United States Patent
De Wind et al.

(10) Patent No.: US 8,908,039 B2
(45) Date of Patent: **\*Dec. 9, 2014**

(54) VEHICULAR VIDEO MIRROR SYSTEM

(75) Inventors: Darryl P. De Wind, West Olive, MI (US); Mark E. Kramer, Zeeland, MI (US); Andrew D. Weller, Holland, MI (US); Peter J. Whitehead, Grand Rapids, MI (US); Rodney K. Blank, Zeeland, MI (US); Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 68 days.

This patent is subject to a terminal disclaimer.

(21) Appl. No.: 13/487,806

(22) Filed: Jun. 4, 2012

(65) Prior Publication Data

US 2012/0236152 A1  Sep. 20, 2012

Related U.S. Application Data

(63) Continuation of application No. 12/118,121, filed on May 9, 2008, now Pat. No. 8,194,133, which is a (Continued)

(51) Int. Cl.
| | |
|---|---|
| *H04N 7/18* | (2006.01) |
| *B60K 35/00* | (2006.01) |
| *B60K 37/06* | (2006.01) |
| *G01C 21/26* | (2006.01) |
| *B60R 11/02* | (2006.01) |
| *B60R 1/12* | (2006.01) |
| *B60R 11/00* | (2006.01) |

(52) U.S. Cl.
CPC ............ *B60R 1/12* (2013.01); *B60R 2001/1253* (2013.01); *B60R 2011/0082* (2013.01); *B60K 35/00* (2013.01); *B60R 2001/1215* (2013.01); *B60K 37/06* (2013.01); *G01C 21/265* (2013.01); *B60R 11/0235* (2013.01); *B60K 2350/1028* (2013.01); *B60K 2350/1024* (2013.01)
USPC ........................................................ 348/148

(58) Field of Classification Search
None
See application file for complete search history.

(56) References Cited

U.S. PATENT DOCUMENTS

| | | |
|---|---|---|
| 1,096,452 A | 5/1914 | Perrin |
| 1,563,258 A | 11/1925 | Cunningham |

(Continued)

FOREIGN PATENT DOCUMENTS

| | | |
|---|---|---|
| AU | A-40317/95 | 2/1995 |
| CN | 1189224 | 7/1998 |

(Continued)

OTHER PUBLICATIONS

Stewart, James W.; HP SnapLED: LED Assemblies for Automotive Signal Applications; Nov. 1, 1998; Hewlett-Packard Journal; vol. 50, No. 1, www.hpl.hp.com/hpjournal/98nov/nov98al.pdf.

(Continued)

*Primary Examiner* — Nhon Diep
(74) *Attorney, Agent, or Firm* — Gardner, Linn, Burkhart & Flory, LLP

(57) ABSTRACT

A video mirror system suitable for use in a vehicle includes an interior rearview mirror assembly mountable at an interior portion of a vehicle and includes a mirror case and a reflective element. A video display device may be one of (i) fixedly disposed in the mirror case and (ii) extendable and retractable relative to the mirror case. The video display device is operable to display video images that are viewable by the driver of the vehicle when the interior rearview mirror assembly is mounted at the interior portion of the vehicle. The interior rearview mirror assembly includes an on-screen display controller operable to receive a video signal from a camera and, responsive to receipt of the video signal, the on-screen display controller is operable to generate a video feed to the video display device.

36 Claims, 35 Drawing Sheets

Related U.S. Application Data continuation of application No. 11/284,543, filed on Nov. 22, 2005, now Pat. No. 7,370,983, and a continuation-in-part of application No. 10/538,724, filed as application No. PCT/US03/40611 on Dec. 19, 2003, now abandoned, said application No. 11/284,543 is a continuation-in-part of application No. 10/755,915, filed on Jan. 13, 2004, now Pat. No. 7,446,650, which is a continuation of application No. 09/793,002, filed on Feb. 26, 2001, now Pat. No. 6,690,268.

(60) Provisional application No. 60/630,061, filed on Nov. 22, 2004, provisional application No. 60/667,048, filed on Mar. 31, 2005, provisional application No. 60/435,554, filed on Dec. 20, 2002, provisional application No. 60/439,626, filed on Jan. 13, 2003, provisional application No. 60/489,812, filed on Jul. 24, 2003, provisional application No. 60/492,225, filed on Aug. 1, 2003, provisional application No. 60/263,680, filed on Jan. 23, 2001, provisional application No. 60/243,986, filed on Oct. 27, 2000, provisional application No. 60/238,483, filed on Oct. 6, 2000, provisional application No. 60/237,077, filed on Sep. 30, 2000, provisional application No. 60/234,412, filed on Sep. 21, 2000, provisional application No. 60/218,336, filed on Jul. 14, 2000, provisional application No. 60/186,520, filed on Mar. 2, 2000.

(56) References Cited

U.S. PATENT DOCUMENTS

| | | |
|---|---|---|
| 2,069,368 A | 2/1937 | Horinstein |
| 2,166,303 A | 7/1939 | Hodny et al. |
| 2,263,382 A | 11/1941 | Gotzinger |
| 2,414,223 A | 1/1947 | DeVirgilis |
| 2,457,348 A | 12/1948 | Chambers |
| 2,561,582 A | 7/1951 | Marbel |
| 2,580,014 A | 12/1951 | Gazda |
| 3,004,473 A | 10/1961 | Arthur et al. |
| 3,075,430 A | 1/1963 | Woodward et al. |
| 3,141,393 A | 7/1964 | Platt |
| 3,152,216 A | 10/1964 | Woodward |
| 3,162,008 A | 12/1964 | Berger et al. |
| 3,185,020 A | 5/1965 | Thelen |
| 3,266,016 A | 8/1966 | Maruyama et al. |
| 3,280,701 A | 10/1966 | Donnelly et al. |
| 3,432,225 A | 3/1969 | Rock |
| 3,451,741 A | 6/1969 | Manos |
| 3,453,038 A | 7/1969 | Kissa et al. |
| 3,467,465 A | 9/1969 | Van Noord |
| 3,473,867 A | 10/1969 | Byrnes |
| 3,480,781 A | 11/1969 | Mandalakas |
| 3,499,112 A | 3/1970 | Heilmeier et al. |
| 3,499,702 A | 3/1970 | Goldmacher et al. |
| 3,521,941 A | 7/1970 | Deb et al. |
| 3,543,018 A | 11/1970 | Barcus et al. |
| 3,557,265 A | 1/1971 | Chisholm et al. |
| 3,565,985 A | 2/1971 | Schrenk et al. |
| 3,612,654 A | 10/1971 | Klein |
| 3,614,210 A | 10/1971 | Caplan |
| 3,628,851 A | 12/1971 | Robertson |
| 3,676,668 A | 7/1972 | Collins et al. |
| 3,680,951 A | 8/1972 | Jordan et al. |
| 3,689,695 A | 9/1972 | Rosenfield et al. |
| 3,711,176 A | 1/1973 | Alfrey, Jr. et al. |
| 3,712,710 A | 1/1973 | Castellion et al. |
| 3,748,017 A | 7/1973 | Yamamura et al. |
| 3,781,090 A | 12/1973 | Sumita |
| 3,806,229 A | 4/1974 | Schoot et al. |
| 3,807,832 A | 4/1974 | Castellion |
| 3,807,833 A | 4/1974 | Graham et al. |
| 3,821,590 A | 6/1974 | Kosman et al. |
| 3,837,129 A | 9/1974 | Losell |
| 3,860,847 A | 1/1975 | Carley |
| 3,862,798 A | 1/1975 | Hopkins |
| 3,870,404 A | 3/1975 | Wilson et al. |
| 3,876,287 A | 4/1975 | Sprokel |
| 3,932,024 A | 1/1976 | Yaguchi et al. |
| 3,940,822 A | 3/1976 | Emerick et al. |
| 3,956,017 A | 5/1976 | Shigemasa |
| 3,978,190 A | 8/1976 | Kurz, Jr. et al. |
| 3,985,424 A | 10/1976 | Steinacher |
| 4,006,546 A | 2/1977 | Anderson et al. |
| 4,035,681 A | 7/1977 | Savage |
| 4,040,727 A | 8/1977 | Ketchpel |
| 4,052,712 A | 10/1977 | Ohama et al. |
| 4,075,468 A | 2/1978 | Marcus |
| 4,088,400 A | 5/1978 | Assouline et al. |
| 4,093,364 A | 6/1978 | Miller |
| 4,097,131 A | 6/1978 | Nishiyama |
| 4,109,235 A | 8/1978 | Bouthors |
| 4,139,234 A | 2/1979 | Morgan |
| 4,159,866 A | 7/1979 | Wunsch et al. |
| 4,161,653 A | 7/1979 | Bedini et al. |
| 4,171,875 A | 10/1979 | Taylor et al. |
| 4,174,152 A | 11/1979 | Gilia et al. |
| 4,200,361 A | 4/1980 | Malvano et al. |
| 4,202,607 A | 5/1980 | Washizuka et al. |
| 4,211,955 A | 7/1980 | Ray |
| 4,214,266 A | 7/1980 | Myers |
| 4,219,760 A | 8/1980 | Ferro |
| 4,221,955 A | 9/1980 | Joslyn |
| 4,228,490 A | 10/1980 | Thillays |
| 4,247,870 A | 1/1981 | Gabel et al. |
| 4,257,703 A | 3/1981 | Goodrich |
| 4,274,078 A | 6/1981 | Isobe et al. |
| 4,277,804 A | 7/1981 | Robison |
| 4,281,899 A | 8/1981 | Oskam |
| 4,288,814 A | 9/1981 | Talley et al. |
| RE30,835 E | 12/1981 | Giglia |
| 4,306,768 A | 12/1981 | Egging |
| 4,310,851 A | 1/1982 | Pierrat |
| 4,331,382 A | 5/1982 | Graff |
| 4,338,000 A | 7/1982 | Kamimori et al. |
| 4,377,613 A | 3/1983 | Gordon |
| 4,398,805 A | 8/1983 | Cole |
| 4,419,386 A | 12/1983 | Gordon |
| 4,420,238 A | 12/1983 | Felix |
| 4,425,717 A | 1/1984 | Marcus |
| 4,435,042 A | 3/1984 | Wood et al. |
| 4,435,048 A | 3/1984 | Kamimori et al. |
| 4,436,371 A | 3/1984 | Wood et al. |
| 4,438,348 A | 3/1984 | Casper et al. |
| 4,443,057 A | 4/1984 | Bauer et al. |
| 4,446,171 A | 5/1984 | Thomas |
| 4,465,339 A | 8/1984 | Baucke et al. |
| 4,473,695 A | 9/1984 | Wrighton et al. |
| 4,490,227 A | 12/1984 | Bitter |
| 4,491,390 A | 1/1985 | Tong-Shen |
| 4,499,451 A | 2/1985 | Suzuki et al. |
| 4,521,079 A | 6/1985 | Leenhouts et al. |
| 4,524,941 A | 6/1985 | Wood et al. |
| 4,538,063 A | 8/1985 | Bulat |
| 4,546,551 A | 10/1985 | Franks |
| 4,555,694 A | 11/1985 | Yanagishima et al. |
| 4,561,625 A | 12/1985 | Weaver |
| 4,572,619 A | 2/1986 | Reininger et al. |
| 4,580,196 A | 4/1986 | Task |
| 4,580,875 A | 4/1986 | Bechtel et al. |
| 4,581,827 A | 4/1986 | Higashi |
| 4,588,267 A | 5/1986 | Pastore |
| 4,603,946 A | 8/1986 | Kato et al. |
| 4,623,222 A | 11/1986 | Itoh et al. |
| 4,625,210 A | 11/1986 | Sagl |
| 4,626,850 A | 12/1986 | Chey |
| 4,630,040 A | 12/1986 | Haertling |
| 4,630,109 A | 12/1986 | Barton |
| 4,630,904 A | 12/1986 | Pastore |
| 4,634,835 A | 1/1987 | Suzuki |

(56) References Cited

U.S. PATENT DOCUMENTS

| | | |
|---|---|---|
| 4,635,033 A | 1/1987 | Inukai et al. |
| 4,636,782 A | 1/1987 | Nakamura et al. |
| 4,638,287 A | 1/1987 | Umebayashi et al. |
| 4,646,210 A | 2/1987 | Skogler et al. |
| 4,652,090 A | 3/1987 | Uchikawa et al. |
| 4,655,549 A | 4/1987 | Suzuki et al. |
| 4,664,479 A | 5/1987 | Hiroshi |
| 4,665,311 A | 5/1987 | Cole |
| 4,665,430 A | 5/1987 | Hiroyasu |
| 4,669,827 A | 6/1987 | Fukada et al. |
| 4,671,615 A | 6/1987 | Fukada et al. |
| 4,671,619 A | 6/1987 | Kamimori et al. |
| 4,678,281 A | 7/1987 | Bauer |
| 4,679,906 A | 7/1987 | Brandenburg |
| 4,682,083 A | 7/1987 | Alley |
| 4,692,798 A | 9/1987 | Seko et al. |
| 4,694,295 A | 9/1987 | Miller et al. |
| 4,697,883 A | 10/1987 | Suzuki et al. |
| 4,701,022 A | 10/1987 | Jacob |
| 4,702,566 A | 10/1987 | Tukude et al. |
| 4,704,740 A | 11/1987 | McKee et al. |
| 4,711,544 A | 12/1987 | Iino et al. |
| 4,712,879 A | 12/1987 | Lynam et al. |
| 4,713,685 A | 12/1987 | Nishimura et al. |
| RE32,576 E | 1/1988 | Pastore |
| 4,718,756 A | 1/1988 | Lancaster |
| 4,721,364 A | 1/1988 | Itoh et al. |
| 4,729,068 A | 3/1988 | Ohe |
| 4,729,076 A | 3/1988 | Masami et al. |
| 4,731,669 A | 3/1988 | Hayashi et al. |
| 4,733,335 A | 3/1988 | Serizawa et al. |
| 4,733,336 A | 3/1988 | Skogler et al. |
| 4,740,838 A | 4/1988 | Mase et al. |
| 4,761,061 A | 8/1988 | Nishiyama et al. |
| 4,773,740 A | 9/1988 | Kawakami et al. |
| 4,780,752 A | 10/1988 | Angerstein et al. |
| 4,781,436 A | 11/1988 | Armbruster |
| 4,789,774 A | 12/1988 | Koch et al. |
| 4,789,904 A | 12/1988 | Peterson |
| 4,793,690 A | 12/1988 | Gahan et al. |
| 4,793,695 A | 12/1988 | Wada et al. |
| 4,794,261 A | 12/1988 | Rosen |
| D299,491 S | 1/1989 | Masuda |
| 4,799,768 A | 1/1989 | Gahan |
| 4,803,599 A | 2/1989 | Trine et al. |
| 4,807,096 A | 2/1989 | Skogler et al. |
| 4,820,933 A | 4/1989 | Hong et al. |
| 4,825,232 A | 4/1989 | Howdle |
| 4,826,289 A | 5/1989 | Vandenbrink et al. |
| 4,827,086 A | 5/1989 | Rockwell |
| 4,837,551 A | 6/1989 | Iino |
| 4,842,378 A | 6/1989 | Flasck et al. |
| 4,845,402 A | 7/1989 | Smith |
| 4,847,772 A | 7/1989 | Michalopoulos et al. |
| 4,855,161 A | 8/1989 | Moser et al. |
| 4,855,550 A | 8/1989 | Schultz, Jr. |
| 4,859,813 A | 8/1989 | Rockwell |
| 4,859,867 A | 8/1989 | Larson et al. |
| 4,860,171 A | 8/1989 | Kojima |
| 4,862,594 A | 9/1989 | Schierbeek et al. |
| 4,871,917 A | 10/1989 | O'Farrell et al. |
| 4,872,051 A | 10/1989 | Dye |
| 4,882,466 A | 11/1989 | Friel |
| 4,882,565 A | 11/1989 | Gallmeyer |
| 4,883,349 A | 11/1989 | Mittelhauser |
| 4,884,135 A | 11/1989 | Schiffman |
| 4,886,960 A | 12/1989 | Molyneux et al. |
| 4,889,412 A | 12/1989 | Clerc et al. |
| 4,891,828 A | 1/1990 | Kawazoe |
| 4,892,345 A | 1/1990 | Rachael, III |
| 4,902,103 A | 2/1990 | Miyake et al. |
| 4,902,108 A | 2/1990 | Byker |
| 4,906,085 A | 3/1990 | Sugihara et al. |
| 4,909,606 A | 3/1990 | Wada et al. |
| 4,910,591 A | 3/1990 | Petrossian et al. |
| 4,916,374 A | 4/1990 | Schierbeek et al. |
| 4,917,477 A | 4/1990 | Bechtel et al. |
| 4,926,170 A | 5/1990 | Beggs et al. |
| 4,930,742 A | 6/1990 | Schofield et al. |
| 4,933,814 A | 6/1990 | Sanai |
| 4,935,665 A | 6/1990 | Murata |
| 4,936,533 A | 6/1990 | Adams et al. |
| 4,937,796 A | 6/1990 | Tendler |
| 4,937,945 A | 7/1990 | Schofield et al. |
| 4,943,796 A | 7/1990 | Lee |
| 4,948,242 A | 8/1990 | Desmond et al. |
| 4,953,305 A | 9/1990 | Van Lente et al. |
| 4,956,591 A | 9/1990 | Schierbeek et al. |
| 4,957,349 A | 9/1990 | Clerc et al. |
| 4,959,247 A | 9/1990 | Moser et al. |
| 4,959,865 A | 9/1990 | Stettiner et al. |
| 4,970,653 A | 11/1990 | Kenue |
| 4,973,844 A | 11/1990 | O'Farrell et al. |
| 4,974,122 A | 11/1990 | Shaw |
| 4,978,196 A | 12/1990 | Suzuki et al. |
| 4,983,951 A | 1/1991 | Igarashi et al. |
| 4,985,809 A | 1/1991 | Matsui et al. |
| 4,987,357 A | 1/1991 | Masaki |
| 4,989,956 A | 2/1991 | Wu et al. |
| 4,996,083 A | 2/1991 | Moser et al. |
| 5,001,386 A | 3/1991 | Sullivan et al. |
| 5,001,558 A | 3/1991 | Burley et al. |
| 5,005,213 A | 4/1991 | Hanson et al. |
| 5,006,971 A | 4/1991 | Jenkins |
| 5,014,167 A | 5/1991 | Roberts |
| 5,016,988 A | 5/1991 | Iimura |
| 5,016,996 A | 5/1991 | Ueno |
| 5,017,903 A | 5/1991 | Krippelz, Sr. |
| 5,018,839 A | 5/1991 | Yamamoto et al. |
| 5,027,200 A | 6/1991 | Petrossian et al. |
| 5,037,182 A | 8/1991 | Groves et al. |
| 5,038,255 A | 8/1991 | Nishihashi et al. |
| 5,052,163 A | 10/1991 | Czekala |
| 5,056,899 A | 10/1991 | Warszawski |
| 5,057,974 A | 10/1991 | Mizobe |
| 5,058,851 A | 10/1991 | Lawlor et al. |
| 5,059,015 A | 10/1991 | Tran |
| 5,066,108 A | 11/1991 | McDonald |
| 5,066,112 A | 11/1991 | Lynam et al. |
| 5,069,535 A | 12/1991 | Baucke et al. |
| 5,070,323 A | 12/1991 | Iino et al. |
| 5,073,012 A | 12/1991 | Lynam |
| 5,076,673 A | 12/1991 | Lynam et al. |
| 5,076,674 A | 12/1991 | Lynam |
| 5,078,480 A | 1/1992 | Warszawski |
| 5,096,287 A | 3/1992 | Kakinami et al. |
| 5,100,095 A | 3/1992 | Haan et al. |
| 5,101,139 A | 3/1992 | Lechter |
| 5,105,127 A | 4/1992 | Lavaud et al. |
| 5,115,346 A | 5/1992 | Lynam |
| 5,119,220 A | 6/1992 | Narita et al. |
| 5,121,200 A | 6/1992 | Choi |
| 5,122,619 A | 6/1992 | Dlubak |
| 5,123,077 A | 6/1992 | Endo et al. |
| 5,124,845 A | 6/1992 | Shimojo |
| 5,124,890 A | 6/1992 | Choi et al. |
| 5,128,799 A | 7/1992 | Byker |
| 5,130,898 A | 7/1992 | Akahane |
| 5,131,154 A | 7/1992 | Schierbeek et al. |
| 5,134,507 A | 7/1992 | Ishii |
| 5,134,549 A | 7/1992 | Yokoyama |
| 5,135,298 A | 8/1992 | Feltman |
| 5,136,483 A | 8/1992 | Schöniger et al. |
| 5,140,455 A | 8/1992 | Varaprasad et al. |
| 5,140,465 A | 8/1992 | Yasui et al. |
| 5,142,407 A | 8/1992 | Varaprasad et al. |
| 5,145,609 A | 9/1992 | Varaprasad et al. |
| 5,148,306 A | 9/1992 | Yamada et al. |
| 5,150,232 A | 9/1992 | Gunkima et al. |
| 5,151,816 A | 9/1992 | Varaprasad et al. |
| 5,151,824 A | 9/1992 | O'Farrell |
| 5,154,617 A | 10/1992 | Suman et al. |
| 5,158,638 A | 10/1992 | Osanami et al. |
| 5,160,200 A | 11/1992 | Cheselske |

(56) References Cited

U.S. PATENT DOCUMENTS

| | | |
|---|---|---|
| 5,160,201 A | 11/1992 | Wrobel |
| 5,166,815 A | 11/1992 | Elderfield |
| 5,168,378 A | 12/1992 | Black et al. |
| 5,173,881 A | 12/1992 | Sindle |
| 5,177,031 A | 1/1993 | Buchmann et al. |
| 5,178,448 A | 1/1993 | Adams et al. |
| 5,179,471 A | 1/1993 | Caskey et al. |
| 5,183,099 A | 2/1993 | Bechu |
| 5,184,956 A | 2/1993 | Langlarais et al. |
| 5,189,537 A | 2/1993 | O'Farrell |
| 5,193,029 A | 3/1993 | Schofield et al. |
| 5,197,562 A | 3/1993 | Kakinama et al. |
| 5,202,950 A | 4/1993 | Arego et al. |
| 5,207,492 A | 5/1993 | Roberts |
| 5,210,967 A | 5/1993 | Brown |
| 5,212,819 A | 5/1993 | Wada |
| 5,214,408 A | 5/1993 | Asayama |
| 5,217,794 A | 6/1993 | Schrenk |
| 5,223,814 A | 6/1993 | Suman |
| 5,223,844 A | 6/1993 | Mansell et al. |
| 5,229,975 A | 7/1993 | Truesdell et al. |
| 5,230,400 A | 7/1993 | Kakinami et al. |
| 5,233,461 A | 8/1993 | Dornan et al. |
| 5,235,316 A | 8/1993 | Qualizza |
| 5,239,405 A | 8/1993 | Varaprasad et al. |
| 5,239,406 A | 8/1993 | Lynam |
| 5,243,417 A | 9/1993 | Pollard |
| 5,245,422 A | 9/1993 | Borcherts et al. |
| 5,252,354 A | 10/1993 | Cronin et al. |
| 5,253,109 A | 10/1993 | O'Farrell et al. |
| 5,255,442 A | 10/1993 | Schierbeek et al. |
| 5,260,626 A | 11/1993 | Takase et al. |
| 5,277,986 A | 1/1994 | Cronin et al. |
| 5,280,555 A | 1/1994 | Ainsburg |
| 5,285,060 A | 2/1994 | Larson et al. |
| 5,289,321 A | 2/1994 | Secor |
| 5,296,924 A | 3/1994 | de Saint Blancard et al. |
| 5,303,075 A | 4/1994 | Wada et al. |
| 5,303,205 A | 4/1994 | Gauthier et al. |
| 5,304,980 A | 4/1994 | Maekawa |
| 5,305,012 A | 4/1994 | Faris |
| 5,307,136 A | 4/1994 | Saneyoshi |
| 5,313,335 A | 5/1994 | Gray et al. |
| 5,325,096 A | 6/1994 | Pakett |
| 5,325,386 A | 6/1994 | Jewell et al. |
| 5,327,288 A | 7/1994 | Wellington et al. |
| 5,330,149 A | 7/1994 | Haan et al. |
| 5,331,312 A | 7/1994 | Kudoh |
| 5,331,358 A | 7/1994 | Schurle et al. |
| 5,339,075 A | 8/1994 | Abst et al. |
| 5,339,529 A | 8/1994 | Lindberg |
| 5,341,437 A | 8/1994 | Nakayama |
| D351,370 S | 10/1994 | Lawlor et al. |
| 5,354,965 A | 10/1994 | Lee |
| 5,355,118 A | 10/1994 | Fukuhara |
| 5,355,245 A | 10/1994 | Lynam |
| 5,355,284 A | 10/1994 | Roberts |
| 5,361,190 A | 11/1994 | Roberts et al. |
| 5,363,294 A | 11/1994 | Yamamoto et al. |
| 5,371,659 A | 12/1994 | Pastrick et al. |
| 5,373,482 A | 12/1994 | Gauthier |
| 5,379,146 A | 1/1995 | Defendini |
| 5,386,285 A | 1/1995 | Asayama |
| 5,386,306 A | 1/1995 | Gunjima et al. |
| 5,400,158 A | 3/1995 | Ohnishi et al. |
| 5,402,103 A | 3/1995 | Tashiro |
| 5,406,395 A | 4/1995 | Wilson et al. |
| 5,406,414 A | 4/1995 | O'Farrell et al. |
| 5,408,353 A | 4/1995 | Nichols et al. |
| 5,408,357 A | 4/1995 | Beukema |
| 5,410,346 A | 4/1995 | Saneyoshi et al. |
| 5,414,439 A | 5/1995 | Groves et al. |
| 5,414,461 A | 5/1995 | Kishi et al. |
| 5,416,313 A | 5/1995 | Larson et al. |
| 5,416,478 A | 5/1995 | Morinaga |
| 5,418,610 A | 5/1995 | Fischer |
| 5,422,756 A | 6/1995 | Weber |
| 5,424,726 A | 6/1995 | Beymer |
| 5,424,865 A | 6/1995 | Lynam |
| 5,424,952 A | 6/1995 | Asayama |
| 5,426,524 A | 6/1995 | Wada et al. |
| 5,426,723 A | 6/1995 | Horsley |
| 5,430,431 A | 7/1995 | Nelson |
| 5,432,496 A | 7/1995 | Lin |
| 5,432,626 A | 7/1995 | Sasuga et al. |
| 5,436,741 A | 7/1995 | Crandall |
| 5,437,931 A | 8/1995 | Tsai et al. |
| 5,439,305 A | 8/1995 | Santo |
| 5,444,478 A | 8/1995 | Lelong et al. |
| 5,446,576 A | 8/1995 | Lynam et al. |
| 5,455,716 A | 10/1995 | Suman et al. |
| 5,461,361 A | 10/1995 | Moore |
| D363,920 S | 11/1995 | Roberts et al. |
| 5,469,187 A | 11/1995 | Yaniv |
| 5,469,298 A | 11/1995 | Suman et al. |
| 5,475,366 A | 12/1995 | Van Lente et al. |
| 5,475,494 A | 12/1995 | Nishida et al. |
| 5,481,409 A | 1/1996 | Roberts |
| 5,483,453 A | 1/1996 | Uemura et al. |
| 5,485,161 A | 1/1996 | Vaughn |
| 5,485,378 A | 1/1996 | Franke et al. |
| 5,487,522 A | 1/1996 | Hook |
| 5,488,496 A | 1/1996 | Pine |
| 5,497,305 A | 3/1996 | Pastrick et al. |
| 5,497,306 A | 3/1996 | Pastrick |
| 5,500,760 A | 3/1996 | Varaprasad et al. |
| 5,506,701 A | 4/1996 | Ichikawa |
| 5,509,606 A | 4/1996 | Breithaupt et al. |
| 5,510,983 A | 4/1996 | Iino |
| 5,515,448 A | 5/1996 | Nishitani |
| 5,517,853 A | 5/1996 | Chamussy |
| 5,519,621 A | 5/1996 | Wortham |
| 5,521,744 A | 5/1996 | Mazurek |
| 5,521,760 A | 5/1996 | DeYoung et al. |
| 5,523,811 A | 6/1996 | Wada et al. |
| 5,523,877 A | 6/1996 | Lynam |
| 5,525,264 A | 6/1996 | Cronin et al. |
| 5,525,977 A | 6/1996 | Suman |
| 5,528,422 A | 6/1996 | Roberts |
| 5,528,474 A | 6/1996 | Roney et al. |
| 5,529,138 A | 6/1996 | Shaw et al. |
| 5,530,240 A | 6/1996 | Larson et al. |
| 5,530,420 A | 6/1996 | Tsuchiya et al. |
| 5,530,421 A | 6/1996 | Marshall et al. |
| 5,535,056 A | 7/1996 | Caskey et al. |
| 5,535,144 A | 7/1996 | Kise |
| 5,539,397 A | 7/1996 | Asanuma et al. |
| 5,541,590 A | 7/1996 | Nishio |
| 5,550,677 A | 8/1996 | Schofield et al. |
| 5,555,172 A | 9/1996 | Potter |
| 5,561,333 A | 10/1996 | Darius |
| 5,566,224 A | 10/1996 | ul Azam et al. |
| 5,567,360 A | 10/1996 | Varaprasad et al. |
| 5,568,316 A | 10/1996 | Schrenck et al. |
| 5,570,127 A | 10/1996 | Schmidt |
| 5,572,354 A | 11/1996 | Desmond et al. |
| 5,574,426 A | 11/1996 | Shisgal et al. |
| 5,574,443 A | 11/1996 | Hsieh |
| 5,575,552 A | 11/1996 | Faloon et al. |
| 5,576,687 A | 11/1996 | Blank et al. |
| 5,576,854 A | 11/1996 | Schmidt et al. |
| 5,576,975 A | 11/1996 | Sasaki et al. |
| 5,578,404 A | 11/1996 | Kliem |
| 5,587,236 A | 12/1996 | Agrawal et al. |
| 5,587,699 A | 12/1996 | Faloon et al. |
| 5,593,221 A | 1/1997 | Evanicky et al. |
| 5,594,222 A | 1/1997 | Caldwell |
| 5,594,560 A | 1/1997 | Jelley et al. |
| 5,594,615 A | 1/1997 | Spijkerman et al. |
| 5,602,542 A | 2/1997 | Widmann et al. |
| 5,602,670 A | 2/1997 | Keegan |
| 5,603,104 A | 2/1997 | Phelps, III et al. |
| 5,608,550 A | 3/1997 | Epstein et al. |
| 5,609,652 A | 3/1997 | Yamada et al. |

(56) References Cited

U.S. PATENT DOCUMENTS

| | | |
|---|---|---|
| 5,610,380 A | 3/1997 | Nicolaisen |
| 5,610,756 A | 3/1997 | Lynam et al. |
| 5,611,966 A | 3/1997 | Varaprasad et al. |
| 5,614,885 A | 3/1997 | Van Lente et al. |
| 5,615,023 A | 3/1997 | Yang |
| 5,615,857 A | 4/1997 | Hook |
| 5,617,085 A | 4/1997 | Tsutsumi et al. |
| 5,619,374 A | 4/1997 | Roberts |
| 5,619,375 A | 4/1997 | Roberts |
| 5,621,571 A | 4/1997 | Bantli et al. |
| 5,626,800 A | 5/1997 | Williams et al. |
| 5,631,089 A | 5/1997 | Center, Jr. et al. |
| 5,631,638 A | 5/1997 | Kaspar et al. |
| 5,631,639 A | 5/1997 | Hibino et al. |
| 5,632,092 A | 5/1997 | Blank et al. |
| 5,632,551 A | 5/1997 | Roney et al. |
| 5,634,709 A | 6/1997 | Iwama |
| 5,640,216 A | 6/1997 | Hasegawa et al. |
| 5,642,238 A | 6/1997 | Sala |
| 5,644,851 A | 7/1997 | Blank et al. |
| 5,646,614 A | 7/1997 | Abersfelder et al. |
| 5,649,756 A | 7/1997 | Adams et al. |
| 5,649,758 A | 7/1997 | Dion |
| 5,650,765 A | 7/1997 | Park |
| 5,650,929 A | 7/1997 | Potter et al. |
| 5,661,455 A | 8/1997 | Van Lente et al. |
| 5,661,651 A | 8/1997 | Geschke et al. |
| 5,661,804 A | 8/1997 | Dykema et al. |
| 5,662,375 A | 9/1997 | Adams et al. |
| 5,666,157 A | 9/1997 | Aviv |
| 5,667,289 A | 9/1997 | Akahane et al. |
| 5,668,663 A | 9/1997 | Varaprasad et al. |
| 5,668,675 A | 9/1997 | Fredricks |
| 5,669,698 A | 9/1997 | Veldman et al. |
| 5,669,699 A | 9/1997 | Pastrick et al. |
| 5,669,704 A | 9/1997 | Pastrick |
| 5,669,705 A | 9/1997 | Pastrick et al. |
| 5,670,935 A | 9/1997 | Schofield et al. |
| 5,671,996 A | 9/1997 | Bos et al. |
| 5,673,994 A | 10/1997 | Fant, Jr. et al. |
| 5,673,999 A | 10/1997 | Koenck |
| 5,677,598 A | 10/1997 | De Hair et al. |
| 5,679,283 A | 10/1997 | Tonar et al. |
| 5,680,123 A | 10/1997 | Lee |
| 5,680,245 A | 10/1997 | Lynam |
| 5,680,263 A | 10/1997 | Zimmermann et al. |
| 5,686,975 A | 11/1997 | Lipton |
| 5,686,979 A | 11/1997 | Weber et al. |
| 5,689,241 A | 11/1997 | Clark, Sr. et al. |
| 5,689,370 A | 11/1997 | Tonar et al. |
| 5,691,848 A | 11/1997 | Van Lente et al. |
| 5,692,819 A | 12/1997 | Mitsutake et al. |
| 5,696,529 A | 12/1997 | Evanicky et al. |
| 5,696,567 A | 12/1997 | Wada et al. |
| 5,699,044 A | 12/1997 | Van Lente et al. |
| 5,699,188 A | 12/1997 | Gilbert et al. |
| 5,703,568 A | 12/1997 | Hegyi |
| 5,708,410 A | 1/1998 | Blank et al. |
| 5,708,415 A | 1/1998 | Van Lente et al. |
| 5,708,857 A | 1/1998 | Ishibashi |
| 5,715,093 A | 2/1998 | Schierbeek et al. |
| 5,724,187 A | 3/1998 | Varaprasad et al. |
| 5,724,316 A | 3/1998 | Brunts |
| 5,729,194 A | 3/1998 | Spears et al. |
| 5,737,226 A | 4/1998 | Olson et al. |
| 5,741,966 A | 4/1998 | Handfield et al. |
| 5,744,227 A | 4/1998 | Bright et al. |
| 5,745,050 A | 4/1998 | Nakagawa |
| 5,745,266 A | 4/1998 | Smith |
| 5,748,172 A | 5/1998 | Song et al. |
| 5,748,287 A | 5/1998 | Takahashi et al. |
| 5,751,211 A | 5/1998 | Shirai et al. |
| 5,751,246 A | 5/1998 | Hertel |
| 5,751,390 A | 5/1998 | Crawford et al. |
| 5,751,489 A | 5/1998 | Caskey et al. |
| 5,754,099 A | 5/1998 | Nishimura et al. |
| D394,833 S | 6/1998 | Muth |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,762,823 A | 6/1998 | Hikmet |
| 5,764,139 A | 6/1998 | Nojima et al. |
| 5,765,940 A | 6/1998 | Levy et al. |
| 5,767,793 A | 6/1998 | Agravante et al. |
| 5,768,020 A | 6/1998 | Nagao |
| 5,775,762 A | 7/1998 | Vitito |
| 5,777,779 A | 7/1998 | Hashimoto et al. |
| 5,780,160 A | 7/1998 | Allemand et al. |
| 5,786,772 A | 7/1998 | Schofield et al. |
| 5,788,357 A | 8/1998 | Muth et al. |
| 5,790,298 A | 8/1998 | Tonar |
| 5,790,502 A | 8/1998 | Horinouchi et al. |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,796,176 A | 8/1998 | Kramer et al. |
| 5,798,057 A | 8/1998 | Hikmet |
| 5,798,575 A | 8/1998 | O'Farrell et al. |
| 5,798,688 A | 8/1998 | Schofield |
| 5,800,918 A | 9/1998 | Chartier et al. |
| 5,802,727 A | 9/1998 | Blank et al. |
| 5,803,579 A | 9/1998 | Turnbull et al. |
| 5,805,330 A | 9/1998 | Byker et al. |
| 5,805,367 A | 9/1998 | Kanazawa |
| 5,806,879 A | 9/1998 | Hamada et al. |
| 5,806,965 A | 9/1998 | Deese |
| 5,808,197 A | 9/1998 | Dao |
| 5,808,566 A | 9/1998 | Behr et al. |
| 5,808,589 A | 9/1998 | Fergason |
| 5,808,713 A | 9/1998 | Broer et al. |
| 5,808,777 A | 9/1998 | Lynam et al. |
| 5,808,778 A | 9/1998 | Bauer et al. |
| 5,812,321 A | 9/1998 | Schierbeek et al. |
| 5,813,745 A | 9/1998 | Fant, Jr. et al. |
| 5,818,625 A | 10/1998 | Forgette et al. |
| 5,820,097 A | 10/1998 | Spooner |
| 5,820,245 A | 10/1998 | Desmond et al. |
| 5,822,023 A | 10/1998 | Suman et al. |
| 5,823,654 A | 10/1998 | Pastrick et al. |
| 5,825,527 A | 10/1998 | Forgette et al. |
| 5,835,166 A | 11/1998 | Hall et al. |
| 5,837,994 A | 11/1998 | Stam et al. |
| 5,844,505 A | 12/1998 | Van Ryzin |
| 5,848,373 A | 12/1998 | DeLorme et al. |
| 5,850,176 A | 12/1998 | Kinoshita et al. |
| 5,850,205 A | 12/1998 | Blouin |
| 5,863,116 A | 1/1999 | Pastrick et al. |
| 5,864,419 A | 1/1999 | Lynam |
| 5,867,801 A | 2/1999 | Denny |
| 5,871,275 A | 2/1999 | O'Farrell et al. |
| 5,871,843 A | 2/1999 | Yoneda et al. |
| 5,877,707 A | 3/1999 | Kowalick |
| 5,877,897 A | 3/1999 | Schofield et al. |
| 5,878,353 A | 3/1999 | ul Azam et al. |
| 5,878,370 A | 3/1999 | Olson |
| 5,879,074 A | 3/1999 | Pastrick |
| 5,883,605 A | 3/1999 | Knapp |
| 5,883,739 A | 3/1999 | Ashihara et al. |
| 5,888,431 A | 3/1999 | Tonar et al. |
| 5,894,196 A | 4/1999 | McDermott |
| D409,540 S | 5/1999 | Muth |
| 5,899,551 A | 5/1999 | Neijzen et al. |
| 5,899,956 A | 5/1999 | Chan |
| 5,904,729 A | 5/1999 | Ruzicka |
| 5,910,854 A | 6/1999 | Varaprasad et al. |
| 5,914,815 A | 6/1999 | Bos |
| 5,917,664 A | 6/1999 | O'Neill et al. |
| 5,918,180 A | 6/1999 | Dimino |
| 5,922,176 A | 7/1999 | Caskey |
| 5,923,027 A | 7/1999 | Stam et al. |
| 5,923,457 A | 7/1999 | Byker et al. |
| 5,924,212 A | 7/1999 | Domanski |

(56) References Cited

U.S. PATENT DOCUMENTS

| | | |
|---|---|---|
| 5,926,087 A | 7/1999 | Busch et al. |
| 5,927,792 A | 7/1999 | Welling et al. |
| 5,928,572 A | 7/1999 | Tonar et al. |
| 5,929,786 A | 7/1999 | Schofield et al. |
| 5,935,702 A | 8/1999 | Macquart et al. |
| 5,936,774 A | 8/1999 | Street |
| 5,938,320 A | 8/1999 | Crandall |
| 5,938,321 A | 8/1999 | Bos et al. |
| 5,938,721 A | 8/1999 | Dussell et al. |
| 5,940,011 A | 8/1999 | Agravante et al. |
| 5,940,120 A | 8/1999 | Frankhouse et al. |
| 5,940,201 A | 8/1999 | Ash et al. |
| 5,942,895 A | 8/1999 | Popovic et al. |
| 5,947,586 A | 9/1999 | Weber |
| 5,949,331 A | 9/1999 | Schofield et al. |
| 5,949,506 A | 9/1999 | Jones et al. |
| 5,956,079 A | 9/1999 | Ridgley |
| 5,956,181 A | 9/1999 | Lin |
| 5,959,367 A | 9/1999 | O'Farrell et al. |
| 5,959,555 A | 9/1999 | Furuta |
| 5,959,577 A | 9/1999 | Fan et al. |
| 5,963,247 A | 10/1999 | Banitt |
| 5,963,284 A | 10/1999 | Jones et al. |
| 5,965,247 A | 10/1999 | Jonza et al. |
| 5,968,538 A | 10/1999 | Snyder, Jr. |
| 5,971,552 A | 10/1999 | O'Farrell et al. |
| 5,973,760 A | 10/1999 | Dehmlow |
| 5,975,715 A | 11/1999 | Bauder |
| 5,984,482 A | 11/1999 | Rumsey et al. |
| 5,986,730 A | 11/1999 | Hansen et al. |
| 5,990,469 A | 11/1999 | Bechtel et al. |
| 5,990,625 A | 11/1999 | Meissner et al. |
| 5,995,180 A | 11/1999 | Moriwaki et al. |
| 5,998,617 A | 12/1999 | Srinivasa et al. |
| 5,998,929 A | 12/1999 | Bechtel et al. |
| 6,000,823 A | 12/1999 | Desmond et al. |
| 6,001,486 A | 12/1999 | Varaprasad et al. |
| 6,002,511 A | 12/1999 | Varaprasad et al. |
| 6,002,983 A | 12/1999 | Alland et al. |
| 6,005,724 A | 12/1999 | Todd |
| 6,007,222 A | 12/1999 | Thau |
| 6,008,486 A | 12/1999 | Stam et al. |
| 6,008,871 A | 12/1999 | Okumura |
| 6,009,359 A | 12/1999 | El-Hakim et al. |
| 6,016,035 A | 1/2000 | Eberspächer et al. |
| 6,016,215 A | 1/2000 | Byker |
| 6,019,411 A | 2/2000 | Carter et al. |
| 6,019,475 A | 2/2000 | Lynam et al. |
| 6,020,987 A | 2/2000 | Baumann et al. |
| 6,021,371 A | 2/2000 | Fultz |
| 6,023,229 A | 2/2000 | Bugno et al. |
| 6,025,872 A | 2/2000 | Ozaki et al. |
| 6,028,537 A | 2/2000 | Suman et al. |
| 6,037,689 A | 3/2000 | Bingle et al. |
| 6,040,939 A | 3/2000 | Demiryont et al. |
| 6,042,253 A | 3/2000 | Fant, Jr. et al. |
| 6,042,934 A | 3/2000 | Guiselin et al. |
| 6,045,243 A | 4/2000 | Muth et al. |
| 6,045,643 A | 4/2000 | Byker et al. |
| 6,046,766 A | 4/2000 | Sakata |
| 6,046,837 A | 4/2000 | Yamamoto |
| 6,049,171 A | 4/2000 | Stam et al. |
| D425,466 S | 5/2000 | Todd et al. |
| 6,060,989 A | 5/2000 | Gehlot |
| 6,061,002 A | 5/2000 | Weber et al. |
| 6,062,920 A | 5/2000 | Jordan et al. |
| 6,064,508 A | 5/2000 | Forgette et al. |
| 6,065,840 A | 5/2000 | Caskey et al. |
| 6,066,920 A | 5/2000 | Torihara et al. |
| 6,067,111 A | 5/2000 | Hahn et al. |
| 6,067,500 A | 5/2000 | Morimoto et al. |
| 6,068,380 A | 5/2000 | Lynn et al. |
| D426,506 S | 6/2000 | Todd et al. |
| D426,507 S | 6/2000 | Todd et al. |
| D427,128 S | 6/2000 | Mathieu |
| 6,072,391 A | 6/2000 | Suzukie et al. |
| 6,074,077 A | 6/2000 | Pastrick et al. |
| 6,074,777 A | 6/2000 | Reimers et al. |
| 6,076,948 A | 6/2000 | Bukosky et al. |
| 6,078,355 A | 6/2000 | Zengel |
| 6,078,865 A | 6/2000 | Koyanagi |
| D428,372 S | 7/2000 | Todd et al. |
| D428,373 S | 7/2000 | Todd et al. |
| 6,082,881 A | 7/2000 | Hicks |
| 6,084,700 A | 7/2000 | Knapp et al. |
| 6,086,131 A | 7/2000 | Bingle et al. |
| 6,086,229 A | 7/2000 | Pastrick |
| 6,087,012 A | 7/2000 | Varaprasad et al. |
| 6,087,953 A | 7/2000 | DeLine et al. |
| 6,091,343 A | 7/2000 | Dykema et al. |
| 6,093,976 A | 7/2000 | Kramer et al. |
| 6,094,618 A | 7/2000 | Harada |
| D428,842 S | 8/2000 | Todd et al. |
| D429,202 S | 8/2000 | Todd et al. |
| D430,088 S | 8/2000 | Todd et al. |
| 6,097,023 A | 8/2000 | Schofield et al. |
| 6,097,316 A | 8/2000 | Liaw et al. |
| 6,099,131 A | 8/2000 | Fletcher et al. |
| 6,099,155 A | 8/2000 | Pastrick et al. |
| 6,102,546 A | 8/2000 | Carter |
| 6,102,559 A | 8/2000 | Nold et al. |
| 6,104,552 A | 8/2000 | Thau et al. |
| 6,106,121 A | 8/2000 | Buckley et al. |
| 6,111,498 A | 8/2000 | Jobes et al. |
| 6,111,683 A | 8/2000 | Cammenga et al. |
| 6,111,684 A | 8/2000 | Forgette et al. |
| 6,111,685 A | 8/2000 | Tench et al. |
| 6,111,696 A | 8/2000 | Allen et al. |
| 6,115,086 A | 9/2000 | Rosen |
| 6,115,651 A | 9/2000 | Cruz |
| 6,116,743 A | 9/2000 | Hoek |
| 6,118,219 A | 9/2000 | Okigami et al. |
| 6,122,597 A | 9/2000 | Saneyoshi et al. |
| 6,122,921 A | 9/2000 | Brezoczky et al. |
| 6,124,647 A | 9/2000 | Marcus et al. |
| 6,124,886 A | 9/2000 | DeLine et al. |
| 6,127,919 A | 10/2000 | Wylin |
| 6,127,945 A | 10/2000 | Mura-Smith |
| 6,128,576 A | 10/2000 | Nishimoto et al. |
| 6,130,421 A | 10/2000 | Bechtel et al. |
| 6,130,448 A | 10/2000 | Bauer et al. |
| 6,132,072 A | 10/2000 | Turnbull et al. |
| 6,137,620 A | 10/2000 | Guarr et al. |
| 6,139,171 A | 10/2000 | Waldmann |
| 6,139,172 A | 10/2000 | Bos et al. |
| 6,140,933 A | 10/2000 | Bugno et al. |
| 6,142,656 A | 11/2000 | Kurth |
| 6,146,003 A | 11/2000 | Thau |
| 6,147,934 A | 11/2000 | Arikawa et al. |
| 6,148,261 A | 11/2000 | Obradovich et al. |
| 6,149,287 A | 11/2000 | Pastrick et al. |
| 6,150,014 A | 11/2000 | Chu et al. |
| 6,151,065 A | 11/2000 | Steed et al. |
| 6,151,539 A | 11/2000 | Bergholz et al. |
| 6,152,551 A | 11/2000 | Annas |
| 6,152,590 A | 11/2000 | Fürst et al. |
| 6,154,149 A | 11/2000 | Tyckowski et al. |
| 6,154,306 A | 11/2000 | Varaprasad et al. |
| 6,157,294 A | 12/2000 | Urai et al. |
| 6,157,418 A | 12/2000 | Rosen |
| 6,157,424 A | 12/2000 | Eichenlaub |
| 6,157,480 A | 12/2000 | Anderson et al. |
| 6,158,655 A | 12/2000 | DeVries, Jr. et al. |
| 6,161,865 A | 12/2000 | Rose et al. |
| 6,164,564 A | 12/2000 | Franco et al. |
| 6,166,625 A | 12/2000 | Teowee et al. |
| 6,166,629 A | 12/2000 | Hamma et al. |
| 6,166,834 A | 12/2000 | Taketomi et al. |
| 6,166,847 A | 12/2000 | Tench et al. |
| 6,166,848 A | 12/2000 | Cammenga et al. |
| 6,167,255 A | 12/2000 | Kennedy, III et al. |
| 6,167,755 B1 | 1/2001 | Damson et al. |
| 6,169,955 B1 | 1/2001 | Fultz |
| 6,170,956 B1 | 1/2001 | Rumsey et al. |

(56) References Cited

U.S. PATENT DOCUMENTS

| | | |
|---|---|---|
| 6,172,600 B1 | 1/2001 | Kakinami et al. |
| 6,172,601 B1 | 1/2001 | Wada et al. |
| 6,172,613 B1 | 1/2001 | DeLine et al. |
| 6,173,501 B1 | 1/2001 | Blank et al. |
| 6,175,164 B1 | 1/2001 | O'Farrell et al. |
| 6,175,300 B1 | 1/2001 | Kendrick |
| 6,176,602 B1 | 1/2001 | Pastrick et al. |
| 6,178,034 B1 | 1/2001 | Allemand et al. |
| 6,178,377 B1 | 1/2001 | Ishihara et al. |
| 6,181,387 B1 | 1/2001 | Rosen |
| 6,182,006 B1 | 1/2001 | Meek |
| 6,183,119 B1 | 2/2001 | Desmond et al. |
| 6,184,679 B1 | 2/2001 | Popovic et al. |
| 6,184,781 B1 | 2/2001 | Ramakesavan |
| 6,185,492 B1 | 2/2001 | Kagawa et al. |
| 6,185,501 B1 | 2/2001 | Smith et al. |
| 6,188,505 B1 | 2/2001 | Lomprey et al. |
| 6,191,704 B1 | 2/2001 | Takenaga et al. |
| 6,193,379 B1 | 2/2001 | Tonar et al. |
| 6,193,912 B1 | 2/2001 | Thieste et al. |
| 6,195,194 B1 | 2/2001 | Roberts et al. |
| 6,196,688 B1 | 3/2001 | Caskey et al. |
| 6,198,409 B1 | 3/2001 | Schofield et al. |
| 6,199,014 B1 | 3/2001 | Walker et al. |
| 6,199,810 B1 | 3/2001 | Wu et al. |
| 6,200,010 B1 | 3/2001 | Anders |
| 6,201,642 B1 | 3/2001 | Bos |
| 6,206,553 B1 | 3/2001 | Boddy et al. |
| 6,207,083 B1 | 3/2001 | Varaprasad et al. |
| 6,210,008 B1 | 4/2001 | Hoekstra et al. |
| 6,210,012 B1 | 4/2001 | Broer |
| 6,212,470 B1 | 4/2001 | Seymour et al. |
| 6,217,181 B1 | 4/2001 | Lynam et al. |
| 6,218,934 B1 | 4/2001 | Regan |
| 6,222,447 B1 | 4/2001 | Schofield et al. |
| 6,222,460 B1 | 4/2001 | DeLine et al. |
| 6,222,689 B1 | 4/2001 | Higuchi et al. |
| 6,227,689 B1 | 5/2001 | Miller |
| 6,232,937 B1 | 5/2001 | Jacobsen et al. |
| 6,236,514 B1 | 5/2001 | Sato |
| 6,239,851 B1 | 5/2001 | Hatazawa et al. |
| 6,239,898 B1 | 5/2001 | Byker et al. |
| 6,239,899 B1 | 5/2001 | DeVries et al. |
| 6,243,003 B1 | 6/2001 | DeLine et al. |
| 6,244,716 B1 | 6/2001 | Steenwyk et al. |
| 6,245,262 B1 | 6/2001 | Varaprasad et al. |
| 6,247,820 B1 | 6/2001 | Van Order |
| 6,249,214 B1 | 6/2001 | Kashiwazaki |
| 6,249,310 B1 | 6/2001 | Lefkowitz |
| 6,249,369 B1 | 6/2001 | Theiste et al. |
| 6,250,148 B1 | 6/2001 | Lynam |
| 6,250,766 B1 | 6/2001 | Strumolo et al. |
| 6,250,783 B1 | 6/2001 | Stidham et al. |
| 6,255,639 B1 | 7/2001 | Stam et al. |
| 6,257,746 B1 | 7/2001 | Todd et al. |
| 6,259,412 B1 | 7/2001 | Duroux |
| 6,259,475 B1 | 7/2001 | Ramachandran et al. |
| 6,260,608 B1 | 7/2001 | Kim |
| 6,262,842 B1 | 7/2001 | Ouderkirk et al. |
| 6,264,353 B1 | 7/2001 | Caraher et al. |
| 6,265,968 B1 | 7/2001 | Betzitza et al. |
| 6,268,803 B1 | 7/2001 | Gunderson et al. |
| 6,268,837 B1 | 7/2001 | Kobayashi et al. |
| 6,269,308 B1 | 7/2001 | Kodaka et al. |
| 6,271,901 B1 | 8/2001 | Ide et al. |
| 6,274,221 B2 | 8/2001 | Smith et al. |
| 6,276,821 B1 | 8/2001 | Pastrick et al. |
| 6,276,822 B1 | 8/2001 | Bedrosian et al. |
| 6,277,471 B1 | 8/2001 | Tang |
| 6,278,271 B1 | 8/2001 | Schott |
| 6,278,377 B1 | 8/2001 | DeLine et al. |
| 6,278,941 B1 | 8/2001 | Yokoyama |
| 6,280,068 B1 | 8/2001 | Mertens et al. |
| 6,280,069 B1 | 8/2001 | Pastrick et al. |
| 6,281,804 B1 | 8/2001 | Haller et al. |
| 6,286,965 B1 | 9/2001 | Caskey et al. |
| 6,286,984 B1 | 9/2001 | Berg |
| 6,289,332 B2 | 9/2001 | Menig et al. |
| 6,290,378 B1 | 9/2001 | Buchalla et al. |
| 6,291,905 B1 | 9/2001 | Drummond et al. |
| 6,291,906 B1 | 9/2001 | Marcus et al. |
| 6,294,989 B1 | 9/2001 | Schofield et al. |
| 6,296,379 B1 | 10/2001 | Pastrick |
| 6,297,781 B1 | 10/2001 | Turnbull et al. |
| 6,299,333 B1 | 10/2001 | Pastrick et al. |
| 6,300,879 B1 | 10/2001 | Ragan et al. |
| 6,301,039 B1 | 10/2001 | Tench |
| 6,304,173 B2 | 10/2001 | Pala et al. |
| 6,305,807 B1 | 10/2001 | Schierbeek |
| 6,310,611 B1 | 10/2001 | Caldwell |
| 6,310,714 B1 | 10/2001 | Lomprey et al. |
| 6,310,738 B1 | 10/2001 | Chu |
| 6,313,454 B1 | 11/2001 | Bos et al. |
| 6,314,295 B1 | 11/2001 | Kawamoto |
| 6,315,440 B1 | 11/2001 | Satoh |
| 6,317,057 B1 | 11/2001 | Lee |
| 6,317,180 B1 | 11/2001 | Kuroiwa et al. |
| 6,317,248 B1 | 11/2001 | Agrawal et al. |
| 6,318,870 B1 | 11/2001 | Spooner et al. |
| 6,320,176 B1 | 11/2001 | Schofield et al. |
| 6,320,282 B1 | 11/2001 | Caldwell |
| 6,320,612 B1 | 11/2001 | Young |
| 6,324,295 B1 | 11/2001 | Valery et al. |
| 6,326,613 B1 | 12/2001 | Heslin et al. |
| 6,326,900 B2 | 12/2001 | DeLine et al. |
| 6,329,925 B1 | 12/2001 | Skiver et al. |
| 6,330,511 B2 | 12/2001 | Ogura et al. |
| 6,331,066 B1 | 12/2001 | Desmond et al. |
| 6,333,759 B1 | 12/2001 | Mazzilli |
| 6,335,680 B1 | 1/2002 | Matsuoka |
| 6,336,737 B1 | 1/2002 | Thau |
| 6,340,850 B2 | 1/2002 | O'Farrell et al. |
| 6,341,523 B2 | 1/2002 | Lynam |
| 6,344,805 B1 | 2/2002 | Yasui et al. |
| 6,346,698 B1 | 2/2002 | Turnbull |
| 6,347,880 B1 | 2/2002 | Fürst et al. |
| 6,348,858 B2 | 2/2002 | Weis et al. |
| 6,351,708 B1 | 2/2002 | Takagi et al. |
| 6,353,392 B1 | 3/2002 | Schofield et al. |
| 6,356,206 B1 | 3/2002 | Takenaga et al. |
| 6,356,376 B1 | 3/2002 | Tonar et al. |
| 6,356,389 B1 | 3/2002 | Nilsen et al. |
| 6,357,883 B1 | 3/2002 | Strumolo et al. |
| 6,362,121 B1 | 3/2002 | Chopin et al. |
| 6,362,548 B1 | 3/2002 | Bingle et al. |
| 6,363,326 B1 | 3/2002 | Scully |
| 6,366,013 B1 | 4/2002 | Leenders et al. |
| 6,366,213 B2 | 4/2002 | DeLine et al. |
| 6,369,701 B1 | 4/2002 | Yoshida et al. |
| 6,370,329 B1 | 4/2002 | Teuchert |
| 6,371,636 B1 | 4/2002 | Wesson |
| 6,379,013 B1 | 4/2002 | Bechtel et al. |
| 6,379,788 B2 | 4/2002 | Choi et al. |
| 6,382,805 B1 | 5/2002 | Miyabukuro |
| 6,385,139 B1 | 5/2002 | Arikawa et al. |
| 6,386,742 B1 | 5/2002 | DeLine et al. |
| 6,390,529 B1 | 5/2002 | Bingle et al. |
| 6,390,626 B2 | 5/2002 | Knox |
| 6,390,635 B2 | 5/2002 | Whitehead et al. |
| 6,396,397 B1 | 5/2002 | Bos et al. |
| 6,396,408 B2 | 5/2002 | Drummond et al. |
| 6,396,637 B2 | 5/2002 | Roest et al. |
| 6,407,468 B1 | 6/2002 | LeVesque et al. |
| 6,407,847 B1 | 6/2002 | Poll et al. |
| 6,408,247 B1 | 6/2002 | Ichikawa et al. |
| 6,411,204 B1 | 6/2002 | Bloomfield et al. |
| 6,412,959 B1 | 7/2002 | Tseng |
| 6,412,973 B1 | 7/2002 | Bos et al. |
| 6,414,910 B1 | 7/2002 | Kaneko et al. |
| 6,415,230 B1 | 7/2002 | Maruko et al. |
| 6,416,208 B2 | 7/2002 | Pastrick et al. |
| 6,417,786 B2 | 7/2002 | Learman et al. |
| 6,418,376 B1 | 7/2002 | Olson |
| 6,419,300 B1 | 7/2002 | Pavao et al. |

(56) References Cited

U.S. PATENT DOCUMENTS

| | | |
|---|---|---|
| 6,420,036 B1 | 7/2002 | Varaprasad et al. |
| 6,420,800 B1 | 7/2002 | LeVesque et al. |
| 6,420,975 B1 | 7/2002 | DeLine et al. |
| 6,421,081 B1 | 7/2002 | Markus |
| 6,424,272 B1 | 7/2002 | Gutta et al. |
| 6,424,273 B1 | 7/2002 | Gutta et al. |
| 6,424,786 B1 | 7/2002 | Beeson et al. |
| 6,424,892 B1 | 7/2002 | Matsuoka |
| 6,426,492 B1 | 7/2002 | Bos et al. |
| 6,426,568 B2 | 7/2002 | Turnbull et al. |
| 6,427,349 B1 | 8/2002 | Blank et al. |
| 6,428,172 B1 | 8/2002 | Hutzel et al. |
| 6,433,676 B2 | 8/2002 | DeLine et al. |
| 6,433,680 B1 | 8/2002 | Ho |
| 6,433,914 B1 | 8/2002 | Lomprey et al. |
| 6,437,688 B1 | 8/2002 | Kobayashi |
| 6,438,491 B1 | 8/2002 | Farmer |
| 6,439,755 B1 | 8/2002 | Fant, Jr. et al. |
| 6,441,872 B1 | 8/2002 | Ho |
| 6,441,943 B1 | 8/2002 | Roberts et al. |
| 6,441,963 B2 | 8/2002 | Murakami et al. |
| 6,441,964 B1 | 8/2002 | Chu et al. |
| 6,445,287 B1 | 9/2002 | Schofield et al. |
| 6,447,128 B1 | 9/2002 | Lang et al. |
| 6,449,082 B1 | 9/2002 | Agrawal et al. |
| 6,452,533 B1 | 9/2002 | Yamabuchi et al. |
| 6,452,572 B1 | 9/2002 | Fan et al. |
| 6,456,438 B1 | 9/2002 | Lee et al. |
| 6,462,795 B1 | 10/2002 | Clarke |
| 6,463,369 B2 | 10/2002 | Sadano et al. |
| 6,466,701 B1 | 10/2002 | Ejiri et al. |
| 6,471,362 B1 | 10/2002 | Carter et al. |
| 6,472,977 B1 | 10/2002 | Pöchmüller |
| 6,472,979 B2 | 10/2002 | Schofield et al. |
| 6,473,001 B1 | 10/2002 | Blum |
| 6,474,853 B2 | 11/2002 | Pastrick et al. |
| 6,476,731 B1 | 11/2002 | Miki et al. |
| 6,476,855 B1 | 11/2002 | Yamamoto |
| 6,477,460 B2 | 11/2002 | Kepler |
| 6,477,464 B2 | 11/2002 | McCarthy et al. |
| 6,483,429 B1 | 11/2002 | Yasui et al. |
| 6,483,438 B2 | 11/2002 | DeLine et al. |
| 6,483,613 B1 | 11/2002 | Woodgate et al. |
| 6,487,500 B2 | 11/2002 | Lemelson et al. |
| 6,494,602 B2 | 12/2002 | Pastrick et al. |
| 6,498,620 B2 | 12/2002 | Schofield et al. |
| 6,501,387 B2 | 12/2002 | Skiver et al. |
| 6,512,203 B2 | 1/2003 | Jones et al. |
| 6,512,624 B2 | 1/2003 | Tonar et al. |
| 6,513,252 B1 | 2/2003 | Schierbeek et al. |
| 6,515,378 B2 | 2/2003 | Drummond et al. |
| 6,515,581 B1 | 2/2003 | Ho |
| 6,515,582 B1 | 2/2003 | Teowee |
| 6,515,597 B1 | 2/2003 | Wada et al. |
| 6,516,664 B2 | 2/2003 | Lynam |
| 6,518,691 B1 | 2/2003 | Baba |
| 6,519,209 B1 | 2/2003 | Arikawa et al. |
| 6,520,667 B1 | 2/2003 | Mousseau |
| 6,522,451 B1 | 2/2003 | Lynam |
| 6,522,969 B2 | 2/2003 | Kannonji |
| 6,525,707 B1 | 2/2003 | Kaneko et al. |
| 6,534,884 B2 | 3/2003 | Marcus et al. |
| 6,538,709 B1 | 3/2003 | Kurihara et al. |
| 6,539,306 B2 | 3/2003 | Turnbull |
| 6,542,085 B1 | 4/2003 | Yang |
| 6,542,182 B1 | 4/2003 | Chutorash |
| 6,543,163 B1 | 4/2003 | Ginsberg |
| 6,545,598 B1 | 4/2003 | de Villeroche |
| 6,549,253 B1 | 4/2003 | Robbie et al. |
| 6,549,335 B1 | 4/2003 | Trapani et al. |
| 6,550,949 B1 | 4/2003 | Bauer et al. |
| 6,552,326 B2 | 4/2003 | Turnbull |
| 6,552,653 B2 | 4/2003 | Nakaho et al. |
| 6,553,308 B1 | 4/2003 | Uhlmann et al. |
| 6,559,761 B1 | 5/2003 | Miller et al. |
| 6,559,902 B1 | 5/2003 | Kusuda et al. |
| 6,560,004 B2 | 5/2003 | Theiste et al. |
| 6,560,027 B2 | 5/2003 | Meine |
| 6,566,821 B2 | 5/2003 | Nakatsuka et al. |
| 6,567,060 B1 | 5/2003 | Sekiguchi |
| 6,567,708 B1 | 5/2003 | Bechtel et al. |
| 6,568,839 B1 | 5/2003 | Pastrick et al. |
| 6,572,233 B1 | 6/2003 | Northman et al. |
| 6,573,957 B1 | 6/2003 | Suzuki |
| 6,573,963 B2 | 6/2003 | Ouderkirk et al. |
| 6,575,582 B2 | 6/2003 | Tenmyo |
| 6,575,643 B2 | 6/2003 | Takahashi |
| 6,578,989 B2 | 6/2003 | Osumi et al. |
| 6,580,373 B1 | 6/2003 | Ohashi |
| 6,580,479 B1 | 6/2003 | Sekiguchi et al. |
| 6,580,562 B2 | 6/2003 | Aoki et al. |
| 6,581,007 B2 | 6/2003 | Hasegawa et al. |
| 6,583,730 B2 | 6/2003 | Lang et al. |
| 6,591,192 B2 | 7/2003 | Okamura et al. |
| 6,592,230 B2 | 7/2003 | Dupay |
| 6,593,565 B2 | 7/2003 | Heslin et al. |
| 6,593,984 B2 | 7/2003 | Arakawa et al. |
| 6,594,065 B2 | 7/2003 | Byker et al. |
| 6,594,067 B2 | 7/2003 | Poll et al. |
| 6,594,090 B2 | 7/2003 | Kruschwitz et al. |
| 6,594,583 B2 | 7/2003 | Ogura et al. |
| 6,594,614 B2 | 7/2003 | Studt et al. |
| 6,595,649 B2 | 7/2003 | Hoekstra et al. |
| 6,597,489 B1 | 7/2003 | Guarr et al. |
| 6,606,183 B2 | 8/2003 | Ikai et al. |
| 6,611,202 B2 | 8/2003 | Schofield et al. |
| 6,611,227 B1 | 8/2003 | Nebiyeloul-Kifle et al. |
| 6,611,759 B2 | 8/2003 | Brosche |
| 6,612,723 B2 | 9/2003 | Futhey et al. |
| 6,614,387 B1 | 9/2003 | Deadman |
| 6,614,419 B1 | 9/2003 | May |
| 6,614,579 B2 | 9/2003 | Roberts et al. |
| 6,615,438 B1 | 9/2003 | Franco et al. |
| 6,616,313 B2 | 9/2003 | Fürst et al. |
| 6,616,764 B2 | 9/2003 | Krämer et al. |
| 6,618,672 B2 | 9/2003 | Sasaki et al. |
| 6,621,616 B1 | 9/2003 | Bauer et al. |
| 6,624,936 B2 | 9/2003 | Kotchick et al. |
| 6,627,918 B2 | 9/2003 | Getz et al. |
| 6,630,888 B2 | 10/2003 | Lang et al. |
| 6,636,190 B2 | 10/2003 | Hirakata et al. |
| 6,636,258 B2 | 10/2003 | Strumolo |
| 6,638,582 B1 | 10/2003 | Uchiyama et al. |
| 6,639,360 B2 | 10/2003 | Roberts et al. |
| 6,642,840 B2 | 11/2003 | Lang et al. |
| 6,642,851 B2 | 11/2003 | DeLine et al. |
| 6,646,697 B1 | 11/2003 | Sekiguchi et al. |
| 6,648,477 B2 | 11/2003 | Hutzel et al. |
| 6,650,457 B2 | 11/2003 | Busscher et al. |
| 6,657,607 B1 | 12/2003 | Evanicky et al. |
| 6,661,482 B2 | 12/2003 | Hara |
| 6,661,830 B1 | 12/2003 | Reed et al. |
| 6,663,262 B2 | 12/2003 | Boyd et al. |
| 6,665,592 B2 | 12/2003 | Kodama |
| 6,669,109 B2 | 12/2003 | Ivanov et al. |
| 6,669,285 B1 | 12/2003 | Park et al. |
| 6,670,207 B1 | 12/2003 | Roberts |
| 6,670,910 B2 | 12/2003 | Delcheccolo et al. |
| 6,670,935 B2 | 12/2003 | Yeon et al. |
| 6,670,941 B2 | 12/2003 | Albu et al. |
| 6,671,080 B2 | 12/2003 | Poll et al. |
| 6,672,731 B2 | 1/2004 | Schnell et al. |
| 6,672,734 B2 | 1/2004 | Lammers |
| 6,672,744 B2 | 1/2004 | DeLine et al. |
| 6,672,745 B1 | 1/2004 | Bauer et al. |
| 6,674,370 B2 | 1/2004 | Rodewald et al. |
| 6,675,075 B1 | 1/2004 | Engelsberg et al. |
| 6,678,083 B1 | 1/2004 | Anstee |
| 6,678,614 B2 | 1/2004 | McCarthy et al. |
| 6,679,608 B2 | 1/2004 | Bechtel et al. |
| 6,683,539 B2 | 1/2004 | Trajkovic et al. |
| 6,683,969 B1 | 1/2004 | Nishigaki et al. |
| 6,685,348 B2 | 2/2004 | Pastrick et al. |
| 6,690,262 B1 | 2/2004 | Winnett |

(56) References Cited

U.S. PATENT DOCUMENTS

| | | |
|---|---|---|
| 6,690,268 B2 | 2/2004 | Schofield et al. |
| 6,690,413 B1 | 2/2004 | Moore |
| 6,690,438 B2 | 2/2004 | Sekiguchi |
| 6,693,517 B2 | 2/2004 | McCarthy et al. |
| 6,693,518 B2 | 2/2004 | Kumata et al. |
| 6,693,519 B2 | 2/2004 | Keirstead |
| 6,693,524 B1 | 2/2004 | Payne |
| 6,700,692 B2 | 3/2004 | Tonar et al. |
| 6,704,434 B1 | 3/2004 | Sakoh et al. |
| 6,709,136 B2 | 3/2004 | Pastrick et al. |
| 6,713,783 B1 | 3/2004 | Mase et al. |
| 6,717,109 B1 | 4/2004 | Macher et al. |
| 6,717,610 B1 | 4/2004 | Bos et al. |
| 6,717,712 B2 | 4/2004 | Lynam et al. |
| 6,719,215 B2 | 4/2004 | Drouillard |
| 6,724,446 B2 | 4/2004 | Motomura et al. |
| 6,726,337 B2 | 4/2004 | Whitehead et al. |
| 6,727,807 B2 | 4/2004 | Trajkovic et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,736,526 B2 | 5/2004 | Matsuba et al. |
| 6,737,629 B2 | 5/2004 | Nixon et al. |
| 6,737,630 B2 | 5/2004 | Turnbull |
| 6,737,964 B2 | 5/2004 | Samman et al. |
| 6,738,088 B1 | 5/2004 | Uskolovsky et al. |
| 6,742,904 B2 | 6/2004 | Bechtel et al. |
| 6,744,353 B2 | 6/2004 | Sjönell |
| 6,746,775 B1 | 6/2004 | Boire et al. |
| 6,747,716 B2 | 6/2004 | Kuroiwa et al. |
| 6,748,211 B1 | 6/2004 | Isaac et al. |
| 6,749,308 B1 | 6/2004 | Niendorf et al. |
| 6,755,542 B2 | 6/2004 | Bechtel et al. |
| 6,756,912 B2 | 6/2004 | Skiver et al. |
| 6,757,039 B2 | 6/2004 | Ma |
| 6,757,109 B2 | 6/2004 | Bos |
| D493,131 S | 7/2004 | Lawlor et al. |
| D493,394 S | 7/2004 | Lawlor et al. |
| 6,759,113 B1 | 7/2004 | Tang |
| 6,759,945 B2 | 7/2004 | Richard |
| 6,760,157 B1 | 7/2004 | Allen et al. |
| 6,765,480 B2 | 7/2004 | Tseng |
| 6,773,116 B2 | 8/2004 | De Vaan et al. |
| 6,774,356 B2 | 8/2004 | Heslin et al. |
| 6,774,810 B2 | 8/2004 | DeLine et al. |
| 6,778,904 B2 | 8/2004 | Iwami et al. |
| 6,779,900 B1 | 8/2004 | Nolan-Brown |
| 6,781,738 B2 | 8/2004 | Kikuchi et al. |
| 6,782,718 B2 | 8/2004 | Lingle et al. |
| 6,784,129 B2 | 8/2004 | Seto et al. |
| 6,797,396 B1 | 9/2004 | Liu et al. |
| 6,800,871 B2 | 10/2004 | Matsuda et al. |
| 6,801,127 B2 | 10/2004 | Mizusawa et al. |
| 6,801,244 B2 | 10/2004 | Takeda et al. |
| 6,801,283 B2 | 10/2004 | Koyama et al. |
| 6,805,474 B2 | 10/2004 | Walser et al. |
| 6,806,452 B2 | 10/2004 | Bos et al. |
| 6,806,922 B2 | 10/2004 | Ishitaka |
| 6,810,323 B1 | 10/2004 | Bullock et al. |
| 6,812,463 B2 | 11/2004 | Okada |
| 6,812,907 B1 | 11/2004 | Gennetten et al. |
| 6,819,231 B2 | 11/2004 | Berberich et al. |
| 6,823,261 B2 | 11/2004 | Sekiguchi |
| 6,824,281 B2 | 11/2004 | Schofield et al. |
| 6,831,268 B2 | 12/2004 | Bechtel et al. |
| 6,832,848 B2 | 12/2004 | Pastrick |
| 6,834,969 B2 | 12/2004 | Bade et al. |
| 6,836,725 B2 | 12/2004 | Millington et al. |
| 6,838,980 B2 | 1/2005 | Gloger et al. |
| 6,842,189 B2 | 1/2005 | Park |
| 6,842,276 B2 | 1/2005 | Poll et al. |
| 6,845,805 B1 | 1/2005 | Köster |
| 6,846,098 B2 | 1/2005 | Bourdelais et al. |
| 6,847,424 B2 | 1/2005 | Gotoh et al. |
| 6,847,487 B2 | 1/2005 | Burgner |
| 6,848,817 B2 | 2/2005 | Bos et al. |
| 6,849,165 B2 | 2/2005 | Klöppel et al. |
| 6,853,491 B1 | 2/2005 | Ruhle et al. |
| 6,859,148 B2 | 2/2005 | Miller et al. |
| 6,861,789 B2 | 3/2005 | Wei |
| 6,870,655 B1 | 3/2005 | Northman et al. |
| 6,870,656 B2 | 3/2005 | Tonar et al. |
| 6,871,982 B2 | 3/2005 | Holman et al. |
| 6,877,888 B2 | 4/2005 | DeLine et al. |
| 6,882,287 B2 | 4/2005 | Schofield |
| 6,889,064 B2 | 5/2005 | Baratono et al. |
| 6,891,563 B2 | 5/2005 | Schofield et al. |
| 6,891,677 B2 | 5/2005 | Nilsen et al. |
| 6,898,518 B2 | 5/2005 | Padmanabhan |
| 6,902,284 B2 | 6/2005 | Hutzel et al. |
| 6,904,348 B2 | 6/2005 | Drummond et al. |
| 6,906,620 B2 | 6/2005 | Nakai et al. |
| 6,906,632 B2 | 6/2005 | DeLine et al. |
| 6,909,486 B2 | 6/2005 | Wang et al. |
| 6,910,779 B2 | 6/2005 | Abel et al. |
| 6,912,001 B2 | 6/2005 | Okamoto et al. |
| 6,912,396 B2 | 6/2005 | Sziraki et al. |
| 6,914,521 B2 | 7/2005 | Rothkop |
| 6,916,099 B2 | 7/2005 | Su et al. |
| 6,917,404 B2 | 7/2005 | Baek |
| 6,918,674 B2 | 7/2005 | Drummond et al. |
| 6,922,902 B2 | 8/2005 | Schierbeek et al. |
| 6,923,080 B1 | 8/2005 | Dobler et al. |
| 6,928,180 B2 | 8/2005 | Stam et al. |
| 6,928,366 B2 | 8/2005 | Ockerse et al. |
| 6,930,737 B2 | 8/2005 | Weindorf et al. |
| 6,933,837 B2 | 8/2005 | Gunderson et al. |
| 6,934,067 B2 | 8/2005 | Ash et al. |
| 6,940,423 B2 | 9/2005 | Takagi et al. |
| 6,946,978 B2 | 9/2005 | Schofield |
| 6,947,576 B2 | 9/2005 | Stam et al. |
| 6,947,577 B2 | 9/2005 | Stam et al. |
| 6,949,772 B2 | 9/2005 | Shimizu et al. |
| 6,950,035 B2 | 9/2005 | Tanaka et al. |
| 6,951,410 B2 | 10/2005 | Parsons |
| 6,951,681 B2 | 10/2005 | Hartley et al. |
| 6,952,312 B2 | 10/2005 | Weber et al. |
| 6,958,495 B2 | 10/2005 | Nishijima et al. |
| 6,958,683 B2 | 10/2005 | Mills et al. |
| 6,959,994 B2 | 11/2005 | Fujikawa et al. |
| 6,961,178 B2 | 11/2005 | Sugino et al. |
| 6,961,661 B2 | 11/2005 | Sekiguchi |
| 6,963,438 B2 | 11/2005 | Busscher et al. |
| 6,968,273 B2 | 11/2005 | Ockerse et al. |
| 6,971,181 B2 | 12/2005 | Ohm et al. |
| 6,972,888 B2 | 12/2005 | Poll et al. |
| 6,974,236 B2 | 12/2005 | Tenmyo |
| 6,975,215 B2 | 12/2005 | Schofield et al. |
| 6,977,702 B2 | 12/2005 | Wu |
| 6,980,092 B2 | 12/2005 | Turnbull et al. |
| 6,985,291 B2 | 1/2006 | Watson et al. |
| 6,989,736 B2 | 1/2006 | Berberich et al. |
| 6,992,573 B2 | 1/2006 | Blank et al. |
| 6,992,718 B1 | 1/2006 | Takahara |
| 6,992,826 B2 | 1/2006 | Wang |
| 6,995,687 B2 | 2/2006 | Lang et al. |
| 6,997,571 B2 | 2/2006 | Tenmyo |
| 7,001,058 B2 | 2/2006 | Inditsky |
| 7,004,592 B2 | 2/2006 | Varaprasad et al. |
| 7,004,593 B2 | 2/2006 | Weller et al. |
| 7,005,974 B2 | 2/2006 | McMahon et al. |
| 7,006,173 B1 | 2/2006 | Hiyama et al. |
| 7,008,090 B2 | 3/2006 | Blank |
| 7,009,751 B2 | 3/2006 | Tonar et al. |
| 7,012,543 B2 | 3/2006 | DeLine et al. |
| 7,012,727 B2 | 3/2006 | Hutzel et al. |
| 7,023,331 B2 | 4/2006 | Kodama |
| 7,029,156 B2 | 4/2006 | Suehiro et al. |
| 7,030,738 B2 | 4/2006 | Ishii |
| 7,030,775 B2 | 4/2006 | Sekiguchi |
| 7,038,577 B2 | 5/2006 | Pawlicki et al. |
| 7,041,965 B2 | 5/2006 | Heslin et al. |
| 7,042,616 B2 | 5/2006 | Tonar et al. |

(56) References Cited

U.S. PATENT DOCUMENTS

| | | |
|---|---|---|
| 7,046,418 B2 | 5/2006 | Lin et al. |
| 7,046,448 B2 | 5/2006 | Burgner |
| 7,050,908 B1 | 5/2006 | Schwartz et al. |
| 7,057,505 B2 | 6/2006 | Iwamoto |
| 7,057,681 B2 | 6/2006 | Hinata et al. |
| 7,063,893 B2 | 6/2006 | Hoffman |
| 7,064,882 B2 | 6/2006 | Tonar et al. |
| 7,068,289 B2 | 6/2006 | Satoh et al. |
| 7,074,486 B2 | 7/2006 | Boire et al. |
| 7,081,810 B2 | 7/2006 | Henderson et al. |
| 7,085,633 B2 | 8/2006 | Nishira et al. |
| 7,092,052 B2 | 8/2006 | Okamoto et al. |
| 7,095,432 B2 | 8/2006 | Nakayama et al. |
| 7,095,567 B2 | 8/2006 | Troxell et al. |
| 7,106,213 B2 | 9/2006 | White |
| 7,106,392 B2 | 9/2006 | You |
| 7,108,409 B2 | 9/2006 | DeLine et al. |
| 7,110,021 B2 | 9/2006 | Nobori et al. |
| 7,114,554 B2 | 10/2006 | Bergman et al. |
| 7,121,028 B2 | 10/2006 | Shoen et al. |
| 7,125,131 B2 | 10/2006 | Olczak |
| 7,130,727 B2 | 10/2006 | Liu et al. |
| 7,132,064 B2 | 11/2006 | Li et al. |
| 7,136,091 B2 | 11/2006 | Ichikawa et al. |
| 7,138,974 B2 | 11/2006 | Hirakata et al. |
| 7,149,613 B2 | 12/2006 | Stam et al. |
| 7,150,552 B2 | 12/2006 | Weidel |
| 7,151,515 B2 | 12/2006 | Kim et al. |
| 7,151,997 B2 | 12/2006 | Uhlmann et al. |
| 7,153,588 B2 | 12/2006 | McMan et al. |
| 7,154,657 B2 | 12/2006 | Poll et al. |
| 7,158,881 B2 | 1/2007 | McCarthy et al. |
| 7,160,017 B2 | 1/2007 | Lee et al. |
| 7,161,567 B2 | 1/2007 | Homma et al. |
| 7,167,796 B2 | 1/2007 | Taylor et al. |
| 7,168,830 B2 | 1/2007 | Pastrick et al. |
| 7,175,291 B1 | 2/2007 | Li |
| 7,176,790 B2 | 2/2007 | Yamazaki |
| 7,184,190 B2 | 2/2007 | McCabe et al. |
| 7,185,995 B2 | 3/2007 | Hatanaka et al. |
| 7,187,498 B2 | 3/2007 | Bengoechea et al. |
| 7,188,963 B2 | 3/2007 | Schofield et al. |
| 7,193,764 B2 | 3/2007 | Lin et al. |
| 7,195,381 B2 | 3/2007 | Lynam et al. |
| 7,199,767 B2 | 4/2007 | Spero |
| 7,202,987 B2 | 4/2007 | Varaprasad et al. |
| 7,206,697 B2 | 4/2007 | Olney et al. |
| 7,209,277 B2 | 4/2007 | Tonar et al. |
| 7,215,238 B2 | 5/2007 | Buck et al. |
| 7,215,473 B2 | 5/2007 | Fleming |
| 7,221,363 B2 | 5/2007 | Roberts et al. |
| 7,221,365 B1 | 5/2007 | Lévesque et al. |
| 7,224,324 B2 | 5/2007 | Quist et al. |
| 7,227,472 B1 | 6/2007 | Roe |
| 7,230,523 B2 | 6/2007 | Harter, Jr. et al. |
| 7,232,231 B2 | 6/2007 | Shih |
| 7,232,594 B2 | 6/2007 | Miroshin et al. |
| 7,233,304 B1 | 6/2007 | Aratani et al. |
| 7,235,918 B2 | 6/2007 | McCullough et al. |
| 7,241,030 B2 | 7/2007 | Mok et al. |
| 7,241,037 B2 | 7/2007 | Mathieu et al. |
| 7,245,207 B1 | 7/2007 | Dayan et al. |
| 7,245,231 B2 | 7/2007 | Kiefer et al. |
| 7,245,336 B2 | 7/2007 | Hiyama et al. |
| 7,248,283 B2 | 7/2007 | Takagi et al. |
| 7,248,305 B2 | 7/2007 | Ootsuta et al. |
| 7,249,860 B2 | 7/2007 | Kulas et al. |
| 7,251,079 B2 | 7/2007 | Capaldo et al. |
| 7,253,723 B2 | 8/2007 | Lindahl et al. |
| 7,255,451 B2 | 8/2007 | McCabe et al. |
| 7,255,465 B2 | 8/2007 | DeLine et al. |
| 7,259,036 B2 | 8/2007 | Borland et al. |
| 7,262,406 B2 | 8/2007 | Heslin et al. |
| 7,262,916 B2 | 8/2007 | Kao et al. |
| 7,265,342 B2 | 9/2007 | Heslin et al. |
| 7,268,841 B2 | 9/2007 | Kasajima et al. |
| 7,269,327 B2 | 9/2007 | Tang |
| 7,269,328 B2 | 9/2007 | Tang |
| 7,271,951 B2 | 9/2007 | Weber et al. |
| 7,274,501 B2 | 9/2007 | McCabe et al. |
| 7,281,491 B2 | 10/2007 | Iwamaru |
| 7,286,280 B2 | 10/2007 | Whitehead et al. |
| 7,287,868 B2 | 10/2007 | Carter et al. |
| 7,289,037 B2 | 10/2007 | Uken et al. |
| 7,290,919 B2 | 11/2007 | Pan et al. |
| 7,292,208 B1 | 11/2007 | Park et al. |
| 7,300,183 B2 | 11/2007 | Kiyomoto et al. |
| 7,302,344 B2 | 11/2007 | Olney et al. |
| 7,304,661 B2 | 12/2007 | Ishikura |
| 7,308,341 B2 | 12/2007 | Schofield et al. |
| 7,310,177 B2 | 12/2007 | McCabe et al. |
| 7,311,428 B2 | 12/2007 | DeLine et al. |
| 7,316,485 B2 | 1/2008 | Roose |
| 7,317,386 B2 | 1/2008 | Lengning et al. |
| 7,318,664 B2 | 1/2008 | Hatanaka et al. |
| 7,323,819 B2 | 1/2008 | Hong et al. |
| 7,324,043 B2 | 1/2008 | Purden et al. |
| 7,324,172 B2 | 1/2008 | Yamazaki et al. |
| 7,324,174 B2 | 1/2008 | Hafuka et al. |
| 7,324,261 B2 | 1/2008 | Tonar et al. |
| 7,327,225 B2 | 2/2008 | Nicholas et al. |
| 7,327,226 B2 | 2/2008 | Turnbull et al. |
| 7,327,855 B1 | 2/2008 | Chen |
| 7,328,103 B2 | 2/2008 | McCarthy et al. |
| 7,329,013 B2 | 2/2008 | Blank et al. |
| 7,329,850 B2 | 2/2008 | Drummond et al. |
| 7,331,415 B2 | 2/2008 | Hawes et al. |
| 7,338,177 B2 | 3/2008 | Lynam |
| 7,342,707 B2 | 3/2008 | Roberts et al. |
| 7,344,284 B2 | 3/2008 | Lynam et al. |
| 7,349,143 B2 | 3/2008 | Tonar et al. |
| 7,349,144 B2 | 3/2008 | Varaprasad et al. |
| 7,349,582 B2 | 3/2008 | Takeda et al. |
| 7,355,524 B2 | 4/2008 | Schofield |
| 7,360,932 B2 | 4/2008 | Uken et al. |
| 7,362,505 B2 | 4/2008 | Hikmet et al. |
| 7,368,714 B2 | 5/2008 | Remillard et al. |
| 7,370,983 B2 | 5/2008 | DeWind et al. |
| 7,372,611 B2 | 5/2008 | Tonar et al. |
| 7,375,895 B2 | 5/2008 | Brynielsson |
| 7,379,224 B2 | 5/2008 | Tonar et al. |
| 7,379,225 B2 | 5/2008 | Tonar et al. |
| 7,379,243 B2 | 5/2008 | Horsten et al. |
| 7,379,814 B2 | 5/2008 | Ockerse et al. |
| 7,379,817 B1 | 5/2008 | Tyson et al. |
| 7,380,633 B2 | 6/2008 | Shen et al. |
| 7,389,171 B2 | 6/2008 | Rupp |
| 7,391,563 B2 | 6/2008 | McCabe et al. |
| 7,396,147 B2 | 7/2008 | Munro |
| 7,411,637 B2 | 8/2008 | Weiss |
| 7,411,732 B2 | 8/2008 | Kao et al. |
| 7,412,328 B2 | 8/2008 | Uhlmann et al. |
| 7,417,781 B2 | 8/2008 | Tonar et al. |
| 7,420,159 B2 | 9/2008 | Heslin et al. |
| 7,420,756 B2 | 9/2008 | Lynam |
| 7,429,998 B2 | 9/2008 | Kawauchi et al. |
| 7,446,462 B2 | 11/2008 | Lim et al. |
| 7,446,650 B2 | 11/2008 | Schofield et al. |
| 7,446,924 B2 | 11/2008 | Schofield et al. |
| 7,448,776 B2 | 11/2008 | Tang |
| 7,452,090 B2 | 11/2008 | Weller et al. |
| 7,453,057 B2 | 11/2008 | Drummond et al. |
| 7,455,412 B2 | 11/2008 | Rottcher |
| 7,460,007 B2 | 12/2008 | Schofield et al. |
| 7,467,883 B2 | 12/2008 | DeLine et al. |
| 7,468,651 B2 | 12/2008 | DeLine et al. |
| 7,471,438 B2 | 12/2008 | McCabe et al. |
| 7,474,963 B2 | 1/2009 | Taylor et al. |
| 7,477,439 B2 | 1/2009 | Tonar et al. |
| 7,480,149 B2 | 1/2009 | DeWard et al. |
| 7,488,080 B2 | 2/2009 | Skiver et al. |
| 7,488,099 B2 | 2/2009 | Fogg et al. |
| 7,489,374 B2 | 2/2009 | Utsumi et al. |
| 7,490,007 B2 | 2/2009 | Taylor et al. |

(56) References Cited

U.S. PATENT DOCUMENTS

| | | |
|---|---|---|
| 7,490,943 B2 | 2/2009 | Kikuchi et al. |
| 7,490,944 B2 | 2/2009 | Blank et al. |
| 7,494,231 B2 | 2/2009 | Varaprasad et al. |
| 7,495,719 B2 | 2/2009 | Adachi et al. |
| 7,496,439 B2 | 2/2009 | McCormick |
| 7,502,156 B2 | 3/2009 | Tonar et al. |
| 7,505,047 B2 | 3/2009 | Yoshimura |
| 7,505,188 B2 | 3/2009 | Niiyama et al. |
| 7,511,607 B2 | 3/2009 | Hubbard et al. |
| 7,511,872 B2 | 3/2009 | Tonar et al. |
| 7,525,604 B2 | 4/2009 | Xue |
| 7,525,715 B2 | 4/2009 | McCabe et al. |
| 7,526,103 B2 | 4/2009 | Schofield et al. |
| 7,533,998 B2 | 5/2009 | Schofield et al. |
| 7,538,316 B2 | 5/2009 | Heslin et al. |
| 7,540,620 B2 | 6/2009 | Weller et al. |
| 7,541,570 B2 | 6/2009 | Drummond et al. |
| 7,542,193 B2 | 6/2009 | McCabe et al. |
| 7,543,946 B2 | 6/2009 | Ockerse et al. |
| 7,543,947 B2 | 6/2009 | Varaprasad et al. |
| 7,545,429 B2 | 6/2009 | Travis |
| 7,547,467 B2 | 6/2009 | Olson et al. |
| 7,548,291 B2 | 6/2009 | Lee et al. |
| 7,551,354 B2 | 6/2009 | Horsten et al. |
| 7,561,181 B2 | 7/2009 | Schofield et al. |
| 7,562,985 B2 | 7/2009 | Cortenraad et al. |
| 7,567,291 B2 | 7/2009 | Bechtel et al. |
| 7,571,038 B2 | 8/2009 | Butler et al. |
| 7,571,042 B2 | 8/2009 | Taylor et al. |
| 7,572,017 B2 | 8/2009 | Varaprasad et al. |
| 7,572,490 B2 | 8/2009 | Park et al. |
| 7,579,939 B2 | 8/2009 | Schofield et al. |
| 7,579,940 B2 | 8/2009 | Schofield et al. |
| 7,580,795 B2 | 8/2009 | McCarthy et al. |
| 7,581,859 B2 | 9/2009 | Lynam |
| 7,581,867 B2 | 9/2009 | Lee et al. |
| 7,583,184 B2 | 9/2009 | Schofield et al. |
| 7,586,566 B2 | 9/2009 | Nelson et al. |
| 7,586,666 B2 | 9/2009 | McCabe et al. |
| 7,589,883 B2 | 9/2009 | Varaprasad et al. |
| 7,589,893 B2 | 9/2009 | Rottcher |
| 7,600,878 B2 | 10/2009 | Blank et al. |
| 7,605,883 B2 | 10/2009 | Yamaki et al. |
| 7,619,508 B2 | 11/2009 | Lynam et al. |
| 7,623,202 B2 | 11/2009 | Araki et al. |
| 7,626,749 B2 | 12/2009 | Baur et al. |
| 7,629,996 B2 | 12/2009 | Rademacher et al. |
| 7,633,567 B2 | 12/2009 | Yamada et al. |
| 7,636,188 B2 | 12/2009 | Baur et al. |
| 7,636,195 B2 | 12/2009 | Nieuwkerk et al. |
| 7,636,930 B2 | 12/2009 | Chang |
| 7,643,200 B2 | 1/2010 | Varaprasad et al. |
| 7,643,927 B2 | 1/2010 | Hils |
| 7,651,228 B2 | 1/2010 | Skiver et al. |
| 7,658,521 B2 | 2/2010 | DeLine et al. |
| 7,663,798 B2 | 2/2010 | Tonar et al. |
| 7,667,579 B2 | 2/2010 | DeLine et al. |
| 7,670,016 B2 | 3/2010 | Weller et al. |
| 7,688,495 B2 | 3/2010 | Tonar et al. |
| 7,695,174 B2 | 4/2010 | Takayanagi et al. |
| 7,696,964 B2 | 4/2010 | Lankhorst et al. |
| 7,706,046 B2 | 4/2010 | Bauer et al. |
| 7,710,631 B2 | 5/2010 | McCabe et al. |
| 7,711,479 B2 | 5/2010 | Taylor et al. |
| 7,724,434 B2 | 5/2010 | Cross et al. |
| 7,726,822 B2 | 6/2010 | Blank et al. |
| 7,728,276 B2 | 6/2010 | Drummond et al. |
| 7,728,721 B2 | 6/2010 | Schofield et al. |
| 7,728,927 B2 | 6/2010 | Nieuwkerk et al. |
| 7,731,403 B2 | 6/2010 | Lynam et al. |
| 7,734,392 B2 | 6/2010 | Schofield et al. |
| 7,742,864 B2 | 6/2010 | Sekiguchi |
| 7,746,534 B2 | 6/2010 | Tonar et al. |
| 7,771,061 B2 | 8/2010 | Varaprasad et al. |
| 7,787,077 B2 | 8/2010 | Kondoh et al. |
| 7,791,694 B2 | 9/2010 | Molsen et al. |
| 7,795,675 B2 | 9/2010 | Darwish et al. |
| 7,815,326 B2 | 10/2010 | Blank et al. |
| 7,821,697 B2 | 10/2010 | Varaprasad et al. |
| 7,822,543 B2 | 10/2010 | Taylor et al. |
| 7,826,123 B2 | 11/2010 | McCabe et al. |
| 7,830,583 B2 | 11/2010 | Neuman et al. |
| 7,832,882 B2 | 11/2010 | Weller et al. |
| 7,842,154 B2 | 11/2010 | Lynam |
| 7,854,514 B2 | 12/2010 | Conner et al. |
| 7,855,755 B2 | 12/2010 | Weller et al. |
| 7,859,565 B2 | 12/2010 | Schofield et al. |
| 7,859,737 B2 | 12/2010 | McCabe et al. |
| 7,864,398 B2 | 1/2011 | Dozeman et al. |
| 7,864,399 B2 | 1/2011 | McCabe et al. |
| 7,871,169 B2 | 1/2011 | Varaprasad et al. |
| 7,873,593 B2 | 1/2011 | Schofield et al. |
| 7,888,629 B2 | 2/2011 | Heslin et al. |
| 7,898,398 B2 | 3/2011 | DeLine et al. |
| 7,898,719 B2 | 3/2011 | Schofield et al. |
| 7,903,324 B2 | 3/2011 | Kobayashi et al. |
| 7,903,335 B2 | 3/2011 | Nieuwkerk et al. |
| 7,906,756 B2 | 3/2011 | Drummond et al. |
| 7,911,547 B2 | 3/2011 | Brott et al. |
| 7,914,188 B2 | 3/2011 | DeLine et al. |
| 7,916,009 B2 | 3/2011 | Schofield et al. |
| 7,916,380 B2 | 3/2011 | Tonar et al. |
| 7,918,570 B2 | 4/2011 | Weller et al. |
| 7,926,960 B2 | 4/2011 | Skiver et al. |
| 7,937,667 B2 | 5/2011 | Kramer et al. |
| 7,965,336 B2 | 6/2011 | Bingle et al. |
| 7,965,357 B2 | 6/2011 | Van De Witte et al. |
| 7,980,711 B2 | 7/2011 | Takayanagi et al. |
| 7,994,471 B2 | 8/2011 | Heslin et al. |
| 8,000,894 B2 | 8/2011 | Taylor et al. |
| 8,004,768 B2 | 8/2011 | Takayanagi et al. |
| 8,019,505 B2 | 9/2011 | Schofield et al. |
| 8,027,691 B2 | 9/2011 | Bernas et al. |
| 8,031,225 B2 | 10/2011 | Watanabe et al. |
| 8,040,376 B2 | 10/2011 | Yamada et al. |
| 8,044,776 B2 | 10/2011 | Schofield et al. |
| 8,047,667 B2 | 11/2011 | Weller et al. |
| 8,049,640 B2 | 11/2011 | Uken et al. |
| 8,063,753 B2 | 11/2011 | DeLine et al. |
| 8,072,318 B2 | 12/2011 | Lynam et al. |
| 8,083,386 B2 | 12/2011 | Lynam |
| 8,094,002 B2 | 1/2012 | Schofield et al. |
| 8,095,260 B1 | 1/2012 | Schofield et al. |
| 8,095,310 B2 | 1/2012 | Taylor et al. |
| 8,100,568 B2 | 1/2012 | DeLine et al. |
| 8,106,347 B2 | 1/2012 | Drummond et al. |
| 8,121,787 B2 | 2/2012 | Taylor et al. |
| 8,134,117 B2 | 3/2012 | Heslin et al. |
| 8,144,033 B2 | 3/2012 | Chinomi et al. |
| 8,154,418 B2 | 4/2012 | Hook et al. |
| 8,162,493 B2 | 4/2012 | Skiver et al. |
| 8,164,817 B2 | 4/2012 | Varaprasad et al. |
| 8,169,307 B2 | 5/2012 | Nakamura et al. |
| 8,170,748 B1 | 5/2012 | Schofield et al. |
| 8,177,376 B2 | 5/2012 | Weller et al. |
| 8,179,236 B2 | 5/2012 | Weller et al. |
| 8,179,437 B2 | 5/2012 | Schofield et al. |
| 8,179,586 B2 | 5/2012 | Schofield et al. |
| 8,194,132 B2 | 6/2012 | Dayan et al. |
| 8,194,133 B2 | 6/2012 | De Wind et al. |
| 8,217,887 B2 | 7/2012 | Sangam et al. |
| 8,228,588 B2 | 7/2012 | McCabe et al. |
| 8,237,909 B2 | 8/2012 | Ostreko et al. |
| 8,267,559 B2 | 9/2012 | DeLine et al. |
| 8,271,187 B2 | 9/2012 | Taylor et al. |
| 8,277,059 B2 | 10/2012 | McCabe et al. |
| 8,282,224 B2 | 10/2012 | Anderson et al. |
| 8,282,226 B2 | 10/2012 | Blank et al. |
| 8,282,253 B2 | 10/2012 | Lynam |
| 8,288,711 B2 | 10/2012 | Heslin et al. |
| 8,294,975 B2 | 10/2012 | Varaprasad et al. |
| 8,304,711 B2 | 11/2012 | Drummond et al. |
| 8,308,325 B2 | 11/2012 | Takayanagi et al. |
| 8,309,907 B2 | 11/2012 | Heslin et al. |

(56) References Cited

U.S. PATENT DOCUMENTS

| | | |
|---|---|---|
| 8,325,028 B2 | 12/2012 | Schofield et al. |
| 8,335,032 B2 | 12/2012 | McCabe et al. |
| 8,339,526 B2 | 12/2012 | Minikey, Jr. et al. |
| 8,355,839 B2 | 1/2013 | Schofield et al. |
| 8,358,262 B2 | 1/2013 | Degwekar et al. |
| 8,379,289 B2 | 2/2013 | Schofield et al. |
| 8,400,704 B2 | 3/2013 | McCabe et al. |
| 8,427,288 B2 | 4/2013 | Schofield et al. |
| 2001/0026316 A1 | 10/2001 | Senatore |
| 2001/0035853 A1 | 11/2001 | Hoelen et al. |
| 2002/0049535 A1 | 4/2002 | Rigo et al. |
| 2002/0085155 A1 | 7/2002 | Arikawa |
| 2002/0092958 A1 | 7/2002 | Lusk |
| 2002/0118321 A1 | 8/2002 | Ge |
| 2002/0133144 A1 | 9/2002 | Chan et al. |
| 2002/0149727 A1 | 10/2002 | Wang |
| 2002/0154007 A1 | 10/2002 | Yang |
| 2003/0002165 A1 | 1/2003 | Mathias et al. |
| 2003/0007261 A1 | 1/2003 | Hutzel et al. |
| 2003/0030724 A1 | 2/2003 | Okamoto |
| 2003/0069690 A1 | 4/2003 | Correia et al. |
| 2003/0090568 A1 | 5/2003 | Pico |
| 2003/0090569 A1 | 5/2003 | Poechmueller |
| 2003/0098908 A1 | 5/2003 | Misaiji et al. |
| 2003/0103142 A1 | 6/2003 | Hitomi et al. |
| 2003/0122929 A1 | 7/2003 | Minaudo et al. |
| 2003/0133014 A1 | 7/2003 | Mendoza |
| 2003/0137586 A1 | 7/2003 | Lewellen |
| 2003/0156193 A1 | 8/2003 | Nakamura |
| 2003/0169158 A1 | 9/2003 | Paul, Jr. |
| 2003/0179293 A1 | 9/2003 | Oizumi |
| 2003/0202096 A1 | 10/2003 | Kim |
| 2003/0206256 A1 | 11/2003 | Drain et al. |
| 2003/0214576 A1 | 11/2003 | Koga |
| 2003/0214584 A1 | 11/2003 | Ross, Jr. |
| 2003/0227546 A1 | 12/2003 | Hilborn et al. |
| 2004/0004541 A1 | 1/2004 | Hong |
| 2004/0027695 A1 | 2/2004 | Lin |
| 2004/0036768 A1 | 2/2004 | Green |
| 2004/0080404 A1 | 4/2004 | White |
| 2004/0239243 A1 | 12/2004 | Roberts et al. |
| 2004/0239849 A1 | 12/2004 | Wang |
| 2005/0018738 A1 | 1/2005 | Duan et al. |
| 2005/0024591 A1 | 2/2005 | Lian et al. |
| 2005/0117095 A1 | 6/2005 | Ma |
| 2005/0168995 A1 | 8/2005 | Kittlemann et al. |
| 2005/0237440 A1 | 10/2005 | Sugimura et al. |
| 2005/0270766 A1 | 12/2005 | Kung et al. |
| 2006/0050018 A1 | 3/2006 | Hutzel et al. |
| 2006/0061008 A1 | 3/2006 | Karner et al. |
| 2006/0076860 A1 | 4/2006 | Hoss |
| 2006/0139953 A1 | 6/2006 | Chou et al. |
| 2006/0187378 A1 | 8/2006 | Bong et al. |
| 2006/0279522 A1 | 12/2006 | Kurihara |
| 2007/0064108 A1 | 3/2007 | Haler |
| 2007/0080585 A1 | 4/2007 | Lyu |
| 2007/0086097 A1 | 4/2007 | Motomiya et al. |
| 2007/0183037 A1 | 8/2007 | De Boer et al. |
| 2007/0262732 A1 | 11/2007 | Shen |
| 2008/0042938 A1 | 2/2008 | Cok |
| 2009/0002491 A1 | 1/2009 | Haler |
| 2009/0052003 A1 | 2/2009 | Schofield et al. |
| 2009/0096937 A1 | 4/2009 | Bauer et al. |
| 2009/0201137 A1 | 8/2009 | Weller et al. |
| 2009/0258221 A1 | 10/2009 | Diehl et al. |
| 2009/0262192 A1 | 10/2009 | Schofield et al. |
| 2009/0296190 A1 | 12/2009 | Anderson et al. |
| 2010/0045899 A1 | 2/2010 | Ockerse |
| 2010/0245701 A1 | 9/2010 | Sato et al. |
| 2010/0246017 A1 | 9/2010 | Tonar et al. |
| 2010/0277786 A1 | 11/2010 | Anderson et al. |
| 2010/0289995 A1 | 11/2010 | Hwang et al. |
| 2011/0128137 A1 | 6/2011 | Varaprasad et al. |
| 2011/0166779 A1 | 7/2011 | McCarthy et al. |
| 2011/0166785 A1 | 7/2011 | McCarthy et al. |
| 2012/0050068 A1 | 3/2012 | Deline et al. |
| 2012/0062744 A1 | 3/2012 | Schofield et al. |
| 2012/0086808 A1 | 4/2012 | Lynam et al. |
| 2012/0182141 A1 | 7/2012 | Peterson et al. |
| 2012/0203550 A1 | 8/2012 | Skiver et al. |
| 2012/0206790 A1 | 8/2012 | Varaprasad et al. |
| 2012/0224066 A1 | 9/2012 | Weller et al. |
| 2012/0224248 A1 | 9/2012 | Schofield et al. |
| 2012/0236152 A1 | 9/2012 | De Wind et al. |

FOREIGN PATENT DOCUMENTS

| | | |
|---|---|---|
| DE | 941408 | 4/1956 |
| DE | 944531 | 7/1956 |
| DE | 7323996 | 11/1973 |
| DE | 2808260 | 8/1979 |
| DE | 3248511 A1 | 7/1984 |
| DE | 3301945 | 7/1984 |
| DE | 3614882 | 11/1987 |
| DE | 3720848 | 1/1989 |
| DE | 9306989.8 U1 | 7/1993 |
| DE | 4329983 | 8/1995 |
| DE | 4444443 A1 | 6/1996 |
| DE | 29703084 U1 | 6/1997 |
| DE | 29805142 U1 | 5/1998 |
| DE | 19741896 | 4/1999 |
| DE | 19755008 | 7/1999 |
| DE | 29902344 U1 | 7/1999 |
| DE | 19934999 | 2/2001 |
| DE | 19943355 | 3/2001 |
| DE | 20118868 | 3/2002 |
| DE | 10131459 | 1/2003 |
| DE | 102005000650 | 7/2006 |
| EP | 0299509 A2 | 1/1989 |
| EP | 0513476 A1 | 11/1992 |
| EP | 0524766 | 1/1993 |
| EP | 0729864 A1 | 12/1995 |
| EP | 0728618 A2 | 8/1996 |
| EP | 0825477 | 2/1998 |
| EP | 0830985 | 3/1998 |
| EP | 0928723 A2 | 7/1999 |
| EP | 937601 A2 | 8/1999 |
| EP | 1075986 | 2/2001 |
| EP | 1097848 A | 5/2001 |
| EP | 1152285 A2 | 11/2001 |
| EP | 1193773 | 3/2002 |
| EP | 1256833 | 11/2002 |
| EP | 0899157 | 10/2004 |
| EP | 1315639 | 2/2006 |
| FR | 1021987 A | 2/1953 |
| FR | 1461419 | 12/1966 |
| FR | 2585991 | 2/1987 |
| FR | 2672857 A1 | 8/1992 |
| FR | 2673499 A1 | 9/1992 |
| FR | 2759045 | 8/1998 |
| GB | 810010 | 3/1959 |
| GB | 934037 | 8/1963 |
| GB | 1008411 | 10/1965 |
| GB | 1136134 | 12/1968 |
| GB | 1553376 | 9/1979 |
| GB | 2137573 A | 10/1984 |
| GB | 2161440 | 1/1986 |
| GB | 2192370 | 1/1988 |
| GB | 2222991 | 3/1990 |
| GB | 2255539 A | 11/1992 |
| GB | 2351055 A | 12/2000 |
| GB | 2362494 | 11/2001 |
| JP | 50-000638 A | 1/1975 |
| JP | 52-146988 | 11/1977 |
| JP | 55-039843 | 3/1980 |
| JP | 57-30639 | 2/1982 |
| JP | 57-102602 | 6/1982 |
| JP | 57-208530 | 12/1982 |
| JP | 58-020954 | 2/1983 |
| JP | 58-030729 | 2/1983 |
| JP | 58-110334 | 6/1983 |
| JP | 58-180347 | 10/1983 |
| JP | 58-209635 | 12/1983 |
| JP | 59-114139 | 7/1984 |

(56) References Cited

FOREIGN PATENT DOCUMENTS

| | | |
|---|---|---|
| JP | 60-212730 | 10/1985 |
| JP | 60-261275 | 12/1985 |
| JP | 61-127186 | 6/1986 |
| JP | 61-260217 | 11/1986 |
| JP | 62-043543 | 2/1987 |
| JP | 62-075619 | 4/1987 |
| JP | 62-122487 | 6/1987 |
| JP | 62-131232 | 6/1987 |
| JP | 63-02753 | 1/1988 |
| JP | 63-085525 | 4/1988 |
| JP | 63-106730 | 5/1988 |
| JP | 63-106731 | 5/1988 |
| JP | 63-274286 | 11/1988 |
| JP | 64-14700 | 1/1989 |
| JP | 01-123587 | 5/1989 |
| JP | 01-130578 | 5/1989 |
| JP | 02-122844 | 10/1990 |
| JP | 03-028947 | 3/1991 |
| JP | 03-28947 | 3/1991 |
| JP | 03-052097 | 3/1991 |
| JP | 30-061192 | 3/1991 |
| JP | 03-110855 | 5/1991 |
| JP | 03-198026 | 8/1991 |
| JP | 03-243914 | 10/1991 |
| JP | 04-114587 | 4/1992 |
| JP | 04-245886 | 9/1992 |
| JP | 05-080716 | 4/1993 |
| JP | 05-183194 | 7/1993 |
| JP | 05-213113 | 8/1993 |
| JP | 05-257142 | 10/1993 |
| JP | 60-80953 A | 3/1994 |
| JP | 61-07035 A | 4/1994 |
| JP | 62-27318 A | 8/1994 |
| JP | 06-318734 | 11/1994 |
| JP | 07-146467 | 6/1995 |
| JP | 07-175035 | 7/1995 |
| JP | 07-191311 | 7/1995 |
| JP | 07-266928 | 10/1995 |
| JP | 07-267002 | 10/1995 |
| JP | 07-277072 | 10/1995 |
| JP | 07-281150 | 10/1995 |
| JP | 07-281185 | 10/1995 |
| JP | 08-008083 | 1/1996 |
| JP | 08-083581 | 3/1996 |
| JP | 08-216789 | 8/1996 |
| JP | 08-227769 | 9/1996 |
| JP | 09-033886 | 2/1997 |
| JP | 09-260074 | 3/1997 |
| JP | 05-077657 | 7/1997 |
| JP | 09-220976 | 8/1997 |
| JP | 09-230827 | 9/1997 |
| JP | 09-266078 | 10/1997 |
| JP | 09-288262 | 11/1997 |
| JP | 10-076880 | 3/1998 |
| JP | 10-190960 | 7/1998 |
| JP | 10-199480 | 7/1998 |
| JP | 10-206643 | 8/1998 |
| JP | 10-221692 | 8/1998 |
| JP | 10-239659 | 9/1998 |
| JP | 10-276298 | 10/1998 |
| JP | 11-038381 | 2/1999 |
| JP | 11-067485 | 3/1999 |
| JP | 11-078693 | 3/1999 |
| JP | 11-109337 | 4/1999 |
| JP | 11-160539 | 6/1999 |
| JP | 11-212073 | 8/1999 |
| JP | 11-283759 | 10/1999 |
| JP | 11-298058 | 10/1999 |
| JP | 11-305197 | 11/1999 |
| JP | 2000-131681 | 5/2000 |
| JP | 2000-153736 | 6/2000 |
| JP | 2000-159014 | 6/2000 |
| JP | 2000-255321 | 9/2000 |
| JP | 2000-330107 | 11/2000 |
| JP | 2001-083509 | 3/2001 |
| JP | 2001-097116 | 4/2001 |
| JP | 2001-222005 | 8/2001 |
| JP | 2002-072901 | 3/2002 |
| JP | 2002-120649 | 4/2002 |
| JP | 2002-122860 | 4/2002 |
| JP | 2002-162626 | 6/2002 |
| JP | 2002-352611 | 12/2002 |
| JP | 2003-182454 | 3/2003 |
| JP | 2003-267129 | 9/2003 |
| JP | 2004-182156 | 7/2004 |
| JP | 2005-148119 | 6/2005 |
| JP | 2005-280526 | 10/2005 |
| JP | 2005-327600 | 11/2005 |
| JP | 38-46073 | 11/2006 |
| JP | 2008-083657 | 4/2008 |
| KR | 20060038856 | 5/2006 |
| KR | 100663930 | 1/2007 |
| KR | 20090031998 | 3/2009 |
| WO | WO 82/02448 | 7/1982 |
| WO | WO 86/06179 | 10/1986 |
| WO | WO 94/19212 | 9/1994 |
| WO | WO 96/21581 | 7/1996 |
| WO | WO 98/14974 | 4/1998 |
| WO | WO 98/38547 | 9/1998 |
| WO | WO 99/15360 | 4/1999 |
| WO | WO 00/23826 | 4/2000 |
| WO | WO 00/52661 | 9/2000 |
| WO | WO 00/55685 | 9/2000 |
| WO | WO 01/01192 | 1/2001 |
| WO | WO 02/18174 | 3/2002 |
| WO | WO 02/49881 | 6/2002 |
| WO | WO 03/021343 | 3/2003 |
| WO | WO 03/078941 | 9/2003 |

OTHER PUBLICATIONS

Edgar, Julian; Goodbye 12 Volts . . . Hello 42 Volts!; Oct. 5, 1999; Autospeed; Issue 50; www.autospeed.co.nz/cms/A_0319/article.html.

Kobe, Gerry; 42 Volts Goes Underhood; Mar. 2000; Automotive Industries; Cahners Publishing Company; www.findarticles.com/p/articles/mi_m3012/is_3_180/ai_61361677.

Jewett, Dale; Aug. 2000; Automotive Industries; Cahners Publising Company; www.findarticles.com/p/articles/mi_m3012/is_8_180ai_64341779.

National Semiconductor, LM78S40, Universal Switching Regulator Subsystem, National Semiconductor Corporation, Apr. 1996, p. 6.

Dana H. Ballard and Christopher M. Brown, Computer Vision, Prentice-Hall, Englewood Cliffs, New Jersey, 5 pages, 1982.

G. Wang, D. Renshaw, P.B. Denyer and M. Lu, CMOS Video Cameras, article, 1991, 4 pages, University of Edinburgh, UK.

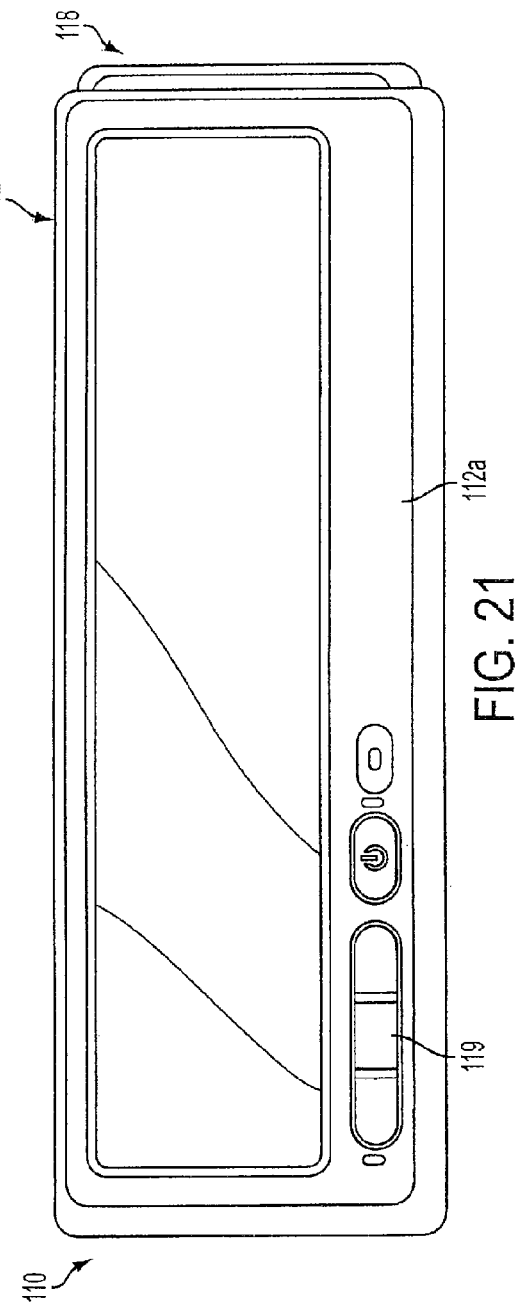

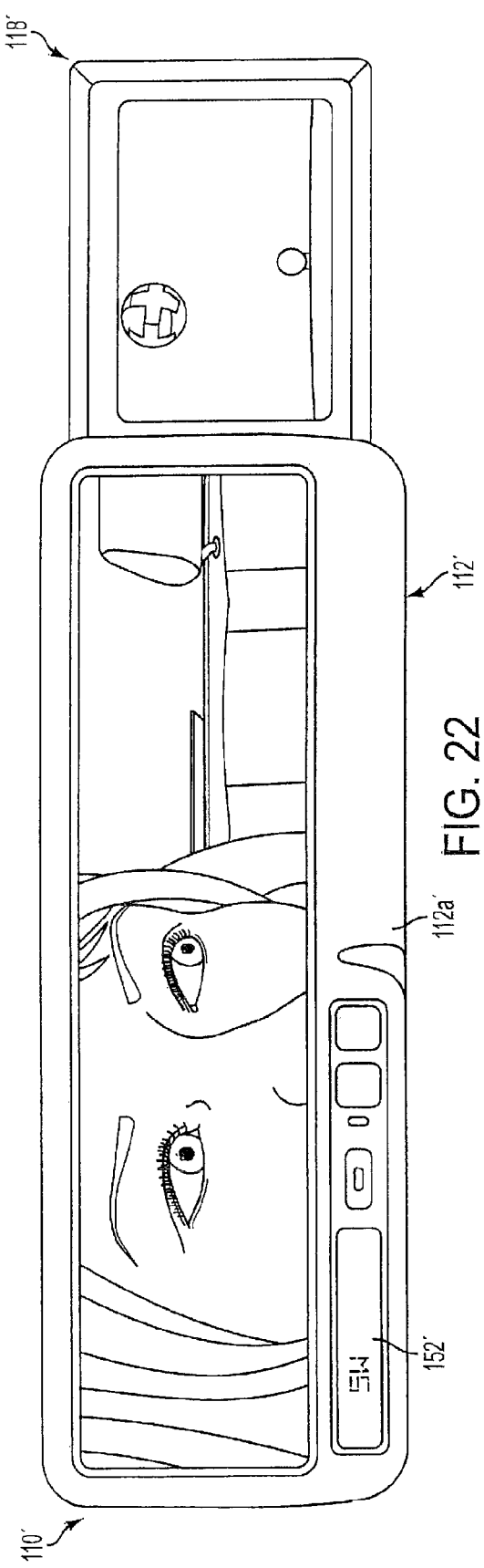
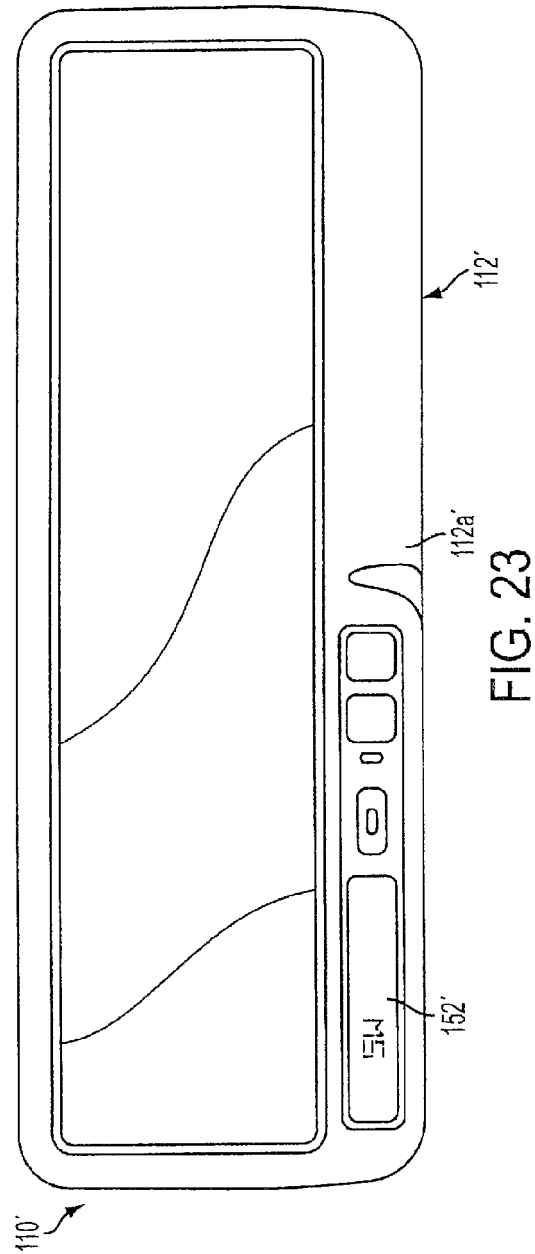
FIG. 22
FIG. 23

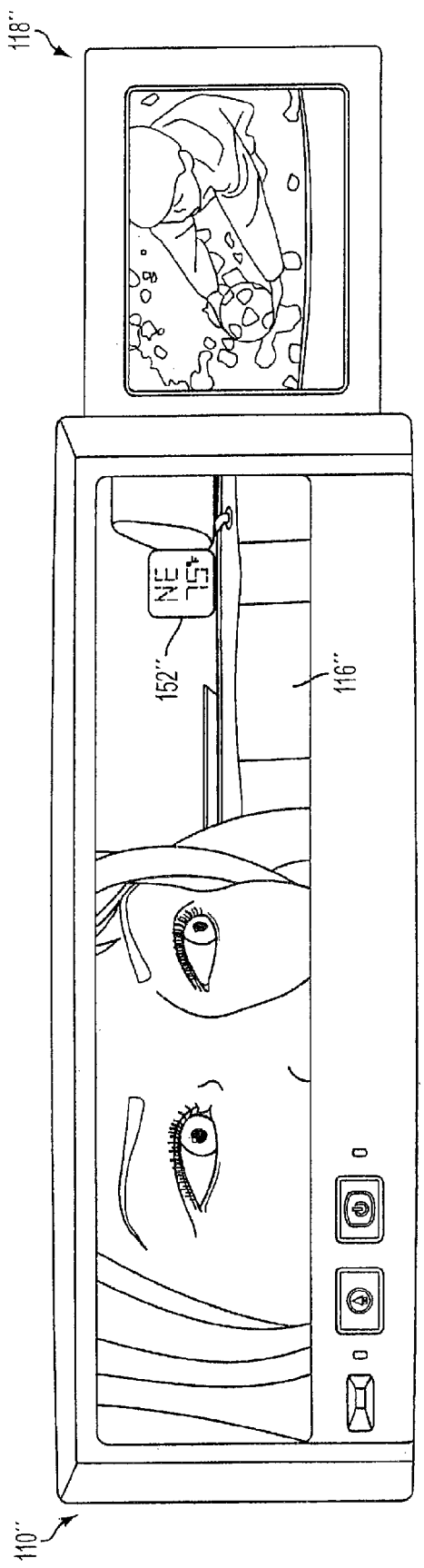
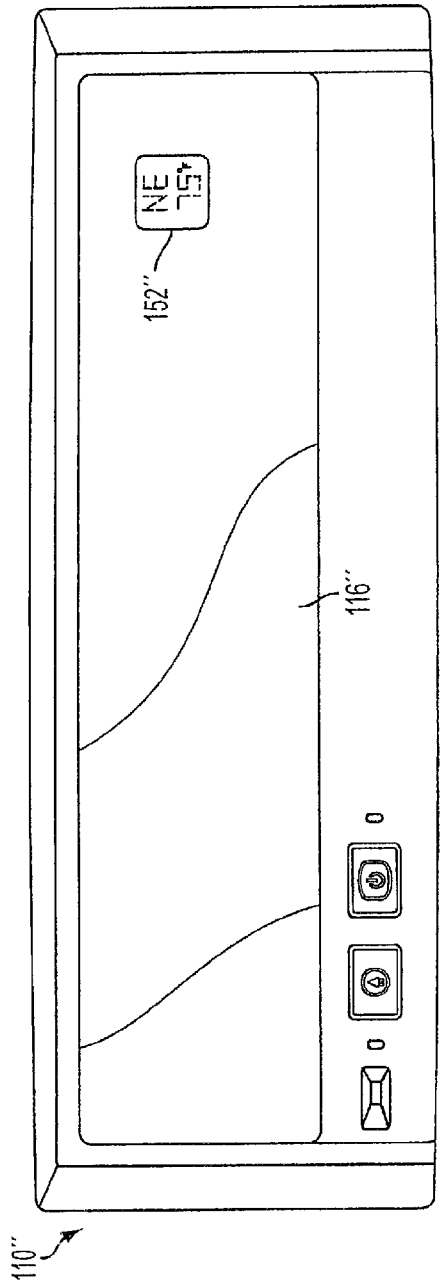
FIG. 24
FIG. 25

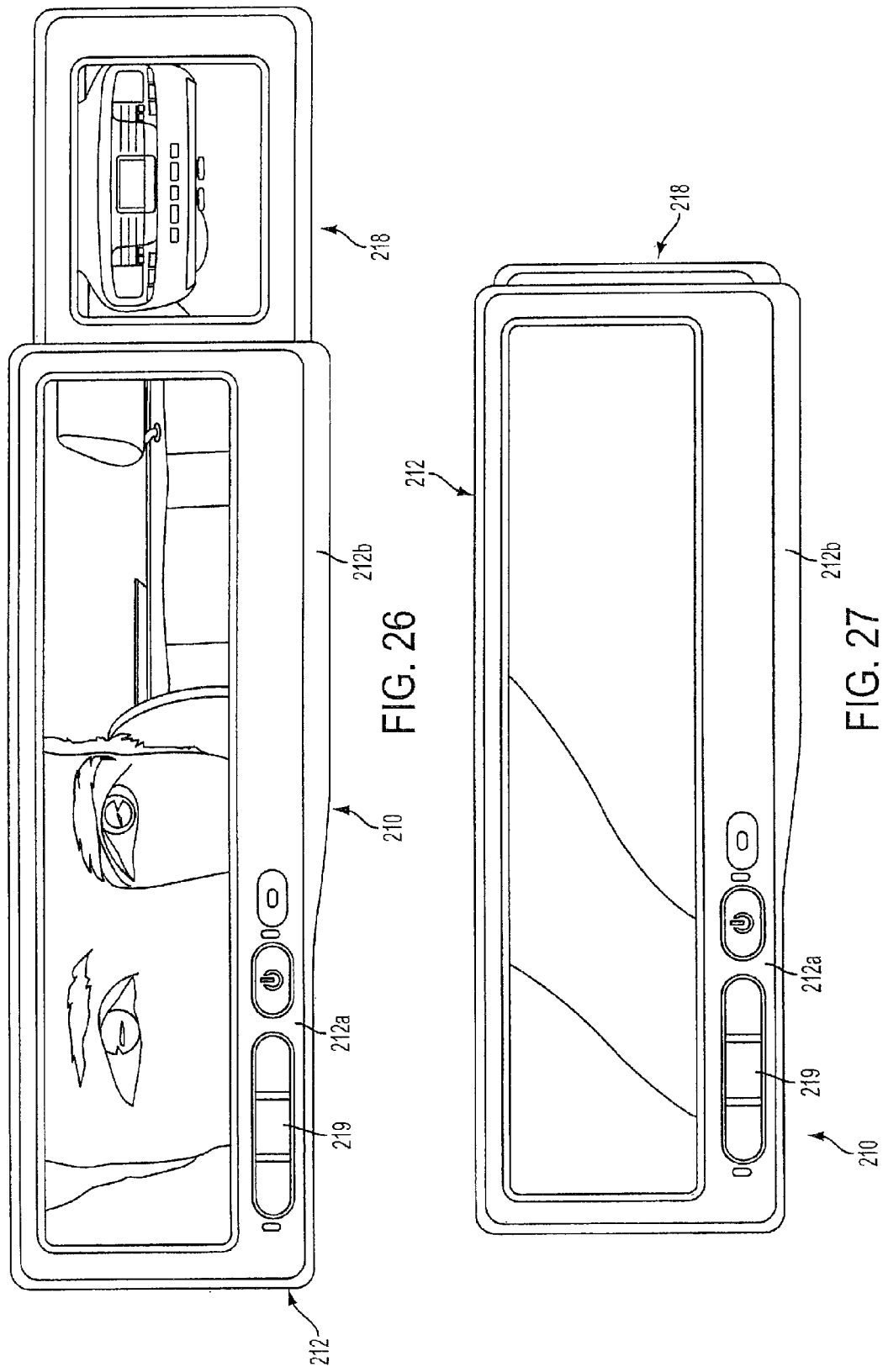

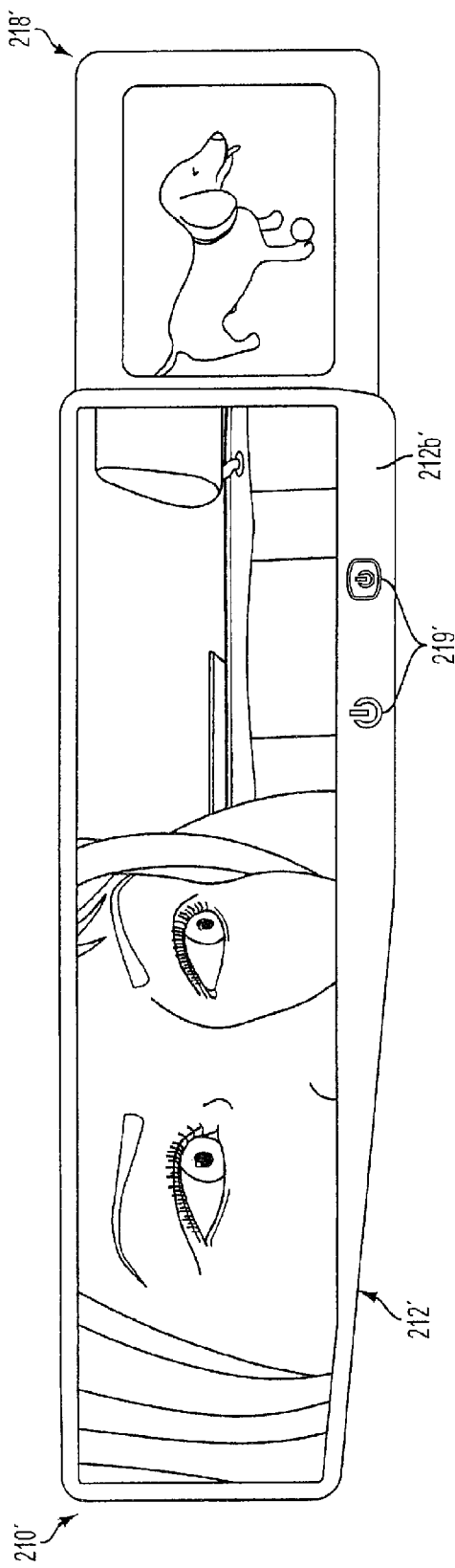
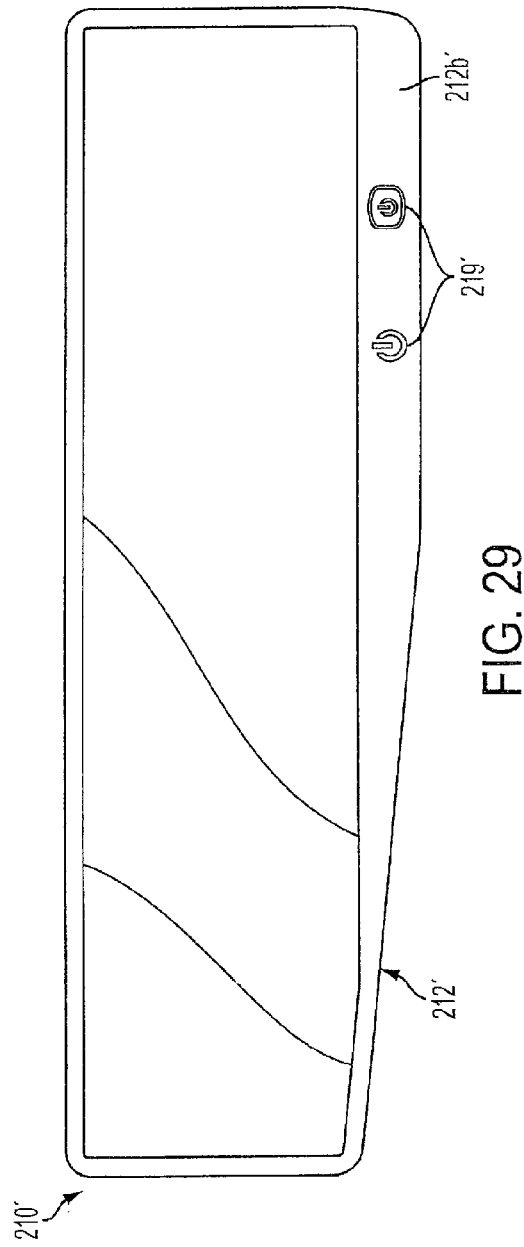
FIG. 28
FIG. 29

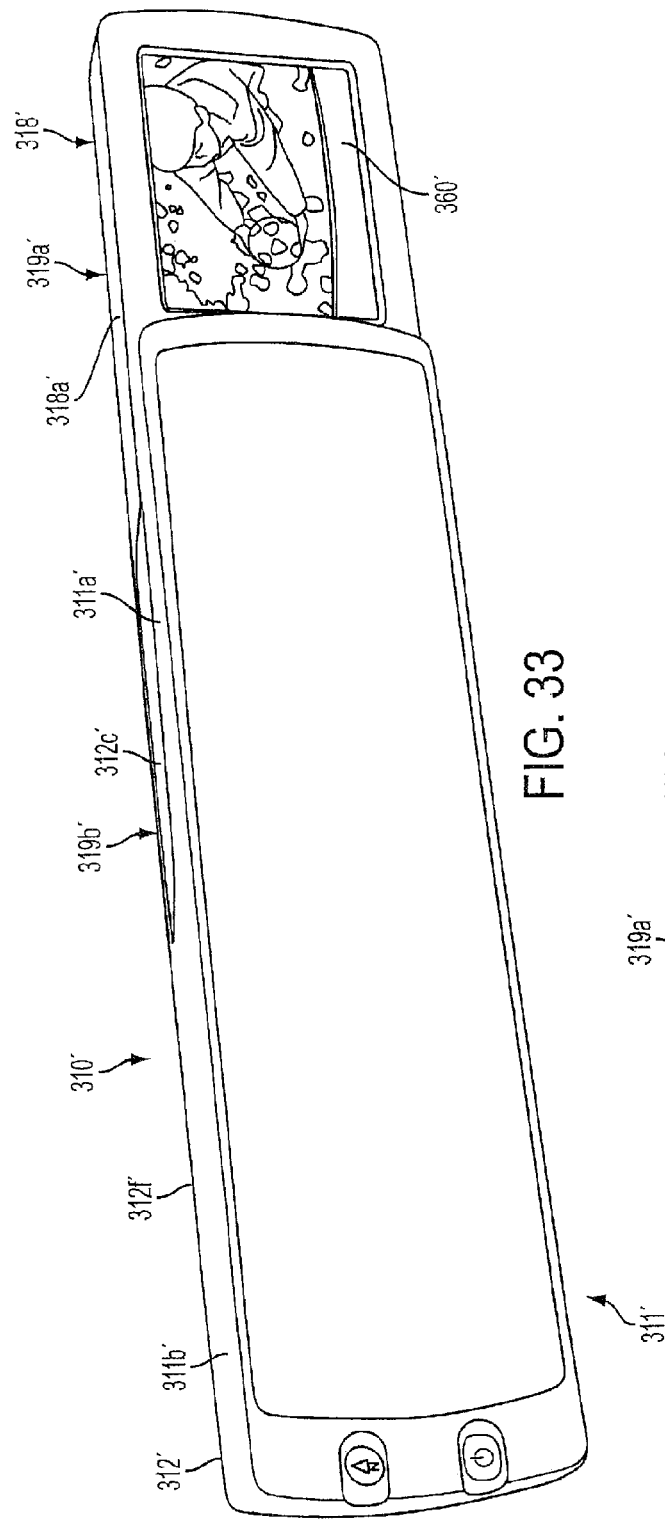
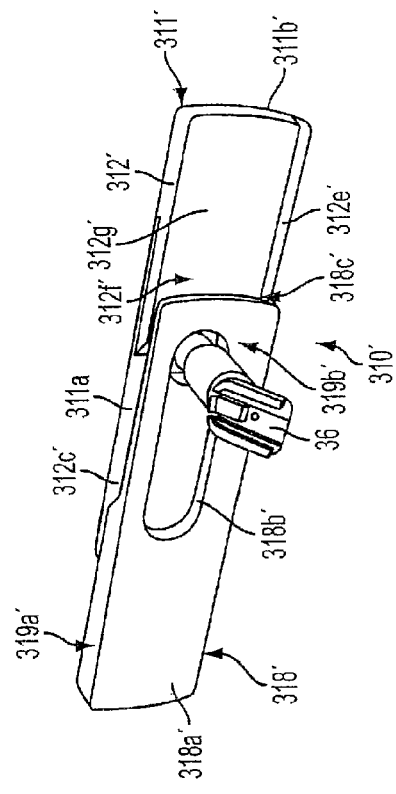

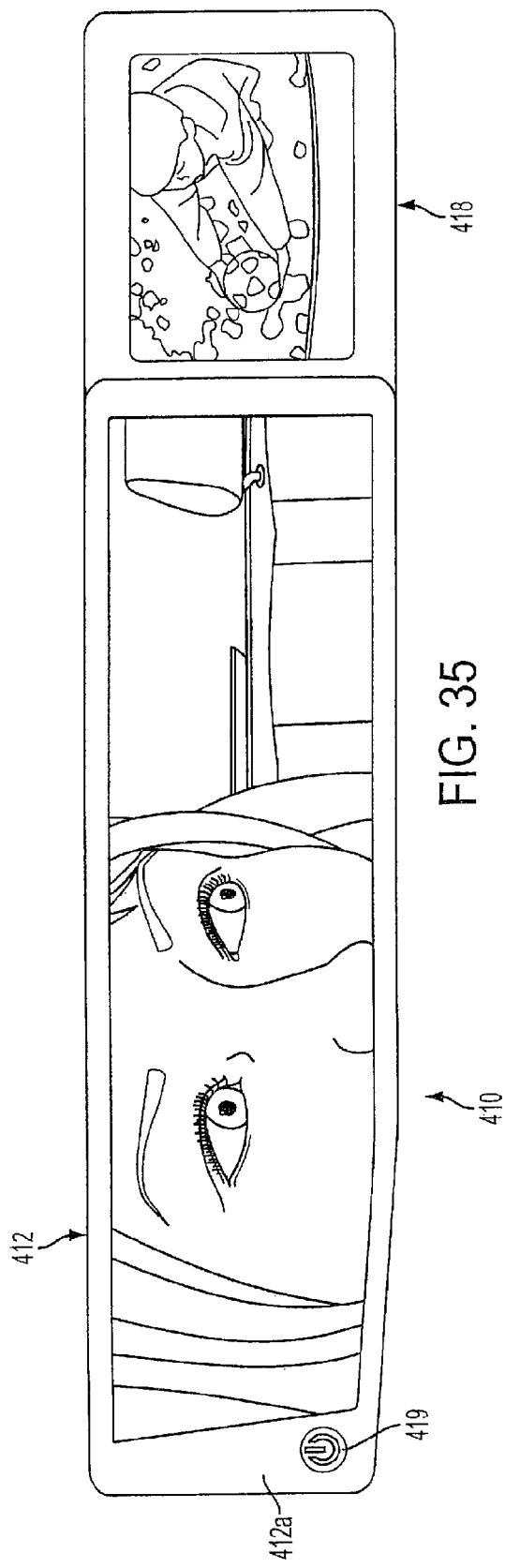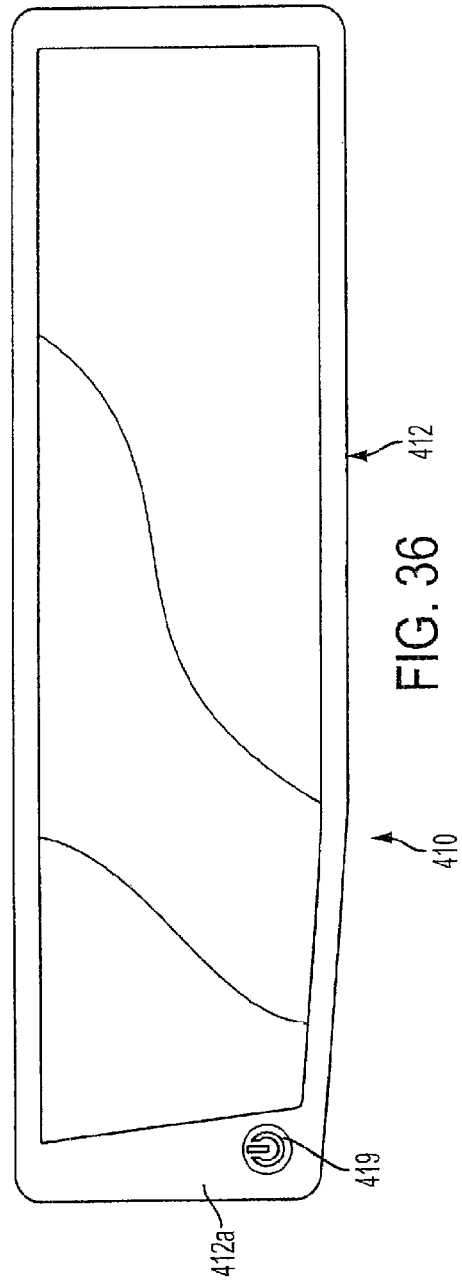

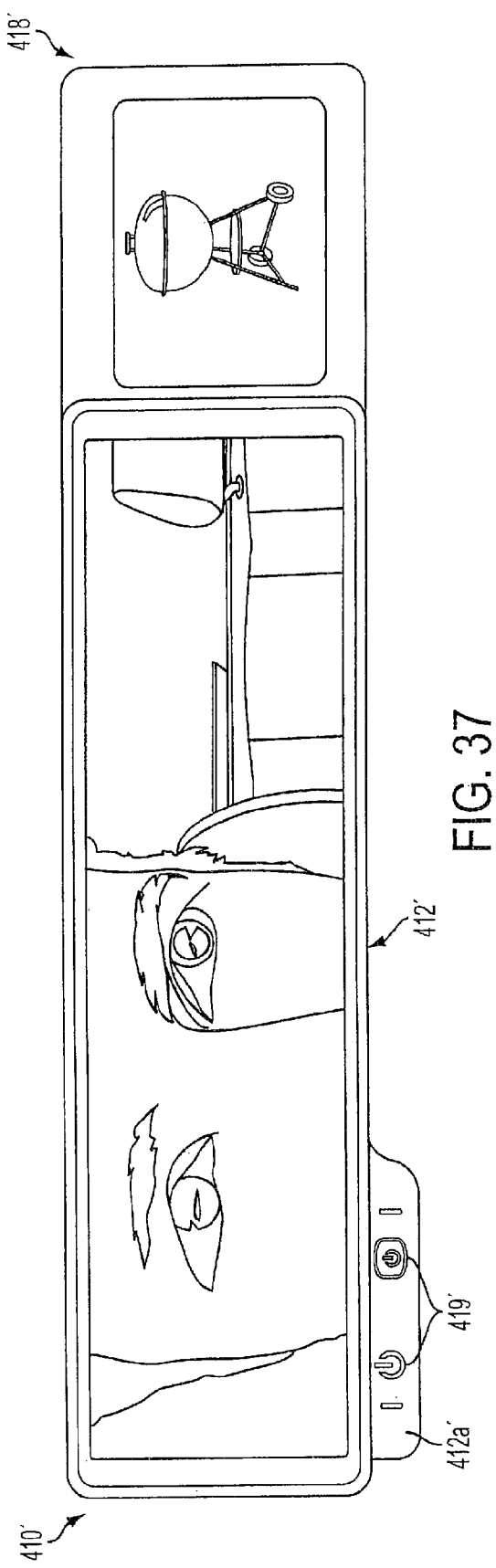
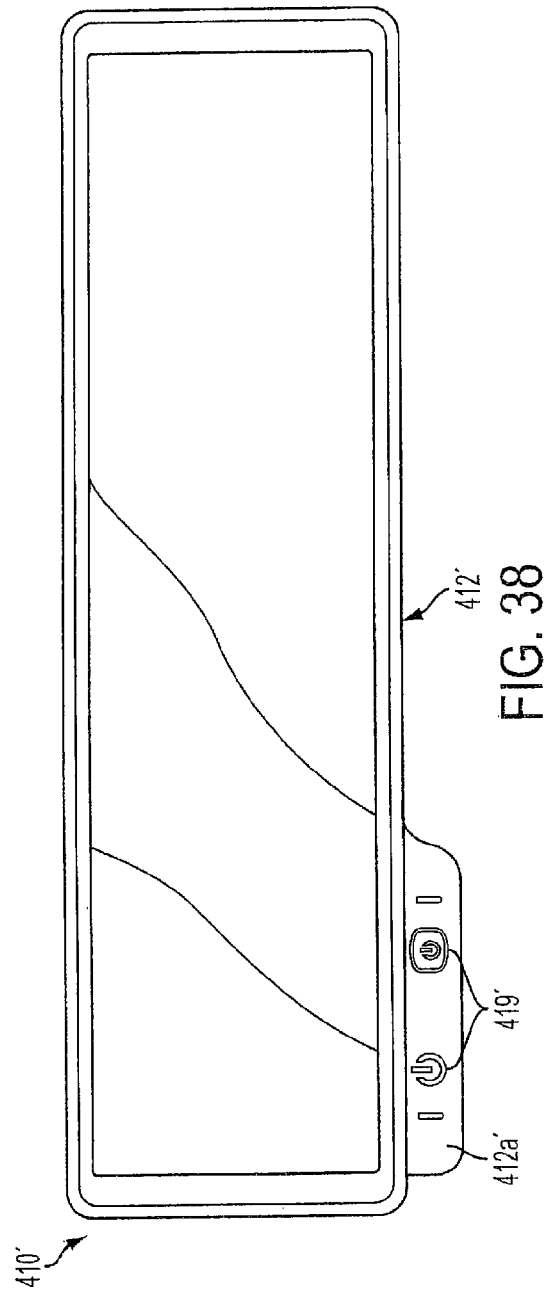
FIG. 37
FIG. 38

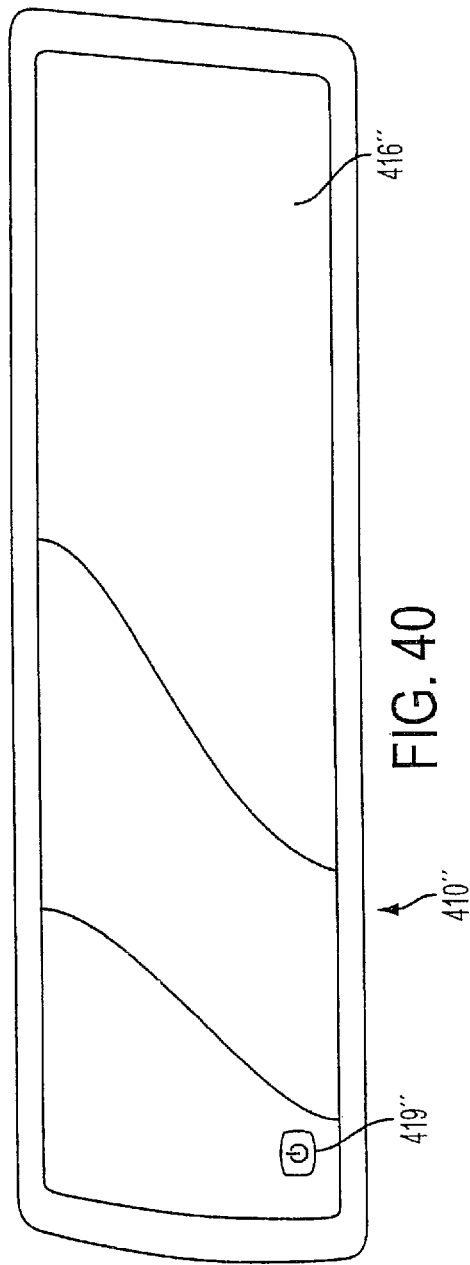
FIG. 39
FIG. 40

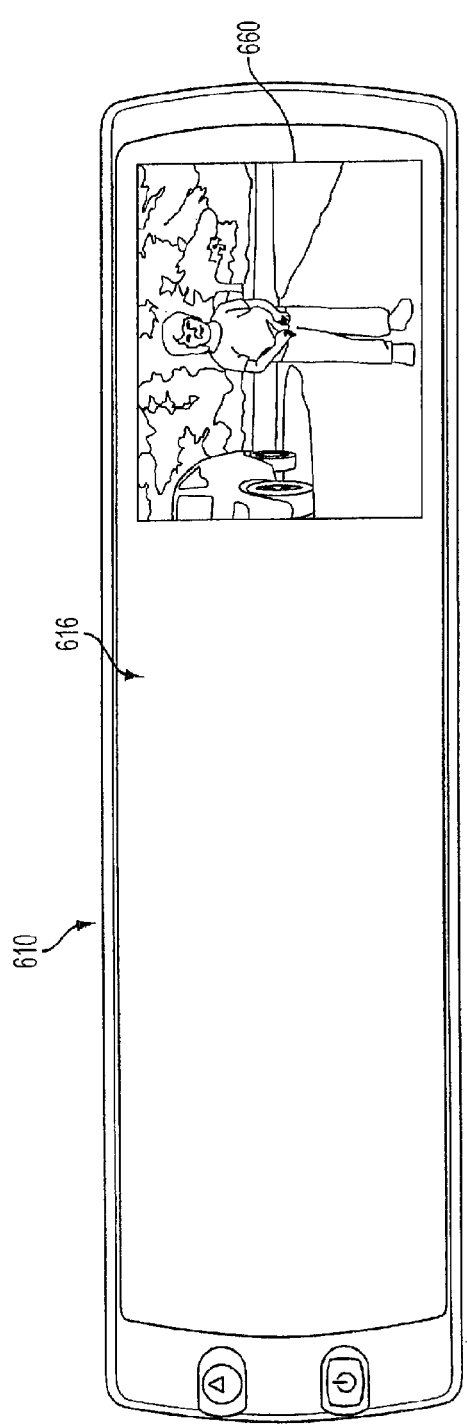
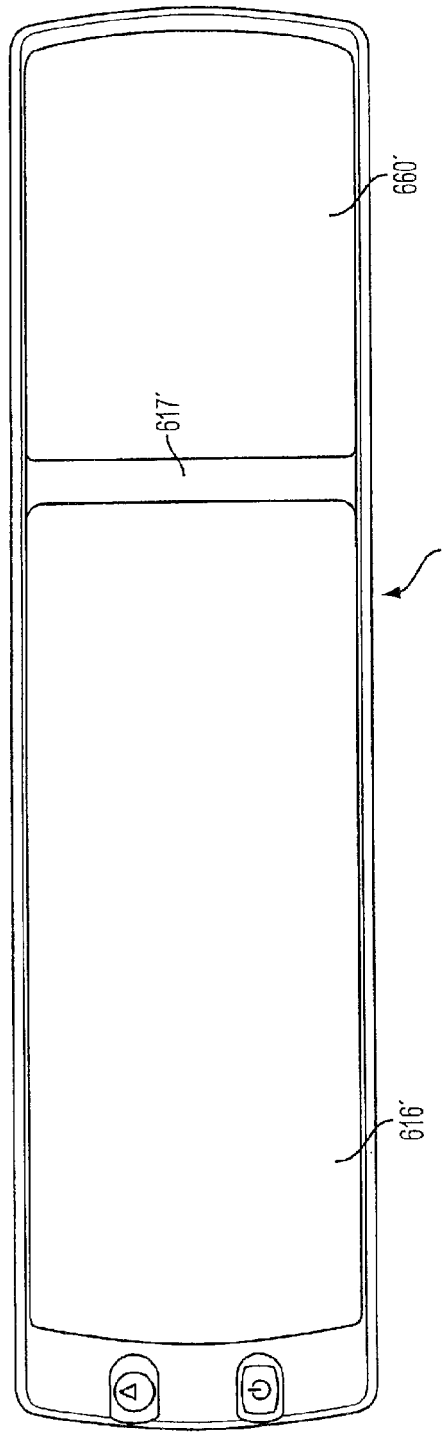
FIG. 44
FIG. 45

VEHICULAR VIDEO MIRROR SYSTEM

CROSS REFERENCE TO RELATED APPLICATIONS

The present application is a continuation of U.S. patent application Ser. No. 12/118,121, filed May 9, 2008, now U.S. Pat. No. 8,194,133, which is a continuation of U.S. patent application Ser. No. 11/284,543, filed Nov. 22, 2005, now U.S. Pat. No. 7,370,983, which claims benefit of U.S. provisional applications, Ser. No. 60/630,061, filed Nov. 22, 2004; and Ser. No. 60/667,048, filed Mar. 31, 2005; and U.S. patent application Ser. No. 11/284,543 is a continuation-in-part of U.S. patent application Ser. No. 10/538,724, filed Jun. 13, 2005, and published Mar. 9, 2006 as U.S. Publication No. 2006/0050018; which is a 371 national phase application of PCT Application No. PCT/US03/40611, filed Dec. 19, 2003, which claims benefit of U.S. provisional applications, Ser. No. 60/435,554, filed Dec. 20, 2002; Ser. No. 60/439,626, filed Jan. 13, 2003; Ser. No. 60/489,812, filed Jul. 24, 2003; and Ser. No. 60/492,225, filed Aug. 1, 2003; and U.S. patent application Ser. No. 11/284,543 is also a continuation-in-part of U.S. patent application Ser. No. 10/755,915, filed Jan. 13, 2004, now U.S. Pat. No. 7,446,650, which is a continuation of U.S. patent application Ser. No. 09/793,002, filed Feb. 26, 2001, now U.S. Pat. No. 6,690,268, which claims benefit of U.S. provisional applications, Ser. No. 60/263,680, filed Jan. 23, 2001; Ser. No. 60/243,986, filed Oct. 27, 2000; Ser. No. 60/238,483, filed Oct. 6, 2000; Ser. No. 60/237,077, filed Sep. 30, 2000; Ser. No. 60/234,412, filed Sep. 21, 2000; Ser. No. 60/218,336, filed Jul. 14, 2000; and Ser. No. 60/186,520, filed Mar. 2, 2000, which are all hereby incorporated herein by reference in their entireties.

FIELD OF THE INVENTION

The present invention relates generally to the field of interior rearview mirror systems for vehicles and, more particularly, to interior rearview mirror systems which incorporate a video display screen. The present invention also relates generally to vehicle accessory systems.

BACKGROUND OF THE INVENTION

It is known to provide a video display screen at an interior rearview mirror assembly of a vehicle, such as, for example, a video display screen of the type disclosed in U.S. Pat. No. 6,428,172 for REARVIEW MIRROR ASSEMBLY WITH UTILITY FUNCTIONS, and U.S. Pat. No. 6,175,300 for BLIND SPOT VIEWING SYSTEM, which are hereby incorporated herein by reference. It has also been suggested to provide a mirror or a display which may be indexed in and out of a mirror case, such as from the bottom of the mirror case, such as also disclosed in U.S. Pat. No. 6,428,172, which is hereby incorporated herein by reference.

Drivers of vehicles, particularly larger vehicles, such as sport utility vehicles (SUVs) and the like, may be faced with a reduced or obstructed field of vision toward the rear and rearward of the vehicle as more objects, such as headrests and entertainment video screens, may block or obstruct a driver's rearward view, whether the driver uses the rearview mirror or even if the driver turns around to generally face the rear window of the vehicle. Larger SUVs may have even less visibility to the immediate rear of the vehicle. Various backup aids have been proposed to provide a display of an image of the exterior scene rearward of the vehicle for viewing by the driver.

SUMMARY OF THE INVENTION

The present invention provides an interior rearview mirror assembly having a video display screen which may be extended and retracted via sliding movement laterally along or via one or more sliding members or rails or bearings or other mating/moving elements, such as positioned within the casing of the interior rearview mirror assembly. As used herein, the term video display screen describes the video display screen and the associated components and circuitry. The video display screen may movably or slidably extend from a side of the mirror assembly and toward the driver or passenger side of the vehicle along the rail or rails to an extended or use position, whereby the video display screen is substantially extended from the mirror casing, and where the screen (and any image or icon or character or indicia or the like displayed thereon) is viewable by a vehicle occupant, such as a driver or a front seat passenger of the vehicle. When not in use, the video display screen may be retracted to or stowed in a non-use position, whereby the video display screen is positioned substantially within the mirror casing or where the display screen is positioned behind a reflective element portion of the mirror assembly, and where the screen is preferably substantially or entirely not viewable by a person within the cabin of the vehicle. The video display screen may thus be movable or slidable in a direction generally parallel to the reflective element of the mirror assembly or generally transverse to the longitudinal axis of the vehicle.

According to an aspect of the present invention, an interior rearview mirror system for a vehicle comprises a casing, a reflective element, such as positioned at a bezel portion of the casing, and a video display screen slidably mounted at the casing. The video display screen is movable or slidable in a direction generally parallel to a length axis of the reflective element between a retracted, non-use position, wherein the video display screen is positioned substantially within the casing, and an extended, use position, wherein the video display screen is substantially extended from a side of the casing for viewing by an occupant of the vehicle.

The video display screen may be mounted to at least one sliding member which is slidable relative to the casing. The sliding member or members may be slidable along or within a sliding block mounted within the casing. Optionally, the video display screen may be slidable along at least one rail or track or guide positioned within the casing. Optionally, the video display screen may be otherwise movable along one or more rails or tracks, such as via a plurality of roller bearings or the like. Optionally, the video display screen may be pivotable about a pivot joint or knuckle joint when extended to the use position.

The video display screen may be manually pulled or extended or retracted or may be electronically or automatically extended or retracted (such as by a motorized action or by a spring action). The display screen may be automatically extended in response to a signal indicative of an activating event, such as an actuation of a manual or user input, an engagement of the reverse gear of the vehicle, actuation of a backup aid device or system or other reverse viewing or imaging device or system, actuation of a cabin viewing device or system, such as a baby viewing or rear seat viewing device or system or the like, actuation of a video communication device or system, actuation of a navigation system of the vehicle and/or approach of a waypoint of a programmed route of the navigation system and/or the like. The video display screen may also be manually pushed or retracted to the non-use position or may be automatically retracted in response to a signal indicative of a deactivating event, such as an actuation of a manual or user input, a curing or completion of the activating event or condition, a disengagement of the reverse gear of the vehicle, deactivation of a backup aid device or system or other reverse viewing or imaging device or system, deactivation of a cabin viewing device or system, such as a baby viewing or rear seat viewing device or system or the like, deactivation of a video communication device or system, deactivation of a navigation system of the vehicle and/or passing of the waypoint of the programmed route and/or the like.

Optionally, the video display screen may be spring-loaded or biased toward the extended position and selectably securable at the non-use position. When stowed in the non-use position, pressing laterally inward on the video display screen may release or unlatch the video display screen such that the biasing member or spring urges or moves or biases the video display screen to the extended, use position. Pressing laterally inward or pushing the video display screen into the mirror casing to the non-use position may then latch or secure the video display screen in the non-use position substantially within the mirror casing.

The mirror assembly may be mounted at a windshield of the vehicle or at an overhead accessory console or accessory module of the vehicle.

According to another aspect of the present invention, an interior rearview mirror system for a vehicle includes an interior rearview mirror assembly including a first portion and a second portion. The first portion includes a reflective element and a mounting element for mounting the mirror assembly at an interior portion of the vehicle. The first portion has a first casing element that has a rear surface. The mounting element extends rearward from the first portion toward a windshield of the vehicle when the interior rearview mirror assembly is mounted at the interior portion of the vehicle. The second portion includes a display screen and has a second casing element. The second portion is adapted for attaching to the first portion in a manner so that the second portion is movable relative to the first portion. The second portion is movable relative to the first portion to move the display screen between a retracted position, where the display screen is positioned substantially at and behind the first portion with the display screen facing the first portion, and an extended position, where the display screen is substantially extended from the first portion at a display side of the mirror assembly for viewing by an occupant of the vehicle. The second portion includes a slot for at least partially enveloping a portion of the mounting element at least when the second portion is at least partially retracted. At least a portion of the rear surface of the first casing element is exposed when the display screen is in the extended position.

Optionally, at least a portion of the second portion may move past the mounting element and toward the opposite side of the mirror assembly from the display side when the second portion is moved toward the retracted position. Optionally, the slot may substantially envelop the mounting element throughout the range of movement of the second portion relative to the first portion. Optionally, the second portion may include a self-contained display element subassembly. The self-contained display element subassembly may include the display screen, display screen circuitry, a motor for driving movement of the display screen relative to the first portion, and motor circuitry.

Therefore, the present invention provides a video display screen which is extendable from a side of a mirror casing for viewing by an occupant of a vehicle. The video display screen may be positioned substantially within the casing when not in use, or may be located behind a reflective element portion or casing, and may be extended substantially outward from the casing or side of the mirror assembly and toward the driver or passenger side of the vehicle when viewing of the video display screen is desired. By slidably positioning (or otherwise movably positioning) the video display screen within or behind the mirror casing, the present invention provides for a large video display screen to enhance viewing of the images displayed thereon by the driver or other occupant of the vehicle, while having a minimal affect on the size of the casing. Optionally, the casing may be formed to be wide or tall enough to receive the video display screen therein, with the casing being at least as wide as the height dimension of the video display screen. Optionally, the mirror reflective element portion and associated casing element may be sized so that the display screen is movable along a rear surface of the reflective element portion, whereby the casing and reflective element portion may comprise a low profile portion with a reduced height, so as to reduce intrusion of the driver's forward field of view.

These and other objects, advantages, purposes and features of the present invention will become apparent upon review of the following specification in conjunction with the drawings.

BRIEF DESCRIPTION OF THE DRAWINGS

FIG. 20 is a front elevation of another mirror assembly and display screen in accordance with the present invention;

FIG. 21 is a front elevation of the mirror assembly of FIG. 20, with the display screen retracted;

FIG. 22 is a front elevation of another mirror assembly and display screen in accordance with the present invention;

FIG. 23 is a front elevation of the mirror assembly of FIG. 22, with the display screen retracted;

FIG. 24 is a front elevation of another mirror assembly and display screen in accordance with the present invention;

FIG. 25 is a front elevation of the mirror assembly of FIG. 24, with the display screen retracted;

FIG. 26 is a front elevation of another mirror assembly and display screen in accordance with the present invention;

FIG. 27 is a front elevation of the mirror assembly of FIG. 26, with the display screen retracted;

FIG. 28 is a front elevation of another mirror assembly and display screen in accordance with the present invention;

FIG. 29 is a front elevation of the mirror assembly of FIG. 28, with the display screen retracted;

FIG. 33 is a front perspective view of another mirror assembly and display screen in accordance with the present invention;

FIG. 34 is a rear perspective view of the mirror assembly of FIG. 33;

FIG. 35 is a front elevation of another mirror assembly and display screen in accordance with the present invention;

FIG. 36 is a front elevation of the mirror assembly of FIG. 35, with the display screen retracted;

FIG. 37 is a front elevation of another mirror assembly and display screen in accordance with the present invention;

FIG. 38 is a front elevation of the mirror assembly of FIG. 37, with the display screen retracted;

FIG. 39 is a front elevation of another mirror assembly and display screen in accordance with the present invention;

FIG. 40 is a front elevation of the mirror assembly of FIG. 39, with the display screen retracted;

FIG. 44 is a front elevation of another mirror assembly and display screen in accordance with the present invention, with a fixed display screen at the reflective element;

FIG. 45 is a front elevation of another mirror assembly and fixed display screen in accordance with the present invention;

DESCRIPTION OF THE PREFERRED EMBODIMENTS

Figure 1:
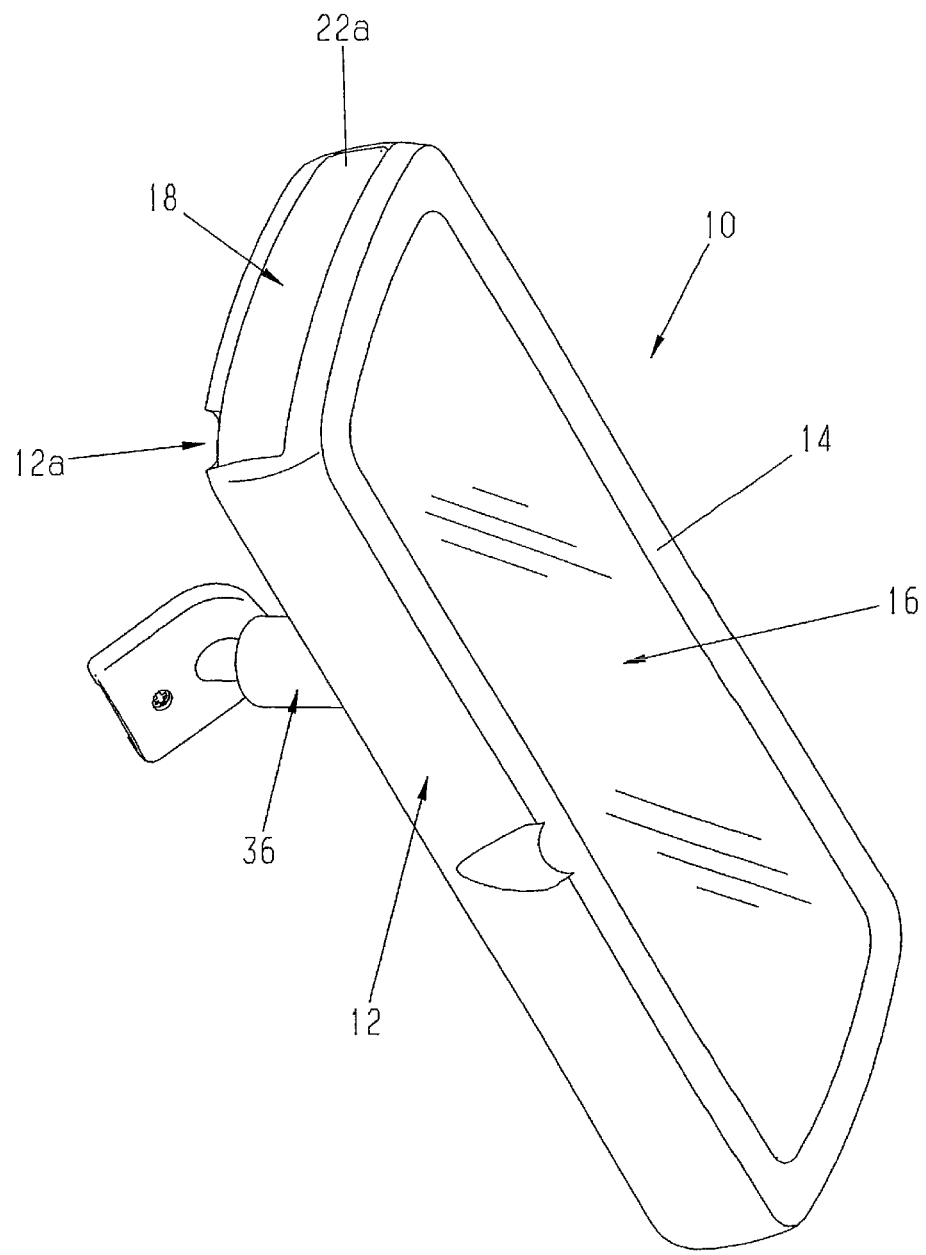
FIG. 1 is a front perspective view of an interior rearview mirror assembly in accordance with the present invention, with a video display screen in its retracted position.
Figure 2:
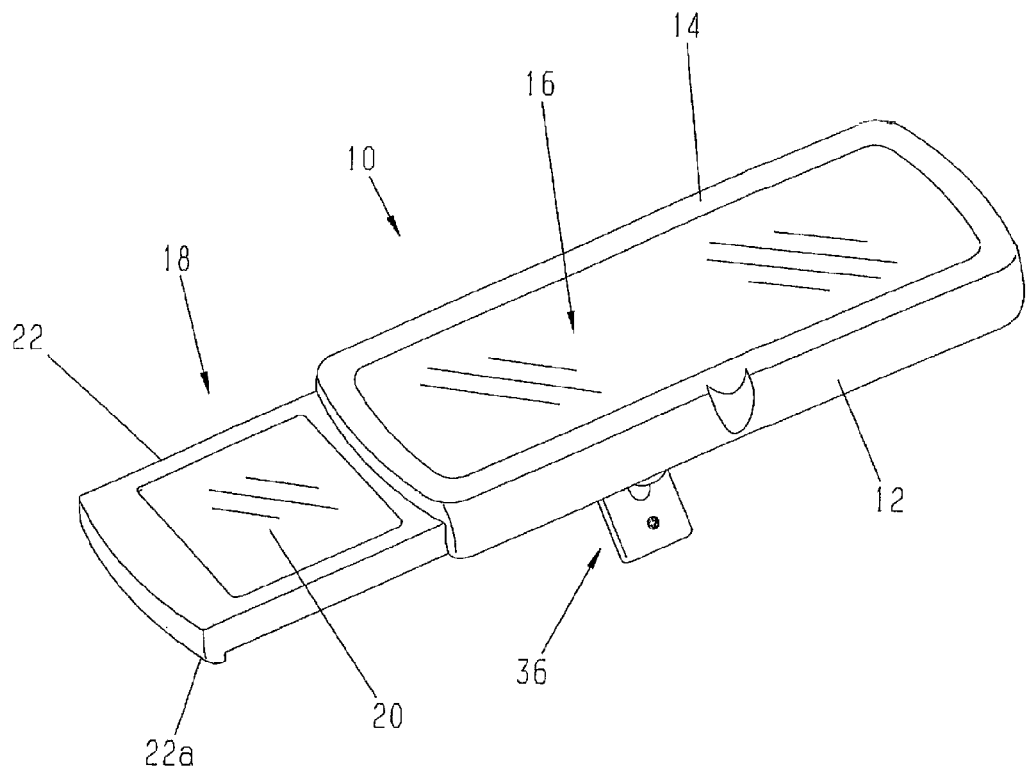
FIG. 2 is another front perspective view of the interior rearview mirror assembly of FIG. 1, with the video display screen in its extended position.
Figure 3:
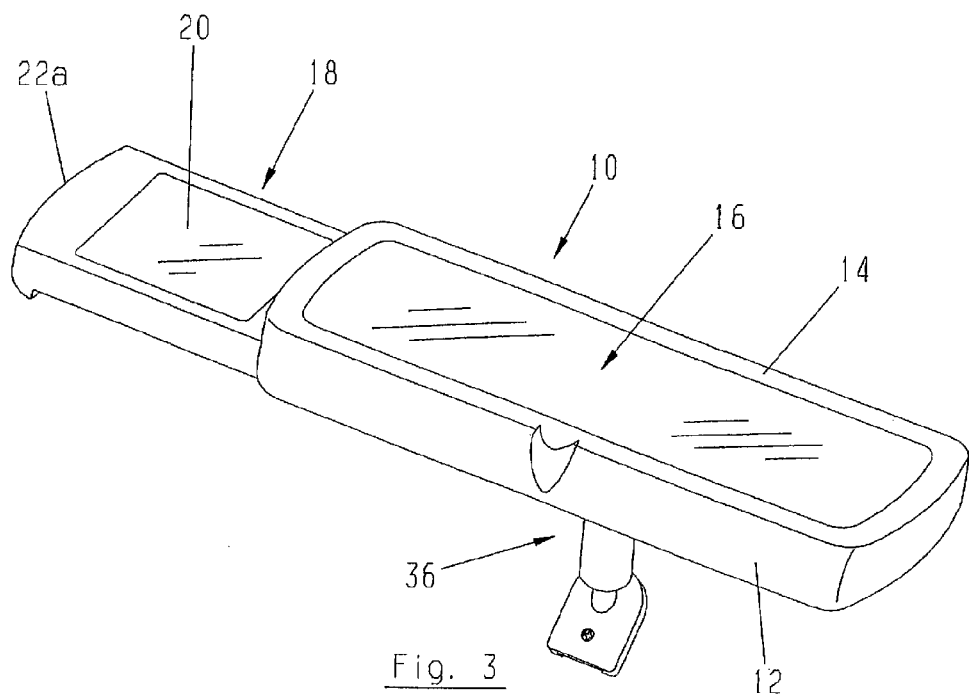
FIG. 3 is another front perspective view of the interior rearview mirror assembly of FIGS. 1 and 2, with the video display screen in its extended position.

Referring now to the drawings and the illustrative embodiments depicted therein, an interior rearview mirror assembly 10 for a vehicle includes a casing 12, a bezel portion 14 and a reflective element 16 positioned at and at least partially within the casing and/or bezel portion (FIGS. 1-3). Mirror assembly 10 includes a video display screen device 18, which is movably or slidably mounted at least partially within casing 12 and movable or slidable between a retracted or stored or non-use position (as shown in FIGS. 1, 4, 6 and 10) and an extended or use position (as shown in FIGS. 2, 3, 5 and 7). Video display screen device 18 includes a video display screen 20 mounted on a frame or support 22, which in turn is mounted at or positioned at one or more slide members 24 (FIGS. 10 and 11) at or within casing 12. Video display screen 20 is operable to display information or images for viewing by the driver or other occupant or occupants of the vehicle when video display screen device 18 is in its extended position, as discussed below. The term video display screen is used herein to describe the video display screen and any components and circuitry associated with the video display screen which are generally contained at or within the frame or support 22.

Figure 4:
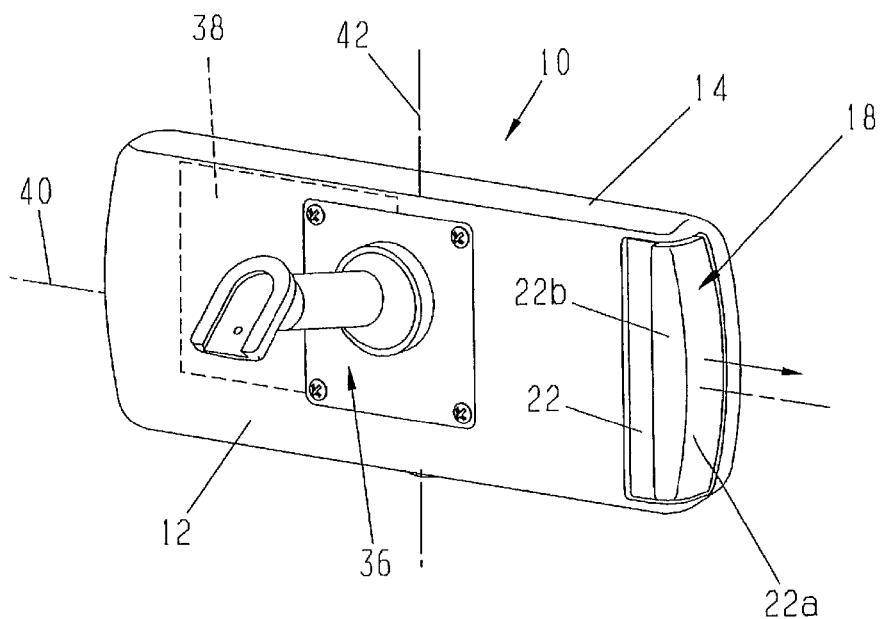
FIG. 4 is a rear perspective view of the interior rearview mirror assembly, with the video display screen in its retracted position.
Figure 5:
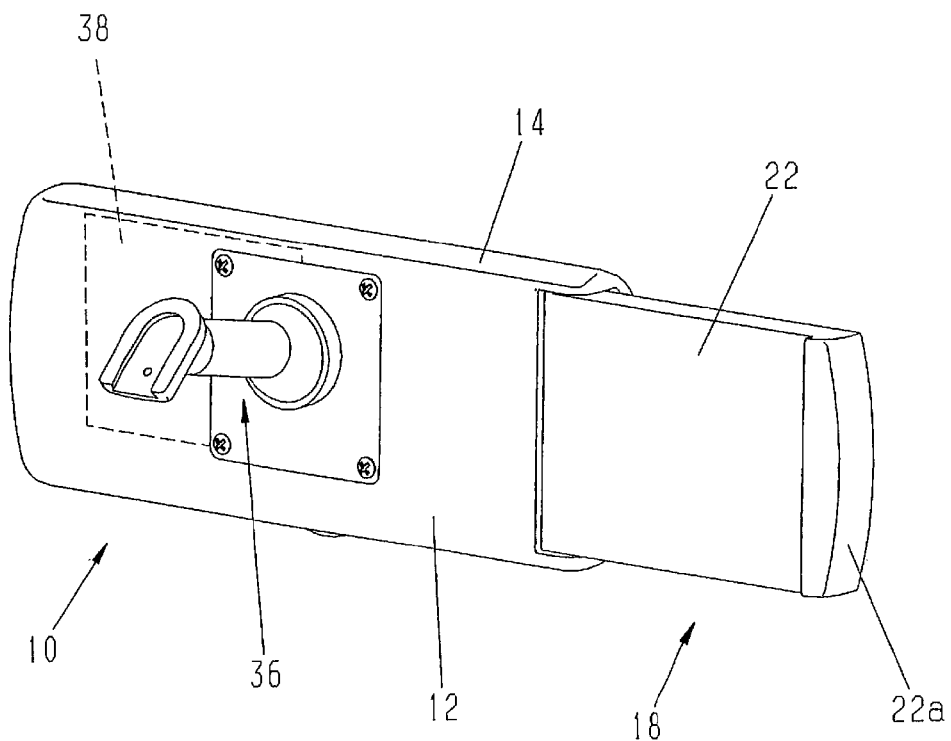
FIG. 5 is another rear perspective view similar to FIG. 4, with the video display screen in its extended position.

As can be seen in FIGS. 2, 3, 5, 7, 10 and 11, casing 12 of mirror assembly 10 is wide enough to allow frame 22 and video display screen 20 to slide therewithin and generally along and parallel to and behind the reflective element 16, such that the video display screen 20 is slidable in a direction generally transverse to the longitudinal direction of the vehicle when the mirror assembly is mounted to the vehicle. As shown in FIG. 4, mirror reflective element 16 consists of a length dimension along its length axis 40 and a width dimension along its width axis 42. The length dimension of the reflective element is typically at least approximately 5.5 inches, more preferably at least approximately 7.5 inches, and most preferably at least approximately 9.5 inches, while the width dimension of the reflective element is preferably at least approximately two inches, more preferably at least approximately 2.5 inches, and most preferably at least approximately three inches, and is selected to allow sufficient clearance for lateral movement of the video display screen therewithin. Preferably, the ratio of the length dimension to the width dimension is at least two, and more preferably at least three.

Because the video display screen is positioned within the mirror casing and is movable or slidable along the length axis and outward from a side of the mirror casing, the video display screen may comprise a large, rectangular-shaped video display screen to enhance viewing of the video display screen by the driver or occupant of the vehicle. The mirror casing is formed to be at least as wide or tall as the height dimension of the video display screen. The width or length of the video display screen (the dimension of the display screen that is along the length axis of the mirror) may be selected depending on the desired size of the viewing area and on the lateral space within the associated mirror casing. Preferably, the video display screen is a least approximately two inches wide or long, more preferably at least approximately 2.5 inches wide or long, and most preferably at least approximately three inches wide or long. The video display screen thus may fit or move or slide laterally within the mirror casing and may provide an increased viewing area without requiring a substantial increase to the size of the mirror casing.

Although shown and described as slidably extending from a side or portion of an interior rearview mirror assembly, the display screen of the present invention may extend from a portion of the mirror assembly elsewhere at or on the mirror assembly (such as extending upward from an upper portion of the mirror assembly or downward from a lower portion of the mirror assembly), or from a portion of the support structure of the mirror assembly (such as in a single ball mounting member arrangement), such as a support structure of the types described in U.S. Pat. No. 6,087,953, which is hereby incorporated herein by reference. Aspects and principles of the present invention may also be suitable for such display screens that may slide or move to extend from the upper or lower portion of the mirror assembly.

Optionally, the display screen device of the present invention may be positioned at or at least partially within a casing or housing of a windshield electronics module or accessory module, such as those described in U.S. patent application Ser. No. 10/958,087, filed Oct. 4, 2004, now U.S. Pat. No. 7,188,963; and/or Ser. No. 11/226,628, filed Sep. 14, 2005, and published on Mar. 23, 2006 as U.S. Patent Publication No. 2006/0061008; and/or U.S. Pat. Nos. 6,824,281, now 6,824,281; and/or 6,690,268, which are hereby incorporated herein by reference, or an overhead console or module or the like, such as those described in PCT Application No. PCT/US03/40611, filed Dec. 19, 2003 and published Jul. 15, 2004 as International Publication No. WO 2004/058540, and U.S. patent application Ser. No. 10/538,724, filed Jun. 13, 2005, and published Mar. 9, 2006 as U.S. Publication No. 2006/0050018, which are hereby incorporated herein by reference. The display screen may extend from a portion or side of the accessory module or the like, or may extend from another portion of the accessory module or the like, or from a support structure of the accessory module or the like (such as described in U.S. patent application Ser. No. 11/226,628, filed Sep. 14, 2005, and published on Mar. 23, 2006 as U.S. Patent Publication No. 2006/0061008, which is hereby incorporated herein by reference), without affecting the scope of the present invention.

Frame 22 of video display screen device 18 substantially surrounds and encases video display screen 20 and may include an outer grasping portion or end portion 22a. End portion 22a and casing 12 may be correspondingly formed such that end portion 22a generally nests partially within casing 12 when video display screen device 18 is in its retracted position. Also, end portion 22a may be formed to generally correspond with the exterior surface of casing 12, such that end portion 22a may provide a generally flush, uniform appearance to the side of the mirror casing when the device is fully retracted. As best seen in FIGS. 4, 5, 8 and 9, end portion 22a may include a grasping portion or lip 22b which extends rearward from video display screen device 18 to provide a handle or grasping surface for a user of video display screen device 18 to grasp and pull to manually pull frame 22 and video display screen 20 outward from casing 12 to the extended position. Optionally, casing 12 may further include a recessed or cut away area 12a (FIG. 1) at the side of the casing to facilitate grasping of the end portion 22a of frame 22, without affecting the scope of the present invention. Optionally, and desirably, the display screen device may not include an outer grasping portion and may be substantially flush with the exterior surface of the mirror casing when the display screen is fully retracted, such that a user cannot readily pull the screen outward from the mirror casing.

Video display screen 20 may be slidable or extendable/retractable via sliding movement of a rail or guide or track or the like relative to a receiving block or guide or the like that slidably receives or guides the rail or guide or track or the like as the display screen extends and retracts relative to the mirror casing. In the illustrated embodiment of FIGS. 10 and 11, video display screen device 18 includes a sliding block 26 positioned within casing 12 to facilitate sliding movement of frame 22 and video display screen 20 relative to casing 12. Sliding block 26 may comprise a plastic or polymeric material and is configured to slidably or movably receive one or more slide members or rails or guides or tracks 24 therethrough. As can be seen with reference to FIGS. 10 and 11, the sliding members 24 may comprise generally cylindrical bars or rods which are fixedly secured to frame or support 22 and are slidable relative to sliding block 26 to facilitate sliding movement of frame 22 and video display screen 20 relative to sliding block 26 and casing 12. The sliding members 24 are positioned generally parallel to the reflective element 16 of the mirror assembly 10 for sliding or conduiting or conveying the video display screen 20 and frame 22 generally parallel to the reflective element and, thus, generally transverse to the longitudinal axis or direction of the vehicle when the mirror assembly 10 is mounted to the vehicle. Although shown and described as being fixedly mounted to one or more sliding rods or members, the frame or support of the video display screen device may alternately be slidably mounted to one or more rods or members or rails or tracks or the like which are generally fixedly positioned along the mirror casing, without affecting the scope of the present invention. If movable along a single rack or track or monorail, the display screen may straddle the single rail, which may extend generally along and partially through a middle region of the mirror casing and/or display screen to provide sufficient support of the display screen.

The display screen and frame may be manually movable along the rods or members and/or may be electronically driven or moved (and preferably under microprocessor control) via a drive motor or the like, as discussed below. Optionally, the display screen and frame may be movable or slidable or extendable/retractable via a moving mechanism or drive mechanism utilizing aspects disclosed in U.S. Pat. Nos. 6,325,518 and 6,726,337, which are hereby incorporated herein by reference. The cable or wire that feeds the display screen, such as to provide power and/or control to the display screen, may be guided to provide corresponding extension and retraction of the cable/wire or the like in tandem with the display screen, or the electrical connection may be made via sliding electrical contact between the rails or guides or the like of the sliding or moving mechanism, without affecting the scope of the present invention.

Figure 7:
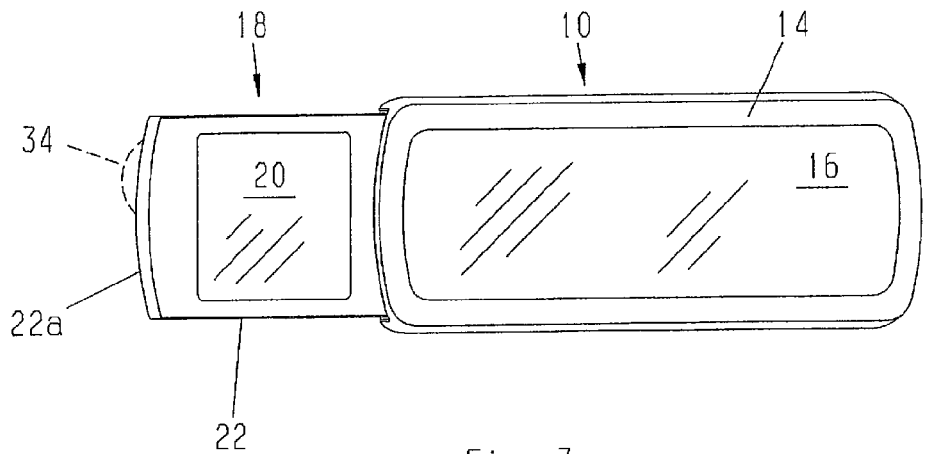
FIG. 7 is a front elevation of the interior rearview mirror assembly of FIG. 6, with the video display screen in its extended position.
Figure 9:
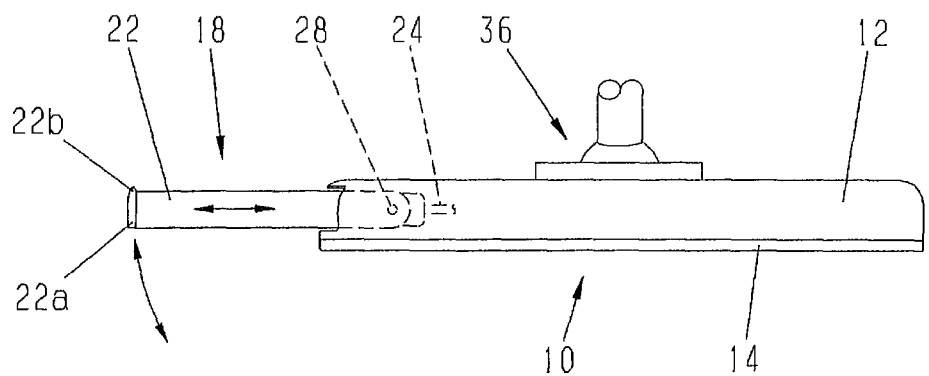
FIG. 9 is a plan view of the interior rearview mirror assembly of FIGS. 6-8, with the video display screen partially extended.
Figure 10:
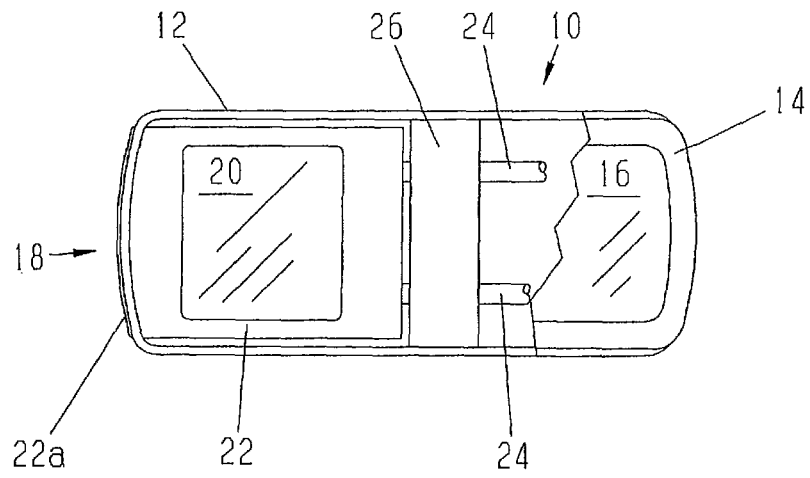
FIG. 10 is a front elevation of the interior rearview mirror assembly of FIGS. 6-9, with the video display screen in its retracted position and with the reflective element and bezel portion partially removed to show additional details.

Optionally, as shown in phantom in. FIG. 9, frame 22 may be pivotable about a generally vertical pivot axis or knuckle joint 28 or the like when video display screen device 18 is in its fully extended position (such as shown in FIGS. 2, 3 and 7). The frame 22 may be pivoted or canted about the pivot axis in either direction to adjust a viewing angle of the video display screen 20 to provide optimal viewing of the screen by the driver or other occupant of the vehicle. As can be seen with reference to FIG. 9, the casing 12 may limit or substantially preclude pivotal movement of frame 22 and video display screen 20 until frame 22 and video display screen 20 are in their fully extended position with the pivot joint 28 being positioned outward or at the exterior of casing 12. Alternately, frame 22 may be non-pivotable or fixed, without affecting the scope of the present invention.

Video display screen 20 may comprise any type of video screen and is operable to display images in response to an input or signal from a control or imaging system. For example, the video display screen may comprise a multi-pixel liquid crystal display (LCD), preferably a thin film transistor multi-pixel liquid crystal display (such as discussed below), or the screen may comprise a multi-pixel organic electroluminescent display or a multi-pixel light emitting diode (LED), such as an organic light emitting diode (OLED) or inorganic light emitting diode display or the like, or a passive reflective and/or backlit pixelated display, or an electroluminescent (EL) display, or a vacuum fluorescent (VF) display or the like. For example, video display screen 20 may comprise a video screen of the types disclosed in U.S. Pat. Nos. 6,428,172; 6,420,975; and 6,690,268, and/or U.S. patent application Ser. No. 09/585,379, filed Jun. 1, 2000 by Hutzel et al. for REARVIEW MIRROR ASSEMBLY WITH UTILITY FUNCTIONS; Ser. No. 10/207,291, filed Jul. 29, 2002 by Hutzel et al. for REARVIEW MIRROR ASSEMBLY WITH UTILITY FUNCTIONS; Ser. No. 10/307,929, filed Dec. 2, 2002, now U.S. Pat. No. 6,902,284; and/or Ser. No. 10/538,724, filed Jun. 13, 2005, and published Mar. 9, 2006 as U.S. Publication No. 2006/0050018, and/or U.S. provisional application Ser. No. 60/732,245, filed Nov. 1, 2005, which are hereby incorporated herein by reference. Optionally, the display screen device may provide a three dimensional aspect to the information being displayed.

Figure 11:
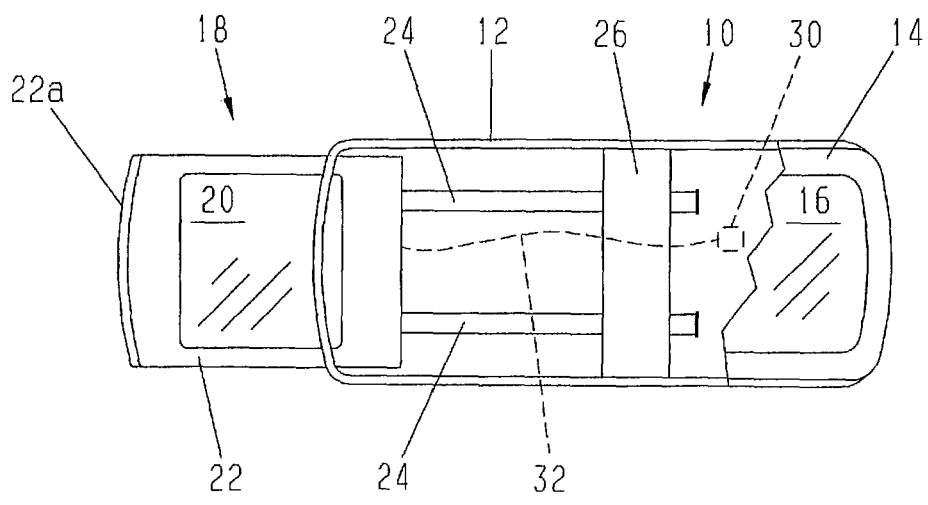
FIG. 11 is a front elevation of the interior rearview mirror assembly of FIGS. 6-10, with the video display screen partially extended and with the reflective element and bezel portion partially removed to show additional details.

Video display screen device 18 may be in communication with or may receive an input or signal from a corresponding imaging sensor or camera or imaging system and may display the image or images provided by the input or signal on the video display screen 20. As shown in FIG. 11, video display screen device 18 or an imaging or vision system of the vehicle may include a control 30, which is in communication with video display screen 20 via an electrical connector or wiring or cable 32, such as a ribbon cable, a coiled or spiral cord, a sliding electrical contact or the like, which preferably is extendable and retractable or bendable or foldable or slidable to allow for extension and retraction of the video display screen relative to the control.

Control 30 is operable to control video display screen 20 in response to an input or signal, such as a signal received from one or more cameras or image sensors of the vehicle, such as a video camera or sensor, such as a CMOS imaging array sensor, a CCD sensor or the like, such as the types disclosed in commonly assigned, U.S. Pat. Nos. 5,550,677; 5,760,962; 6,097,023; 5,877,897; and 5,796,094, and/or U.S. patent application Ser. No. 10/534,632, filed May 11, 2005, now U.S. Pat. No. 7,965,336; and/or U.S. provisional application Ser. No. 60/731,183, filed Oct. 28, 2005 by Gibson for CAMERA MODULE FOR VEHICLE VISION SYSTEM, which are hereby incorporated herein by reference, or from one or more imaging systems of the vehicle, such as a reverse or backup aid system, such as a rearwardly directed vehicle vision system utilizing principles disclosed in U.S. Pat. Nos. 5,550,677; 5,760,962; 5,670,935; 6,201,642; 6,396,397; 6,498,620; 6,717,610 and/or 6,757,109, which are hereby incorporated herein by reference, a trailer hitching aid or tow check system, such as the type disclosed in U.S. patent application Ser. No. 10/418,486, filed Apr. 18, 2003, now U.S. Pat. No. 7,005,974, which is hereby incorporated herein by reference, a cabin viewing or monitoring device or system, such as a baby viewing or rear seat viewing camera or device or system or the like, such as disclosed in U.S. Pat. Nos. 5,877,897 and/or 6,690,268, which are hereby incorporated herein by reference, a video communication device or system, such as disclosed in U.S. Pat. No. 6,690,268, which is hereby incorporated herein by reference, and/or the like. The imaging sensor or camera may be activated and the display screen may be extended or deployed in response to the vehicle shifting into reverse, such that the display screen is viewable by the driver and is displaying an image of the rearward scene while the driver is reversing the vehicle.

Optionally, the rearward imaging system or backup aid may be operable in conjunction with or in combination with other rearward sensing devices or systems, such as by utilizing the principles described in U.S. patent application Ser. No. 11/239,980, filed Sep. 30, 2005, now U.S. Pat. No. 7,881,496, and/or U.S. provisional applications, Ser. No. 60/614,644, filed Sep. 30, 2004 by Camilleri et al. for CAMERA DISPLAY SYSTEM; Ser. No. 60/618,686, filed Oct. 14, 2004 by Laubinger for VEHICLE IMAGING SYSTEM; and Ser. No. 60/628,709, filed Nov. 17, 2004 by Camilleri et al. for IMAGING AND DISPLAY SYSTEM FOR VEHICLE, which are hereby incorporated herein by reference. In such an application, distance sensing systems/elements, such as ultrasonic sensing elements or devices (such as described in U.S. patent application Ser. No. 11/239,980, filed Sep. 30, 2005, now U.S. Pat. No. 7,881,496, already incorporated herein by reference), may provide object sensing and distance sensing capabilities and features to the imaging and display system, whereby the display screen may display distance markers or may otherwise enhance or adjust the image display (such as via highlighting one or more regions of the display or providing graphic overlays or the like, such as described below) to alert the driver to an object detected rearward of the vehicle and/or in the path of the vehicle.

Optionally, the display screen and/or mirror may include user interface inputs, such as buttons or switches or touch or proximity sensors or the like, with which a user may adjust one or more characteristics of the imaging sensor and/or imaging system, such as via the principles described in U.S. patent application Ser. No. 11/239,980, filed Sep. 30, 2005, now U.S. Pat. No. 7,881,496, and/or U.S. provisional applications, Ser. No. 60/614,644, filed Sep. 30, 2004 by Camilleri et al. for CAMERA DISPLAY SYSTEM; Ser. No. 60/618,686, filed Oct. 14, 2004 by Laubinger for VEHICLE IMAG- ING SYSTEM; and Ser. No. 60/628,709, filed Nov. 17, 2004 by Camilleri et al. for IMAGING AND DISPLAY SYSTEM FOR VEHICLE, which are hereby incorporated herein by reference. Optionally, the images captured by the imaging sensor or camera may be processed by the control to extract information or data for different applications or systems, such as described in U.S. patent application Ser. No. 11/239,980, filed Sep. 30, 2005, now U.S. Pat. No. 7,881,496, and/or U.S. provisional application Ser. No. 60/618,686, filed Oct. 14, 2004 by Laubinger for VEHICLE IMAGING SYSTEM, which are hereby incorporated herein by reference.

Optionally, the video display screen may also or otherwise serve as a screen for a navigation system of the vehicle or the like, such as a GPS navigation system, such as a known navigation system or such as navigations systems of the types discussed below. The display screen may be operable to display video images and/or may display icons, characters, letters, text or other indicia, and may provide a menu driven display and control for the navigation system or the like (as discussed below), without affecting the scope of the present invention.

Figure 6:
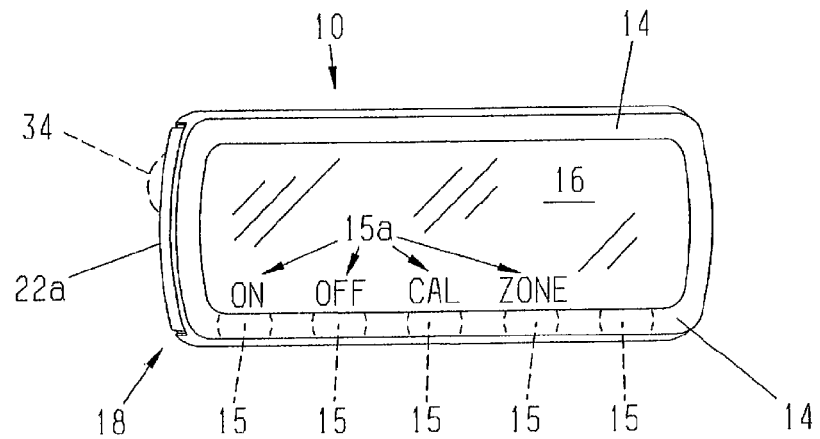
FIG. 6 is a front elevation of an interior rearview mirror assembly in accordance with the present invention, with the video display screen in its retracted position.
Figure 8:
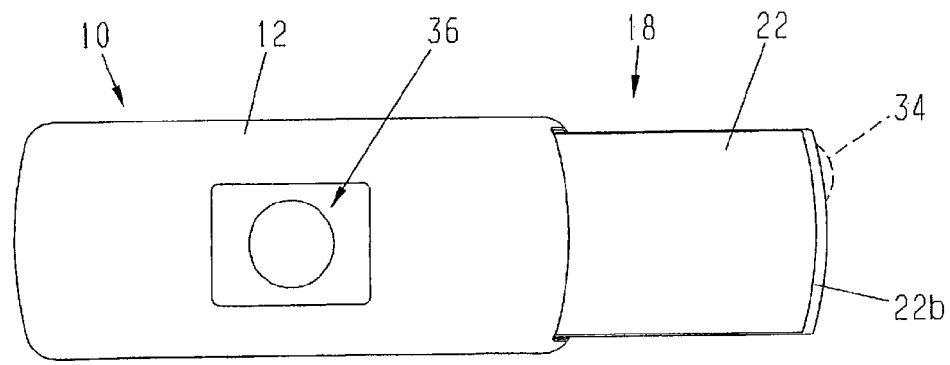
FIG. 8 is rear elevation of the interior rearview mirror assembly of FIGS. 6 and 7, with the video display screen partially extended.

As shown in FIGS. 6-8, video display screen device 18 may include an adjustment mechanism or dial 34 to adjust the intensity or brightness and/or contrast and/or appearance of the video display screen 20. Optionally, the intensity or brightness or contrast of the video display screen may be automatically adjusted in response to an ambient light sensor or glare detector, such as a sensor of the display screen device, or of the interior rearview mirror assembly or vehicle or of a console or module or the like, such as the types disclosed in U.S. Pat. Nos. 4,793,690 and/or 5,193,029, which are hereby incorporated herein by reference, without affecting the scope of the present invention. In applications where the display screen device is implemented with an electro-optic or electrochromic mirror reflective element assembly, the display screen device may be automatically adjusted in response to the ambient light sensor or glare detector associated with the electro-optic or electrochromic circuitry or system. The display intensity of the display screen may be adjusted in response to the photo sensor or light sensor, and may be increased during daytime lighting conditions and reduced at dusk or during nighttime lighting conditions. The intensity and/or contrast and/or brightness of the display may be substantially continuously adjusted or may be adjusted intermittently or in steps in response to the light sensor or sensors, such as by utilizing aspects of the displays described in U.S. Pat. Nos. 5,416,313 and 5,285,060, which are hereby incorporated herein by reference, or may be adjusted when the display screen is activated or extended.

Optionally, the display screen may include contrast enhancement or anti-glare coating or means, such as described in U.S. Pat. No. 6,690,268, which is hereby incorporated herein by reference. For example, the display screen may include polarization means or filters or coatings, such as known in the art, to enhance visibility and/or viewability and/or discernibility of the display and displayed information/video images during high ambient light levels, such as may be encountered on a sunny day. Optionally, the display screen may include other anti-glare coating or other anti-glare means, without affecting the scope of the present invention.

Desirably, the display screen emits light that is bright enough to be readily viewable and discernible during high ambient lighting conditions, such as are typically encountered on a sunny day. Preferably, the display luminance (and especially for a TFT LCD display element showing video or full color video or still images) is greater than about 300 candelas per meters squared ($cd/m^2$), more preferably greater than about 500 $cd/m^2$, and more preferably greater than about 700 $cd/m^2$. This is to help ensure that the driver can discern any video image being displayed against the sunlight streaming in through the rear window and incident at the display screen at the interior mirror assembly that will tend to wash-out the video image unless the video image is sufficiently bright. Optionally, the display screen may utilize aspects of the display element described in U.S. provisional application Ser. No. 60/732,245, filed Nov. 1, 2005, which is hereby incorporated herein by reference.

Because the video display screen 20 may be pulled or moved near or into the driver's forward field of view (if the display screen extends toward the driver's side of the vehicle), and thus may interfere with the driver's forward vision, when the display screen is in the extended position, video display screen device 18 is preferably occasionally extended and/or activated for viewing, and retracted to the non-use position when not in use. Frame 22 and video display screen 20 may be manually pulled to the extended, use position by the driver or occupant of the vehicle, and may be manually pushed back into the retracted, non-use position when the desired viewing is completed. The video display screen and/or associated imaging device or system may be actuated in response to the frame and video display screen being moved to the extended position or may be actuated via one or more user actuatable controls or buttons or the like on the frame of the video display screen device or elsewhere on the mirror assembly or vehicle, or in response to other types of activating events, such as discussed below.

Optionally, the frame and video display screen may be spring-loaded or biased or spring actuated, whereby a spring or other biasing member may function to bias or urge or assist the frame and screen toward the extended position (or retracted position if desired). In such an application, the spring or biasing member may be overcome by pushing the frame into the mirror casing to the non-use position, whereby a latch mechanism or the like may retain the frame in the non-use position. The frame may then be pressed inward to release the latch and to allow the biasing member or spring to move or urge or assist the frame and video display screen to the extended position. Such spring and latch mechanisms are conventional and well known.

Optionally, and preferably, and as can be seen with reference to FIGS. 12-18, the frame and the video display screen may extend toward the passenger side of the vehicle. This avoids any potential intersection of or hitting of or interference with the fully extended video display with the inner surface of the vehicle windshield, which may occur when the display screen extends toward the driver side of the vehicle due to the angle or canting of the mirror casing and reflective element toward the driver for appropriate rearward viewing by the driver of the vehicle. Because the mirror assembly is typically angled or canted toward the driver of the vehicle (such as at an angle of approximately twenty-two degrees from a line parallel to the longitudinal axis of the vehicle) to provide the driver with the appropriate or desired rearward field of view, it is desirable and preferable to have the video display screen, slide outward toward the passenger side of the vehicle. The display screen thus may extend toward the passenger side of the mirror and laterally therefrom in a motion, such as a sliding motion, that is parallel to the length axis of the reflective element. Because the mirror assembly is angled toward the driver of the vehicle, the passenger side video display screen may be readily viewable by the driver of the vehicle when it is extended from the mirror assembly. Optionally, the passenger side video display screen may be pivotable (such as about a pivot axis or a ball joint or the like, as discussed below) relative to the mirror casing when it is fully extended to further angle the video display screen toward the driver to enhance the viewing of the video display screen.

Optionally, frame 22 and video display screen 20 may be extended electronically, such as via a driving device or mechanism (not shown), such as via a linear actuator, a solenoid device, a rack and pinion device, an electrical drive motor or actuator, such as the types disclosed in U.S. Pat. Nos. 6,116,743 and/or 6,390,635, and PCT Application No. PCT/US03/40611, filed Dec. 19, 2003, and published Jul. 15, 2004 as International Publication No. WO 2004/058540 and/or U.S. patent application Ser. No. 10/538,724, filed Jun. 13, 2005, and published Mar. 9, 2006 as U.S. Publication No. 2006/0050018, which are hereby incorporated herein by reference, a non-armature electrical motor, a shape memory alloy (SMA) device, a NanoMusele™ device, an electrically induced stress-strain device or actuator, a bio-material and/or the like, such as discussed below. Preferably, the display screen device or module and/or drive system or drive means is powered/actuated under microprocessor control.

Figure 12:
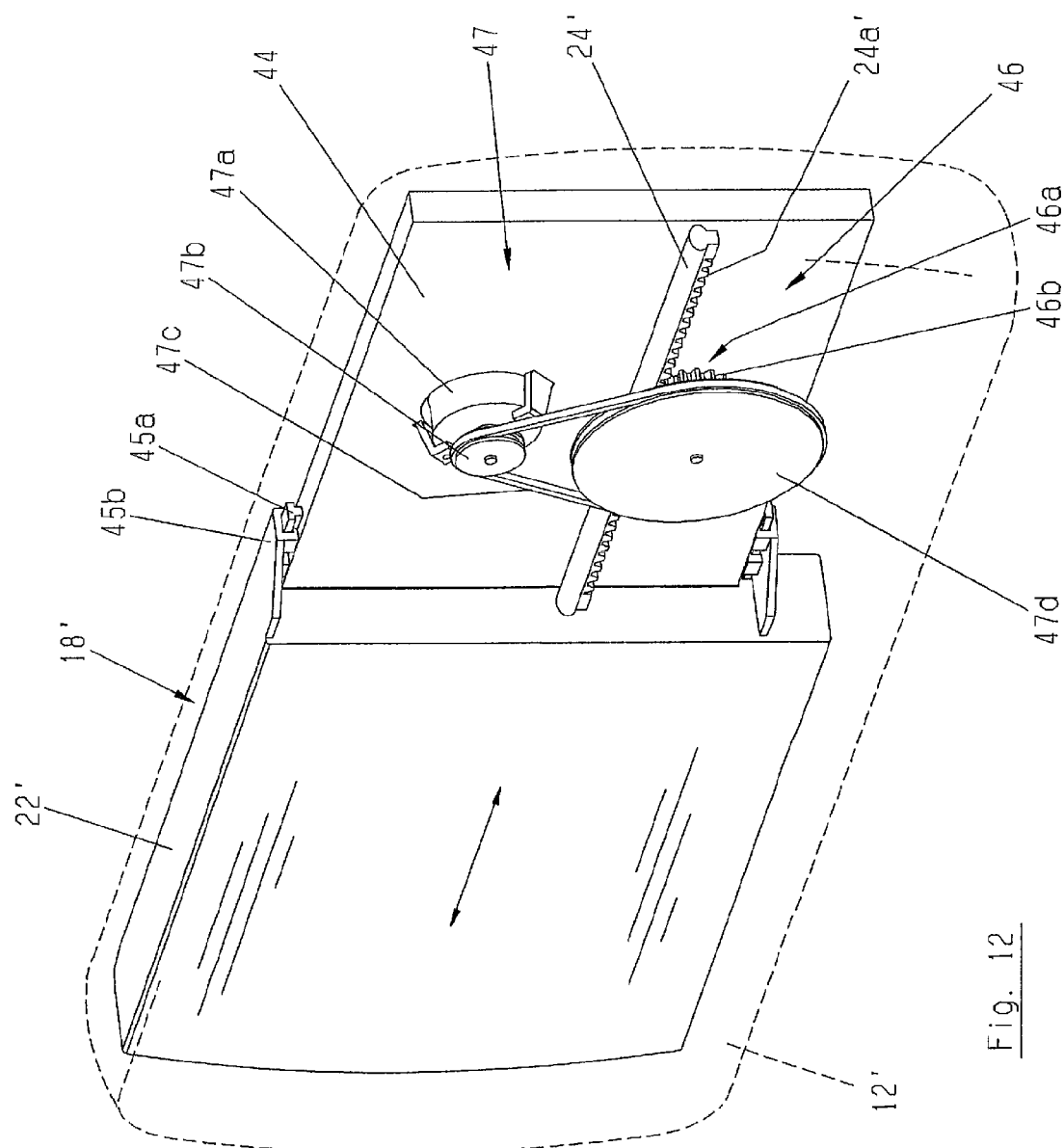
FIG. 12 is a rear perspective view of a video display screen actuator in accordance with the present invention.
Figure 13:
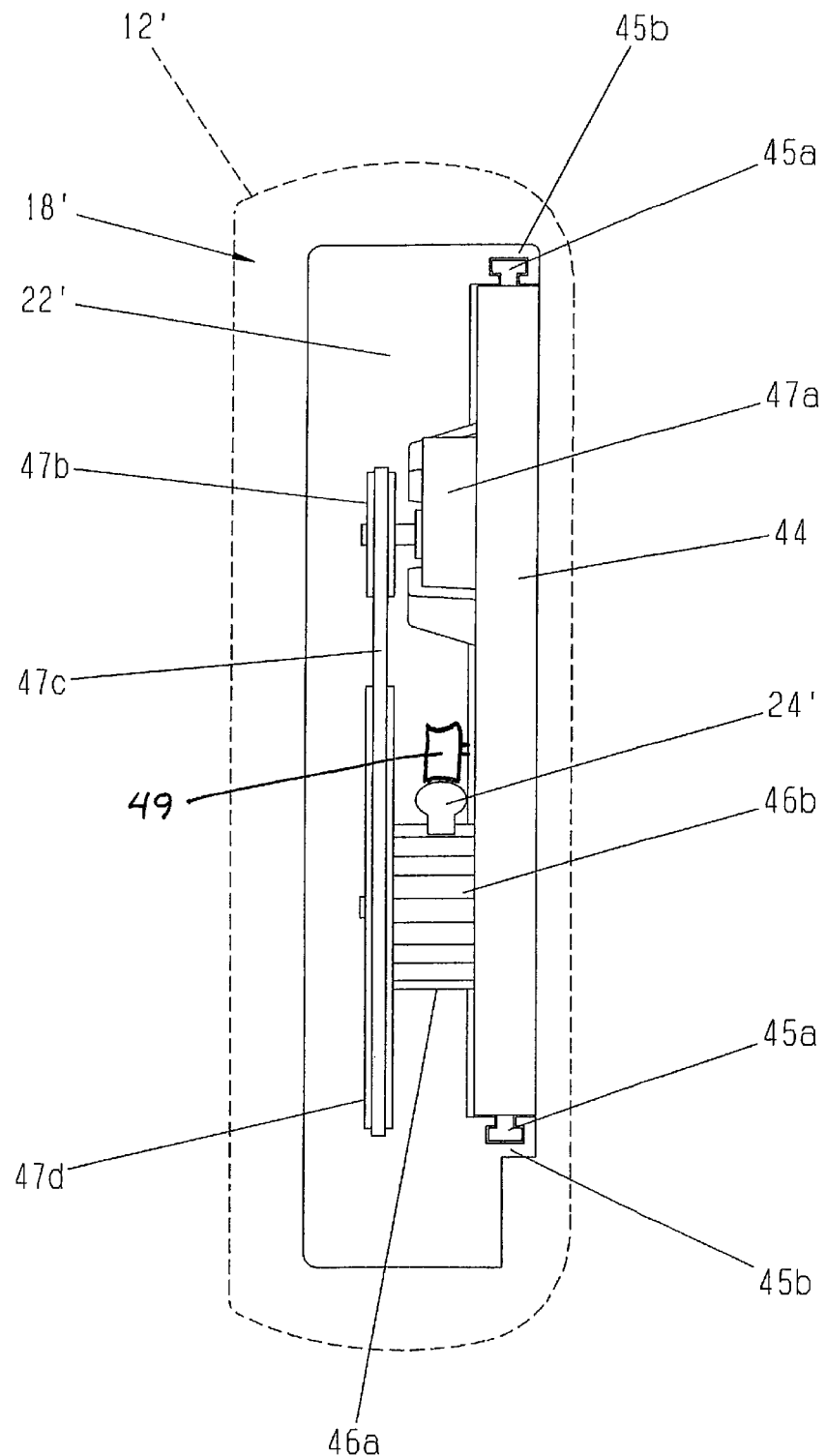
FIG. 13 is an end elevation of the video display screen actuator of FIG. 12.

For example, and as shown in FIGS. 12 and 13, a video display screen device or module or element 18' may include a frame or carriage 22' that is extendable and retractable from a base portion 44. Base portion 44 may be mountable inside a mirror housing or casing 12', such that extension and retraction of display screen frame 22' relative to base portion 44 causes extension and retraction of the frame 22' and the display screen (not shown in FIGS. 12 and 13) relative to mirror casing 12', as discussed above. Base portion 44 may be fixedly secured within the mirror assembly and may have upper and lower track or rack or rail portions 45a, which slidably engage corresponding upper and lower track or rack or rail portions 45b of frame 22', such that frame 22' may slide or move along the track portions 45a to extend and retract relative to base portion 44. The track portions 45a, 45b function to maintain alignment of the frame and display screen as it moves relative to the base portion and to maintain proper alignment and engagement of the rack and pinion mechanism 46, discussed below.

Optionally, the display screen may include a cleaning or wiping or brushing element at the opening at the side or end of the mirror casing for engaging and cleaning the display screen (so as to remove dust or dirt or the like that may accumulate on the display screen) as the display screen is extended and retracted relative to the mirror casing. Likewise, the racks or rails may also comprise self-cleaning type components and/or self-lubricating type components to maintain clean contacts and/or sustain low friction between the racks during use of the display screen. Because the screen is contained within the mirror casing when not in use, dust and dirt typically may not accumulate on the screen and other internal components of the display screen and moving mechanisms, such that such cleaning devices or mechanisms may not be necessary.

In the illustrated embodiment of FIGS. 12 and 13, video display screen device 18' includes a belt drive mechanism 47 that is operable to move the frame 22' relative to base portion 44 via a rack and pinion mechanism 46. Rack and pinion mechanism 46 includes a rod or member 24' extending from frame 22' and generally along base portion 44. Rod 24' includes a plurality of notches or teeth 24a' for engaging corresponding teeth 46b of a sprocket or gear member or pinion 46a. Pinion 46a is rotatably mounted to base portion 44, such that rotation of pinion 46a causes a corresponding translational movement of rod 24' relative to pinion 46a and base portion 44.

Optionally, the pinion of the rack and pinion mechanism may engage another gear or sprocket and may rotatably drive the other gear or sprocket, which in turn imparts a corresponding translational movement of the rod to linearly move the display screen relative to the minor casing. The gear ratios of the sprocket or sprockets may be selected to provide the desired driving torque and extension/retraction speed of the display screen when the motor is activated. The rack and pinion mechanism 46 thus provides translational movement of frame 22' as the rod 24' is moved or as pinion 46a is rotated. The mechanism may include a guide 49 (FIG. 13) that engages the rack generally at or near the pinion and at an opposite side of the rack from the pinion, such that the guide functions to guide and maintain the rack in engagement with the pinion during operation of the mechanism. The guide may comprise a roller or wheel that rolls along the rack as the rack is moved or may comprise any other guiding means for guiding the rack and urging the rack into engagement with the pinion. The rack may engage or attach to the carriage of the display screen at one end, while its opposite or free end may generally float at the other side of the pinion.

Optionally, the base portion 44 onto which the drive motor and pinion is mounted may comprise a carrier plate 44' (FIG. 16), which may extend at least partially along the rear surface of the reflective element. The carrier plate may include or attach to the ball receiving portion or socket 48 of the mounting mechanism of the mirror assembly, and may also include or attach to the rail or rack portions 45a' along which the guides or tracks 45b' of the display screen module 18' may be moved. The carrier plate 44' may include one or more openings therethrough for placement of a display device or element 50 at the rear of the reflective element for displaying information through the reflective element of the mirror assembly, such as through an aperture or window 52 (FIG. 15) formed in the reflective coating of the reflective element or via a transflective display or the like. A circuit board 54 may be attached to the carrier plate 44' to support the controls and/or accessories and/or circuitry of the mirror assembly and/or display screen module.

The belt drive mechanism 47 includes a drive motor 47a that is mounted to base portion or carrier plate 44, 44' and that is operable to rotatably drive a pulley 47b, which in turn drives a belt or band 47c to rotate a second pulley 47d. Second pulley 47d is mounted to or secured to pinion 46a, such that rotational driving by motor 47a causes rotation of pinion 46a, which in turn causes translational movement of rod 24' and frame 22' and the display screen relative to base portion or carrier plate 44, 44'. The display screen device and/or mirror assembly may include or utilize mechanical movement means and/or sound dampening means to ensure quiet, preferably near silent or silent, extension/retraction of the display screen. Optionally, the drive mechanism may deliver a slight sound to provide the driver with a cognizant awareness (in addition to the visible cue or prompt) of the extension/retraction of the display screen.

The rack and pinion elements or components may comprise various materials, such as metallic or polymeric materials. Desirably, the selected material, such as acetal or the like, may provide a self-lubricating material with high wear or durability and low moisture absorption characteristics. Desirably, the selected materials for the rack and pinion components are dissimilar materials, with the interface materials including one harder material, such as a metal material, such as brass or the like, or an engineering plastic, such as Nylon or the like, and one softer material, such as a softer plastic, such as acetal or the like. In a preferred embodiment, the rack may comprise an acetal or glass filled Nylon material, while the pinion may comprise an acetal or brass or Nylon material. Other suitable materials may be used without affecting the scope of the present invention.

The drive motor 47a may comprise a rotary drive motor, such as, for example, a five pole DC brush motor or the like. Preferably, the drive motor includes an internal varistor or variable resistor to minimize EMC effects and reduce brush noise and the like. The drive motor may further include DC motor circuitry topologies and interference suppressors, such as those described in U.S. Pat. No. 6,229,226, which is hereby incorporated herein by reference.

The drive motor may be operable via a pulse width modulation (PWM) or the like. Preferably, the drive motor is operable to provide a decaying pulse width modulation motor drive to reduce or control or smooth a hard stop (such as a mechanical stop or an electronic stop, such as a software controlled stop or the like) at either or both ends of the display screen travel. For example, a control or PWM function may modulate or adjust or slow the motor down as it approaches the end of the travel in either direction (such as at or near the fully extended or fully retracted positions or at or near any position therebetween where the display screen may be stopped). Optionally, the motor may be otherwise controlled, such as via software or ASICs or the like, or the motor may comprise a stepper motor or the like, to move the display screen and to preferably provide a smooth transition during starting and stopping of the movement of the display screen in either direction. Optionally, the drive motor may be operable via an analog drive circuit or the like, whereby the drive motor may operate to provide a decaying voltage/current motor drive to reduce or control or smooth a hard stop at either or both ends of the display screen travel. Optionally, the drive or motive system may incorporate a clutch mechanism to control or enhance or smooth the onset and/or stopping of the movement of the display screen in either direction and/or to relieve or obviate stress/strain/damage on any gear drive or guide/track used should a user attempt to manually extend or retract the video display screen in opposition to the drive or motive system of the display screen device.

Optionally, the drive system or mirror assembly may include one or more mechanical stop elements to limit movement of the display screen in either direction. For example, damping material or elements or means, such as elastomeric or rubber stops or the like, may be positioned at or in the mirror assembly to contact the carriage or body or other portion of the display screen to dampen the stopping of the display screen at the extended and/or retracted positions. Other dampening or control means may be implemented to control the movement of the display screen and to provide smooth extension and retraction of the display screen, without affecting the scope of the present invention. Such drive controls or software or damping means facilitate rapid movement of the display screen, such as rapid extension of the display screen to the extended or partially extended position, while providing a substantially smooth stop at the end of the travel of the display screen.

For many applications, the driver may desire a more rapid extension of the display screen, such as when initially engaging the reverse gear. Thus, it is desired that the display screen reach the fully extended position, such as in preferably less than about 3.5 seconds, more preferably less than about 2.5 seconds, and most preferably less than about 1.5 seconds. Optionally, extension of the display screen may be spring assisted (or otherwise mechanically assisted) so as to achieve the desired rapid extension. While it is also desirable to have rapid retraction of the display screen, the driver is often more tolerant of a slower retraction. Thus, mechanical and/or electrical assists or assist means may be incorporated that favor a faster extension rate or time to the fully extended position over the rate or time of retraction to the retracted position. The drive motor thus may operate, as powered under microprocessor control, to quickly extend the display screen module to quickly move the display screen to a viewable orientation, but may operate to retract the display screen module at a different rate, such as a slower rate, since it may not be as critical to quickly retract the display screen module.

The drive motor thus may operate under microprocessor control to extend and retract the display screen module at a desired rate and with the desired performance characteristics. The display screen module may be substantially, smoothly extended and retracted via the cooperation of the mechanical driving mechanisms and the electronics and/or controls of the drive motor. The drive motor may be selected to provide the desired performance characteristics, while performing at a low sound or noise (dB or dBA) level or desired sound or noise level or sound characteristic. Preferably, the audible level of the motor or drive mechanism (such as may be measured at a typical location of a driver's head) is less than about 40 dBA (wherein dBA represents "decibels adjusted", which is a weighted absolute noise power or a weighting of the raw decibel level that most closely resembles the way the human ear receives and perceives sound levels); more preferably, the audible level at or near the driver's head location is less than about 30 dBA, and most preferably less than about 20 dBA. The dBA scale is a weighted average of the overall sound pressure, which is computed to most closely match the ability of the human ear to hear sound.

Figure 16:
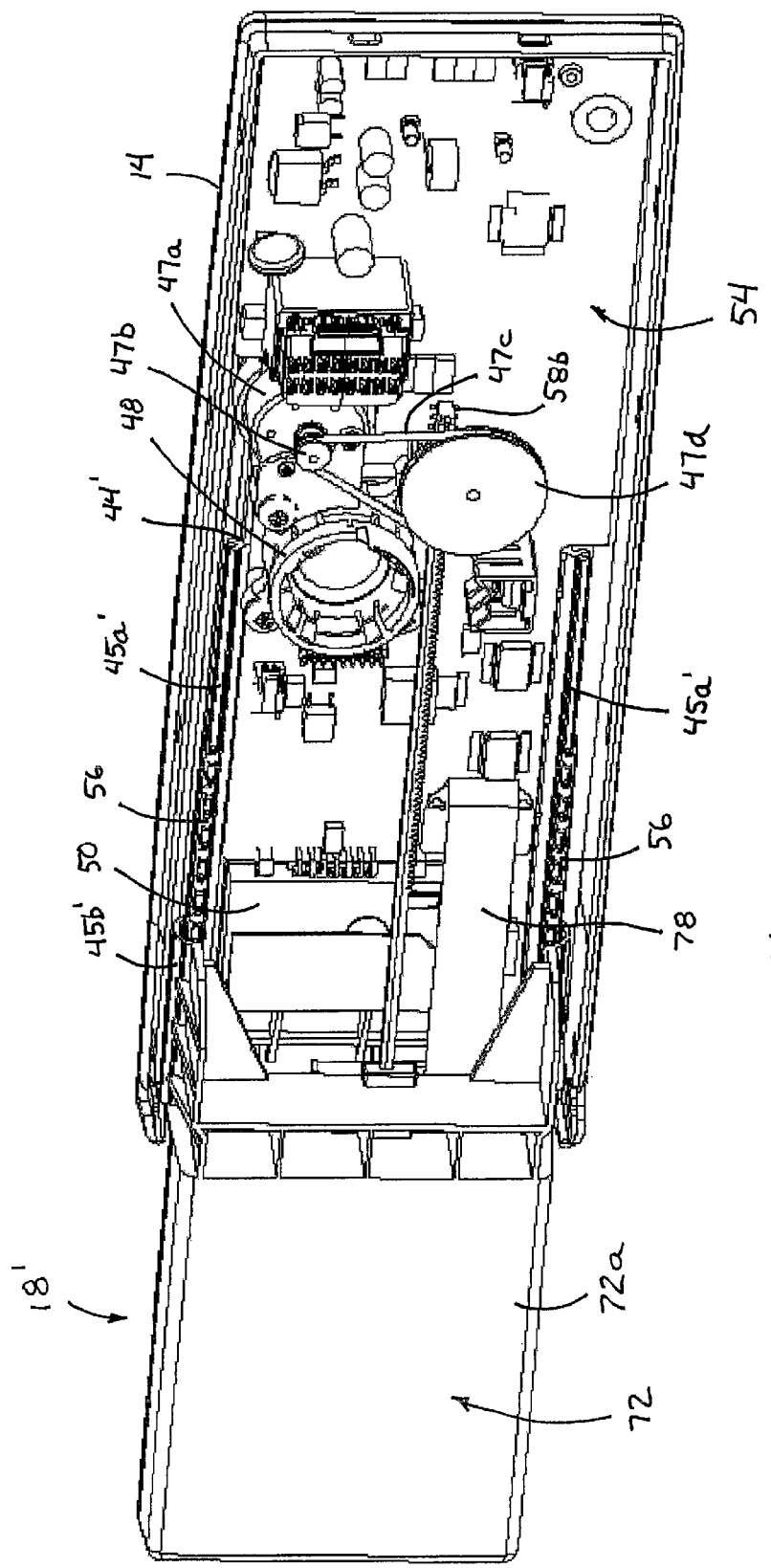
FIG. 16 is a rear perspective view of another mirror assembly with a display screen movably mounted therein in accordance with the present invention, with the rear casing of the mirror assembly removed.

As can be seen in FIGS. 12, 13 and 16, the drive motor 47a may be secured or fastened to the base portion or carrier plate 44, 44' of the mirror assembly, such as via threaded or mechanical fasteners or the like. The drive motor is mounted to the base portion or carrier plate and may be spaced therefrom (such that the non-shaft side of the motor may not contact the carrier plate) to limit or reduce vibration of the carrier plate and mirror assembly when the drive motor is activated. Optionally, a damping material, such as an elastomeric or rubbery material, such as a silicone or a thermoplastic elastomer (TPE) may be disposed at the drive motor to absorb or dampen vibration, or the motor may be mounted to the mirror assembly, such as by adhesion, such as by using a double-sided adhesive coated TPE that has damping materials to passively limit or reduce or substantially preclude the mechanical transfer of structure borne vibration to the mirror assembly, or an active damping system may be provided to counteract the vibration frequency or frequencies of the drive motor. Other damping means for damping or canceling vibration of the motor may be implemented without affecting the scope of the present invention. Optionally, anti-vibration elements or means may be provided for the display screen and/or the mirror reflective element so as to compensate for any propensity toward any mirror reflector vibration and/or display screen vibration that may be due to the increased assembly mass and/or any change in the center of gravity of the mirror assembly due to the extension of the display screen.

The frame or carriage and the video display screen thus may be extended and retracted via belt drive mechanism 47 and rack and pinion mechanism 46. The belt drive mechanism provides a smooth drive movement and may provide reduced noise to the drive mechanism. The belt drive system or mechanism may limit or substantially preclude motor stall situations in an interference condition by allowing the motor to rotate while sliding motion of the display screen is halted. Also, the belt drive may provide softer start and stop conditions by reducing the shock of the gear mesh when the motor is activated and deactivated, such as via a clutch mechanism or slip clutch or the like.

The drive mechanism or drive means preferably include an anti-stall functionality, element or means, which helps to reduce or obviate damage, such as may occur due to motor burn out and/or motor/component overheating, such as due to a blockage or impediment impeding extension or retraction of the display screen. Optionally, if such an impediment occurs, the display screen drive motor may automatically stop, and may reverse the direction of travel of the display screen after a period of time. For example, if the display screen encounters a blockage while extending, the drive motor may reverse to retract the display screen after a period of time at the blockage (such as after about one second or thereabouts). Similarly, the drive motor may function to extend the display screen if the display screen encounters blockage while retracting into the mirror casing (which may protect against a person's finger getting pinched by the display screen as it retracts into the mirror casing). Other anti-pinch elements or means may be provided, such as elements at the casing or display screen, that may function to limit or substantially preclude the possibility of a person, such as a child, getting their finger caught or pinched by the display screen when it is retracted into the mirror casing.

The rack and pinion arrangement or mechanism may enable the powered or driven mechanism to be manually overridden by pulling or pushing the display screen in the desired direction (which may cause the belt to slip on the pulleys if the motor is not operating). Such a manual override may be desired to allow the display screen to be operated without the electric drive in case of failure of the drive motor. Although shown and described as a rack and pinion type of drive mechanism, other drive mechanisms for providing linear translation of the display screen in response to activation of a drive motor may be implemented without affecting the scope of the present invention. For example, the drive mechanism may comprise a worm gear drive mechanism, a stepper motor drive mechanism, a linear actuator, a pneumatic drive mechanism, a shape memory alloy device or stress-strain actuator or drive mechanism (such as a NanoMuscle™ actuator or drive mechanism such as described below), or any other drive means or mechanism for linearly moving the display screen relative to the mirror casing.

Optionally, the display screen may be movable along the rails or rack portions, and the rails or the screen module may include roller bearings or ball bearings positioned therealong and in rolling engagement with the other of the rails or screen module, in order to enhance movement or extension and retraction of the display screen relative to the mirror casing. For example, and as shown in FIG. 16, a strip of roller or ball bearings 56, such as linear bearings or ball bearings or needle bearings or the like, may be positioned along the rails or racks 45a' and at the interface of the rails 45a' and guides or tracks 45b' of the screen device 18'. Such an arrangement may provide enhanced movement and reduced friction, and may be particularly beneficial in cold climate conditions, where the plastic on plastic interface may stick during such cold temperatures. Also, the ball bearing configuration may function to accommodate part to part tolerances and dimensional variations within the mirror assembly to provide enhanced movement of the display screen. Although shown as a pair of rails, the display screen and carriage may be movable along a single rail or more than two rails, without affecting the scope of the present invention.

Optionally, and alternately, for example, a conventional solenoid may be used for a drive motor. Preferably, however, and particularly for substantially silent operation, a shape memory alloy device or electrically induced stress-strain actuator or the like may be implemented, such as a Nano-Muscle™ actuator, such as a 70 gram High Speed/High Efficiency Linear Actuator, a 125 gram High Speed/High Efficiency Linear Actuator, or a 195 gram High Speed/High Efficiency Linear Actuator, all of which are commercially available from NanoMuscle, Inc. of Antioch, Cal. Such electrically induced stress-strain linear actuators comprise a selection and/or combination of metallic elements, typically bimetallic elements, such as bimetallic alloys, which may contract in response to electrical actuation and may extend or return to their original state when the electrical actuation is removed. More particularly, such electrically induced stress-strain actuator, such as the NanoMuscle™ actuator or the like, contracts in response to one or more electrically resistive shape memory alloy wires contracting as they are heated with application of a suitable voltage. Often such linear actuators may incorporate a spring or other biasing member or return force device or mechanism to urge or assist the actuator to its original, non-contracted state when the electrical actuation is removed. The actuator may be mounted at the mirror assembly such that contraction of the actuator results in a corresponding retraction of the frame and video display screen to the retracted, non-use position or a corresponding extension of the frame and video display screen to the extended, use position, depending on the application of the actuator. Other such contracting or extending devices may be implemented, and may comprise metallic or polymeric components, without affecting the scope of the present invention. Such shape memory alloy devices thus provide substantially silent operation, since there is substantially no parts or gears or the like moving relative to one another during operation. It is further envisioned that pivotal movement of the video display screen about a pivot axis or joint, as discussed above, may be selectably electronically controlled via a rotational drive motor or the like, without affecting the scope of the present invention.

Optionally, the drive system may include sensors for sensing initial movement of the video display screen in either direction, whereby the drive motor may be actuated to move the display screen in response to detection of such initial movement. For example, a sensor may detect an initial inward movement of the display screen, such that a small push of the extended display screen toward the mirror assembly may turn on the electric drive which then may retract the display screen.

Figure 17:
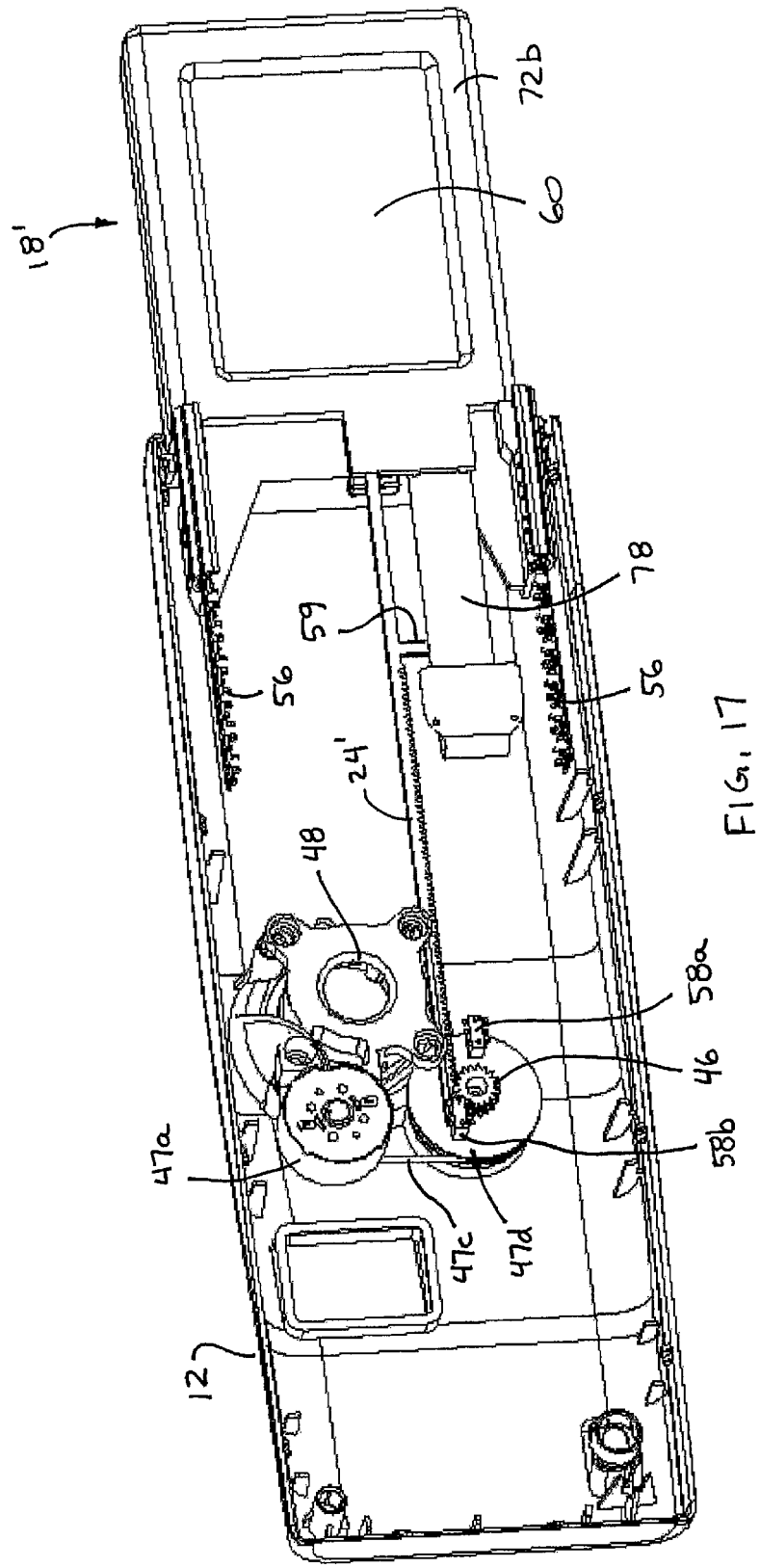
FIG. 17 is a front perspective view of the display screen and rear casing of the mirror assembly, with the reflective element assembly, circuit board and bezel removed to show additional details.
Figure 18:
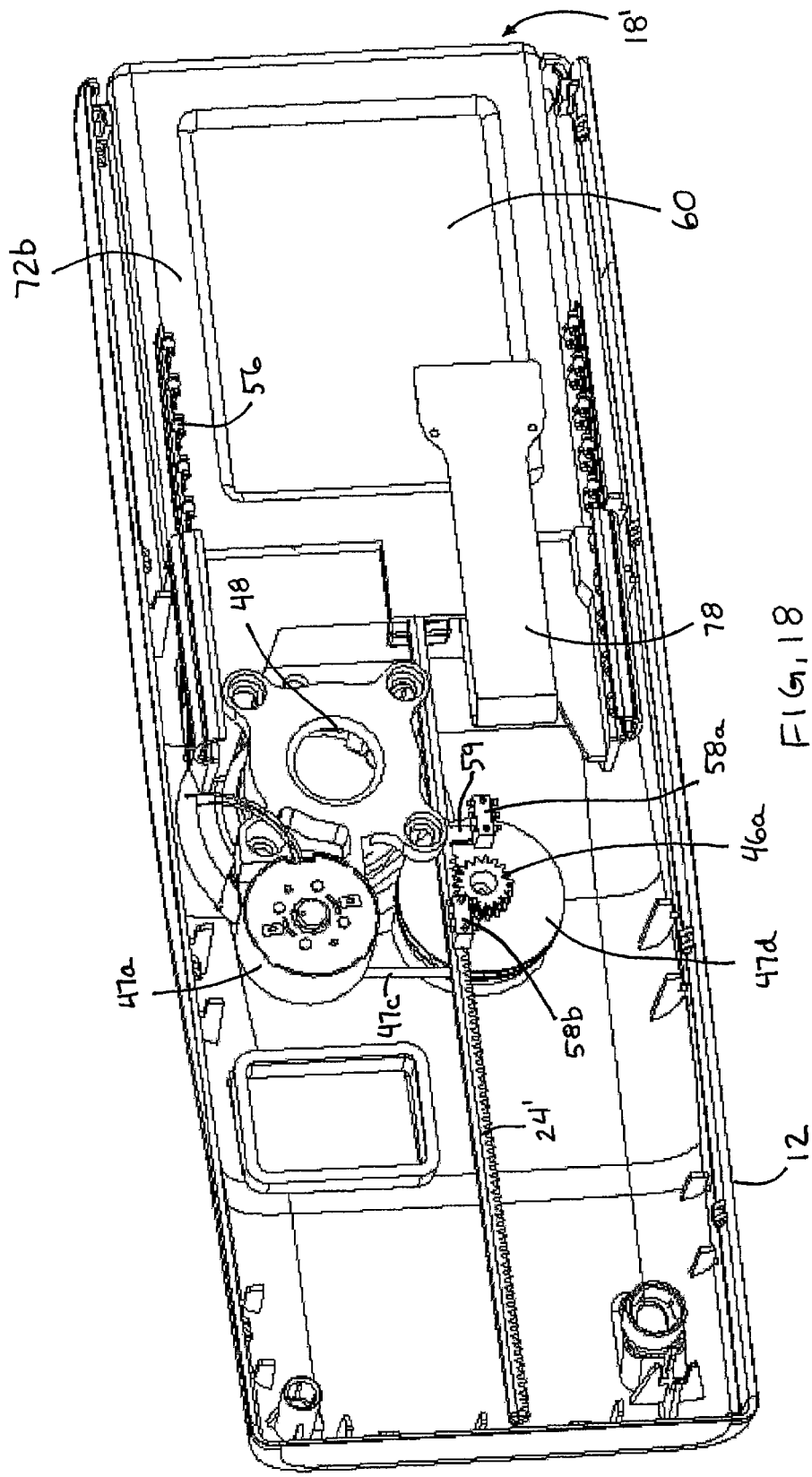
FIG. 18 is a front perspective view similar to FIG. 17, but with the display screen in its refracted position.

Optionally, the mirror assembly may include one or more limit switches or position detection devices or sensors (such as a Hall effect sensor or an optical sensor or an electro-mechanical switch or the like) to determine the position of the display screen relative to the fully extended and/or fully retracted positions. For example, and with reference to FIGS. 17 and 18, the mirror assembly may include a first limit sensor or switch 58a for detecting when the display screen is fully retracted and a second limit sensor or switch 58b for detecting when the display screen is fully extended. In the illustrated embodiment, the limit sensors 58a, 58b are positioned at the circuit board and/or base or carrier plate (not shown in FIGS. 17 and 18). FIGS. 17 and 18 are shown with the circuit board and base and reflective element and bezel of the mirror assembly removed to show additional details, but the switches/sensors and motor and other drive elements and mechanisms may be attached to the base plate and/or circuit board and contained within and between the bezel portion and the rear casing 12.

In the illustrated embodiment, the first limit sensor 58a contacts or senses an arm or extension or tab 59a that extends from the rod or arm 24' so that the tab approaches or passes or contacts the limit sensor when the rod and the display screen are fully or substantially fully retracted into the mirror casing (as shown in FIG. 18), and may open or close a circuit when contacted or approached by the tab 59 so as to indicate to the drive control that the carriage and display screen are fully retracted. Likewise, the second limit sensor 58b may detect the end of the rod 24' or may contact or detect a stop or block or trigger member or element at the end of the rod (or at an end of one of the rails or guide rods or tracks or guides) when the carriage and display screen are fully extended (as shown in FIG. 17), and may open or close a circuit when contacted or approached by the stop so as to indicate to the drive control that the carriage and display screen are fully extended. Optionally, the limit switches or sensors (or a single switch or sensor) may be positioned elsewhere within the mirror assembly and may contact or detect the carriage or housing or casing or racks of the display screen when the screen and carriage are fully extended from the mirror casing and/or retracted into the mirror casing.

Other suitable position detection or determining devices may be implemented without affecting the scope of the present invention. For example, an optical sensor or a LED transmitter and receiver pair may detect holes or slots or extensions or teeth or notches or the like along the rack or rail to determine the location of the carriage and display screen when they are at the extended or retracted position and/or at other positions or locations therebetween, a magnetic sensor or a linear potentiometer or a rotary potentiometer or rotary encoders (which may count pulses that correspond to the movement of the carriage and display screen) or armature pulse counting (which may count pulses or spikes of the motor) or Hall effect sensors, or other snap detector/limit switches, such as, for example, an ESE24 switch commercially available from Panasonic of Tokyo, Japan, or the like, may be operable to detect or determine the various positions or locations of the carriage or display screen relative to the mirror casing. The sensors or detecting devices may detect the fully extended location and the fully retracted location of the display screen relative to the mirror casing, and may optionally detect one or more locations therebetween.

Optionally, the control of the display screen or mirror assembly may be protected against damage or wear due to motor stalling or the like, and may deactivate or modulate or adjust or otherwise control the drive motor if the display screen module does not extend the full amount, such as if there is an interference or blocking condition that blocks or inhibits or restricts the extension of the display screen module (such as may occur if a person's hand is in the way of the extending display screen or if the mirror is tilted or canted so that the display screen is extending toward the windshield of the vehicle or toward a visor of the vehicle). The motor may be deactivated in response to a period of time elapsing before the display screen is detected at its fully extended position, or in response to a change in the load on or current draw of the motor as the motor attempts to extend the display screen against the blocking object, or in response to a detection that the display screen is not moving or slowly moving while the drive motor is activated. The control and deactivation of the motor thus may limit driving by the motor when the path of movement of the display screen is blocked or restricted. The control may further function to retract the display screen when such blockage or interference is detected.

Optionally, the drive control may activate and/or deactivate the drive motor to move the carriage and display screen in either direction in response to the detection or determination of the location of the display screen relative to the mirror casing. For example, the control may monitor the position of the display screen relative to the mirror easing and may adjust the position if the position moves or drifts away from the desired location. For example, the control may detect a drifting or movement of the display screen out from its retracted position, and may actuate the drive motor to move the display screen back to its fully retracted position, in order to limit or substantially preclude extension or drifting of the video screen out from the mirror casing, such as due to vibration of the mirror assembly while the vehicle is operating, so that the display screen stays fully retracted when not in use. The control may also monitor the location of the display screen when it is extended and may maintain the display screen in the desired extended (or partially extended) location when the display screen is in use. The mirror control thus may monitor the position of the display screen and, if it is in the retracted state and the display screen begins to move out of position (due to vibration or the like), the control brings the display screen back to the appropriate or initial or fully retracted position, and may do so in a manner that is substantially unperceivable to the driver or occupant of the vehicle. The control may function in a similar manner when the display screen is in the extended or partially extended position.

Optionally, the control may be operable to extend the display screen partially outward from the mirror casing, such that only a portion of the display screen is viewable by the driver of the vehicle. For example, the display screen may be extended partially outward to provide an alert to the driver that information pertaining to a particular feature or function or accessory of the mirror assembly or vehicle may be viewable on the display screen. The driver may then elect to have the display screen extend further outward for viewing the information, if desired. For example, the display screen may be extended partially outward, such as when a navigation system is activated (as discussed below), to alert the driver that the vehicle is approaching a waypoint or turn or the like of a navigational route or path. When partially extended, the display screen may be extended so that a portion of the video screen is viewable by the driver or so that only the outer portion of the frame or bezel of the display screen (which may include one or more icons or indicators or the like to indicate the respective function that triggered the partial extension) is viewable by the driver. If the driver is aware of the approaching waypoint, the driver may ignore the partial extension of the display screen, and may continue on the desired path (and the display screen may retract after a period of time has elapsed or after the waypoint is reached). If the driver is unfamiliar with the path, the driver may elect to have the display screen extend further (such as via a voice command or user input at the mirror assembly or display screen or elsewhere in the vehicle, such as at the steering wheel of the vehicle or the like) to view a map or driving instructions or the like that will clarify to the driver what driving maneuver is needed to stay on the desired course or route. The display screen may retract after a period of time or after the vehicle has reached the waypoint and performed the appropriate maneuver. Optionally, the display screen may fully extend if the vehicle passes the waypoint and strays from the entered route or path, and may then provide instructions or maps to guide the vehicle back onto the desired route or path.

Optionally, the display screen may be partially extended to alert the driver of other conditions, such as driving conditions, vehicle status conditions, accessory functionality or status, and the like, without affecting the scope of the present invention. When partially extended, the screen may extend a small amount such that the outer frame portion of the display is viewable by the driver (and the outer frame portion may include one or more indicators or displays for alerting the driver or informing the driver of the function associated with or triggering the partial extension of the display screen) or the screen may extend partially outward such that a portion of the display screen is viewable, whereby the display may include a partial display or iconistic display or the like to indicate what accessory or feature or status it is partially extending in connection with, so as to provide an informative alert to the driver. Optionally, an audible message/alert and/or a tactile/haptic alert may be generated in conjunction with the partial extension to notify the driver of the function.

The display screen thus may provide an alert function by extending out or partially extending out from the mirror casing to alert the driver of when the display screen has information to display to the driver or when the display screen may provide a particular function or input or control that may be desired by the driver at that time, depending on various criteria and conditions, such as driving conditions, other user inputs or voice commands, activated accessories, status of various vehicle components and accessories, and the like. The outer portion of the frame or bezel of the display screen module may include one or more inputs thereon (as discussed below), such that a user may access and actuate the input or inputs (or the user may give a voice command to cause further extension of the display screen for access to other inputs or for viewing the entire video display screen) when the display screen is only partially deployed or extended.

Figure 14:
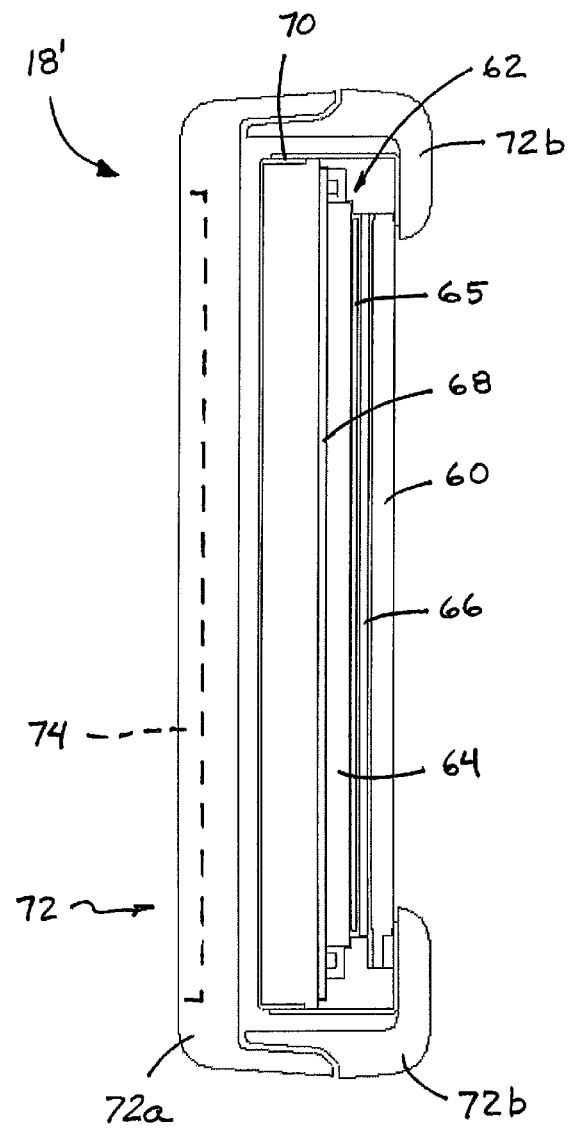
FIG. 14 is a sectional view of the video display screen of the present invention.

In the illustrated embodiment of FIG. 14, the video display screen module 18' comprises an LCD display screen or panel 60 and a backlight or illumination source 62 positioned behind the LCD screen 60 to backlight the LCD screen and illuminate the display. The LCD screen or panel 60 may comprise a fall color panel or a black and white or monochrome display panel, depending on the particular application and desired appearance of the display. The LCD panel 60 is back lit by the illumination source 62, which illuminates the LCD panel so that the image displayed on the panel is backlit and thus readily viewable and discernible by the driver or occupant of the vehicle. Optionally, the LCD panel 60 may include a polarizer or film or coating or the like that may provide a desired angle of the light that passes through the LCD panel, so as to direct the light in a desired direction, such as generally toward a head region of a typical driver of a vehicle. Although described as an LCD panel, other types of video display screen elements or devices may be implemented, without affecting the scope of the present invention. For example, the display panel may comprise a light emitting diode (LED) display, an organic light emitting diode (OLED) display, a color STN display or the like, or any other display means that may operate to provide a color or monochromatic display at the display screen when the display screen is at least partially extended from the mirror casing.

In the illustrated embodiment, the LCD display panel 60 is back lit by the illumination source 62, which may comprise one or more white light emitting diodes (LED) that illuminates or back lights the panel 60 via a light guide 64. The light guide 64 receives the light emitted by the LED or LEDs (or other illumination sources, such as electroluminescent sources, CCFLs, organic light emitting diodes (OLED) or xenon lights, flat fluorescent tubes, incandescent light bulbs, such as miniature incandescent bulbs or the like) and guides or directs the light toward the LCD panel and through the LCD panel to enhance the brightness of the display screen for viewing by the driver or occupant of the vehicle. The light guide 64 may include a coating or film 65, such as a brightness enhancing film or the like, thereon to enhance and/or direct the light emanating from the light guide. The brightness enhancing film, which may comprise a plastic sheet with prismatic or optic features molded or extruded or otherwise formed thereon, may correct and redirect light toward the LCD panel to increase or enhance the on-axis brightness of the light and thus of the display as viewed by the driver or occupant of the vehicle. Optionally, the display screen may utilize aspects of aspects of the polarizing element described in U.S. provisional application Ser. No. 60/732,245, filed Nov. 1, 2005 by Weller for INTERIOR REARVIEW MIRROR ASSEMBLY WITH DISPLAY, which is hereby incorporated herein by reference.

Because the display screen may be operable in conjunction with a rearward facing imaging system or back up aid, it is desirable that the display screen be operable within a short period of time after vehicle start up, since a driver may start the vehicle engine and quickly shift to reverse to back up. When the vehicle is shifted into reverse, the display screen may extend and the imaging sensor and display screen may operate to capture and display images of the exterior scene rearward of the vehicle. Preferably, the fluid or liquid of the LCD panel is selected to provide an enhanced or extended temperature operating range that may provide sufficient performance at lower (and higher) temperature levels. However, in extreme or substantially low temperatures (such as may be encountered during the winter months in some northern states of the U.S.), it may be desirable to preheat or rapidly heat the liquid or fluid of the LCD panel (or to heat the display medium of other types of displays, such as electro-optic displays and electro-optical media and the like) to provide enhanced performance of the display screen when it is activated. The mirror assembly and/or display screen thus may include an auxiliary heating device or element or system that may be actuated to initially heat the liquid or fluid of the LCD display panel (or to heat the display medium of other types of displays, such as electro-optic displays and electro-optical media and the like) to enhance the performance of the display screen upon initial start up of the display in cold temperature conditions. For example, a driver may start his or her vehicle after the vehicle has been parked in a sub-zero climate (such as in northern Minn. in the middle of winter). Such a driver may wish to immediately reverse the vehicle once the engine starts, and so the driver will not welcome having a video display screen with reduced or inoperable clarity due to the electro-optic medium of the video display screen being below its effective operating temperature. Thus, the quick heat up elements and means of the present invention enable a rapid heating of the electro-optic medium during those critical initial seconds of vehicle operation, so that the driver does not have to wait to fully realize the benefits of the camera based reversing system.

For example, and as shown in FIG. 14, the display screen module 18' may include a heater or heating element or device 66 for heating the electro-optic medium of the display screen (such as the liquid or fluid of the LCD display panel 60), such as during cold temperature conditions. In the illustrated embodiment, the heating device 66 comprises a thin glass sheet or substrate with a substantially transparent conductive coating on a surface thereof. The conductive coating may comprise any substantially transparent conductive or semi-conductive coating or layer, such as an indium tin oxide (ITO) coating or tin oxide or doped tin oxide or zinc oxide or doped zinc oxide coating or the like, and such as coatings of the types described in U.S. Pat. Nos. 6,690,268; 5,668,663 and 5,724,187, and/or in U.S. patent application Ser. No. 10/054, 633, filed Jan. 22, 2002, now U.S. Pat. No. 7,195,381; Ser. No. 11/021,065, filed Dec. 23, 2004, now U.S. Pat. No. 7,255, 451; Ser. No. 10/528,269, filed Mar. 17, 2005, now U.S. Pat.

No. 7,274,501; and/or Ser. No. 10/533,762, filed May 4, 2005, now U.S. Pat. No. 7,184,190, and/or in PCT Application No. PCT/US03/29776, filed Sep. 19, 2003 and published Apr. 1, 2004 as International Publication No. WO 2004/026633, and/or in PCT Application No. PCT/US03/35381, filed Nov. 5, 2003 and published May 21, 2004 as International Publication No. WO 2004/042457, and/or in U.S. provisional applications, Ser. No. 60/563,342, filed Apr. 19, 2004; Ser. No. 60/644,903, filed Jan. 19, 2005; and/or Ser. No. 60/667,049, filed Mar. 31, 2005, which are all hereby incorporated herein by reference. The coating may be electrically connected to a heating actuator, whereby actuation of the heater causes a current to be applied to the conductive coating to heat the conductive coating. The transparent conductor coated glass (or polycarbonate or other suitable material) substrate of heating device 66 (such as a thin glass or polycarbonate sheet or substrate having a thickness of approximately 0.5 mm to about 1 mm or thereabouts, such as a thickness of about 0.7 mm or thereabouts) may be positioned between the light guide 64 and the LCD panel 60, and may be spaced from the light guide and the LCD panel (such as about 0.5 mm or thereabouts from each), so as to accommodate flexing or bowing of the thin substrate as it heats or cools, without contacting the light guide or the LCD panel.

The heating device may be activated to heat or preheat the electro-optic medium of the video display screen in response to a triggering event or signal or combination of triggering events or signals, for example, after determining that the vehicle ignition has just been switched on and the temperature at the mirror assembly is sub-zero (or below a threshold temperature). Typically, once time passes after the initial startup of the vehicle, the interior heater of the cabin raises the overall cabin temperature and so the need for such heat activation or over-activation is reduced or eliminated. For example, the heater may be activated in response to a low temperature (such as at or below a temperature threshold) being detected by a temperature sensor at the vehicle or at the mirror assembly or display screen and in response to activation of the vehicle ignition. Optionally, in order to provide an earlier start up of the heating process, the heater may be activated in response to the low temperature threshold and a signal from a remote keyless entry device or remote starter or the like, or in response to a detection of the driver (such as via detection of a remote device with the driver) at or near the vehicle, or in response to an opening or unlocking of a door of the vehicle. The signal that "wakes up" or activates the mirror and/or heater may be a wireless signal (such as an RF or microwave or IR signal or the like), or may be communicated via a hard wire input or a multiplexed bus message.

The heater thus may be activated to heat the electro-optic medium of the display screen to provide enhanced performance of the display screen in such cold temperature conditions. For example, a control may activate the heater upon ignition of the vehicle if a thermistor (or other suitable temperature sensing element or means) at the display screen indicates that the temperature is below a threshold temperature, such as about zero degrees Celsius, and may deactivate the heater at a slightly higher temperature incorporating hysteresis. The heater could be turned on sooner and before the ignition on condition, such as in response to a remote keyless entry signal, a detection of a vehicle door opening, a remote starter, or the like.

Although shown and described as a substantially transparent substrate with a' substantially transparent conductive coating disposed thereon, the heater or heating device for the display screen may comprise other forms or types of heating elements or devices, and optionally may incorporate such other forms or types of heating elements separately or in combination with the heating device discussed above and/or other heating elements, without affecting the scope of the present invention. For example, the control may activate the illumination source of the backlight to increase the temperature at the LCD panel quicker. Optionally, the heating device may comprise a plurality of thin (and preferably partially transparent or translucent) conductive elements or wires or conductors laminated between two layers of thin, substantially transparent film, and adhered to the back surface of the LCD panel, or other heating elements or the like may be located at the rear of the LCD panel to generate heat at the panel, while also being substantially transparent to allow light emanating from the light guide to pass therethrough and through the LCD panel.

Optionally, the heating device may comprise IR emitting LEDs or other radiation sources or light sources that may emit radiation in the far infrared region (such as up to about 10 microns or thereabouts), and thus may radiatively couple into and thus heat the rear glass substrate of the LCD display screen construction. Optionally, the LEDs or illumination/radiation sources may provide radiation at a particular wavelength (or range of wavelengths) or spectral content, so that the radiation is absorbed by the glass and/or the electro-optic medium so as to provide radiative coupling with and/or heat to the glass and/or electro-optic medium of the display screen.

Optionally, the heating device may comprise one or more infrared light emitting diodes or heating LEDs or the like positioned in the mirror casing, such as at the carrier plate or the like, and operable to direct energy or radiation toward the display screen when the display screen is in its retracted position within the mirror casing, in order to initially heat the electro-optic medium of the video display before the display screen is extended from the mirror casing. Optionally, the display screen may be initially overdriven or overpowered electronically to initially generate additional heat at the display, and then may be backed down or reduced after a predetermined period of time to its normal operating levels. However, such a heating system is not preferred due to the potential wear on the display screen and potential shortened life cycle of the display screen that may result from such overpowering of the display screen.

Because LEDs have a reduced performance at higher temperatures, the thermistor may detect the temperature at the display screen and/or illumination source and generate an output signal to indicate a detection of a higher temperature, such as above a threshold temperature. The microprocessor or control then may reduce the current at the LEDs (to extend the life of the LEDs) of the illumination source in response to such an output signal from the thermistor.

As shown in FIG. 14, the LCD panel 60, heating device 66, illumination source 62 and light guide 64 may be mounted at a circuit board 68, such as a printed circuit board or the like, and may be contained generally in an enclosure or housing or casing 70 of the display screen module. The enclosure 70 may comprise a metallic enclosure and may be grounded to reduce EMC effects and the like. The entire assembly, including the display elements and the circuit board and circuitry and enclosure, may be housed or contained generally within a plastic housing 72, which may include a rear portion or housing 72a and a frame portion or bezel portion 72b that may overlap the front or viewable surface of the LCD panel and generally frame the LCD display for viewing. The frame portion or bezel portion of the display casing or housing may include user inputs, such as buttons or switches or touch sensors or proximity sensors or the like at or around the LCD display for adjusting or controlling various features or functions or accessories, as discussed below.

Optionally, the display screen housing 72 may be adjustably mounted to the carriage or the carriage may include an adjustment joint or pivot joint or the like, such that the display screen may be pivoted about a generally vertical axis when fully extended from the mirror casing. The display thus may be angled or canted toward the driver of the vehicle or elsewhere if desired. Optionally, the pivot joint may comprise a ball joint or the like, which may allow for pivotal movement of the display screen about multiple axes, such as about a generally horizontal axis that extends generally along the mirror assembly (such as a ball joint similar to ball joints or pivot joints used to facilitate rotation and adjustment of LCD viewfinder screens common in many personal or hand held video cameras). The display screen thus may be substantially adjustable to provide a desired viewing angle for the screen. Optionally, and as shown in FIG. 14, the display screen rear housing 72a may include a reflector or mirror 74 thereon or therein, and the display screen may be pivoted about the ball joint about 180 degrees so that the reflector is directed generally rearwardly and into the cabin of the vehicle. Such an arrangement may provide a rear seat or rear cabin reflector or monitor in front of and generally in the forward field of view of the driver or occupant of the vehicle for viewing (by the driver or occupant of the vehicle) of the rear seat or rear cabin of the vehicle, such as for use as a baby monitor or cabin monitor or the like for viewing a baby in the rear seat of the vehicle.

Figure 15:
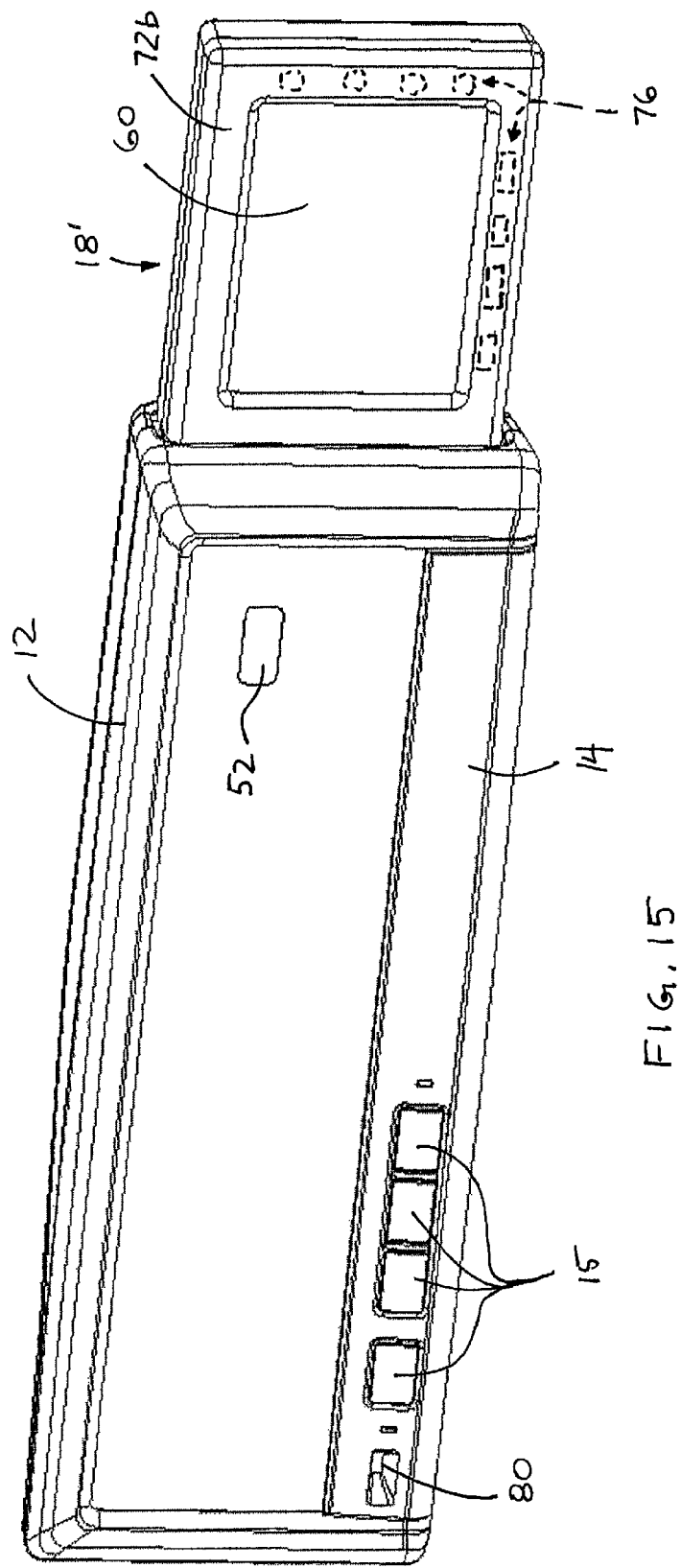
FIG. 15 is a front perspective view of a mirror assembly and display screen in accordance with the present invention.

Optionally, and as shown in FIG. 15, the frame 72b around the display screen panel 60 may include user interface inputs 76, such as buttons, switches, touch sensors, proximity sensors and/or the like, to provide a user input at the display when the display screen is extended or at least partially extended. The inputs may function to control or adjust the display screen, such as brightness, contrast or other appearance or characteristics of the displayed image, or may cause full extension or retraction of the display screen, or may control or adjust other accessories or features of the mirror assembly and/or vehicle. The inputs may include icons or other indicia or the like to indicate the function of the inputs, or the display may display the related function of the inputs at an area near the respective input, as discussed below. Optionally, the display screen may provide a touch screen LCD (such as the types described in U.S. Pat. Nos. 6,001,486; 6,310,611; 6,320,282; and 6,627,918, and U.S. patent application Ser. No. 09/817,874, filed. Mar. 26, 2001 by Quist et al., now U.S. Pat. No. 7,224,324; Ser. No. 10/798,171, filed Mar. 11, 2004; Ser. No. 10/710,164, filed Jun. 23, 2004, now U.S. Pat. No. 7,165,323; and/or Ser. No. 11/218,374, filed Sep. 2, 2005, now U.S. Pat. No. 7,507,438; and/or U.S. provisional application Ser. No. 60/685,051, filed May 26, 2005, which are hereby incorporated herein by reference) and a user may touch the desired part of the screen to actuate the desired function or feature or control. Optionally, the display screen may display a menu and a user may toggle through the menu via the user inputs and may select the desired feature or accessory or function or the like from the menu shown on the display.

The display screen module may include the circuitry for driving the LCD screen and an LCD decoder board and other circuitry, all of which may be movable with the module between the extended and retracted positions. The controls and circuitry associated with the imaging sensor or camera that captures the images displayed on the display screen may be positioned within the mirror assembly, or may be positioned within the display screen module or within an accessory module or windshield electronics module or accessory console or the like, without affecting the scope of the present invention. The control may determine when an activating event or triggering event or signal occurs, and may activate or control the imaging sensor and/or the drive motor and/or the display screen accordingly, as discussed below.

As shown in FIGS. 16-18, the circuitry of the display screen module may be electrically connected to circuitry of the mirror assembly via an electrical conductor or cable 78, such as a multi-wire ribbon cable or flex strip or coiled or spiral or accordion cable or conductor or the like. The cable 78 may comprise a substantially flat ribbon or strip to facilitate flexing or bending of the cable to generally fold over itself as the display screen module is retracted, so that the cable allows for extension and retraction of the display screen module without excessive stress or strain occurring to the electrical cable. The cable may be connected to the display screen module and/or circuitry at the mirror assembly via any connecting mechanism or connector or connecting means, such as a zero insertion force (ZIF) connector or the like. Preferably, the flex strip or cable is connected to the decoder board and circuitry of the display screen module via a single axis positive locking connector on the display screen module. Preferably, in order to reduce EMC effects, the flex strip may be shielded and may include multiple ground wires or connectors. For example, the flex strip may include about 50 conductors or traces, with about 25 of them (every other trace) being connected to ground terminals.

Optionally, however, other wiring or connection means for electrically connecting the controls/circuitry to the display screen module, such as single grounded wiring schemes or differential ended wiring schemes or other transmission means, may be implemented without affecting the scope of the present invention. The circuitry and/or electrical connections may include various elements to reduce EMC effects, such as decoupling capacitors, bypass capacitors, feed through capacitors, ferrite beads, inductors, common mode chokes and/or the like. Optionally, the mirror assembly and/or display screen module may include grounded metal enclosures around the motor and/or microprocessors and/or the video display screen, in order to reduce EMC effects.

The video display screen electronic controls may be operable to control various characteristics of the display screen to enhance or adjust or modulate the displayed image. Optionally, the brightness, contrast, tint and color of the image may be controlled by fixed settings on the LCD decoder hoard, or they may be dynamically controlled via various user interfaces or inputs, such as analog signals (such as potentiometer signals or the like) or digital signals (such as digital potentiometer signals, PWM signals, serial communications, such as SCI/SPI or the like). Optionally, a dimming input may also be implemented to control the LCD backlight intensity level. For example, the dimming input may be hard wired to a sensor or the like (such as to the photo sensor or sensors of the electro-optic reflective element of the mirror assembly or to a photo sensor of the vehicle or to an instrument panel dimming control at the instrument panel or dashboard of the vehicle or the like) or may be in communication with a multiplexed bus system or the like, to provide manual or automatic dimming control of the backlight of the display screen. Optionally, the display screen intensity, contrast, tint and the like may be manually adjusted via a user interface at the display screen, such as one or more dials or buttons or switches or sensors or the like at the display screen.

Optionally, the video display screen may include graphical overlay capability, where the display control may graphically overlay information or icons or indicia or markers or the like over the displayed image, such as to show a distance to a detected object for a backup imaging system or the like. The graphic overlays may be provided at the display screen by incorporating an on-screen display (OSD) controller, such as a 82750DB OSD controller commercially available from Intel Corp. of Santa Clara, Calif., or a field programmable gate array (FPGA) or the like, into the display screen controls to provide graphic overlays and a more custom application for the video display screen and interior rearview mirror assembly.

Optionally, the control or circuitry of the display screen module and/or mirror assembly may include efficient high side switches, such as a switch from the BSP family of switches commercially available from Infineon, to control the power to the LCD decoder, LCD backlight, LCD heater and imaging sensor. Such switches may be activated and deactivated by the controls to achieve the desired functionality of the imaging and display system. Such switches may also protect against fault conditions.

During operation, the display screen module may extend or partially extend to display information to the driver or occupant of the vehicle. However, if the controls or circuitry detect a fault condition with the imaging sensor or display screen or drive motor or the like, the control may activate a user interface fault condition to alert the driver or occupant of a detected fault condition. For example, if a fault condition is detected, the backlight illumination source may be modulated or flashed (such as at a rate of about one Hz or thereabouts), or a fault condition alert may be displayed on the display screen (such as via the on-screen display controller or other display screen control or the like), in order to indicate the fault condition to the user. If the backlight is already on, the backlight may modulate from a normal intensity to a brighter intensity. The backlight may be modulated at a different rate or different intensities to indicate different detected fault conditions.

For example, when the ignition is turned on, the control may check if the display screen is in its retracted position and, if the display screen is not retracted, the control may attempt to retract the display screen. If the control does not successfully retract the display screen after a predetermined period of time (such as about two seconds or thereabouts), a fault signal may be generated and the control may modulate the display screen or may otherwise indicate the fault condition.

Similar criterion may be used when the display screen is retracted and extended in response to the reverse/back up signal. For example, when a reverse backup signal is received (such as a signal indicative of the vehicle being shifted into reverse), the control may activate the imaging sensor or camera at the rear of the vehicle. If a valid image data signal (such as a valid NSTC signal or the like depending on the particular application) is not detected after a predetermined period of time following activation of the camera (such as about 200 ms or thereabouts), a fault signal may be generated and the control may modulate the display screen or may otherwise indicate the fault condition. The control may generate the fault signals after the predetermined period of time has elapsed. The time period may be a preset time period or may be programmed or changed depending on the particular application. Once a default condition is detected, the user may turn off the ignition to reset or clear the fault condition.

Optionally, the mirror or display screen control may be in communication (such as via a wireless communication link, such as via RF or microwave or IR wireless transmission, or via a wired connection, such as a multiwire cable or a LIN bus cable or the like) with a vehicle fault detection or diagnostic system, such as via a multiplex bus system of the vehicle or the like. When the diagnostic system detects a fault condition of an accessory or system of the vehicle, the control may indicate the fault condition at the display screen. For example, the control may partially or fully extend the display screen module to indicate and/or display a fault condition alert to the driver or passenger of the vehicle. Optionally, the display screen may further display instructions as to how to correct the fault or instructions to go to the nearest service station or the like, in response to the fault condition. For example, the control may partially extend the display screen to indicate the fault condition, and if desired, a user may elect to fully extend the display screen (such as in response to a user interface or input at the mirror assembly and/or display screen or in response to a voice command or the like) to view the additional information or instructions. Optionally, the display screen may display relevant portions of the owner's manual to show the faulty component and/or system and to provide instructions as to how to correct the fault condition, such as described in U.S. patent application Ser. No. 10/964,512, filed Oct. 13, 2004, now U.S. Pat. No. 7,308,341, which is hereby incorporated herein by reference. Optionally, the control or circuitry of the video display and/or mirror assembly may be in communication with a remote or external control or base or center of a telematic system (such as found in various vehicles or the like, and/or such as described in U.S. Pat. Nos. 4,862,594; 4,937,945; 5,131,154; 5,255,442; 5,632,092; 5,798,688; 5,971,552; 5,924,212; 6,243,003; 6,278,377; and 6,420,975; 6,477,464; and/or 6,678,614; and/or U.S. patent application Ser. No. 10/456,599, filed Jun. 6, 2003, now U.S. Pat. No. 7,004,593; Ser. No. 10/645,762, filed Aug. 20, 2003, now U.S. Pat. No. 7,167,796; Ser. No. 10/538,724, filed Jun. 13, 2005, and published Mar. 9, 2006 as U.S. Publication No. 2006/0050018; and Ser. No. 10/422,378, filed Apr. 24, 2003, now U.S. Pat. No. 6,946,978; and/or PCT Application No. PCT/US03/40611, filed Dec. 19, 2003 and published Jul. 15, 2004 as International Publication No. WO 2004/058540, and/or PCT Application No. PCT/US03/308877, filed Oct. 1, 2003 and published Apr. 15, 2004 as International Publication No. WO 2004/032568, which are all hereby incorporated herein by reference.), such as ONSTAR®, TELEAID™, RESCU® or the like, and the control may display various information or alerts or the like in response to a communication from the remote telematic center, such as via utilizing the principles described in U.S. patent application Ser. No. 10/964,512, filed Oct. 13, 2004, now U.S. Pat. No. 7,308,341; and/or Ser. No. 11/232,324, filed Sep. 21, 2005, now U.S. Pat. No. 7,423,522; and/or U.S. provisional application Ser. No. 60/611,796, filed Sep. 21, 2004, which are hereby incorporated herein by reference.

Optionally, in order to ensure proper performance of the display screen, drive motor and other components of the mirror assembly and the display screen module, the control may monitor the ignition voltage of the vehicle, and may shutdown some or all of the video display functions and controls to protect the video minor sub-components if the voltage is detected to be at or over a threshold level, such as 16 volts DC or thereabouts.

The control of the mirror assembly and/or the display screen may receive image data or the like from an imaging sensor or camera positioned elsewhere at or on or in the vehicle, such as at a rearward portion of the vehicle with a rearward exterior field of view, or such as at an interior portion (such as at or near or associated with the interior rearview mirror assembly or an accessory module or windshield electronics module or the like) of the vehicle with an interior field of view (such as into the vehicle cabin) or an exterior field of view (such as forwardly of and through the windshield of the vehicle). The signal from the camera or image data may be communicated to the control via various communication links or video transmission medium, such as wires or cables (such as a CAT-3 shielded twisted pair wire or a CAT-5 coaxial cable or the like) or a fiber optic cable or via wireless communication, such as IR signals or VHF or UHF signals or the like, or via a multiplex bus system of the vehicle or the like. For example, the connection or link between the imaging sensor or controls and the mirror assembly and/or display screen module may be provided via vehicle electronic or communication systems and the like, and may be connected via various protocols or nodes, such as Bluetooth™, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA), or via wireless communications such as VHF or UHF signals, and/or the like, depending on the particular application of the mirror/display system and the vehicle.

The imaging sensor or camera may provide various image data signals, such as an NTSC signal or LVDS, PAL, analog RUB, component video, SECAM, S-video or the like. Optionally, the imaging system may be operable to selectively switch between, for example, PAL and NTSC, to adjust the imaging system and mirror/display system to accommodate European and U.S. applications.

The sliding or pivotal or other movement of the frame and display screen thus may selectively occur in response to a manual or user input, such as actuation of a user interface control or button (not shown) at the interior rearview mirror assembly or a voice command or input, or the display screen may extend automatically, such as in response to another activating event or triggering event or other dynamic event or events. For example, the display screen may be automatically extended and activated in response to an engagement of the reverse gear of the vehicle or actuation of a backup aid or other reverse viewing system, such as a reverse viewing system utilizing principles disclosed in U.S. Pat. Nos. 5,550,677; 5,760,962; 5,670,935; 6,201,642; 6,396,397; 6,498,620; 6,717,610; and/or 6,757,109, and/or U.S. patent application Ser. No. 10/418,486, filed Apr. 18, 2003, now U.S. Pat. No. 7,005,974, which are hereby incorporated herein by reference, actuation of a cabin viewing device or system, such as a baby viewing or rear seat viewing device or system or the like, such as the types disclosed in U.S. Pat. Nos. 5,877,897 and/or 6,690,268, which are hereby incorporated herein by reference, actuation of a video communication device or system, such as a video communication device of the types disclosed in U.S. Pat. No. 6,690,268, which is hereby incorporated herein by reference, actuation of other telephone or communication systems (where the display screen may extend to display telephone numbers or recently called numbers or other information or the like), actuation of a navigation system of the vehicle, such as a navigation system of the types described in U.S. Pat. No. 6,477,464, and U.S. patent application Ser. No. 10/456,599, filed Jun. 6, 2003, now U.S. Pat. No. 7,004,593; Ser. No. 10/287,178, filed Nov. 4, 2002, now U.S. Pat. No. 6,678,614; Ser. No. 10/645,762, filed Aug. 20, 2003, now U.S. Pat. No. 7,167,796; and Ser. No. 10/422,378, filed Apr. 24, 2003, now U.S. Pat. No. 6,946,978, which are hereby incorporated herein by reference, and such as discussed below, a vehicle system or device status or warning system (where the display screen may be automatically extended to display a warning or alert to the driver in response to a condition being detected, such as the driver's seatbelt being unfastened (and optionally with the vehicle being in gear or moving or the like), a high oil temperature or pressure, a low tire pressure (such as in response to a tire pressure management system (TPMS), such as the types described. U.S. Pat. Nos. 6,294,989; 6,445,287; and/or 6,472,979, and/or in U.S. patent application Ser. No. 10/232,122, filed Aug. 30, 2002, now U.S. Pat. No, 6,975,215; Ser. No. 10/279,059, filed Oct. 23, 2002, now U.S. Pat. No. 6,774,774; and Ser. No. 11/232,324, filed Sep. 21, 2005, now U.S. Pat. No. 7,423,522; and/or U.S. provisional application Ser. No. 60/611,796, filed Sep. 21, 2004, which are hereby incorporated herein by reference), a low fuel level and/or the like), or any other activating event or triggering event or condition or detection or dynamic event and/or the like, without affecting the scope of the present invention.

The outward movement or extension of the display screen not only provides the display of information at a position that is readily viewable by the driver of the vehicle, but the outward movement of the display screen also provides a visual cue or prompt, and optionally an audible sound associatable with a sliding motion, to catch the driver's attention and reinforce viewing of the display screen so that the driver can readily view the information being displayed at the display screen. Similarly, the video display screen may be automatically retracted to the non-use position in response to a manual or user input, or in response to completion of or curing of the activating or triggering event or deactivation of the system or device associated with the activating or triggering event, such as shifting of the vehicle out of reverse, deactivation of a rearward viewing device or system, deactivation of a cabin viewing device or system, deactivation of a video communication device or system or disconnection of the telephone connection or conversation, deactivation of a navigation system of the vehicle or arrival at a particular waypoint or destination (as discussed below), or a correction or curing of the system condition, such as fastening of the seatbelt, and/or the like.

The display screen may be manually moved to its retracted position when the driver no longer wants to view the screen, even if the activating event has not yet completed. This allows the driver to override the automatic extension and retraction, such as when the driver no longer wants to view the information relating to the activating event, without disturbing or adversely affecting the automatic extension controls and components. For example, if the driver chooses to ignore a warning that the tire pressure is low (or other warning or information display or the like), the driver may manually move the display screen to its retracted position. The manual movement may be accomplished via pushing the display screen into the mirror assembly, or pressing or actuating a user input or button or the like to cause the retraction of the display screen, or providing a voice command to the system to cause the retraction/override of the display screen device. Optionally, the drive system of the display screen device may include sensors for sensing initial movement of the display screen in either direction, whereby the drive motor or the like may be actuated to move the display screen in response to detection of such initial movement. For example, a sensor may detect an initial inward or outward movement of the display screen, such that a small push or pull of the display screen may activate the electronic drive motor or system which then retracts or extends the display screen.

Optionally, the display screen may be manually extended by the driver or occupant of the vehicle even if a dynamic or activating or triggering event has not occurred. The driver may then select a desired function of the display screen when it is extended. Optionally, the display screen may display a menu for the driver to select from when the display screen is extended manually. The menu or menus may be in the form of text displays, graphic displays, video displays, iconistic displays, indicia displays and/or the like. The driver may then select from the menu by touching or actuating a user input or by providing a voice command or the like to cause the display screen to display information or video or the like pertaining to the selected function or system or accessory. For example, the driver may cause the display screen to display the rear vision system video or images even though the vehicle is not in reverse by manually extending the display screen and manually selecting the rear image display function. The manual extension and activation may be accomplished by manually pulling or moving the display screen or by actuating a user input or by providing a voice command (such as "open" or "extend") or the like.

The video display screen thus may be operable to automatically or manually extend to display information or video pertaining to a selected or triggering event or function. For example, video display screen 20 may be in communication with a camera or imaging sensor or system operable to capture images of an area rearward of the vehicle. Video display screen 20 may then be extended in response to engagement of the reverse gear of the vehicle or activation of the rearward viewing device or system, where the video display screen 20 may be operable to display images representative of the scene and events occurring rearward of the vehicle, such that the driver may view the video display screen as the vehicle is reversed. When the vehicle is shifted out of reverse, the video display screen may be automatically retracted to its non-use position. As discussed above, frame 22 and video display screen 20 may be extended and retracted via a linear actuator, a solenoid device, a rack and pinion device, an electrical drive motor, a non-armature electrical motor, a shape memory alloy device, a NanoMuscle™ device, an electrically induced stress-strain device, a bio-material and/or the like, without affecting the scope of the present invention. Optionally, the video display screen and frame may be manually pulled from the mirror casing, but the video display screen device may limit or substantially preclude sliding movement of the frame toward the extended position unless the vehicle is shifted into the reverse gear or some other activating event occurs, such as actuation of a rearward viewing device or system, actuation of a cabin viewing device or system, such as a baby viewing or rear seat viewing device or system or the like, actuation of a video communication device or system, actuation of a navigation system of the vehicle and/or the like, without affecting the scope of the present invention. The manual operation of the video display screen device may override the automatic extension and retraction of the display screen without adversely affecting the automatic or electronic controls or devices or systems. The display screen and mirror assembly thus may include a manual override mechanism or device or means, which may allow an override of the automatic extension/retraction of the display screen, such as via pushing in or pulling out at the display screen, and using appropriate override elements or means, such as a slip clutch mechanism or the like (so that the gears of the drive mechanism may not be damaged when a user manually pushes or pulls or moves the display screen).

It is further envisioned that the control system of the display device may extend and retract the display screen in response to multiple activating or triggering events or a hierarchy of events, and may operate in a hierarchical manner where certain events control or override other events. The display screen device may be linked to the triggering event and thus may be operable to display information or video images or the like pertaining to the system or device or function associated with the activating or triggering event. For example, when the reverse gear is engaged, the display screen may extend automatically and display the captured images or video of the scene rearward of the vehicle (as captured by a video camera or imaging sensor or the like at the rear portion of the vehicle). If, on the other hand, a user activates a phone system or communication system, such as by pressing a button or actuating an input or providing a voice command or the like, the display screen may extend and may display useful information, such as menus to select from or telephone numbers (such as a directory or a list or recently called numbers) or the like, to the user of the communication system. Optionally, if a telephone call is received by the telephone or communication system, the display screen may extend to display a caller identification function or other pertinent information or the like or video images of the caller (if associated with a video communication system) or the like to the driver or user.

Optionally, the microprocessor controlled control circuitry or algorithm for driving or extending/retracting the display screen may include an extension suppression functionality or means, whereby the extension of the display screen (such as in response to an activating or triggering event or the like) may be suppressed when the vehicle speed is moving or is above a threshold speed or the like. For example, the microprocessor controlled control circuitry or algorithm may suppress extension of the display screen for certain functions (such as, for example, video conferencing or the like) when the vehicle speed is above about 5 mph or above about 10 mph or thereabouts or when the vehicle is moving at any speed and/or when the vehicle is in drive, and may extend the display screen for such functions when the vehicle speed is reduced to a level at or below the threshold speed or when the vehicle is stopped or shifted to Park. The microprocessor controlled control circuitry or algorithm may override the suppression function and thus extend the display screen for other functions, such as functions that should not wait until the vehicle is slowed or stopped, such as an emergency alert or warning or the like, so that the display screen may extend or partially extend to alert the driver of an emergency condition irrespective of the vehicle speed. The suppression function thus may apply to suppress the automatic extension of the display screen when the vehicle is moving for certain functions or triggering events, and the suppression function may be overridden for other functions, such that the display screen may extend for such other functions irrespective of vehicle movement (such as for a backup aid when the vehicle is moving in reverse).

In situations where the display screen is already extended and displaying information to the driver pertaining to an activating event, such as, for example, displaying the rear seat area of the vehicle when a cabin monitor is activated, the display screen or display screen driver/control may change or adjust or reconfigure the display to correspond to another activating event, such as, for example, a warning or alert that the vehicle is low on fuel or the like. The hierarchy of activating events may determine which events may override other events, such that an important event, such as a rear vision system display while the vehicle is in reverse, is not overridden by an event that can wait until after the first event (backing up the vehicle) is completed, such as a navigational instruction pertaining to the vehicle navigation system or other information or video. The display screen device thus may comprise a dynamic extension system that automatically extends the display screen in response to dynamic events or functions. However, the driver or occupant of the vehicle may override the event hierarchy at any time by manually activating another one of the triggering events or systems or functions. For example, if the driver is backing up the vehicle, but is not using the rear vision system display, the driver or another occupant may manually activate the navigation system or telephone system or cabin monitoring system or the like to change the display to correspond to the newly activated system. The manual override may be accomplished via manual actuation of a user input or the like or via a voice command or the like.

As described above, the display screen may be extended in response to an activating event associated with a vehicle navigation system and/or a point of interest compass system, such as navigation systems/compass systems of the types described in U.S. Pat. No. 6,477,464, and U.S. patent application Ser. No. 10/456,599, filed Jun. 6, 2003, now U.S. Pat. No. 7,004,593; Ser. No. 10/287,178, filed Nov. 4, 2002, now U.S. Pat. No. 6,678,614; Ser. No. 10/645,762, filed Aug. 20, 2003, now U.S. Pat. No. 7,167,796; and Ser. No. 10/422,378, filed Apr. 24, 2003, now U.S. Pat. No. 6,946,978, which are hereby incorporated herein by reference. In such applications, the display screen may be extended to display navigational information, such as driving instructions or compass heading or a map or the like, to the driver of the vehicle as the driver negotiates a programmed or desired route.

The display screen may be extended and activated to display the instructions and/or compass heading and/or map in accordance with the geographical position of the vehicle, such as detected by an in-vehicle or vehicle-based navigation system detector, such as a global positioning system (GPS) or circuitry and/or the like. The vehicular global positioning system may comprise an in-vehicle GPS antenna and a GPS receiver/signal processor that receives a satellite communication to determine the geographic location of the vehicle, as is known in the art. Such global positioning system receivers/processors, sometimes referred to as a GPS chip set, are available from various suppliers, such as, for example, Motorola of Schaumburg, Ill. and Trimble Navigation of Sunnyvale, Calif. The display screen thus may be extended and activated as the vehicle approaches a waypoint or milestone in the programmed route of the vehicle navigation system. The display screen thus not only provides the instructions and/or map to the driver, but the extension of the display screen provides a visual cue or prompt to alert the driver or catch the driver's attention so that the driver knows to look at the screen to get the next instruction at an appropriate time before the vehicle arrives at the waypoint or milestone. The display screen may then retract to its retracted position after the vehicle arrives at the next waypoint or milestone. The global positioning system thus may determine when the geographic position of the vehicle approaches a waypoint and may then trigger extension of the display in conjunction with the vehicle navigation system or in conjunction with a vehicle database or navigation system database.

For example, a user or driver may enter a desired destination into the navigational system and the navigational system may determine an appropriate route for the vehicle to travel from its initial or current location until it arrives at the desired destination. As is known in the art, the route may be determined to provide a shortest distance route or quickest route or may be determined in accordance with other parameters as may be selected by the user. When the vehicle begins the journey, the display screen may extend and activate to display a first instruction or set of instructions or map, such as "Take Oak Road West and turn right at Maple Street and head North on Maple Street". The display screen may remain extended until the driver of the vehicle has carried out the instructions and passed the first waypoint or milestone (for example, the intersection of Oak Road and Maple Street). The display screen may then display the next instruction (such as, for example, "Take Maple Street North to Interstate 96") and may then retract until the vehicle approaches the next waypoint. As the vehicle approaches the next waypoint, such as about one or two miles before the next waypoint (or any other distance as may be desired), the display screen may again extend and be activated to display or re-display the next instruction or set of instructions and/or map to the driver. For example, the display screen may extend (which, as discussed above, provides a visual cue to the driver that he or she is approaching the next waypoint or milestone of the journey) and may be activated to display a second instruction or set of instructions and/or map to the driver, such as "Enter Interstate 96 and take Interstate 96 East to Exit 43". While the vehicle is on the on-ramp or thereabouts, the display screen may display the next set of instructions or map (for example, "Take Interstate 96 East to Exit 43"), and then may retract to its retracted position as the vehicle is driven onto Interstate 96 and heading east on Interstate 96. The display screen thus only extends and is activated when the instructions are desired, and is retracted between waypoints so as not to be a bother or nuisance to the driver in situations where no further instructions are necessary. The extension of the display screen provides a visual cue to the driver to look at the screen for the next instruction at a particular time when the next instruction may be highly desirable or necessary to the driver.

The time or distance before the next waypoint that the display screen extends may be selected or pre-set by the manufacturer of the vehicle or mirror assembly or navigational system or the like. Optionally, the time or distance before the next waypoint that the display screen extends may vary depending on the vehicle speed or the particular road or highway on which the vehicle is traveling. For example, if the vehicle is traveling on a highway at about 70 mph, the display screen may extend and activate approximately two miles before the next waypoint to allow the driver sufficient time to get into the appropriate lane for exiting the highway. However, if the vehicle is traveling on a road at about 30 mph, the display screen may extend and activate approximately 0.5 to 1 miles before the waypoint, because at the slower speed, such a distance provides ample time for the driver to prepare to execute the next driving instruction. The vehicle speed may be determined by wheel sensors or speed sensors of the vehicle or by the global positioning system or the like, or the speed may be estimated based on the known speed limit for the particular road that the vehicle is traveling on (where the particular speed limit may be extracted from a database of such speed limits). It is further envisioned that the display screen may extend and activate at different locations or distances relative to the approaching waypoint in response to the driving conditions (as may be detected by a rain sensor or other vision system or as may be provided by the global positioning system or the like), traffic conditions (as may be provided by a vehicle vision system or object detection system or headlamp control system or the like), and/or hazardous conditions (as may be provided by vehicle vision systems or vehicle status systems or collision avoidance systems, such as the types disclosed in U.S. Pat. No. 6,411,204, which is hereby incorporated herein by reference) and/or the like, in order to provide sufficient time to the driver to prepare to execute the next set of instructions.

Optionally, the display screen may extend when the vehicle is not moving or stopped (as determined by a vehicle speed sensor or by a global positioning system or the like), such as at a stop light or the like, and may display information to the driver at a time when the driver is able to fully focus on the information being displayed. For example, the display screen may display driving instructions or location information or the like pertaining to the programmed route or next waypoint, or the display screen may display trip statistics or the like, such as time traveled, distance traveled, estimated arrival time, and/or the like. Optionally, the display screen may display other information that may be of interest to the driver, such as information pertaining to the geographic position of the vehicle (such as, for example, if the vehicle is stopped by a particular store or restaurant, the display may display an advertisement of the store or restaurant) as may be provided via the global positioning system database or concierge service or the like, or may display any other type of information to the driver at a time when the driver has time to look at and read/understand the information while the vehicle is stopped. The display screen may be manually retracted when the driver is finished viewing the information being displayed or may be automatically retracted upon movement of the vehicle or a period of time after onset of movement of the vehicle. The extension of the display screen when the vehicle is stopped may be manually overridden to avoid extension if such extension is not desired. Thus, and optionally, the driver may manually pull out from the mirror housing (or push in to the mirror housing) the video display screen assembly without needing to actuate the electrically-powered extension/retraction drive system. Thus, should it be desired to view the video screen when the vehicle ignition is off (such as might occur when the vehicle is parked), then optionally the video screen can be manually extended without damage to the electrically powered drive system. Optionally, the display screen may partially extend to alert the driver of information that may be important to the driver (such as an alert to a fault or failure of a vehicle accessory or component or system), and the display screen may then fully extend upon slowing and/or stopping of the vehicle.

Optionally, the navigational system may be programmable or selectable or operable to allow the driver to select at which waypoint or milestone along the journey that the display screen will be extended and be visible and readable by the driver to provide instructions such as those set forth above. For example, the driver of the vehicle may be well aware of how to get onto Interstate 96 and to head east on Interstate 96 to head toward the desired destination, but may not know where to exit and where to go after exiting the interstate. The driver thus may not want the display screen to extend and provide the initial instructions that are already known to the driver while the driver is driving the vehicle toward and onto and along Interstate 96. At the onset of the journey or while the driver is setting the navigation system, the navigation system may receive inputs from the driver that are indicative of a desired start point or waypoint for the instructions to begin, and the display screen may remain retracted and deactivated until the geographical position of the vehicle (as detected by the navigational system detector) approaches the selected waypoint or milestone at which the display of the instructions or maps will begin (or unless the display screen is extended and activated in accordance with a different activating or triggering event). As the vehicle approaches the selected waypoint or milestone, the display screen may extend and may be activated to display the appropriate instructions and/or map. For example, the display screen may remain retracted while the vehicle travels toward and onto and along Interstate 96. When the vehicle is approximately one to two miles (or other distance, as desired or depending on other parameters as discussed above) from exit 43, the display screen may extend to alert the driver, and may display the instruction: "Take Exit 43 and turn left Pine Street. Take Pine Street North to Elm Street." After the vehicle has turned onto Pine Street, and the system has detected that the waypoint has been reached, the display screen may again retract (and optionally may briefly display the next driving instructions or compass heading or map before it retracts) until the vehicle approaches the next waypoint, for example, the intersection of Pine Street and Elm Street. As the vehicle approaches the next waypoint, the display screen may again extend and display the next instruction or set of instructions and/or map at the appropriate, time or location before the next waypoint. The display screen thus may remain retracted throughout the known or familiar part of the journey, and then may extend to alert the driver or catch the driver's attention and to provide the appropriate instructions and/or compass heading and/or map to the driver at the appropriate time as the vehicle approaches the next waypoint or milestone in the journey or trip.

Optionally, if the driver is familiar with the route beyond what was initially thought when programming or setting or selecting the route, the driver may at any time manually override the system to retract the display screen when it extends to provide the next instructions or map. For example, the driver may actuate an input or control at the display screen or at the steering wheel or at the mirror assembly or elsewhere in the vehicle (such as may be provided at a keypad or touch pad interface, preferably menu driven as described herein) or may provide a vocal message or voice command to cause the display screen to retract and deactivate if it is not desired or needed. The driver may actuate or provide such inputs to select the destination or initial waypoint or to override the navigation system or the like or to enter telephone numbers (for a communication system) or street addresses or the like. The navigation system thus may retract the display screen when it is not needed or desired by the driver. As the vehicle approaches the next waypoint or milestone in the journey, the display screen may again extend and provide the next appropriate instruction and/or map to the driver of the vehicle. Likewise, if the driver is less familiar with the route, or merely wants to check the location or progress or the like, the driver may override the system to cause the display screen to extend and activate to show the next instructions or directional heading or a map or any trip statistics that the driver may want to review. For example, the driver may actuate an input or control at the display screen or at the steering wheel or at the mirror assembly or elsewhere in the vehicle or may provide a vocal message to cause the display screen to extend and activate to display such instructions, heading, maps or information or the like.

If a particular waypoint is passed or missed, such that the vehicle is no longer on or following the programmed route, the system may extend the display screen to alert the driver and may display a warning that a turn or exit or the like was missed, and may provide instructions as to how to get back on the programmed route, such as described in U.S. patent application Ser. No. 10/645,762, filed Aug. 20, 2003, now U.S. Pat. No. 7,167,796, which is hereby incorporated herein by reference. The display screen may be extended in this manner even during the initial or familiar part of the route to alert the driver that he or she has departed from the desired route.

The display screen thus may extend to alert the driver that information or video pertaining to one of the activating or triggering events or waypoints is being displayed. The driver's attention is thus drawn to the display screen when such information is being displayed, such that the driver is not likely to miss or overlook or ignore such information. The display screen thus provides a driver prompt that prompts the driver to look at the display screen for new information that is being displayed thereon. Optionally, an audible prompt may be provided to alert the driver to look at the display screen for the instructions. Optionally, the navigation system and/or display screen device may be operable to turn down the volume of other vehicle systems, such as a radio or communication system or the like, when the display screen is extended, such that the driver may focus on the display screen or so that the driver may readily hear and recognize the audible prompt or voice command or alert signal.

Optionally, the driver prompt or alert may be provided via an audio signal or a tactile or haptic signal at the steering wheel or the like (such as a vibration of the steering wheel to alert the driver to view the display screen), and may be provided in addition to the automatic extension of the display screen or as a separate or secondary prompt. Such a secondary prompt may be particularly useful when the driver passes a waypoint or milestone in a journey. In such a situation, the display screen may already be extended to display the next waypoint/instructions, so the secondary prompt may alert the driver to check or view the display screen to notify the driver that he or she has passed the waypoint. Also, such a secondary prompt or audio or tactile signal may be particularly useful when the display screen is already extended for one function or system and another dynamic activating or triggering event occurs that has a higher priority than the first function or system. Because the display screen is already extended, the driver may not be prompted by the extension of the screen to view the new information.

Therefore, the secondary prompt or signal may be provided to alert the driver to again look at the display screen. For example, if the driver or occupant of the vehicle is using a telephone system and the display screen is already extended to show telephone numbers or the like as the vehicle approaches a waypoint, the display screen may be adjusted or reconfigured to display the next set of instructions and/or compass heading and/or map associated with the approaching waypoint and the secondary prompt may be provided to alert the driver to look at the display screen. It is further envisioned that the display of the navigation instructions may be provided on the screen in addition to the telephone numbers (or other information or video being displayed on the display screen), such as in a picture-in-picture type format (such as is known in the television art) or the like. Optionally, the secondary prompt may only be provided in such situations where the display screen is already extended for a first activating event when a second activating event occurs.

Existing global positioning systems as used globally in the automotive industry receive their satellite feed from U.S. government owned or controlled satellites and are U.S. agency controlled. Such satellite feeds are restricted to provide a geographic location resolution of about 15 meters to about 20 meters. The European Commission (EC) and the European Space Agency (ESA) are in the process of developing and launching a separate multi-satellite system that will operate under the GALILEO satellite radio navigation system protocol. Such a satellite system is intended to provide a geographic location resolution of about 4 meters when functioning. It is envisioned that any GPS receiver utilized in conjunction with the mirror assembly or display system of the present invention would be configured to operate under either or both satellite systems.

Optionally, the navigation system and display screen of the present invention may be provided as a self contained module or the like at the windshield area of the vehicle. For example, the navigation system, including the global positioning system antenna and control circuitry and the like, may be provided with a windshield electronics module or accessory module or the like or with the mirror assembly or overhead console, and may be in electrical connection or communication with the display screen device, such as via a wire connection or a wireless communication or the like. The complete navigation system and display thus may lend itself to aftermarket applications and may be installed in an existing vehicle.

For example, a stand alone navigation system may include a slide out or extendable/retractable display screen and a windshield electronics module. The windshield electronics module may include the antenna (such as a global positioning system antenna), controls and circuitry for the navigation system. The controls may be operable to receive manual inputs to set a desired route and may be operable to control or extend/retract the display screen and to activate the display screen to display the appropriate information to the driver, based on or in response to the geographical location of the vehicle along the selected or desired route, such as described above. The stand alone navigation system may include a user interface device, such as a keypad or manual inputs or the like, and one or more displays, such as icons, letters, characters, and/or indicia or the like. The user interface device may receive manual inputs that select the desired route (such as by entering a desired destination or address or the like), and the navigation system may determine the appropriate route and the appropriate waypoints at which the display screen may extend and activate to display the appropriate information to the driver of the vehicle.

Optionally, the user interface device may comprise a menu driven device that may display a plurality of functions in response to particular entries or key selections or inputs by the user of the navigation system. For example, the user interface device may include a display screen (and may be at or incorporated into the extendable/retractable display screen) and may include a plurality of inputs or buttons or sensors or the like positioned at or around the display screen. Optionally, the user actuatable inputs may be positioned at and at least partially around the rim of the mirror, and the display may be provided as a display on demand transflective display at the mirror reflective element, such as a display of the types described in U.S. Pat. Nos. 5,668,663; 5,724,187; and/or 6,690,268, and/or in U.S. patent application Ser. No. 10/054,633, filed Jan. 22, 2002, now U.S. Pat. No. 7,195,381; and/or Ser. No. 11/021,065, filed Dec. 23, 2004, now U.S. Pat. No. 7,255,451; Ser. No. 10/528,269, filed Mar. 17, 2005, now U.S. Pat. No. 7,274,501; and/or Ser. No. 10/533,762, filed May 4, 2005, now U.S. Pat. No. 7,184,190, and/or PCT Application No. PCT/US03/29776, filed Sep. 9, 2003 and published Apr. 1, 2004 as International Publication No. WO 2004/026633, which are all hereby incorporated herein by reference. Optionally, the inputs may be positioned around the rim of the display screen and the display on demand transflective displays may be provided at the display screen.

The inputs may be actuated to select particular functions displayed on the screen or may be held in or continuously or repeatedly actuated to scroll through functions or selections displayed on the screen. For example, the destination or address may be keyed into the navigation system by selecting and actuating an input that corresponds to the "destination entry" function shown on the display, where the user may then be prompted to key in the address or street name. The user then may actuate a first input and may continue to actuate the input (such as repeatedly actuating the input or holding the input down to continuously actuate the input) to scroll through the alphabet (such as with the scrolling letter being shown on the display on demand transflective display at the display screen or mirror reflective element) to set the first letter of the street name. Once the first letter is set, the user may do the same with a second input or button or sensor to set the second letter of the street name and so on. After a sufficient amount of letters have been selected (such as the first three or four letters of the street name), the display screen may display multiple street names in the targeted area (which may be input at the onset of the programming of the navigation system) that start with the same letters keyed in by the user. The user then may actuate another input to scroll through the listed street names to find and select the desired street name.

For example, the user may key in the first letter, such as "M" for Maple Street by holding down the first button or input until "M" is shown at the first space of the street name. The second letter "a" may be selected in a similar manner. After the first few letters are entered, the user may then scroll through the list of street names that begin, for example, with the letters "M-a-p", and may then scroll down until Maple Street is located, whereby the user may select "Maple Street" to enter the destination. The address and/or city and/or region and/or the like may be entered in a similar manner to input the destination for the vehicle.

The navigation system may then program or select the appropriate route and may begin to extend the display screen and activate the display screen to provide the appropriate instructions and/or compass headings and/or maps to the driver of the vehicle as the vehicle travels along the programmed route and approaches the waypoints. Optionally, the navigation system control may include word sensing/guessing algorithms or systems, such as often used in text messaging for mobile phones and the like, whereby (under microprocessor control), an algorithm or software anticipates/estimates/guesses the intended word being typed or entered and types ahead of the user's input strokes or keystrokes so as to assist the user in entering the desired words/text/destination/information and/or the like.

The display screen of the present invention thus may be operable in conjunction with one or more systems of the mirror assembly or accessory module or console or of the vehicle, and may be linked to such systems to display information or video or the like pertaining to the particular system when that system is activated or selected. The display screen may automatically extend and activate to display such information or video when a particular system is activated, or when a particular condition or location of the vehicle is detected, and may automatically retract when the particular system is deactivated or when the particular condition or location of the vehicle is passed. The display screen thus may extend to alert the driver that there is pertinent information or video being displayed at the display screen, and may be retracted when such information or video is not necessary or desired. The driver may override the display screen function to manually retract/deactivate the display screen when it is not desired, or to manually extend/activate the display screen when it is desired. The display system thus provides a dynamic extension system that responds dynamically to driving conditions and/or traffic conditions and/or vehicle conditions and/or hazardous conditions and/or selected systems or accessories.

Optionally, the display screen may be activated/extended in conjunction with a rear vision system or back up aid. For example (and such as described in U.S. patent application Ser. No. 11/226,628, filed Sep. 14, 2005, and published on Mar. 23, 2006 as U.S. Patent Publication No. 2006/0061008, which is hereby incorporated herein by reference), the display screen may extend (and/or the display screen may be activated) when the vehicle is shifted into reverse, and then may retract (and/or deactivate) when the vehicle is shifted into park and drive or other forward gear. In a trailer hitching situation, or in other reversing situations, where a vehicle is backed up toward a trailer tongue for connecting the trailer to the vehicle (or otherwise backed up toward other objects), the vehicle may be driven backward and forward multiple times to align the vehicle hitch with the trailer tongue (or to align or avoid other objects rearward of the vehicle). Such repeated shifting of the vehicle between reverse and drive may result in the display being extended/retracted multiple times and/or activated/deactivated multiple times, which may also result in the driver losing his or her frame of reference in the image displayed as he or she repeatedly engages and disengages the reverse gear of the vehicle. Thus, the circuitry or logic or control of the display of the present invention may extend and/or activate the display when the reverse gear of the vehicle is engaged, and may maintain the display in the extended/activated state, even if the vehicle is shifted into the "drive" gear or any forward gear, until a threshold criteria is met, such as when the forward speed of the vehicle exceeds a threshold speed, such as about 3 miles per hour (mph) or about 5 mph or about 7 mph or about 10 mph (or any desired threshold vehicle forward speed), or when the vehicle travels in the forward direction a threshold distance (such as about 10 feet or about 20 feet or about 30 feet or thereabouts), or when a time period has elapsed from the time of disengaging the reverse gear or engaging the forward gear (such as about 5 seconds or about 10 seconds or any other threshold time period after disengaging the reverse gear). The display screen thus stays extended/activated during short term forward movements, such as may typically occur during a hitching or other backup or reverse maneuvering event, in order to provide a continuous display to the driver of the vehicle during the entire hitching or reverse maneuvering operation. The camera or imaging device and system may also remain activated so that the rearward image is displayed and viewable at the display during the reverse maneuverings and short term forward movements.

Figure 54:
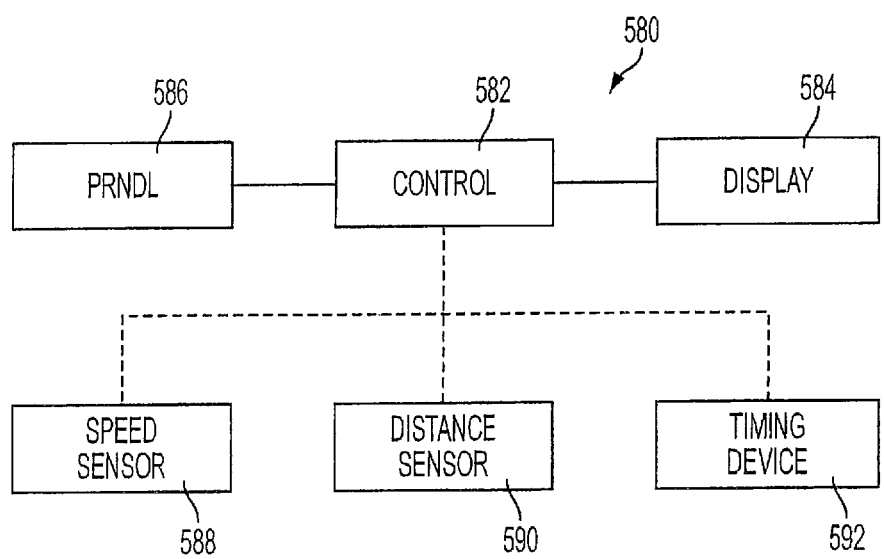
FIG. 54 is a block diagram of a display control system in accordance with the present invention.

For example, and with reference to FIG. 54, a display control system 580 includes a control or microprocessor 582 that is operable to control a display or display screen 584, and that may activate/deactivate the display and/or may extend/retract the display in response to an activating event or trigger. In the illustrated embodiment, control 582 extends and retracts display 584 in response to a signal indicative of the transmission gear of the vehicle that is engaged (such as a signal from a shifter or PRNDL 586 of the vehicle or the like). The control thus may extend the display screen when the reverse gear is engaged, and may retract the display screen in response to one or more deactivating or retracting events/signals. For example, control 582 may retract display 584 when the control receives a signal that is indicative of a speed sensor 588 (such as a wheel speed sensor or encoder or other speed sensing means) detecting or sensing that the vehicle is traveling forward at or greater than a threshold speed, or may retract the display when control 582 receives a signal that is indicative of a distance sensor 590 detecting or sensing that the vehicle has traveled forward a threshold distance after the reverse gear was disengaged, or may retract the display when control 582 receives a signal that is indicative of a timing device 592 signaling that a threshold amount of time has elapsed since the reverse gear was disengaged. Other inputs or signals or deactivating events or triggers that are indicative of the vehicle no longer being in a hitching or other reverse maneuvering situation may be utilized so that the control will retract the display after the reverse maneuvering situation is completed and not during the reverse maneuvering situation. The control thus will not immediately retract the display when the forward gear is engaged but will leave the display extended/activated during short term forward movements of the vehicle.

Optionally, the video display screen device of the present invention may comprise a video display screen module or subassembly, which may include the video display screen and the control and/or associated circuitry on the frame or support, such that the module is extendable and retractable relative to the mirror casing. Such a video display screen module may be purchased from a video display screen module source or supplier and assembled or installed into the mirror product (or movably attached to a rear portion of a reflective element portion of a mirror assembly, such as discussed below) at the mirror assembly plant. For example, the module may be slidably installed as a single unit on or along one or more slide members at the mirror casing and electrically connected to a lead or wire or connector at the mirror assembly, thereby easing the manufacturing processes of the mirror assembly and video display screen assembly.

Although the addition of the control and associated components and circuitry to the extendable frame may add weight to the extended portion of the video display screen module, this is of minimal concern since any additional vibration of the mirror assembly which may occur due to the additional weight extended outward from the mirror casing may occur when the video display screen is in its extended position, which, as discussed above, is preferably occasional or temporary, and typically when the video display screen is in use. However, the mirror assembly desirably includes anti-vibration means for limiting vibration of the display screen when extended and/or of the reflective element, such as vibration that may be due to the increased mass of the mirror assembly and/or a change in the center of gravity of the mirror assembly when the display screen is extended.

It is further envisioned that the frame of the video display screen device of the present invention may support or include or contain one or more other accessories or controls. For example, one or more user actuatable controls or buttons may be included on the frame and may be operable to actuate or control the video display screen and/or one or more other accessories, such as a rearward viewing device or system, a cabin viewing device or system or a video communication device or system, or other accessories of the mirror assembly or of an accessory module or of the vehicle. Optionally, the frame may include or support other accessories, such as one or more microphones or speakers or the like, which may be associated with a video communication device or system in communication with the video display screen or may be associated with other audio devices or systems of the vehicle.

Optionally, the frame may support or include a camera or video or imaging device or sensor, which may be directable toward the driver of the vehicle when the frame is extended toward the driver side of the vehicle. For example, the camera, video display screen and a microphone or microphones, and a speaker and/or other audible signaling device, such as a buzzer or other alert device or the like, may all be included on the support frame of the video display screen device and may function in connection with a video and audio communication device or system or the like, such as a system utilizing principles disclosed in U.S. Pat. Nos. 6,243,003; 6,278,377; and/or 6,420,975; and/or U.S. patent application Ser. No. 10/529,715, filed Mar. 30, 2005, now U.S. Pat. No. 7,657,052; and/or PCT Application No. PCT/US03/30877, filed Oct. 1, 2003 and published Apr. 15, 2004 as International Publication No. WO 2004/032568, which are hereby incorporated herein by reference. Other controls and/or accessories, such as discussed below with respect to the mirror assembly, may also or otherwise be included in or incorporated into the frame of the video display screen device, without affecting the scope of the present invention.

Optionally, the video display screen module may, extend toward the driver side of the mirror assembly when the mirror assembly is installed in a vehicle, or may alternately or additionally and preferably be positioned on the passenger side of the mirror assembly and may extend from the passenger side of the mirror assembly to provide an extendable and retractable video display screen for viewing by the driver or a passenger of the vehicle, without affecting the scope of the present invention. Because the mirror assembly is typically angled toward the driver of the vehicle to provide the driver with the appropriate or desired rearward field of view, the driver side video display screen device of the present invention may, in its extended position, interfere with or contact the windshield when the mirror assembly is angled toward the driver. In such applications where there may be insufficient clearance on the driver's side, it is desirable and preferable to have the video display screen slide outward toward the passenger side of the vehicle (as shown in FIGS. 12-40). Because the mirror assembly is angled toward the driver of the vehicle, the passenger side video display screen may be readily viewable by the driver of the vehicle when it is extended from the mirror assembly. Optionally, the passenger side video display screen may be pivotable relative to the mirror casing to further angle the video display screen toward the driver to enhance the viewing of the video display screen. Thus, compared to mirror assemblies that have a display screen extend, such as from the bottom of the mirror casing when the mirror is mounted to the windshield, the display screen of the present invention provides an improved display by having the display unit slide or extend laterally out from the mirror casing to reduce potential interference with the forward field of view of the driver of the vehicle. In the former situations with the display screen extending from the bottom of the mirror casing, the display screen may interfere with the forward field of view of the driver of the vehicle, whereas in applications of the present invention such as shown in FIG. 12, the display screen may extend to a region at the passenger side of the vehicle and thus is not typically within the forward field of view of the driver during normal driving conditions.

For example, and with reference to FIGS. 19-40, the mirror assembly may comprise various styled or constructed mirror assemblies with various features and content, and with the display screen 18 being extendable, preferably toward the passenger side of the vehicle when the mirror assembly is installed at the vehicle (but of course, other extensions, such as to the driver side or at the bottom or top of the mirror assembly, may be contemplated), such as at the interior surface of the vehicle windshield. During the below discussion of FIGS. 19-40, the mirror assemblies and display screen devices or modules may be substantially similar as the mirror assemblies and display screen devices or modules of FIGS. 1-18, such that a detailed discussion of the mirror assemblies and display screen devices or modules will not be repeated herein. Where elements or components of the mirror assemblies and/or display screen devices or modules may be substantially similar, the same reference numbers may be used to reference the elements in FIGS. 19-40 as used to reference the substantially similar elements in FIGS. 1-18.

Figure 19:
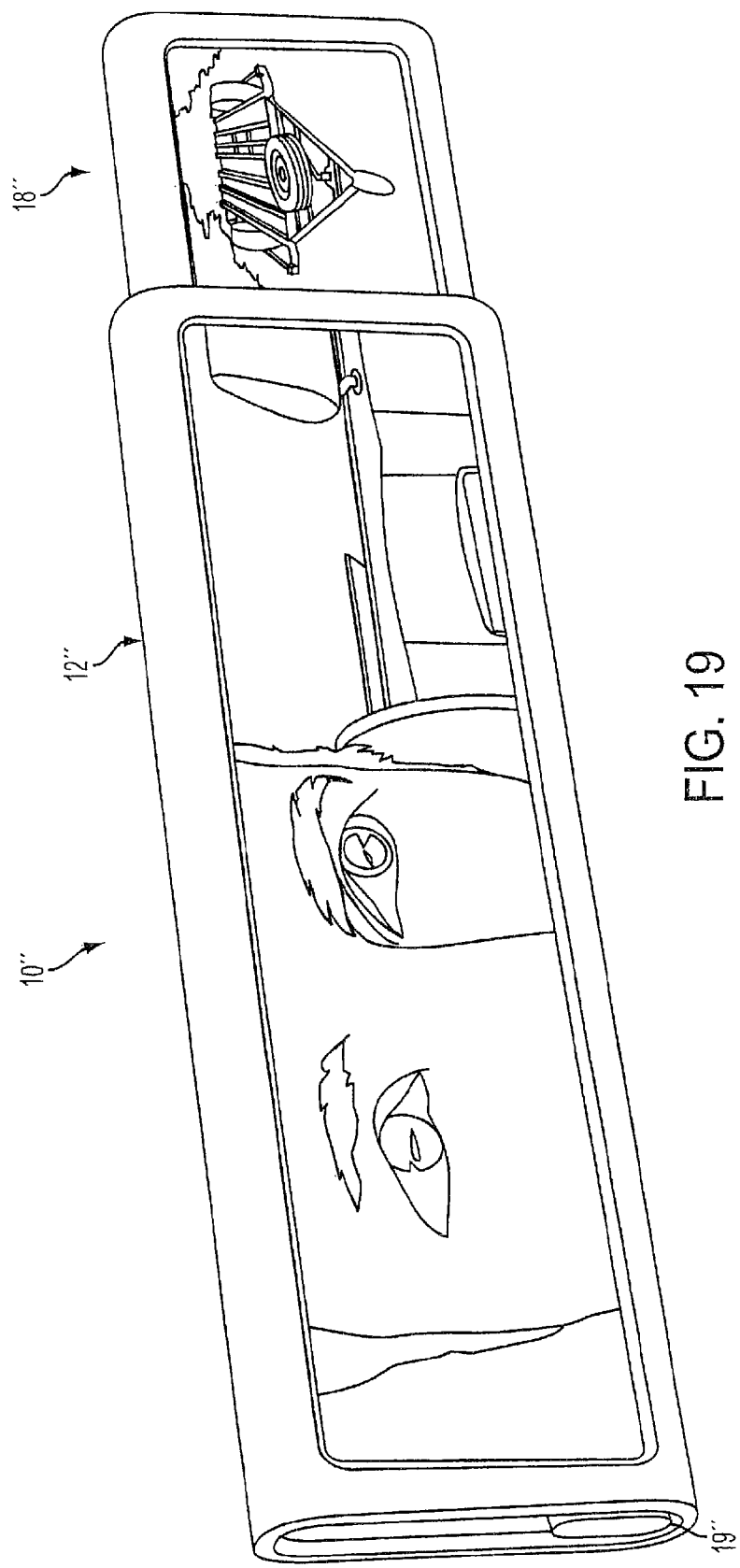
FIG. 19 is a front perspective view of another mirror assembly and display screen in accordance with the present invention.

As shown in FIG. 19, a mirror assembly 10" includes a display screen device or module 18" that extends from a mirror casing 12". The mirror casing 12" substantially receives the display screen within the casing when the display screen 18" is retracted into the mirror casing. The mirror assembly 10' includes a user input 19" at an opposite end of the mirror assembly from the display screen, whereby actuation of the user input 19" may cause the display screen to extend or retract relative to the mirror casing.

Optionally, and as shown in FIGS. 20 and 21, the mirror assembly 110 may include a lower perimeter or chin portion 112a of casing 112, whereby the user inputs 119 may be positioned along the lower perimeter portion 112a for access by a user of the mirror assembly and/or display screen. Optionally, and as shown in FIGS. 22 and 23, the mirror assembly 110' may include a display 152', such as a temperature display or compass display or the like (such as the types described below), at the lower perimeter portion 112a' of mirror casing 112' for viewing by the driver of the vehicle. Optionally, and as shown in FIGS. 24 and 25, the mirror assembly 110" may include a display 152" at the reflective element 116". The display 152" may display information, such as temperature or compass directional heading or the like, and may be located at a window in the reflective coating of the reflective element, or may be located behind a transflective reflective element or the like, such as the types described below. The mirror assembly 110, 110', 110" thus provides a wider or taller casing for receiving the display device or module or screen 118, 118', 118" therein. Optionally, the casing may not change in size as compared to the other styles of mirror assemblies, and the reflective element viewing area may be reduced to provide the space for the lower perimeter portion at the lower or chin portion of the casing.

Optionally, and as shown in FIGS. 26 and 27, the mirror assembly 210 may include the lower perimeter or chin portion 212a (which may support or provide a location for user inputs 219), and may include an expanded casing portion 212b at a side region (such as the side region toward the passenger side of the vehicle when the mirror assembly is installed in a vehicle) so as to receive the video display screen or module or device 218 therein. Similarly, and as shown in FIGS. 28 and 29, the expanded side region 212b' of mirror casing 212' of mirror assembly 210' may be expanded or increased in the vertical dimension for receiving the display screen or module or device 218' therein, while the side of the mirror that is opposite from the display screen may have a lower profile. In such an embodiment, the user inputs 219' may be located at the expanded side region 212b'.

Optionally, and desirably, the display screen device or module or element may be slidably attached to a rear portion of the mirror casing, and may form part of the rear mirror casing when in its retracted position. The display screen casing thus may extend substantially along the rear of the mirror assembly to provide a more secure mounting arrangement of the display screen to the mirror assembly, whereby an increased or substantial amount of the display screen casing or frame may extend along the mirror casing or frame even when the display screen is in its fully extended orientation. The elongated display screen casing thus may substantially anchor the display screen to the mirror casing and may achieve reduced vibration of the display screen relative to the mirror casing when the display screen is in its extended orientation or position.

Figure 30:
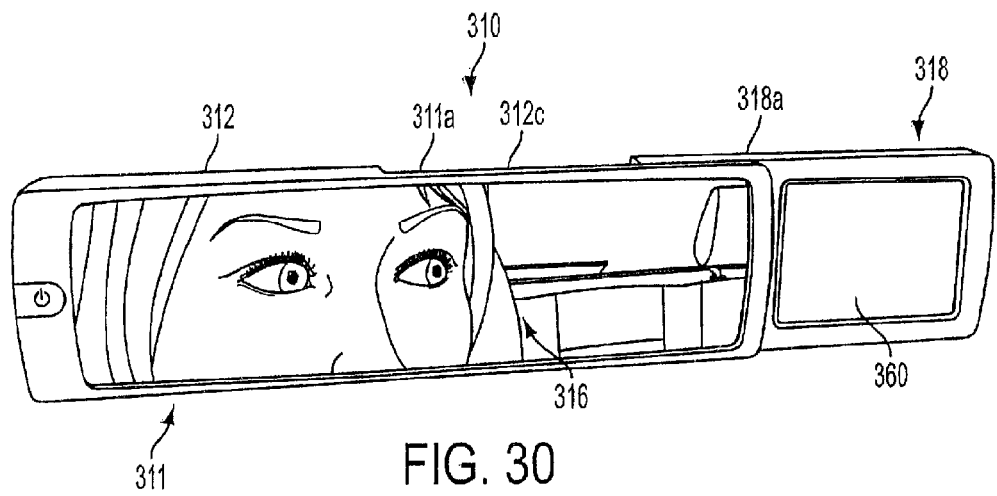
FIG. 30 is a front perspective view of another mirror assembly and display screen in accordance with the present invention.
Figure 31:
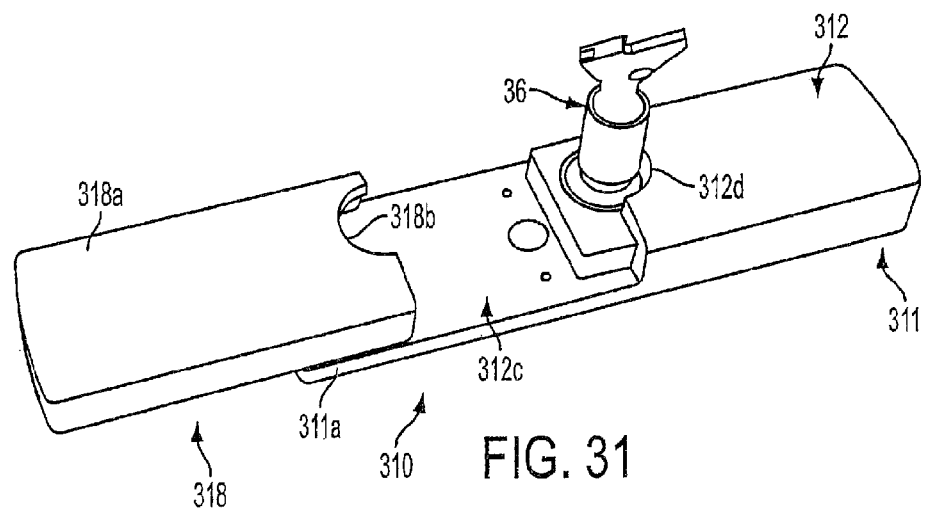
FIG. 31 is a rear perspective view of the mirror assembly of FIG. 30.
Figure 32:
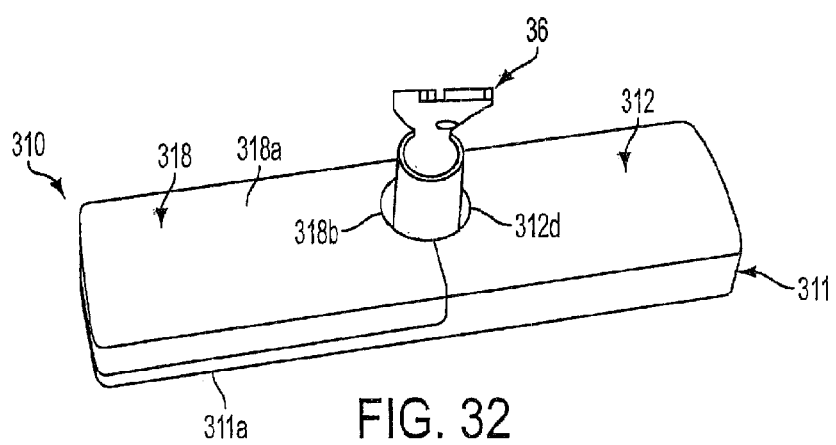
FIG. 32 is a rear perspective view of the mirror assembly of FIG. 30, with the display screen retracted.

For example, and as shown in FIGS. 30-32, the rearview mirror assembly 310 includes a first or forward or reflective element portion or subassembly 311 and a second or rearward or display element or portion or module or subassembly 318. Reflective element portion 311 includes a reflective element 316 and a mounting element or support arm 36 extending generally rearwardly from the reflective element for mounting the mirror assembly to an interior portion of the vehicle, while display element portion 318 includes a display screen 360 and associated circuitry. Reflective element portion 311 includes a cut-away or removed portion or reduced thickness portion 311a along at least a portion of the rear of the casing, such as along approximately half of the rear of the casing as shown in FIGS. 31 and 32. The display element portion 318 includes or is encased by a casing 318a that substantially encases the display screen circuitry and the like at the rear of the display screen 360. The display element casing 318a is formed to substantially match the contours and appearance and surface texture and color of the mirror casing 312 so that the mirror assembly has the appearance of a substantially continuous casing when the display element 318 is fully retracted (FIG. 32).

Casing 312 substantially encases the rear portion of the reflective element subassembly (so as to encase a rear portion of the reflective element and any circuitry or elements or components of the reflective element subassembly) and provides a rear surface 312c (FIG. 31) at the reduced thickness portion 311a of subassembly or portion 311 so that the rear surface 312c of casing 312 is exposed when the display element 318 is extended. The rear surface 312c may include one or more mating elements, such as rails or tracks or guides or bearings or slide elements along the rear surface 312c for movably attaching to one or more other mating elements, such as rails or tracks or guides or bearings or slide elements, at the display element portion 318 (such as at a forward facing portion or surface of the display element portion).

The display element portion 318 thus is movable along the rear surface 312c of reflective element portion or subassembly 311 to extend and retract the display screen or element relative to the reflective element portion 311. When extended toward the display side of the mirror assembly (the passenger side of the mirror assembly and vehicle in the illustrated embodiment), the display screen is viewable by a person viewing the mirror assembly from within the cabin of the vehicle. When the display screen is retracted, the display screen is positioned behind the reflective element portion and may face or oppose the rear surface of the reflective element portion so as to be substantially or entirely non-viewable by a person viewing the mirror assembly from within the cabin of the vehicle. Preferably, the drive mechanism of the display element 318 (such as a drive motor and gears and clutch mechanism and the like) is self-contained within the display element 318, with the appropriate gears or driving or mating elements of the display element 318 engaging the mating elements at the rear surface 312c when the display element 318 is mounted to the reflective element portion 311.

As shown in FIG. 31, the display element casing 318a may include a notch or cutout area or slot 318b (such as a partial or open slot, such as a generally C-shaped slot, such as illustrated in FIG. 31) for fitting around or at least partially receiving or enveloping the mounting assembly 36, so that the notch or cutout area or slot 318b of display element casing 318a cooperates with a similar notch or cutout area or slot or partial/open slot 312d of casing 312 to substantially surround or envelop the mounting assembly 36 as it protrudes rearward through the mirror casing for attaching to an interior portion of the vehicle, such as an interior surface of the vehicle windshield or the like. Because the display screen may be smaller than the length between the mirror mounting arrangement and the end of the mirror casing, the display screen may be fully extended for viewing, while a substantial portion of the display element casing is engaged with the mirror assembly (such as a track or rail along the mirror assembly as described above) to provide enhanced support of the display screen (as shown in FIGS. 30 and 31).

Optionally, and with reference to FIGS. 33 and 34, the display element portion 318' may extend substantially or entirely the length of the casing 312' of first or forward or reflective element portion or subassembly 311' of mirror assembly 310' (when the display screen is retracted), so as to provide enhanced support of the display element portion 318' when the display screen 360' is extended. In the illustrated embodiment, the display element portion 318' includes a display screen portion 319*a*' (which is thick or deep enough to contain the display screen 360' and the associated circuitry and drive mechanism within or substantially encased by the display element casing 318*a*') and a reduced thickness support portion or arm 319*b*'. The reflective element portion or subassembly 311' thus may have a reduced thickness or depth or cutout region 311*a*' extending along about half the length of the rear portion of the reflective element portion 311' for receiving the display screen portion 319*a*' of display element portion 318'. The rear of the reflective element portion 311' is substantially encased and has a rear casing surface or portion 312*f* which may be partially exposed when the display element is at least partially extended. When the display screen is retracted, the display screen is behind the reflective element portion and may face or oppose the rear surface of the reflective element portion so as to be substantially or entirely non-viewable by a person viewing the mirror assembly from within the cabin of the vehicle.

The reflective element portion 311' may include at least one mating element (such as one or more guides or rails or tracks or the like at or along the rear casing surface 312*f* of the reflective element portion 311'), while the display element portion 318' may also include at least one mating element, so that the display element portion 318' movably attaches to the rear of the reflective element portion 311' to assemble the mirror assembly 310'. The mating elements may provide for sliding or rolling or moving engagement of the display element portion 318' along substantially or entirely the length of the rear portion or surface 312*f* of the mirror casing 312'. For example, the rear surface 312*c*' of the reduced thickness portion 311*a*' may provide a mounting interface or element or surface or track or the like for movably attaching the display screen portion 319*a*' of display element portion 318', while the rear surface 312*g*' of the thicker portion 311*b*' of the reflective element portion 311' (at the side of the minor assembly opposite from the reduced thickness portion or region) may provide another mounting interface or element or surface or track or the like for movably attaching the support arm portion 319*b*' of display element portion 318'.

The display screen portion 319*a*' and the reduced thickness portion or support arm 319*b*' thus movably engage the forward casing 312' at the rear casing surface 312*c*' and the rear casing surface 312*g*', respectively. Optionally, the display element and the front casing portions may have respective substantially uniform thicknesses along their lengths, without affecting the scope of the present invention. In such an application, other accessories or circuitry or the like may be provided with the display element subassembly or module, while the reflective element subassembly or module may principally contain or include the reflective element and the mounting element or support arm or the like for mounting the mirror assembly at an interior portion of the vehicle.

As shown in FIG. 34, the display screen casing 318*a*' includes a substantially or wholly closed aperture or slot or guideway 318*b*' formed along a portion of the display screen casing for receiving the mounting element or support arm 36 therethrough. The slot 318*b*' preferably substantially or wholly envelops or surrounds the mounting element and support arm (in other words, the edge of the display element portion 318' that defines the aperture or slot surrounds the mounting element and support arm) at the rear of the mirror assembly, so that the support arm or mounting element is substantially enveloped by the casing 318*a*' throughout the range of movement of the display element portion 318' relative to the reflective element portion 311', and whereby the mounting element or support arm protrudes through the slot or opening in the display element portion throughout the range of movement of the display element portion relative to the reflective element portion. The slot is sized so that the display element portion 318' and display screen casing 318*a*' may be moved between the extended position (as shown in FIGS. 33 and 34) and the retracted position (not shown) without interference of the display element portion and casing with the mounting element 36 of the mirror assembly 310'.

The display screen casing 318*a*' thus extends over a substantial portion of the rear of the reflective element portion of the mirror assembly (more than half of the length of the mirror assembly) when the display screen is fully extended, and thus provides substantial support of the display screen device at the mirror assembly at all degrees of extension/retraction of the display screen. As can be seen in FIG. 34, the reflective element easing 312' may include a slot or groove or other mating element 312*e*' along a lower rear portion thereof (and/or along an upper rear portion thereof) for slidably receiving and guiding a corresponding lip or tab or sliding element or mating element 318*e*' of display element portion 318*a*' to provide enhanced guidance and support of the display element portion 318' at the mirror casing 312' of reflective element portion 311' of mirror assembly 310'.

Thus, the display element portion (including the rear casing portion and the display element and associated electronic circuitry, such as the drive system elements and display screen and display control elements and the like) may be provided with an attachment face or surface or element for movably attaching to a corresponding attachment face or surface or element at the rear of the reflective element portion. The display element portion thus may be provided as a self-contained unit or subassembly or module that may be readily attached to the reflective element portion (which may include the reflective element and bezel portion and a portion of the mirror casing), such as via a snap type connection to the reflective element portion. The display element portion or unit or module or subassembly may be slidable along the rear surface or interface at the reflective element portion to move the display screen between the extended, viewable position and the retracted, non-viewable position, where the display screen is positioned at or behind the reflective element casing and thus is not readily viewable or visible to a person viewing the mirror assembly from within the vehicle cabin. The mirror assembly of the present invention thus provides a split case design or arrangement, with the rear portion providing or substantially encasing a self-contained video display screen element or module or unit or subassembly that is nested with the front portion, which includes the mirror reflective element and forward mirror casing.

For example, a slidable video display element module or subassembly or assembly or unit may include a video display screen, motive control circuitry (preferably including a microprocessor and digital logic), a motor (operable to drive the movement of the display screen relative to the reflective element portion), gears/gearing (for moving the display screen relative to the reflective element portion in response to the motor, and preferably including a clutch mechanism or slip clutch), a guide track or rail or element, limit switches and/or stops, and any associated cabling or wires or circuitry, such that the display module or subassembly is a stand alone subassembly or unit. The stand alone display module or subassembly or unit may be attached to a portion of a mirror assembly (such as a reflective element portion having a casing element or portion and a reflective element and a mounting element for mounting the mirror assembly at an interior portion of the vehicle) and may function to move relative to the portion of the mirror assembly to extend and retract the display screen relative to the portion of the mirror assembly. Optionally, the stand alone or self-contained display element subassembly or unit may be purchased or obtained as a separate unit and encased within a casing for attachment to the reflective element portion of the mirror assembly.

Thus, a mirror manufacturer may purchase the self-contained display screen element portion or unit from a display screen supplier. The display screen element may include and combine a display screen and associated electronic circuitry that is at least sufficient to control the video slideout function, including the video function and the motor function. The mirror manufacturer thus may provide, the reflective element portion, which includes the mirror reflective element and forward casing element or portion, and may include the mounting arrangement or arm or assembly, and the mirror manufacturer may snap or attach the rear display screen element or subassembly or sub-module (which preferably includes the entire video display mechanism) to the rear of the reflective element portion to assemble the mirror assembly. The display element may be purchased as a unit and may include the outer casing that substantially encases the circuitry and elements of the display screen (or may include a frame or skeleton or structure, whereby the outer casing or skin of the unit may be provided by the mirror manufacturer to match the outer casing of the reflective element portion).

When assembled, the display element portion or subassembly may be slidable or otherwise movable (such as via rollers or bearings or slide elements or the like) relative to the reflective element portion, such as along the rear surface or interface or mating element of the reflective element portion or subassembly, to extend and retract the display screen at the display side of the mirror assembly (preferably toward the passenger side of the vehicle when the mirror assembly is mounted in the vehicle). Optionally, the display element may include other electronic components and/or circuitry and/or elements, such as, for example, mirror reflective element control circuitry (such as for controlling the automatic dimming function of an electro-optic or electrochromic mirror reflective element or the like), which may be connected to the appropriate connectors or terminals at the forward casing portion or at the reflective element when the display element portion is attached or snapped to the reflective element portion to assemble the mirror assembly. Optionally, the reflective element portion may include other electronic circuitry or elements therein, such as for displays or user actuatable inputs or the like, and the appropriate electrical power or control connections may be made to the reflective element portion and its circuitry when the display element portion is attached or snapped to the rear interface surface of the reflective element portion.

Preferably, the rear display element portion extends substantially or entirely the length of the rear of the reflective element portion to provide substantial support for the display element portion even when the display screen is fully extended. For example, an interior mirror assembly is typically between 8 inches and 10.5 inches in width (the dimension generally across the vehicle when the mirror assembly is mounted in the vehicle), while the display screen may be approximately 3.5 inches wide (or more). In an application where the mirror assembly is about 10 inches wide, the rear casing portion or display element portion may, for example, be about 10 inches wide or thereabouts so as to substantially uniformly match the length or width of the reflective element portion when the display element portion is fully retracted (or positioned generally flush with the reflective element portion). Thus, when the display screen is moved outward to its fully extended position (which may require movement of at least 3.5 inches or more, such as about 4 inches or thereabouts), a substantial portion (about five to six inches or thereabouts) of the display element portion remains located over the rear of the reflective element portion so that a substantial portion of the display element portion may be engaged with the interface surface or mating element of the reflective element portion to substantially cantileverly support the extended display screen at the mirror assembly. As can be seen in FIG. 34, when the display element portion 318' is fully extended, the display element may still engage the reflective element portion 311' at two locations, where the display screen portion 319a' engages the outer end of the casing 312' and where the reduced thickness portion 319b' engages the generally central rear portion of the casing and near or at the mounting aim or assembly 36. The reduced thickness portion 319b' of the display element 318' thus functions as an extended mounting arm to provide additional support and stabilization of the display screen, in addition to the support provided by the display screen portion 319a' of the display element 318'.

As shown in FIG. 34, display element portion 318' spans a substantial amount of the rear surface of the reflective element portion 311'. Preferably, the display element portion 318' is sized so that at least a portion of the display element portion moves past the mounting element and toward the opposite side of the mirror assembly from the display side (the display side is the side at which the display screen is extended for viewing, and in the illustrated embodiment, the display side is the passenger side of the mirror assembly and vehicle, such that the opposite side is at the driver side of the mirror assembly and vehicle in the illustrated embodiment) when the display element portion is moved toward its retracted position. In the illustrated embodiment of FIGS. 33 and 34, the display element portion is sized so that at least a portion of the display element portion is located at the opposite side of the mirror assembly from the display side throughout the range of movement of the display element portion relative to the reflective element portion. For example, and as shown in FIG. 34, the end of the display element portion opposite from the display screen is located toward the driver side of the mirror assembly (and to the right of the mounting element in FIG. 34) even when the display screen is fully extended toward the passenger side of the mirror assembly. As also shown in FIG. 34, at least a portion of the rear surface of the front or reflective element portion is exposed when the display element portion is at least partially extended or moved toward its extended position.

As can be seen in FIGS. 30, 33, and 35-50, by providing the attachment of the display screen device at the rear of the mirror casing (and not received within the mirror casing), the height of the display screen device may be substantially the same as the height of the mirror casing, so as to provide a uniform height or substantially uniform height along the entire length of the mirror assembly and display screen, even when the display screen is fully extended (and especially with side-mounted user interfaces/buttons, such as discussed below). The mirror assembly thus may obviate the addition of a lower perimeter or chin portion of the mirror casing, since a greater height of the mirror casing is not needed for receiving the display screen within the mirror casing, and hence, forward field of view is enhanced.

In such low profile mirror embodiments, the user input or inputs may be positioned at other locations around the perimeter of the reflective element of the mirror assembly or at the reflective element or the like, without affecting the scope of the present invention. For example, and desirably, a user input 419 of a mirror assembly 410 (FIGS. 35 and 36) may be located at a side perimeter region 412*a* of mirror casing 412, such as at the side region that is opposite from the end of the mirror at which the display screen 418 extends. When the user actuatable input or inputs are so positioned, the mirror assembly may comprise a lower or reduced profile mirror assembly (with a reduced vertical dimension when the mirror assembly is mounted in the vehicle). Optionally, further inputs or buttons may be provided at the display screen casing so as to be accessible or actuatable when the display screen is extended outward for viewing by the driver or occupant of the vehicle.

Optionally, and as shown in FIGS. 37 and 38, the mirror assembly 410' may include a lower chin portion 412*a*' of casing 412' for locating one or more user inputs 419' for access by a user of the mirror assembly 410', such as for manually activating or deactivating or controlling the display screen device or module 418'. Optionally, and as shown in FIGS. 39 and 40, a user input 419" may be located at the reflective element 416" of mirror assembly 410", whereby the user input 419" may be a touch sensor or proximity sensor or the like, such as the types described below. The user input 419" may be located at the lower corner of the reflective element (as shown in FIGS. 39 and 40) and generally opposite from the end of the mirror assembly at which the display module 418" extends, or the user input may be located elsewhere at the reflective element without affecting the scope of the present invention. The user inputs or buttons or the like may be actuatable to extend and retract the display screen module or may control or adjust one or more other accessories or the like at or in or associated with the mirror assembly.

Figure 41:
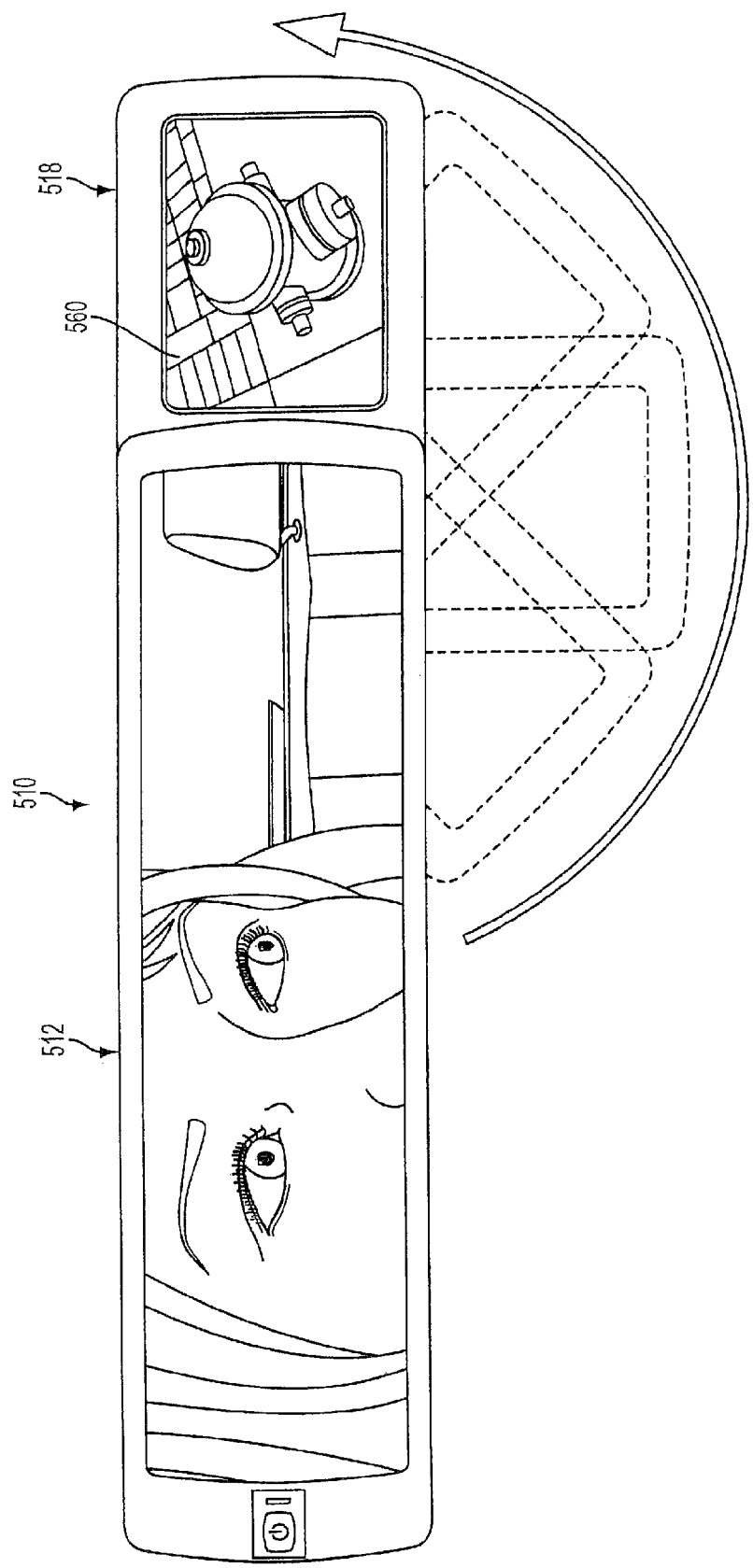
FIG. 41 is a front elevation of another mirror assembly with a display screen pivotally mounted thereon in accordance with the present invention.
Figure 42:
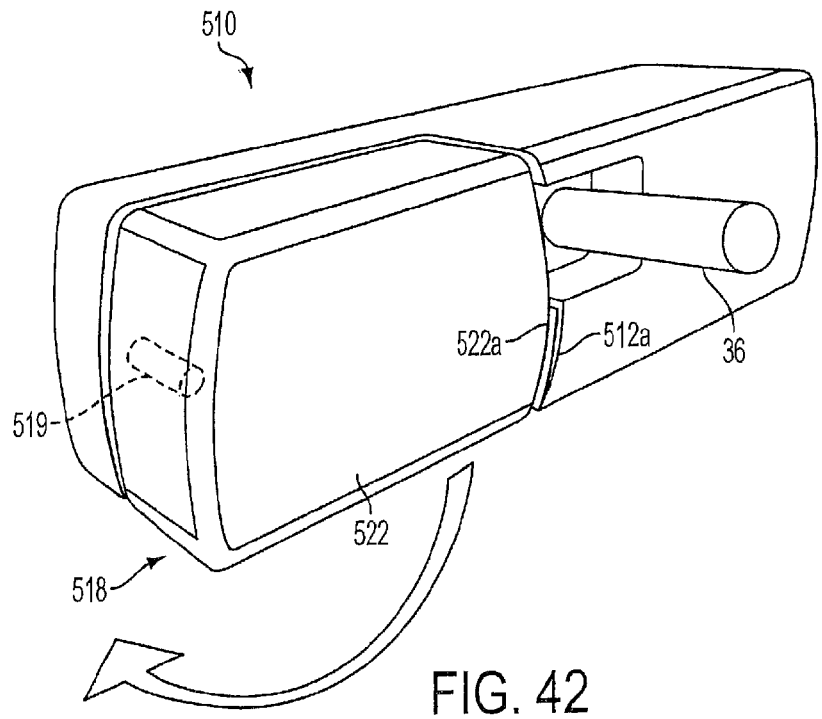
FIG. 42 is a rear perspective view of the mirror assembly of FIG. 41, with the display screen pivoted to its storage position.
Figure 43:
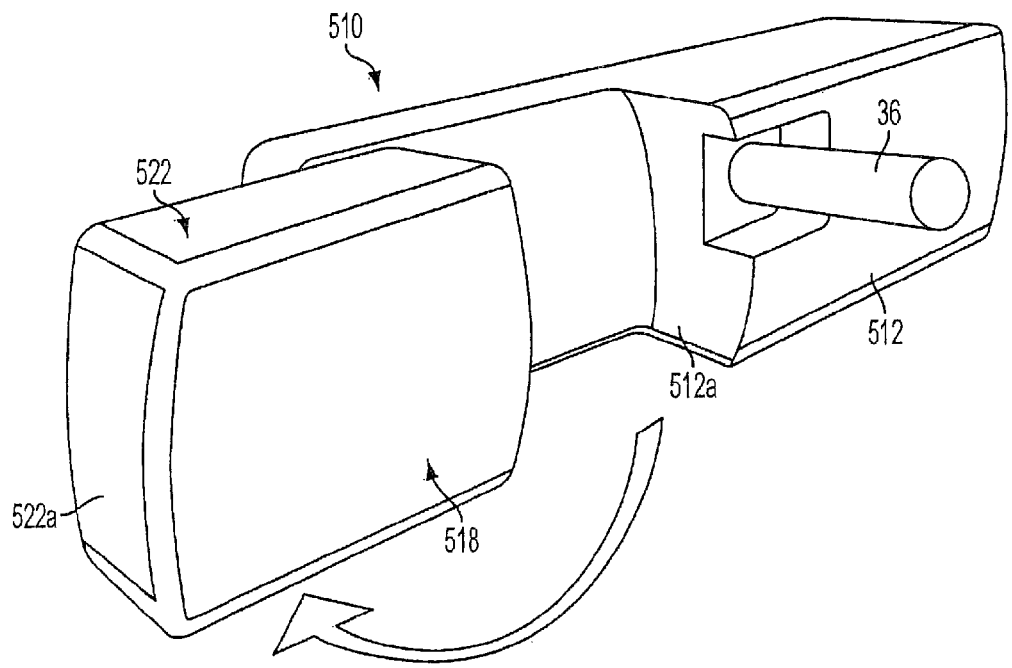
FIG. 43 is another rear perspective view of the mirror assembly of FIG. 41, with the display screen pivoted to its in use position.

Optionally, and with reference to FIGS. 41-43, a video display screen device 518 may include a frame or display screen casing 522 and a display screen 560 that are pivotally mounted to the casing 512 of a mirror assembly 510. Frame 522 and the display screen may be pivotable about a pivot axis 519 between a stored or non-use position, where the display screen is at the rear of or within the mirror casing 512 (as shown in FIG. 42), and a use position, where display screen 560 is moved outward from mirror casing 512 and is viewable by the driver or occupant of the vehicle (as shown in FIGS. 41 and 43). As can be seen in FIG. 42, frame or display screen casing 522 may be formed to define an exterior corner or rear portion of casing 512, such that mirror assembly 510 provides a generally uniform exterior casing when the frame and display screen are pivoted to their non-use position. The end 522*a* of frame or display screen casing 522 may be rounded and a receiving portion 512*a* of mirror casing 512 may be correspondingly rounded or curved (and with a radius of curvature approximately equal to the distance between the end 522*a* of the frame and the pivot axis), such that the display screen device may pivot between the use and non-use positions without interfering with the mirror casing. By pivotally mounting the video display at the rear portion of the mirror casing, the video display and mirror casing may provide a lower profile mirror assembly, since a rear portion of the casing need not encompass or encase the video display.

Video display screen device 518 and mirror assembly 510 may otherwise be substantially similar to the video display screen devices and mirror assemblies discussed above with respect to FIGS. 1-18, such that a detailed discussion of the display screen devices and mirror assemblies will not be repeated herein. The frame and display screen may be manually pivoted or automatically or electronically pivoted between the use and non-use positions, such as in response to an activating event or the like, such as described above. The display screen device may be positioned at the driver side of the mirror assembly or at the passenger side of the mirror assembly, without affecting the scope of the present invention. However, it is preferable to have the display screen positioned at, and to extend outward when extended from the passenger side of the rearview mirror assembly when the rearview mirror assembly is installed in the vehicle, as this is less intrusive to the driver's forward field of view.

Alternately, the video display screen device may include a frame and display screen that are pivotally mounted to a mirror casing and pivotable about a generally vertical pivot axis, or the video display screen device may include a frame and display screen that are pivotally mounted to a mirror casing via a pivotable or jointed arm or member or the like, such as the types of video display screen devices described in PCT Application No. PCT/US03/40611, filed Dec. 19, 2003 and published Jul. 15, 2004 as International Publication No. WO 2004/058540, and/or U.S. patent application Ser. No. 10/538,724, filed Jun. 13, 2005, and published Mar. 9, 2006 as U.S. Publication No. 2006/0050018, which are hereby incorporated herein by reference.

Optionally, aspects of the present invention may be utilized in a mirror assembly with a fixed or non-movable display screen at or near the reflective element of the mirror assembly. For example, and with reference to FIG. 44, a mirror assembly 610 may include a display screen 660 at a side region of the reflective element 616 (such as at a passenger side region of the reflective element when the mirror assembly is installed in a vehicle). The display screen 660 may comprise an LCD type display screen of the types described above. Optionally, the display screen 660 may be located behind a transflective reflective element so as to be viewable through the reflective element when the display screen is activated, but to be substantially non-viewable or non-discernible when viewing the reflective element when the display screen is not activated. In such an embodiment, it is desirable that the display screen be substantially non-viewable or non-discernible when it is not in use, but that it also be substantially viewable when in use, even in high ambient lighting conditions, such as are typically encountered on a sunny day. Thus, a polarizing transflective element may be implemented at the reflective element to substantially polarize the polarized light emitted from the display screen while substantially reflecting other light incident on the reflective element, such as other light from the rear of the vehicle (such as by utilizing aspects of the polarizing element described in U.S. provisional application Ser. No. 60/732,245, filed Nov. 1, 2005 by Weller for INTERIOR REARVIEW MIRROR ASSEMBLY WITH DISPLAY, which is hereby incorporated herein by reference.

Figure 46:
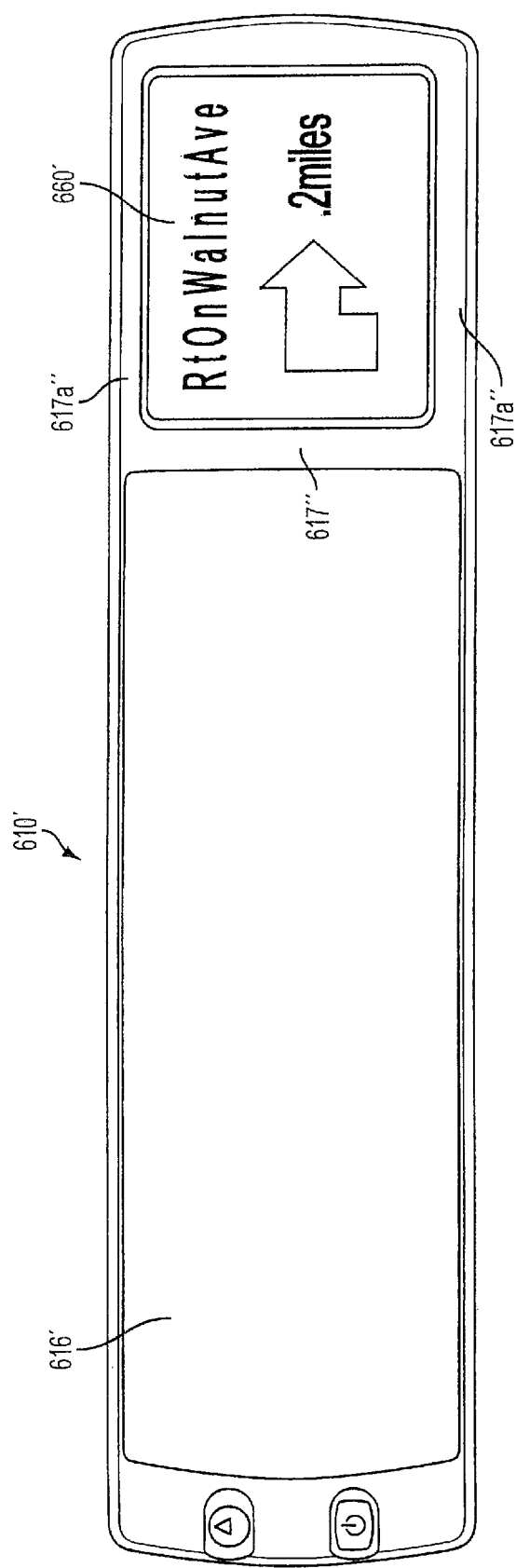
FIG. 46 is another front elevation of the mirror assembly of FIG. 45, showing the fixed display screen displaying navigational instructions in accordance with the present invention.

Optionally, the non-movable display screen may be separated from the viewable reflective element of the minor assembly, such as by a divider element or the like that may extend generally vertically across the front of the mirror assembly to separate or demarcate the separation of the display screen and reflective element. For example, and with reference to FIGS. 45 and 46, a display screen 660' may be located at a passenger side or end of a mirror assembly 610', while the reflective element 616' is toward the driver side or end of the mirror assembly 610' and separated from the display screen 660' by a dividing element 617'. The display screen 660' may be exposed at the mirror assembly for direct viewing by a driver of the vehicle, or the display screen 660' may be located behind a reflective element portion or other glass or plastic element or cover, depending on the particular application of the mirror assembly. Optionally, and as shown in FIG. 46, the divider element 617" may include a perimeter frame portion or element 617a" that surrounds or substantially surrounds or frames the display screen 660'. As shown in FIG. 46, the display screen 660' may be operable in connection with a navigational system of the vehicle, and may display directions or route instructions to the driver, such as in the manner described above.

The interior rearview mirror assembly includes a mounting portion 36 (FIGS. 1-5, 9, 31, 32, 34, 42 and 43), which may be mounted to the vehicle to provide pivotal movement of the mirror casing and reflective element relative to the vehicle. The mounting portion may be mounted to the vehicle, such as to an interior surface of the vehicle windshield or to a header portion of the vehicle or the like, via any mounting arm or mounting arrangement, such as the types disclosed in U.S. Pat. Nos. 5,671,996; 5,813,745; 5,673,994; 5,820,097; 5,708, 410; 5,576,687; 5,521,760; 5,330,149; 5,100,095; 5,058,851; 4,930,742; 4,936,533; 4,436,371; 4,524,941; 4,435,042; and/or 4,646,210; and/or U.S. patent application Ser. No. 11/226, 628, filed Sep. 14, 2005; and published on Mar. 23, 2006 as U.S. Patent Publication No. 2006/0061008; and/or PCT Application No. PCT/US2004/015424, filed May 18, 2004 and published on Dec. 2, 2004, as International Publication No. WO 2004/103772; and/or U.S. provisional application Ser. No. 60/729,430, filed Oct. 21, 2005 by Hook for MOUNTING ASSEMBLY FOR VEHICLE INTERIOR MIRROR, which are hereby incorporated by reference herein, without affecting the scope of the present invention. Desirably, the mounting arm and ball and socket arrangement provide enhanced torque at the pivot joints to limit or reduce pivotal movement of the mirror casing, in order to accommodate the additional weight of the display screen and/or the movement of the display screen relative to the mirror casing.

Preferably, the mounting arrangement provides a breakaway characteristic, such as a breakaway mount such as the types disclosed in U.S. Pat. Nos. 5,820,097 and/or 5,100,095, which are hereby incorporated herein by reference. Preferably, the display screen also provides a breakaway characteristic so that the display screen may breakaway from the mirror assembly if impacted when in its extended or partially extended position. The mirror assembly and/or display screen may include breakaway elements and/or breakaway means that allow the extended or extending or retracting display screen to break away from the mirror assembly if impacted. For example, the display screen and/or mirror assembly may include breakout pins, snaps, elements and/or breakout portions or the like as known in the mechanical arts.

The interior rearview mirror assembly may include a bezel portion and casing, such as described above, or the mirror assembly may comprise other types of casings or bezel portions or the like, such as described in U.S. Pat. Nos. 6,439, 755; 4,826,289; and 6,501,387; and/or PCT Application No. PCT/US2004/015424, filed May 18, 2004 and published on Dec. 2, 2004, as International Publication No. WO 2004/ 103772; and/or U.S. patent applications, Ser. No. 10/933,842, filed Sep. 3, 2004, now U.S. Pat. No. 7,249,860; and/or Ser. No. 10/993,302, filed Nov. 19, 2004, now U.S. Pat. No. 7,338, 177; and/or U.S. provisional application Ser. No. 60/525,952, filed Nov. 26, 2003 by Lynam for MIRROR REFLECTIVE ELEMENT FOR A VEHICLE, which are all hereby incorporated herein by reference, without affecting the scope of the present invention. For example, the mirror assembly may comprise a flush or frameless or bezelless reflective element, such as the types described in PCT Application No. PCT/ US2004/015424, filed May 18, 2004 and published on Dec. 2, 2004, as International Publication No. WO 2004/103772; PCT Application No. PCT/US03/35381, filed Nov. 5, 2003 and published May 21, 2004 as International Publication No. WO 2004/042457; and/or in U.S. patent application Ser. No. 11/140,396, filed May 27, 2005, now U.S. Pat. No. 7,360,932; Ser. No. 11/226,628, filed Sep. 14, 2005, and published on Mar. 23, 2006 as U.S. Patent Publication No. 2006/0061008; Ser. No, 11/021,065, filed Dec. 23, 2004, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; and/or Ser. No. 10/538, 724, filed Jun. 13, 2005, and published Mar. 9, 2006 as U.S. Publication No. 2006/0050018; and/or in U.S. provisional applications, Ser. No. 60/563,342, filed Apr. 19, 2004 by Bareman et al. for METHOD OF MANUFACTURING ELECTRO-OPTIC MIRROR CELL; Ser. No. 60/629,926, filed Nov. 22, 2004 by McCabe et al, for METHOD OF MANUFACTURING ELECTRO-OPTIC MIRROR CELL; Ser. No. 60/624,320, filed Nov. 2, 2004 by Uken for MIRROR ASSEMBLY FOR VEHICLE; Ser. No, 60/681,250, filed May 16, 2005; Ser. No. 60/690,400, filed Jun. 14, 2005; Ser. No. 60/695,149, filed Jun. 29, 2005; and/or Ser. No. 60/730, 334, filed Oct. 26, 2005 by Baur for VEHICLE MIRROR ASSEMBLY WITH INDICIA AT REFLECTIVE ELEMENT, which are all hereby incorporated herein by reference.

Optionally, the mirror assembly may comprise a modular mirror construction, and may include back housing portions or the like, such as cap portions of the types described in PCT Application No. PCT/US2004/015424, filed May 18, 2004 and published on Dec. 2, 2004, as International Publication No. WO 2004/103772, which is hereby incorporated herein by reference. The display screen may be provided as a modular display screen and may be mountable or installable in the appropriate or suitable mirror casing to provide a modular mirror assembly and display screen. For example, a rear casing or cap portion may include the display screen module including the associated components, such as the rails and motor and the like, and may be attachable to a reflective element and/or bezel portion to assemble the modular mirror assembly. The display screen module thus may be provided as an optional component or accessory for a vehicle, and may be readily assembled to a common reflective element and/or bezel portion of the mirror assembly.

Optionally, the mirror casing and/or reflective element, and/or the display screen casing and/or display screen may include customized or personalized viewable characteristics, such as color or symbols or indicia selected by the vehicle manufacturer or owner of the vehicle, such as the customization characteristics described in PCT Application No. PCT/ US2004/015424, filed May 18, 2004 and published on Dec. 2, 2004, as International Publication No. WO 2004/103772; and/or U.S. patent application Ser. No. 11/243,783, filed Oct. 5, 2005; and/or Ser. No. 11/021,065, filed Dec. 23, 2004, now U.S. Pat. No. 7,255,451; and/or U.S. provisional applications, Ser. No. 60/553,842, filed Mar. 17, 2004; Ser. No. 60/563, 342, filed Apr. 19, 2004; Ser. No. 60/629,926, filed Nov. 22, 2004 by McCabe et al. for METHOD OF MANUFACTURING ELECTRO-OPTIC MIRROR CELL; Ser. No. 60/681, 250, filed May 16, 2005; Ser. No. 60/690,400, filed Jun. 14, 2005; Ser. No. 60/695,149, filed Jun. 29, 2005; Ser. No. 60/730,334, filed Oct. 26, 2005 by Baur for VEHICLE MIRROR ASSEMBLY WITH INDICIA AT REFLECTIVE ELEMENT; and/or Ser. No. 60/616,182, filed Oct. 5, 2004 by Dubay et al. for WINDOW AND SUN SHADE MODULE FOR VEHICLE, which are hereby incorporated herein by reference. For example, the frame or casing of the display module and/or the mirror assembly may be selected to have a desired color or combination of colors (or text or print or indicia thereon) to personalize the appearance of the mirror assembly. Optionally, the reflective element may include text or symbols or icons or other characters or indicia to provide a desired appearance or message at the mirror assembly or display screen, such as by utilizing aspects of the mirror assembly described in PCT Application No. PCT/US2004/015424, filed May 18, 2004 and published on Dec. 2, 2004, as International Publication No. WO 2004/103772; and/or U.S. patent application Ser. No. 11/243,783, filed Oct. 5, 2005; and/or U.S. provisional application Ser. No. 60/616,182, filed Oct. 5, 2004, which are hereby incorporated herein by reference. The icons or characters or indicia may be formed at or near or on the display screen, or may be provided via graphic overlays when the display screen is extended and operating, or may otherwise be formed or provided at or on or in the display screen casing or frame, without affecting the scope of the present invention. Optionally, the bezel or frame color or colors may be selected to be designer colors or may match or contrast the color of the mirror casing, and/or may have logos or icons or other indicia thereon. Optionally, the display screen module may include warnings or other statements or alerts or messages printed or otherwise formed on the bezel or frame portion of the display screen so that the messages or the like are readily viewable when the display screen is extended.

The interior rearview mirror assembly may comprise a prismatic mirror assembly or a non-electro-optic miner assembly or an electro-optic or electrochromic mirror assembly. For example, the interior rearview mirror assembly may comprise a prismatic mirror assembly, such as the types described in U.S. Pat. Nos. 6,318,870; 6,598,980; 5,327,288; 4,948,242; 4,826,289; 4,436,371; and 4,435,042; and PCT Application No. PCT/US2004/015424, filed May 18, 2004 and published on Dec. 2, 2004, as International Publication No. WO 2004/103772; and U.S. patent application Ser. No. 10/933,842, filed Sep. 3, 2004, now U.S. Pat. No. 7,249,860, which are hereby incorporated herein by reference. Optionally, the prismatic reflective element may comprise a conventional prismatic reflective element or prism or may comprise a prismatic reflective element of the types described in U.S. patent application Ser. No. 10/528,269, filed Mar. 17, 2005, now U.S. Pat. No. 7,274,501; Ser. No. 10/709,434, filed May 5, 2004, now U.S. Pat. No. 7,420,756; Ser. No. 10/933,842, filed Sep. 3, 2004, now U.S. Pat. No. 7,249,860; Ser. No. 11/021,065, filed Dec. 23, 2004, now U.S. Pat. No. 7,255,451; and/or Ser. No. 10/993,302, filed Nov. 19, 2004, now U.S. Pat. No. 7,338,177; and/or PCT Application No. PCT/US03/29776, filed Sep. 19, 2003 and published Apr. 1, 2004 as International Publication No. WO 2004/026633; and/or PCT Application No. PCT/US2004/015424, filed May 18, 2004 and published on Dec. 2, 2004, as International Publication No. WO 2004/103772; and U.S. provisional application Ser. No. 60/525,952, filed Nov. 26, 2003 by Lynam for MIRROR REFLECTIVE ELEMENT FOR A VEHICLE, which are all hereby incorporated herein by reference, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319; and 6,315,421 (the entire disclosures of which are hereby incorporated by reference herein), that can benefit from the present invention.

Optionally, the mirror assembly may comprise an electro-optic or electrochromic mirror assembly and may include an electro-optic or electrochromic reflective element. The electrochromic mirror element of the electrochromic mirror assembly may utilize the principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference, and/or as disclosed in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Granquist, EDS., Optical Engineering Press, Wash. (1990), which are hereby incorporated by reference herein; and/or as described in U.S. patent application Ser. No. 10/054,633, filed Jan. 22, 2002, now U.S. Pat. No. 7,195,381, which are hereby incorporated herein by reference. Optionally, the electrochromic circuitry and/or a glare sensor (such as a rearward facing glare sensor that receives light from rearward of the mirror assembly and vehicle through a port or opening along the casing and/or bezel portion and/or reflective element of the mirror assembly) and circuitry and/or an ambient light sensor and circuitry may be provided on one or more circuit boards of the mirror assembly. The mirror assembly may include one or more other displays, such as the types disclosed in U.S. Pat. Nos. 5,530,240 and/or 6,329,925, which are hereby incorporated herein by reference, and/or display-on-demand transflective type displays, such as the types disclosed in U.S. Pat. Nos. 5,668,663; 5,724,187 and/or 6,690,268, and/or in U.S. patent application Ser. No. 10/054,633, filed Jan. 22, 2002, now U.S. Pat. No. 7,195,381; Ser. No. 11/021,065, filed Dec. 23, 2004, now U.S. Pat. No. 7,255,451; Ser. No. 11/226,628, filed Sep. 14, 2005, and published on Mar. 23, 2006 as U.S. Patent Publication No. 2006/0061008; and/or Ser. No. 10/538,724, filed Jun. 13, 2005, and published Mar. 9, 2006 as U.S. Publication No. 2006/0050018; Ser. No. 10/528,269, filed Mar. 17, 2005, now U.S. Pat. No. 7,274,501; and/or Ser. No. 10/533,762, filed May 4, 2005, now U.S. Pat. No. 7,184,190, and/or PCT Application No. PCT/US03/29776, filed Sep. 9, 2003 and published Apr. 1, 2004 as International Publication No. WO 2004/026633, which are all hereby incorporated herein by reference. The thicknesses and materials of the coatings on the substrates, such as on the third surface of the reflective element assembly, may be selected to provide a desired color or tint to the mirror reflective element, such as a blue colored reflector, such as is known in the art and such as described in U.S. Pat. Nos. 5,910,854 and 6,420,036, and in U.S. patent application Ser. No. 10/528,269, filed Mar. 17, 2005, now U.S. Pat. No. 7,274,501, and in PCT Application No. PCT/US03/29776, filed Sep. 9, 2003 and published Apr. 1, 2004 as International Publication No. WO 2004/026633, which are all hereby incorporated herein by reference.

Optionally, the mirror assembly and/or prismatic or electrochromic reflective element may include one or more displays, such as for the accessories or circuitry described herein. The displays may be similar to those described above, or may be of types disclosed in U.S. Pat. Nos. 5,530,240 and/or 6,329,925, which are hereby incorporated herein by reference, and/or may be display-on-demand or transflective type displays, such as the types disclosed in U.S. Pat. Nos. 6,690,298; 5,668,663 and/or 5,724,187, and/or in U.S. patent application Ser. No. 10/054,633, filed Jan. 22, 2002, now U.S. Pat. No. 7,195,381; Ser. No. 11/226,628, filed Sep. 14, 2005 by Karner et al., and published on Mar. 23, 2006 as U.S. Patent Publication No. 2006/0061008; and/or Ser. No. 10/993,302, filed Nov. 19, 2004, now U.S. Pat. No. 7,338,177; and/or in U.S. provisional applications, Ser. No. 60/525,952, filed Nov. 26, 2003 by Lynam for MIRROR REFLEC- TIVE ELEMENT FOR A VEHICLE; Ser. No. 60/717,093, filed Sep. 14, 2005 by Lynam; and/or Ser. No. 60/732,245, filed Nov. 1, 2005 by Weller for INTERIOR REARVIEW MIRROR ASSEMBLY WITH DISPLAY, and/or in PCT Application No. PCT/US03/29776, filed Sep. 19, 2003 and published Apr. 1, 2004 as International Publication No. WO 2004/026633, which are all hereby incorporated herein by reference. Optionally, a prismatic reflective element may comprise a display on demand or transflective prismatic element (such as described in PCT Application No. PCT/US03/29776, filed Sep. 19, 2003 and published Apr. 1, 2004 as International Publication No. WO 2004/026633; and/or U.S. patent application Ser. No. 10/993,302, filed Nov. 19, 2004, now U.S. Pat. No. 7,338,177; and/or U.S. provisional application, Ser. No, 60/525,952, filed Nov. 26, 2003 by Lynam for MIRROR REFLECTIVE ELEMENT FOR A VEHICLE, which are all hereby incorporated herein by reference) so that the displays are viewable through the reflective element, while the display area still functions to substantially reflect light, in order to provide a generally uniform prismatic reflective element even in the areas that have display elements positioned behind the reflective element.

Optionally, the display and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 6,690,268; 6,672,744; 6,386,742; and 6,124,886, and/or U.S. patent application Ser. No. 10/739,766, filed Dec. 18, 2003, now U.S. Pat. No. 6,877,888; and/or Ser. No. 10/355,454, filed Jan. 31, 2003, now U.S. Pat. No. 6,824,281, and/or PCT Application No. PCT/US03/03012, filed Jan. 31, 2003 and published Aug. 7, 2003 as International Publication No. WO 03/065084, and/or PCT Application No. PCT/US03/40611, filed Dec. 19, 2003 and published Jul. 15, 2004 as International Publication No. WO 2004/058540, and/or PCT Application No. PCT/US04/15424, filed May 18, 2004 and published on Dec. 2, 2004, as International Publication No. WO 2004/103772, which are hereby incorporated herein by reference.

Optionally, and with reference to FIGS. 6 and 15, the mirror assembly may include a user actuatable input or inputs 15 to activate or deactivate or adjust one or more accessories of the mirror assembly or accessory module or console or of the vehicle. The inputs 15 may be positioned at the mirror casing 12 or bezel portion 14 of the mirror assembly where they may be readily accessible by the driver or occupant of the vehicle. The inputs may comprise push buttons or the like or touch sensitive elements or sensors or proximity sensors or the like that may be selectably touched or depressed or approached to activate/deactivate/adjust the accessory or accessories, as discussed below. Optionally, similar user inputs 76 (FIG. 15) may be provided at the frame portion or bezel portion 72b of the display screen 18' for activation/deactivation or control of one or more functions or features of the display screen and/or associated accessories or systems. The inputs may be on the frame of the display screen and around the display screen or elsewhere on the display screen module, such as on the display screen panel.

Optionally, and desirably, the user inputs may comprise one or more touch sensitive elements or touch sensors or proximity sensors positioned along the plastic mirror portion, such as the plastic casing or plastic bezel portion of the mirror assembly. The touch sensors or proximity sensors may be molded into the plastic mirror portion when the plastic mirror portion is formed or may be positioned in pockets within the plastic casing or plastic bezel portion, such that touching or approaching the plastic mirror portion with a finger or the like in the region where the touch sensor is positioned will actuate the touch sensor to provide the desired control function. The touch sensor thus may provide control or adjustment of one or more accessories, without the mechanical components and costs associated with known mechanical buttons and switches and the like. The touch sensors may be associated with or electrically connected to circuitry or a printed circuit board of the mirror assembly or of the vehicle or of an accessory module or console or the like of the vehicle or mirror assembly, whereby actuation of the touch sensor or sensors causes a corresponding activation or deactivation or adjustment or control of a desired or associated accessory or function, as also discussed below.

The touch sensitive elements or touch sensors or proximity sensors may utilize aspects of touch sensitive elements of the types described in U.S. Pat. Nos. 5,594,222; 6,001,486; 6,310,611; 6,320,282; and 6,627,918, and U.S. patent application Ser. No. 09/817,874, filed Mar. 26, 2001 by Quist et al., now U.S. Pat. No. 7,224,324, which are hereby incorporated herein by reference, or may comprise proximity sensors of the types, described in U.S. Pat. Publication No. 2002/0044065, published Apr. 18, 2002 by Quist et al.; now U.S. Pat. No. 7,224,324; and/or U.S. patent application Ser. No. 10/933,842, filed Sep. 3, 2004, now U.S. Pat. No. 7,249,860; Ser. No. 10/538,724, filed Jun. 13, 2005, and published Mar. 9, 2006 as U.S. Publication No. 2006/0050018; and/or Ser. No. 10/956,749, filed Oct. 1, 2004, now U.S. Pat. No. 7,446,924; and/or PCT Application No, PCT/US03/40611, filed Dec. 19, 2003 and published Jul. 15, 2004 as International Publication No. WO 2004/058540, which are hereby incorporated herein by reference, or may comprise inputs molded within the bezel of the mirror assembly, such as described in U.S. provisional applications, Ser. No. 60/535,559, filed Jan. 9, 2004 by Lindahl for MIRROR ASSEMBLY; and/or Ser. No. 60/553,517, filed Mar. 16, 2004 by Lindahl et al. for MIRROR ASSEMBLY, which are hereby incorporated herein by reference, or may comprise membrane type switches, such as described in U.S. provisional applications, Ser. No. 60/575,904, filed Jun. 1, 2004 by Uken for MIRROR ASSEMBLY FOR VEHICLE; and/or Ser. No. 60/624,320, filed Nov. 2, 2004 by Uken for MIRROR ASSEMBLY FOR VEHICLE, which are hereby incorporated herein by reference; and/or the like, without affecting the scope of the present invention. For example, the membrane type inputs or buttons or switches may be placed at the reflective element of the mirror assembly or may be placed at or on the display screen of the extendable/retractable display screen device or module.

For example, the proximity sensor may comprise a capacitive proximity sensor that is operable to detect a capacitive disturbance or electric field detection or disturbance at or near the sensor when an object, such as a person's finger or the like, enters the electric field at the sensor. The proximity sensor may detect such a presence without requiring actual contact with the person's finger, and may detect the presence of the person's finger when the person's finger is within a few millimeters of the sensor, such as within approximately 3 mm or about 1 mm or closer. Optionally, the touch sensitive element may comprise a sensor of the types commercially available from TouchSensor Technologies, LLC of Wheaton, Ill. For example, the sensor may be operable to generate an electric field and to detect the presence of a conductive mass entering the field. When a voltage is applied to the sensor, the sensor generates the electric field, which emanates through any dielectric material, such as glass or plastic or the like (such as through the plastic bezel portion or the plastic casing of the mirror assembly or through the reflective element), at the sensor. When a conductive mass (such as a person's finger or the like, or metal or the like) enters the electric field, the sensor may detect a change in the field and may indicate such a detection, such as by closing a switch contact or the like.

Optionally, a proximity or touch sensor at the mirror assembly or display screen module may utilize an infrared (IR) transmitter/receiver to detect a person's finger (or other object) close to the mirror bezel or display screen frame (or elsewhere if desired) and trigger or activate/deactivate or adjust/control an accessory or function or the like in response to such detection. The IR transmitter/receiver, such as, for example, an integrated high efficiency IR emitter and photo diode device, such as an Agilent HSDL-9100 Miniature Surface-Mount Proximity Sensor commercially available from Agilent Technologies, Inc., may be positioned at or embedded in or behind the bezel or frame portion. The material of the bezel or frame portion may encompass or partially encompass the emitter and receiver and may comprise an opaque material that is at least partially transmissive to allow the IR radiation to pass therethrough. Optionally, the bezel or frame portion may include icons or indicia or may be formed as "finger cups" (with indentations or raised portions to define or demarcate the location of the sensors) to identify the sensors so that they are discernible to the driver or occupant of the vehicle.

The sensor may be implemented at the mirror assembly without requiring any new interface designs and with no need for electronic modification of a mirror assembly designed for conventional electromechanical buttons or switches. Because the touch sensitive elements or sensors have no moving parts to wear out, such touch sensitive elements may provide enhanced durability and longer life cycles over conventional mechanical switches.

As shown in FIGS. 6 and 15, the touch sensors or proximity sensors may be positioned along, such as by being embedded in the bezel material and/or being positioned behind the bezel portion of the mirror assembly (and/or at or around the frame portion of the display screen), where a user may touch or approach the sensor or sensors to activate/deactivate or control or adjust the associated accessory or function. By having the touch sensors or proximity sensors in and/or physically behind the plastic material of the mirror portion, the presence of the sensor need not necessarily be readily visible to or discernable to the driver and/or occupant of the vehicle. Optionally, the sensors may include demarcations or printing or the like to be visible or discernible to a user, or the sensors may be positioned within or behind the bezel portion (or elsewhere at the mirror assembly or display screen or accessory module or console or the like) with no readily visible or discernible demarcations to indicate their presence. For example, the bezel portion at the proximity/touch sensors may be color coded or may have icons or indicia or text or the like printed or screened thereon, or the sensors may be positioned at raised moldings or the like at the bezel or may be at respective illumination sources or the like to make the location of the sensors known to a user. Alternately, the location of the sensors may be substantially not readily visible or discernible at the mirror assembly, without affecting the scope of the present invention. In such applications where the locations of the proximity/touch sensors are not readily known or observed or discerned, it may be desirable to provide a display or displays along the reflective element at or above the sensors to indicate to the user the location and function of the proximity/touch sensors, as discussed below.

Likewise, in order to provide feedback to the user to indicate that the user successfully actuated the touch sensor or proximity sensor, it is envisioned that an illumination source, such as a light emitting diode (LED) or the like, may be positioned at or adjacent to a respective touch sensor, and may be energized or may glow when the touch sensor is actuated. The illumination source may be molded into the plastic bezel or frame portion (such as the plastic bezel portion or the plastic casing at which the touch sensor is positioned) or may be embedded or positioned in a pocket formed in the plastic bezel or frame portion. The plastic bezel or frame portion may have a thin plastic wall at the region of the illumination source, such that the glowing illumination source may be visible through the thin plastic wall when the touch sensor is successfully actuated.

Optionally, one or more touch sensors or proximity sensors may be positioned along the bezel portion of the mirror assembly, and the mirror assembly may include one or more displays 15a (FIG. 6), such as display on demand transflective type of displays, at the reflective element (and/or at or around the display screen) generally at or near or above the touch sensors. The display or displays may be operable to display an icon or character or text or indicia or the like that is associated with the function of the respective touch sensor when the touch sensor is actuated. The display thus may provide an indication of the function of the touch sensor and/or may provide an indication that the user successfully actuated the touch sensor. For example, touch sensor functions to activate and deactivate an accessory, such as, for example, a passenger side inflatable restraint (PSIR), an icon such as "PSIR on" may be energized or backlit or the like when the touch sensor is actuated to indicate that the PSIR is activated, and an icon such as "PSIR off" may be energized or backlit or the like when the touch sensor is actuated a second time to indicate that the PSIR is deactivated. The display icons or indicia may be energized or backlit for a period of time following the actuation of the touch sensor and then may be deactivated. If the touch sensors provide a specific function or control, the plastic mirror portion may have an icon or indicia or the like printed thereon that corresponds to the function of the respective touch sensor, and the display may then be activated to provide confirmation of a successful actuation of the touch sensor.

Optionally, and desirably, multiple touch sensors or proximity sensors may be positioned along the bezel portion of the mirror assembly and/or along the bezel or frame portion of the display screen, and the mirror assembly and/or display screen may include one or more displays, such as display on demand transflective types of displays, at the reflective element and/or display screen and generally at or near or above the touch sensors (or elsewhere at the reflective element). The touch sensors may control one or more accessories or functions and the function of the touch sensors may change in response to user selections based on a menu driven display. For example, the display or displays may initially be operable to display icons or characters or text or indicia that are associated with initial or selected functions of the touch sensors, and then may be operable to display a second level or set of icons or characters or text or indicia that are associated with a selected second level or set of functions of the touch sensors. The mirror assembly thus may provide a menu driven control system, whereby the function or functions of the touch sensors may change or may be reconfigured depending on what initial function is selected or is displayed on the reflective element.

For example, the touch sensors may initially correspond to a particular or respective accessory or control function and a user may first actuate one of the touch sensors to cause a display to show a selectable function or functions associated with the particular accessory, such as multiple functions pertaining to the particular accessory. For example, one of the touch sensors may be actuatable to control or adjust a compass system and display, whereby the display may show functions or controls for the compass system at respective ones of the touch sensors, such as "on" at one of the touch sensors, "off" at another one of the touch sensors, "cal" at another touch sensor (for calibrating the compass system or manually activating a calibration mode of the compass system), "zone" at another touch sensor (for changing the zone of the compass system), and/or the like. After touching the "compass" touch sensor to actuate the compass menu, the user may then actuate an appropriate touch sensor associated with the desired function. The user actuatable control or input thus provides two or more levels of controls, where the first level (or first actuation of one of the touch sensors) causes the display to show the second level of associated control functions and causes the function of the touch sensors to change corresponding to what is displayed at the reflective element. The touch sensors may then toggle the desired function or may adjust the desired function or may select a third level of menus or functions for the touch sensors to control or adjust.

Optionally, an initial actuation of any one of the touch sensors or proximity sensors causes the display to display or indicate the initial or default function of the touch sensors, such as "compass", "temperature", "PSIR", "clock", "lights", and/or the like for the user to select to switch the display and touch sensors to the desired control level. For example, a user may initially actuate any of the touch sensors to view a display of their initial or default functions and then may selectably actuate the touch sensor at the "lights" icon, whereby the display may display different lights to activate/deactivate, such as, for example, "map" (for activating/deactivating map reading lights of the mirror assembly or of an accessory console or overhead system or console or of the vehicle), "ceiling" or "console" (for activating/deactivating ceiling lights of the vehicle or of an accessory console or overhead system or console), "rear seat" (for activating/deactivating lights that illuminate the rear seat of the vehicle, such as for a baby view camera or the like, such as described in U.S. Pat. Nos. 5,877,897 and/or 6,690,268, which are hereby incorporated herein by reference), "door" (for activating/deactivating lights in the vehicle doors), and/or other lights of the mirror assembly or an accessory module or an accessory console or overhead system or console or of the vehicle.

Optionally, the intensity or brightness of the display or displays and/or the brightness and contrast of the display screen may be automatically adjusted in response to an ambient light sensor or glare detector, such as a sensor of the interior rearview mirror assembly or vehicle or of a console or module or the like, such as the types disclosed in U.S. Pat. Nos. 4,793,690 and/or 5,193,029, which are hereby incorporated herein by reference, without affecting the scope of the present invention. In applications where the mirror reflective element assembly comprises an electro-optic or electrochromic mirror reflective element assembly, the displays and/or display screen may be automatically adjusted in response to the ambient light sensor or glare detector associated with the electro-optic or electrochromic circuitry or system. The display intensity of the displays and/or display screen may be adjusted in response to the photo sensor or light sensor (such as a photo sensor 80 (FIGS. 15 and 20-27) at the bezel of the minor assembly and directed rearwardly toward the rear of the vehicle), and may be increased during daytime lighting conditions and reduced at dusk or during nighttime lighting conditions. The intensity of the displays and/or display screen may be substantially continuously adjusted or may be adjusted in steps in response to the light sensor or sensors, such as by utilizing aspects of the displays described in U.S. Pat. Nos. 5,416,313 and 5,285,060, which are hereby incorporated herein by reference, or may be adjusted when the touch sensors are actuated.

Optionally, and for mirror assemblies having electro-optic reflective element assemblies or cells, such as electrochromic reflective element assemblies, the mirror assembly may include an indicator or indicators or displays that function to indicate to the driver or occupant of the vehicle that the electro-optic reflective element is energized or activated or darkened or is dimming and that may function to indicate the degree of energization or activation or darkening or dimming. Typically, it is difficult to readily determine whether or not an electro-optic or electrochromic reflective element assembly is darkening (or otherwise reducing the reflectivity of light incident thereon), particularly during nighttime conditions and when rearward approaching headlights are detected. Although an LED or other indicator may be used to indicate that the electro-optic reflective element assembly is operable (such as when the circuitry for driving or energizing the reflective element assembly is connected to the power source or the like and thus is ready to activate or energize or darken the reflective element assembly), such an indicator does not provide a further indication when the reflective element assembly is actually operating or activated or energized or darkened (and is thus reducing the reflectivity of light incident on the reflective element as compared to the non-energized or bleached state of the reflective element assembly or cell).

Thus, it may be desirable to provide an indicator or display that is viewable by the driver and that indicates that the reflective element assembly is operating or is energized or activated (and thus darkened or tinted or the like from its non-operating or non-energized or non-activated or bleached state). Such an indicator or display may provide an enhancement of the perceived value of the electro-optic feature to the driver or owner of the vehicle. Optionally, the indicator or display may also provide an indication of the degree of energization or activation or darkening or tinting of the reflective element assembly. The present invention thus contemplates an affirmative indicator, or display that is readily viewable by, recognizable by and interpretable by the driver, and that indicates the degree of electro-optic or electrochromic activity, such as when glaring rearward approaching headlights are detected under ambient driving conditions (and that cause the electro-optic circuitry to power or energize the reflective element assembly), and when the electro-optic circuitry thus powers or energizes or activates or darkens the reflective element assembly or cell to reduce the reflectivity of light incident on the reflective element assembly or cell.

For example, a mirror assembly of the present invention may include a series of indicators, such as a series of light emitting diodes (LEDs) or the like, or a light bar or the like, positioned along the bezel of the mirror assembly (or elsewhere at or near the mirror assembly and/or reflective element, or behind the reflective element assembly and thus viewable through the reflective element or the like). The indicators may be independently and/or sequentially activated in response to a particular degree or threshold degree of activation of the reflective element assembly. The indicators may be activated in a linear manner, where each subsequent indicator is activated after substantially similar changes in the degree of darkening or activation or energization of the reflective element assembly, or more of a logarithmic manner (where the subsequent indicators are activated after decreasing degrees of change in the degree of darkening or activation or energization of the reflective element assembly), in order to better match the driver's eye's response to the darkening or reduction in reflectivity of the electro-optic or electrochromic reflective element assembly or cell.

For example, the mirror assembly may include five LEDs, where one of the LEDs may be activated in response to the electro-optic reflective element assembly first being energized and providing a first threshold degree of darkening or energization to reduce the reflectivity of light incident on the reflective element assembly, and with each subsequent or sequential LED being activated in response to the degree of darkening or energization reaching respective threshold levels. For example, the first LED or indicator may be activated or illuminated when the electro-optic reflective element assembly is activated and provides a degree of darkening that reduces the reflectivity of light incident on the reflective element to about 40 percent (typically, a bleached or non-energized cell provides about 70 to 80 percent or thereabouts reflectivity of light incident thereon). When the darkening increases and thus reduces the reflectivity to about, for example, 20 percent, the second LED may also be illuminated. Likewise, the third LED may be activated when the darkening increases and thus reduces the reflectivity of light incident on the reflective element to about, for example, 15 percent, and the fourth LED may be activated when the darkening increases and thus reduces the reflectivity of light incident on the reflective element to about, for example, 10 percent, and finally, the fifth LED may be activated when the darkening increases and thus reduces the reflectivity of light incident on the reflective element to about, for example, 5 percent.

Alternately, the LEDs may be activated in response to more of a linear change in the reflectivity of the reflective element assembly, where an additional LED is activated after an increase in darkening or decrease in reflectivity of light incident on the reflective element assembly that is substantially the same for each indicator. For example, a first LED may be activated when the reflectivity of light incident on the reflective element is reduced from about 80 percent to 65 percent, a second LED may be activated when the reflectivity is reduced to about 50 percent, a third LED may be activated when the reflectivity is reduced to about 35 percent, a fourth LED may be activated when the reflectivity is reduced to about 20 percent and a fifth LED may be activated when the reflectivity is reduced to about 5 percent. The indicators or display may be activated in response to other steps or intervals of darkening of the reflective element assembly or in response to different levels or degrees of current applied across the conductive coatings or layers of the reflective element assembly reflectivity of light incident thereon, or in response to different levels of reflectivity of light incident on the reflective element assembly, without affecting the scope of the present invention.

Although described as a series of illumination sources, such as LEDs or the like, clearly other forms of indicators or displays may provide similar indications to the driver of the vehicle, without affecting the scope of the present invention. For example, the indicator may comprise a light bar that may fill up depending on the level of coloring or darkening occurring (such as between zero percent and 100 percent) at or in the reflective element assembly. The light bar may be oriented generally horizontally, such as along the upper or lower bezel portion of the mirror assembly, or may be oriented generally vertically, such as along one of the side bezel portions of the mirror assembly, or may be positioned behind the reflective element and viewable therethrough, without affecting the scope of the present invention.

Optionally, a display on demand or transflective display may be provided that provides an indication of the activation or energization of the reflective element assembly and degree thereof. Optionally, the series of indicators or light bar or display may be positioned behind the reflective element assembly (such as at a window formed in the reflective coating of the reflective element or behind a transflective reflective element assembly) and viewable through the reflective element assembly. Optionally, the intensity of the display or LEDs may be modulated or adjusted so as to increase the intensity as more of the display or LEDs are illuminated to provide enhanced viewing of the display, particularly when the indicators or displays are viewed through the darkened reflective element assembly or cell. As each indicator is illuminated or as the display or indicator is adjusted to indicate an increase in coloring or darkening or dimming of the reflective element assembly, the intensity of the illuminated indicators or the display may increase to account for the increase in coloring or darkening of the reflective element assembly, such that the intensity of the indicators or display appears substantially unchanged to the driver of the vehicle (for example, the intensity of a first indicator in a linear indicator array increases when the electrochromic medium further dims such that its adjacent second indicator illuminates; this is because the now further light attenuating electrochromic medium would otherwise reduce the observed intensity of the first indicator). The displays or indicators or LEDs may be adjustable via circuitry utilizing aspects of the systems described in U.S. Pat. Nos. 5,530,240; 5,416,313; and 5,285,060, which are hereby incorporated herein by reference.

Therefore, the mirror assembly of the present invention may provide an affirmative indicator or series of indicators or display that is readily viewable by, recognizable by and interpretable by the driver and that indicates the degree of electro-optic or electrochromic activity of the mirror assembly. The indicator or display may provide an indication of initial activity or activation or energization of the reflective element assembly and may provide further indication of an increase in energization or darkening of the reflective element assembly or a decrease in reflectivity of light incident thereon. Because such a feature may not be desirable to all drivers, the mirror assembly may include a user interface or input or button or switch that allows a user to selectively deactivate or disable the function, such that the indicators or display will not be activated. Optionally, indicia may be formed at the conductive and reflective coatings of the reflective element to indicate the darkening or dimming of the reflective element, such as by utilizing aspects described in U.S. provisional applications, Ser. No. 60/681,250, filed May 16, 2005; Ser. No. 60/690,400, filed Jun. 14, 2005; Ser. No. 60/695,149, filed Jun. 29, 2005; and Ser. No. 60/730,334, filed Oct. 26, 2005, which are all hereby incorporated herein by reference.

Although shown and described as being positioned at the bezel or casing portion of the mirror assembly, it is envisioned that the touch sensors or proximity sensors or elements and/or indicators or displays may be positioned elsewhere at or on the mirror assembly and may be positioned at the reflective element of the mirror assembly, such as behind the reflective element (where the presence of a person's finger at or near the reflective element may actuate the touch sensor or proximity sensor), without affecting the scope of the present invention. The reflective element assembly may comprises a display on demand transflective display and may include such proximity sensors to function as a touch screen (or proximity screen) for selecting or inputting the desired functions or inputs. It is also envisioned that the touch sensors or proximity sensors and displays of the types described above may optionally be provided at the display screen device of the present invention, such as at or within the frame of the display screen device or behind the display screen such that the display screen may provide a touch screen to provide menu driven controls or selections, or the touch sensors may be provided at an overhead console or accessory system or module or the like (such as at the overhead accessory system or module discussed below), without affecting the scope of the present invention.

Also, although described as capacitive or electric field disturbance sensors that are actuatable by the user touching or approaching the plastic mirror portion or the reflective element or other mirror portion or module portion at the region corresponding to the touch sensor, it is envisioned that the proximity sensors or elements may comprise other touchless sensors or elements, such as antennae or antenna segments or the like that detect the presence of a person's finger at or near the region corresponding to the antenna segments, such as described in U.S. Ser. No. 10/956,749, filed Oct. 1, 2004, now U.S. Pat. No. 7,446,924, which is hereby incorporated herein by reference. Optionally, the inputs or sensors may comprise other types of sensors, such as touch or proximity switches of the types described in PCT Application No. PCT/US03/40611, filed Dec. 19, 2003 and published Jul. 15, 2004 as International Publication No. WO 2004/058540; and/or U.S. Pat. Nos. 6,001,486; 6,310,611; 6,320,282; and 6,627,918; and/or U.S. patent application Ser. No. 09/817,874, filed Mar. 26, 2001 by Quist et al., now U.S. Pat. No. 7,224,324; Ser. No. 10/956,749, filed Oct. 1, 2004, now U.S. Pat. No. 7,446,924; Ser. No. 10/538,724, filed Jun. 13, 2005, and published Mar. 9, 2006 as U.S. Publication No. 2006/0050018; Ser. No. 11/021,065, filed Dec. 23, 2004, now U.S. Pat. No. 7,255,451; Ser. No. 11/140,396, filed May 27, 2005, now U.S. Pat. No. 7,360,932; and/or Ser. No. 10/933,842, filed Sep. 3, 2004, now U.S. Pat. No. 7,249,860; and/or U.S. provisional applications, Ser. No. 60/624,320, filed Nov. 2, 2004 by Uken for MIRROR ASSEMBLY FOR VEHICLE; Ser. No. 60/563,342, filed Apr. 19, 2004 by Bareman et al. for METHOD OF MANUFACTURING ELECTRO-OPTIC MIRROR CELL; and/or Ser. No. 60/629,926, filed Nov. 22, 2004 by McCabe et al. for METHOD OF MANUFACTURING ELECTRO-OPTIC MIRROR CELL, which are hereby incorporated herein by reference.

Optionally, the user inputs of the mirror assembly or display or module may comprise other types of buttons or switches for controlling or activating/deactivating one or more electrical accessories or devices of or associated with the mirror assembly. The mirror assembly may comprise any type of switches or buttons, such as touch or proximity sensing switches, such as touch or proximity switches of the types described above, or the inputs may comprise other types of buttons or switches, such as those described in U.S. patent application Ser. No, 11/029,695, filed Jan. 5, 2005, now U.S. Pat. No. 7,253,723; and/or U.S. provisional applications, Ser. No. 60/553,517, filed Mar. 16, 2004; Ser. No. 60/535,559, filed Jan. 9, 2004; Ser. No. 60/690,401, filed Jun. 14, 2005; and Ser. No. 60/719,482, filed Sep. 22, 2005, which are hereby incorporated herein by reference, or such as fabric-made position detectors, such as those described in U.S. Pat. Nos. 6,504,531; 6,501,465; 6,492,980; 6,452,479; 6,437,258; and 6,369,804, which are hereby incorporated herein by reference. For example, the inputs may comprise a touch or proximity sensor of the types commercially available from TouchSensor Technologies, LLC of Wheaton, Ill. The touch or proximity sensor may be operable to generate an electric field and to detect the presence of a conductive mass entering the field. When a voltage is applied to the sensor, the sensor generates the electric field, which emanates through any dielectric material, such as plastic or the like, at the sensor. When a conductive mass (such as a person's finger or the like, or metal or the like) enters the electric field, the sensor may detect a change in the field and may indicate such a detection. Other types of switches or buttons or inputs or sensors may be incorporated to provide the desired function, without affecting the scope of the present invention.

Optionally, the user inputs or buttons may comprise user inputs for a garage door opening system, such as a vehicle based garage door opening system of the types described in U.S. Pat. Nos. 6,396,408; 6,362,771; and 5,798,688, and/or U.S. patent application Ser. No. 10/770,736, filed Feb. 3, 2004, now U.S. Pat. No. 7,023,322; and/or U.S. provisional applications, Ser. No. 60/502,806, filed Sep. 12, 2003 by Taylor et al. for GARAGE DOOR OPENING SYSTEM FOR VEHICLE; and Ser. No. 60/444,726, filed Feb. 4, 2003 by Baumgardner et al. for GARAGE DOOR OPENING SYSTEM FOR VEHICLE, which are hereby incorporated herein by reference. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,3,77; and 6,420,975; 6,477,464; and/or 6,678,614; and/or U.S. patent applications, Ser. No. 10/456,599, filed Jun. 6, 2003, now U.S. Pat. No. 7,004,593; Ser. No. 10/645,762, filed Aug. 20, 2003, now U.S. Pat. No. 7,167,796; Ser. No. 10/964,512, filed Oct. 13, 2004, now U.S. Pat. No. 7,308,341; and Ser. No. 10/422,378, filed Apr. 24, 2003, now U.S. Pat. No. 6,946,978; and/or PCT Application No. PCT/US03/40611, filed Dec. 19, 2003 and published Jul. 15, 2004 as International Publication No. WO 2004/058540, and/or PCT Application No. PCT/US03/308877, filed Oct. 1, 2003 and published Apr. 15, 2004 as International Publication No. WO 2004/032568, which are all hereby incorporated herein by reference.

Optionally, the mirror assembly may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; and/or 5,669,698, and/or U.S. patent application Ser. No. 10/054,633, filed Jan. 22, 2002, now U.S. Pat. No. 7,195,381; Ser. No. 10/745,056, filed Dec. 22, 2003, now U.S. Pat. No. 6,971,775; and/or Ser. No. 10/933,842, filed Sep. 3, 2004, now U.S. Pat. No. 7,249,860, microphones, such as disclosed in U.S. Pat. Nos. 6,243,003; 6,278,377; and/or 6,420,975; and/or U.S. patent application Ser. No. 10/529,715, filed Mar. 30, 2005, now U.S. Pat. No. 7,657,052; and/or PCT Application No. PCT/US03/30877, filed Oct. 1, 2003, and published Apr. 15, 2004 as International Publication No. WO 2004/032568, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 5,929,786 and/or 5,786,772, and/or U.S. patent application Ser. No. 10/427,051, filed Apr. 30, 2003, now U.S. Pat. No. 7,038,577; and Ser. No. 10/209,173, filed Jul. 31, 2002, now U.S. Pat. No. 6,882,287; and/or U.S. provisional application Ser. No. 60/638,687, filed Dec. 23, 2004, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 6,690,268 and 6,847,487; and/or U.S. provisional applications, Ser. No. 60/614,644, filed Sep. 30, 2004; Ser. No. 60/618,686, filed Oct. 14, 2004; Ser. No. 60/628,709, filed Nov. 17, 2004; Ser. No. 60/644,903, filed Jan. 11, 2005; Ser. No. 60/667,049, filed Mar. 31, 2005; and/or U.S. patent application Ser. No. 11/105,757, filed Apr. 14, 2005, now U.S. Pat. No. 7,526,103, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; and/or 6,731,205; and/or U.S. patent application Ser. No. 11/232,324, filed Sep. 21, 2005, now U.S. Pat. No. 7,423,522; and/or U.S. provisional application Ser. No. 60/611,796, filed Sep. 21, 2004), and/or an ONSTAR® system, a compass, such as disclosed in U.S. Pat. Nos. 5,924,212; 4,862,594; 4,937,945; 5,131,154; 5,255,442; and/or 5,632,092, and/or any other accessory or circuitry or the like (with all of the above-referenced patents and PCT and U.S. patent applications being commonly assigned to Donnelly Corporation, and with the disclosures of the referenced patents and patent applications being hereby incorporated herein by reference in their entireties).

Optionally, the mirror assembly, or a pod or module at or near or associated with the mirror assembly, may include a receptacle or port or socket for connecting or docking or receiving a digital data storage device, such as a memory stick or the like, so that data may be exchanged between digital devices of the vehicle (that may be disposed at or about the interior mirror assembly or elsewhere in the vehicle) and the memory stick or data storage device or the like. The mirror assembly thus may function to download or upload digital information from the device or memory stick or to the device or memory stick, and may provide a communication means with the vehicle speakers or a display for playback of the recorded information. The mirror assembly may also include appropriate circuitry and hardware/software for downloading and utilizing or playing or displaying the data or information streamed into the circuitry from the digital data storage device at the port.

For example, the mirror assembly may include an industry standard data exchange connector or port, such as a universal serial bus (USB) port or the like, for connection to a digital playback device or to digital data storage devices or the like, such as a memory stick or the like. Thus, a user can readily plug their digital device into the port at the mirror assembly (or at a module or pod at or near or associated with the mirror assembly) to download or upload or stream the desired data or information. For example, a user can digitally record music as a digital file onto their memory stick and may bring the music into the vehicle for playback by plugging in or connecting the memory stick to the data port at the mirror assembly. Likewise, a user can digitally record music or other information onto the memory stick at the mirror assembly, and may then carry or take the music or information on the memory stick from the vehicle to their home or office or other desired location.

The driver of the vehicle thus may choose to bring their portable computer or digital storage device into the vehicle and may stream data into the vehicle for storage or processing or playback (such as at the video display screen or other video screen or display screen or the like) at or near or associated with the mirror assembly. Optionally, and alternatively, the user may use the digital storage device and data port to stream data out of the vehicle to store data (such as recorded music or the like) onto the digital storage device. The port may be located anywhere at the mirror assembly, or may be located at a pod or module at or near or associated with the mirror assembly, without affecting the scope of the present invention. Optionally, the mirror assembly may also or otherwise include a receiver or socket or port for connection to a digital playback device, such as an MP3 player or other digital device, such as an iPod or the like. The data port and/or other receiver or port may be located at the mirror assembly or at an accessory pod or module or a windshield electronics module or the like, which may be located at or near the mirror assembly or which may be associated with the mirror assembly or which may be located at a header portion or console or the like of the vehicle, without affecting the scope of the present invention.

Optionally, the display system of the present invention may provide a graphic overlay, such as icons or text or indicia or the like, at the display screen. In applications with digital cameras or digital camera outputs, the digital signals from the digital camera or digital environment may be readily digitally married with computer graphics or the like and displayed on a display screen. Such digital signals may be communicated from the camera to the display device (which is remote from the camera) via various protocols or nodes, such as Bluetooth™, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA) and/or the like.

However, in many applications, a camera or image sensor may be selected or used that provides a non-digital or analog video signal, such as an NTSC signal or a PAL signal or the like. For example, such non-digital or analog communications may be desired to communication the video signal from a rear portion of the vehicle to a display system at or near a front portion of the vehicle cabin (typically via wires connected between the camera and the display device). When the analog video signal or images are displayed, it may be desired to provide such graphic or text or iconistic overlays at the display to enhance the information provided by the display screen.

The screen display and graphic overlay or overlay screen display of the present invention provides an economical video on-screen character or iconistic or graphical overlay for vehicle rear vision assist (such as, for example, a forward, sideward or rearward parking assist or backup aid or the like) and other vehicle-based video or imaging applications. The low cost wiring between the analog camera and the display device may be utilized, while still providing the graphic overlays on the video images being displayed. The overlay screen display thus comprises economical circuitry that generates an on-screen display that overlays user-defined text or icons or graphical overlays in real-time onto either an incoming NTSC or PAL video signal feed (such as is output from an analog video camera) or onto a self-generating background screen, directly onto a video mirror display or other vehicular rear vision application or any NTSC or PAL (video in) television signal, DVD signal, VCR signal or the like.

Optionally, in one embodiment, a fixed grid or reticule pattern may be overlayed onto the real-time rear camera image to indicate one or more physical reference points (such as, for example, a vehicle bumper, the sides of vehicle, a virtual trailer hitch location, and/or the like) or distance information or other relevant or desired information. The overlay screen display could also overlay monochrome text or colored text onto an incoming video source or could display colored text on a self-generated colored background screen (such as, for example, a blue screen). Text color, blinking, zoom level, cursor positioning, and the background color may be controlled from user inputs, such as push-button controls or the like, or by the vehicle's multiplexed communication system or the like.

Other commands for controlling the video display screen and overlay may include screen clearing, showing/hiding the text, scrolling the text, blinking or flashing or intermittently displaying the text and enabling/disabling translucent text (a feature that allows video to pass through the text, such as in a similar manner as some television networks do with their logos). The overlay information may comprise various vehicle information to display such information for viewing by the driver of the vehicle. For example, the overlay information may include GPS coordinates indicating the vehicle's location or a location of another place, such as a waypoint of a programmed travel route or a destination location or the like, a compass or directional heading of the vehicle, the outside temperature, or warnings or alerts, or other information that a driver may wish to see while driving the vehicle. Optionally, the overlay information may comprise telematics information, such as, for example, hands free commands, turn by turn instructions, caller ID, traffic information, and/or the like.

Figure 53:
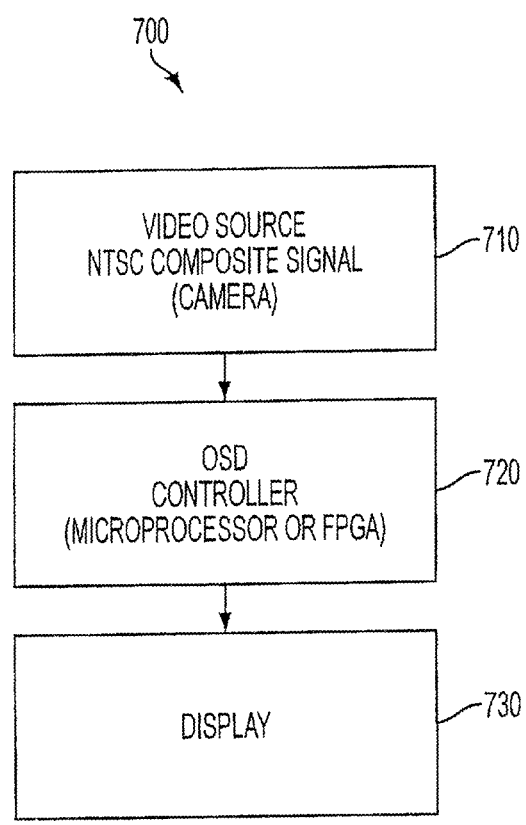
FIG. 53 is a block diagram of a graphic overlay system in accordance with the present invention.

The overlay screen display controller circuitry may be incorporated in the rearview mirror or at an interface module located between the video source or camera and the display. For example, and as shown in FIG. 53, a graphic overlay system 700 may include a video signal 710, such as a video source NTSC composite signal or the like, which may be provided from a camera or image sensor to the overlay screen display (OSD) controller 720, such as a microprocessor or FPGA or the like. The controller 720 may generate the overlay information and the video signal and overlay information may be provided to the display 730. The controller 720 thus may function to receive the composite video signal, add the appropriate information (such as icons or indicia or text or the like) and resends the composite signal out to be displayed at the video display screen.

Using the present invention, graphical overlays and the like may be economically generated and overlayed/displayed on a video screen viewable by the driver (such as an interior mirror slide-out video screen) by a overlay screen display (OSD) video controller that is receiving a non-digital analog video signal from a non-digital, analog video camera (such as an NTSC analog camera or PAL camera or the like) mounted at the vehicle, such as at the rear of the vehicle to view rearward when reverse gear is engaged, and that generates the video feed to the video display screen seen by the driver, with a graphic overlay superimposed onto the NTSC or similar TV-protocol video feed from the rear mounted analog video camera (or other camera mounted elsewhere at the vehicle with a corresponding field of view).

Optionally, a non-digital or analog video signal (such as an NTSC or PAL signal) may be fed or communicated to an analog to digital (A/D) converter to digitize or convert the signal to a digital format. The digitized signal may then be fed or communicated to a microprocessor or controller for digital processing, such as for adding a digital graphic overlay to the images of the video signal. The digitized signal, with digital graphic overlays, may then pass to a digital to analog (D/A) converter to convert the digitized signal with graphic overlays to a non-digital or analog signal, which is then communicated to the display device or element or screen, such as via, known analog signals, such as an NTSC or PAL signal or the like). The display system thus may provide graphic overlays to an analog camera signal so that the video images and graphic overlays, such as text, indicia, icons or the like, may be viewed at the display screen by the driver of the vehicle. The A/D converter, microprocessor and/or D/A converter may be located at any location between the analog camera and the display device, such as at the interior rearview mirror assembly or proximate to or near or associated with the interior rearview mirror assembly, or elsewhere at the vehicle, without affecting the scope of the present invention.

Optionally, the accessory or accessories, such as those described above and/or below, may be positioned at or within the mirror casing and may be included on or integrated in a printed circuit board positioned within the mirror casing, such as along a rear surface of the reflective element or elsewhere within a cavity defined by the casing, without affecting the scope of the present invention. The user actuatable inputs and/or touch sensors and/or proximity sensors and displays described above may be actuatable to control and/or adjust the accessories of the mirror assembly/system and/or overhead console and/or accessory module and/or vehicle. The connection or link between the controls and the display screen device and/or the navigation system and/or other systems and accessories of the mirror system may be provided via vehicle electronic or communication systems and the like, and may be connected via various protocols or nodes, such as Bluetooth™, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA) and/or the like, or via VHF or UHF or other wireless transmission formats, depending on the particular application of the mirror/accessory system and the vehicle. Optionally, the connections or links may be provided via various wireless connectivity or links, without affecting the scope of the present invention.

Optionally, the mirror assembly may include a compass system and compass circuitry, such as a compass system utilizing aspects of the compass systems described in U.S. patent application Ser. No. 10/933,842, filed Sep. 3, 2004, now U.S. Pat. No. 7,249,860; Ser. No. 10/456,599, filed Jun. 6, 2003, now U.S. Pat. No. 7,004,593; Ser. No. 11/226,628, filed Sep. 14, 2005, and published on Mar. 23, 2006 as U.S. Patent Publication No. 2006/0061008; and/or Ser. No. 09/999,429, filed Nov. 15, 2001, now U.S. Pat. No. 6,642, 851, and/or U.S. Pat. Nos. 4,546,551; 5,699,044; 4,953,305; 5,576,6.87; 5,632,092; 5,677,851; 5,708,410; 5,737,226; 5,802,727; 5,878,370; 6,087,953; 6,173,508; 6,222,460; and 6,513,252, and/or PCT Application No. PCT/US2004/015424, filed May 18, 2004 and published on Dec. 2, 2004, as International Publication No. WO 2004/103772, and/or European patent application, published Oct. 11, 2000 under Publication No EP 0 1043566, and/or U.S. provisional applications, Ser. No. 60/624,091, filed Nov. 1, 2004; Ser. No, 60/636,931, filed Dec. 17, 2004; Ser. No. 60/638,250, filed Dec. 21, 2004; Ser. No. 60/642,227, filed Jan. 7, 2005; and Ser. No. 60/653,787, filed Feb. 17, 2005, which are all hereby incorporated herein by reference. The compass circuitry may include compass sensors, such as a magneto-responsive sensor, such as a magneto-resistive sensor, a magneto-capacitive sensor, a Hall sensor, a magneto-inductive sensor, a flux-gate sensor or the like. The sensor or sensors may be positioned at and within a base portion of the mirror assembly so that the sensor/sensors is/are substantially fixedly positioned within the vehicle, or may be attached or positioned within the mirror casing. Note that the magneto-responsive sensor used with the mirror assembly may comprise a magneto-responsive sensor, such as a magneto-resistive sensor, such as the types disclosed in U.S. Pat. Nos. 5,255,442; 5,632,092; 5,802,727; 6,173,501; 6,427,349; and 6,513,252 (which are hereby incorporated herein by reference), or a magneto-inductive sensor, such as described in U.S. Pat. No. 5,878,370 (which is hereby incorporated herein by reference), or a magneto-impedance sensor, such as the types described in PCT Publication No, WO 2004/076971, published Sep. 10, 2004 (which is hereby incorporated herein by reference), or a Hall-effect sensor, such as the types described in U.S. Pat. Nos. 6,278,271; 5,942,895 and 6,184,679 (which are hereby incorporated herein by reference). The sensor circuitry and/or the circuitry in the mirror housing and associated with the sensor may include processing circuitry. For example, a printed circuit board may include processing circuitry which may include compensation methods, such as those described in U.S. Pat. Nos. 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; and 6,642,851, which are all hereby incorporated herein by reference. The compass sensor may be incorporated in or associated with a compass system and/or display system for displaying a directional heading of the vehicle to the driver, such as a compass system of the types described in U.S. Pat. Nos. 5,924,212; 4,862,594; 4,937,945; 5,131,154; 5,255,442; and/or 5,632,092, and/or U.S. patent application Ser. No. 10/456,599, filed Jun. 6, 2003, now U.S. Pat. No. 7,004,593, and/or PCT Application No. PCT/US2004/015424, filed May 18, 2004 and published on Dec. 2, 2004, as International Publication No. WO 2004/103772, which are all hereby incorporated herein by reference.

Optionally, the sensor may comprise a two-axis sensor (comprising two magneto-responsive sensor elements disposed orthogonally to each other and disposed in a cavity generally parallel to the floor plane of the vehicle so as to be sensitive to the horizontal component of the Earth's magnetic field), or the sensor may comprise a three-axis sensor (comprising two magneto-responsive sensor elements disposed orthogonally to each other and disposed in the cavity, and a third magneto-responsive sensor element at a right angle (approximately ninety degrees) to the two sensor elements and disposed in the cavity, so that the three-axis sensor is sensitive to the horizontal component and to the vertical component of the Earth's magnetic field), without affecting the scope of the present invention. The sensor may be arranged at a desired angle to provide enhances sensing in the horizontal directions when the mirror assembly is installed in the vehicle.

Optionally, an integrated automotive "compass-on-a-chip" may be disposed in a cavity of the mounting base of the mirror (or within the mirror housing or in an attachment to the mirror mount or elsewhere within the mirror assembly such as to the rear of the video screen or to the rear of the mirror reflective element) and may comprise at least two magneto-responsive sensor elements (such as a Hall sensor or multiple Hall sensors), associated A/D and D/A converters, associated microprocessor(s) and memory, associated signal processing and filtering, associated display driver and associated LIN/CAN BUS interface and the like, all (or a sub-set thereof) created or disposed or commonly established onto a semiconductor chip surface/substrate or silicon substrate, such as utilizing CMOS technology and/or fabrication techniques as known in the semiconductor manufacturing arts, and constituting an ASIC chip, such as utilizing principles described in U.S. patent application Ser. No. 11/226,628, filed Sep. 14, 2005, and published on Mar. 23, 2006 as U.S. Patent Publication No. 2006/0061008, and/or U.S. provisional applications, Ser. No. 60/624,091, filed Nov. 1, 2004; Ser. No. 60/638,250, filed Dec. 21, 2004; Ser. No. 60/642,227, filed Jan. 7, 2005; and Ser. No. 60/653,787, filed Feb. 17, 2005, which are hereby incorporated herein by reference, and/or such as by utilizing aspects of an EC driver-on-a-chip such as described in U.S. patent application Ser. No. 11/201,661, filed Aug. 11, 2005, now U.S. Pat. No. 7,480,149. The ASIC chip may be small (preferably less than approximately a two square centimeter area, more preferably less than approximately a 1.5 square centimeter area, and most preferably less than approximately a one square centimeter, area or thereabouts) and readily packagable into the mirror assembly (or a feed from such, a compass-on-a-chip may be provided to the mirror assembly from a compass-on-a-chip packaged elsewhere in the vehicle cabin remote from the mirror assembly such as in an instrument panel portion or in roof console portion). Such large scale integration onto the likes of the silicon substrate/chip can allow a compass functionality to be provided by a relatively small chip, and with appropriate pin out or electrical leads provided as is common in the electrical art.

The compass-on-a chip preferably may include some or all of the following:

Synchronous Communications (SI/O):
    8 or 16 bit Synchronous Serial Interface—1 channel
        Multi Word Buffer such as a 3 Word buffer
        Clock: Digital Out (Open Collector/Drain, 5 volt compatible)
        Data Out Digital Out (Open Collector/Drain, 5 volt compatible)
        Data In: Digital Input (5 volt compatible)

Asynchronous Communications (UART):
    BUS compatible such as LIN or CAN compatible
    Standard Baud rates selectable from at least 2400 to 19,200 or more
    2 lines, Tx & Rx PWM Generator:
   10 bit resolution
   250 Hz-1 kHz or higher
   Double buffered (new value can be loaded without disrupting current cycle)
   Digital Out (Open Collector/Drain, 5 volt compatible)
RAM:
   At least 768 bytes
EEPROM:
   At least 60 bytes
ROM/Flash (MD Usage):
   At least 10K; more preferably at least 20K; most preferably at least 30K
Watchdog Timer:
   Preferable intervals in the 1 to 2 second range.
Timers:
   1-16 bit timer Time Base Timer
   1-16 bit timer/counter/input capture (input line)
Reset:
   Brownout/Low Voltage detection built in.
Analog Requirements:
   4 Analog Inputs
   10 bit resolution
   100 readings per second per channel max.
   External analog reference pin
   Voltage range: 0 to 5V preferred, 3.3 v min.)
   Leakage current <1 microamp
Digital Inputs:
   4 Digital Inputs (5 volt compatible)
Digital Outputs:
   1 Push-Pull
   3 Open Collector/Drain, 5 volt compatible
Regulated Voltage:
   3.3 volts up to 10 ma.

The integrated compass chip may be connected to a power in or supply lead or wiring harness (such as a wiring harness that extends down from the headliner of the vehicle) and may connect to a wiring or harness of the mirror assembly. Preferably, the compass chip may connect between and in-line with the vehicle wiring harness and the mirror wiring harness (which may connect between the mounting base of the mirror assembly and the mirror casing, such as in the manner described in U.S. patent application Ser. No. 11/226,628, filed Sep. 14, 2005, and published on Mar. 23, 2006 as U.S. Patent Publication No. 2006/0061008; and/or U.S. provisional applications, Ser. No. 60/624,091, filed Nov. 1, 2004; Ser. No. 60/638,250, filed Dec. 21, 2004; Ser. No. 60/642,227, filed Jan. 7, 2005; and Ser. No. 60/653,787, filed Feb. 17, 2005, which are hereby incorporated herein by reference), or in-line with another pug/socket connector of the vehicle. The integrated compass chip thus may be readily connected, such as via plug-in-socket type connections, to both wires or harnesses to electrically connect the compass chip to the power source and to a display or user interface or input at the mirror. The connectors of the compass chip may be selected such that when the compass chip is not selected as an option of the vehicle, the vehicle wiring harness connects to or plugs into the mirror harness or wiring in the same manner, such that common wiring harnesses and/or connectors may be used at the vehicle and mirror, regardless of whether or not the compass system is included. Thus, an electronic chip (such as an integrated compass-on-a-chip) may be connected in-line with an existing plug/socket arrangement in the vehicle such that the presence of the chip-in-line is largely unnoticed by the vehicle occupants.

Because the compass sensor or sensors and circuitry may be positioned at or in or near the mirror assembly, the compass sensors could experience magnetic anomalies when the drive motor of the display screen is activated to extend/retract the display screen. Such magnetic anomalies may influence or corrupt the displayed compass heading and short or long term calibration of the compass system. Therefore, it is desirable that the mirror assembly or compass system include a compass disabling function or means, whereby the compass control or compass algorithm stops reading or disables the sensor or disregards or does not incorporate the raw compass value readings (such as the x and y A/D inputs) from the sensor when the drive motor is activated or running. The compass system or control thus limits or substantially precludes erroneous compass readings or calibrations that may occur if data is sampled by the compass sensor or sensors while the drive motor is extending or retracting the display screen.

Therefore, the present invention provides a mirror assembly that includes a video display screen which is laterally extendable from a side of a mirror casing for viewing by an occupant of a vehicle. The video display screen may be selectably or automatically slidably movable via one or more rails or slide members laterally within and/or along the mirror casing. The video display screen may be positioned substantially within the mirror casing when not in use (or may be movably attached to a rear surface or portion of a reflective element portion of the mirror assembly so as to be positioned substantially behind the mirror casing when not in use), and may extend substantially outward from the mirror casing toward the driver or passenger site of the vehicle when viewing of the video display screen is desired. By having extension of the video display screen occurring occasionally and in response to one or more activating events or stimuli, such as discussed above, the temporary extension or presence of the video display screen, even when in or partially in the forward field of view of driver, is not unacceptable or hazardous.

The extension and retraction mechanism allows for occasional use of the video display screen and allows the video display screen to be stowed when not in use. By slidably positioning the video display screen within or along/behind the mirror casing, the present invention provides for a large video display screen to enhance viewing of the images displayed thereon by the driver or other occupant of the vehicle, while having a minimal affect on the size of the mirror casing. For applications where the display element is received within the mirror casing, the mirror casing is formed to be wide enough to receive the video display screen therein, with the mirror casing being at least as wide as the height dimension of the video display screen. Alternately, for applications where the display element is movably attached to a rear of a reflective element portion of the mirror assembly, the mirror reflective element may comprise a lower profile or reduced height reflective element and mirror assembly and, thus, may enhance the forward field of view of the driver of the vehicle.

Although shown and described as being preferably incorporated into or at an interior rearview mirror assembly mounted at an interior surface of the windshield, or alternatively into or at an interior rearview mirror assembly mounted at a header portion of the vehicle or the like, embodiments of the present invention may be of benefit and may be used in other regions of the vehicle, such as in windshield electronic modules or accessory modules or overhead systems or overhead consoles or the like, or into an instrument panel portion of the vehicle, or elsewhere in the vehicle, without affecting the scope of the present invention. Optionally, for example, aspects of the present invention may be utilized in connection with a video slideout display element and/or a powered/movable sun visor display element of the types described in U.S. patent application Ser. No. 11/226,628, filed Sep. 14, 2005, and published on Mar. 23, 2006 as U.S. Patent Publication No. 2006/0061008, which is hereby incorporated herein by reference.

Therefore, the present invention provides a display screen that is slidably or movably positioned at or within a casing and that may be extendable and operable in conjunction with one or more systems of the mirror assembly or accessory module or console or of the vehicle. The display screen may extend sidewardly or laterally toward the passenger side of the vehicle from the casing, such as a mirror casing or windshield electronics module casing or accessory module casing or the like. The display screen may be linked to such systems to extend and to display information or video or the like pertaining to the particular system when that system is activated or selected. The display screen may automatically extend and activate to display such information or video when a particular system is activated, or when a particular condition or location of the vehicle is detected, and may automatically retract when the particular system is deactivated or when the particular condition or location of the vehicle is cured or completed or passed. The display system thus provides a dynamic extension and/or retraction system that responds dynamically to driving conditions and/or traffic conditions and/or vehicle conditions and/or hazardous conditions and/or selected systems or accessories, and that may extend to alert the driver that there is pertinent information or video being displayed at the display screen, and retract when such information or video is not necessary or desired.

Figure 47:
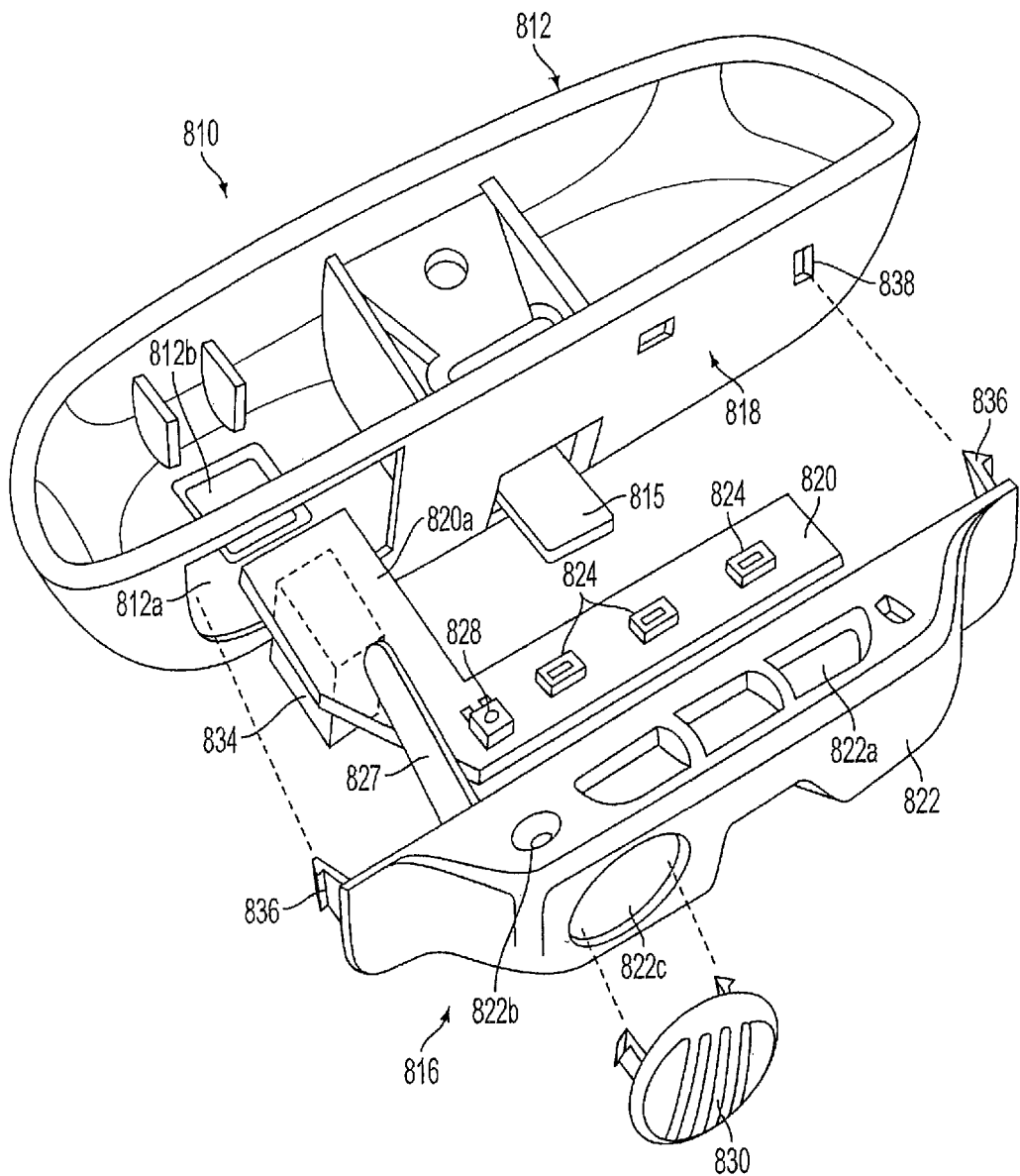
FIG. 47 is an exploded perspective view of another mirror assembly, with an attachable module that attaches to the lower portion of the mirror casing in accordance with the present invention.
Figure 48:
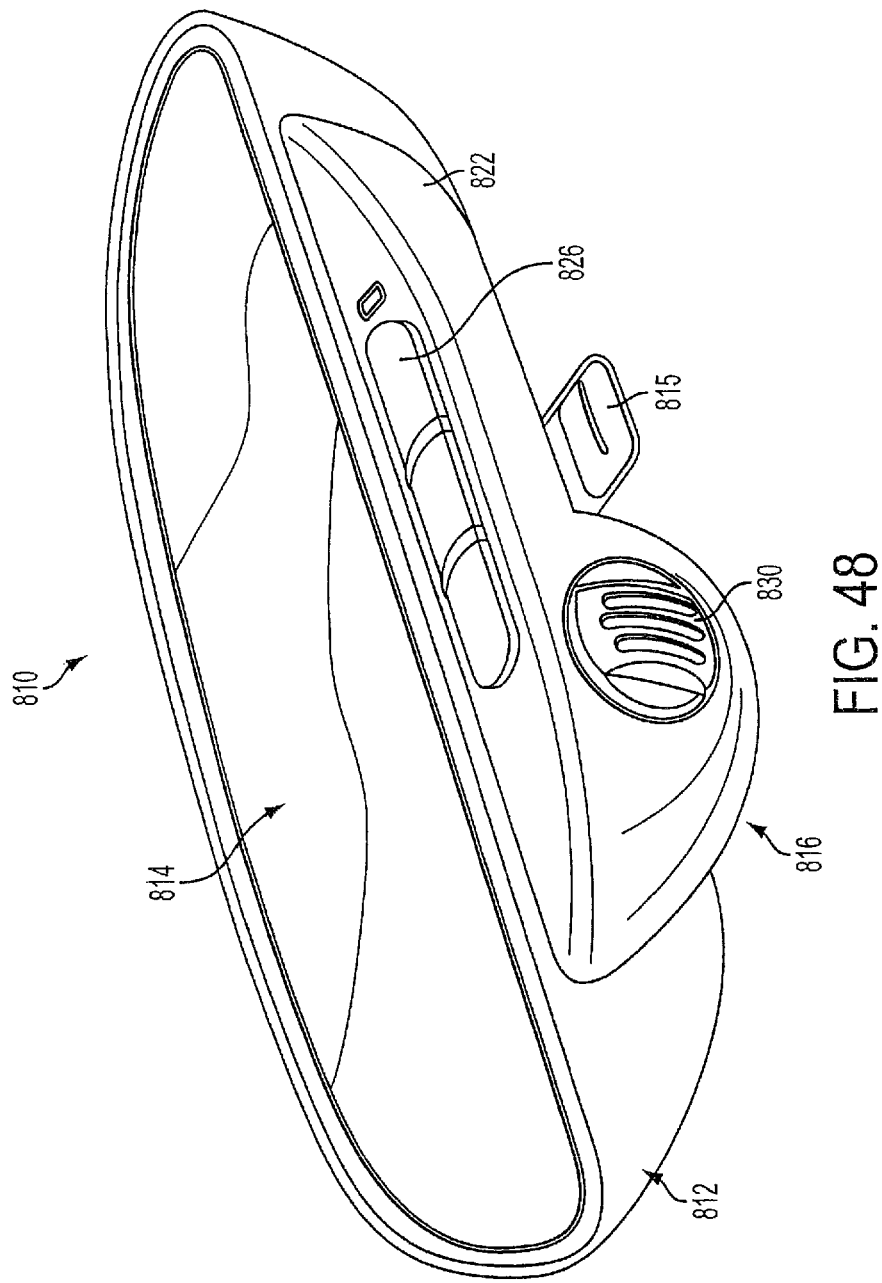
FIG. 48 is a lower perspective view of the mirror assembly of FIG. 47 as assembled.
Figure 49:
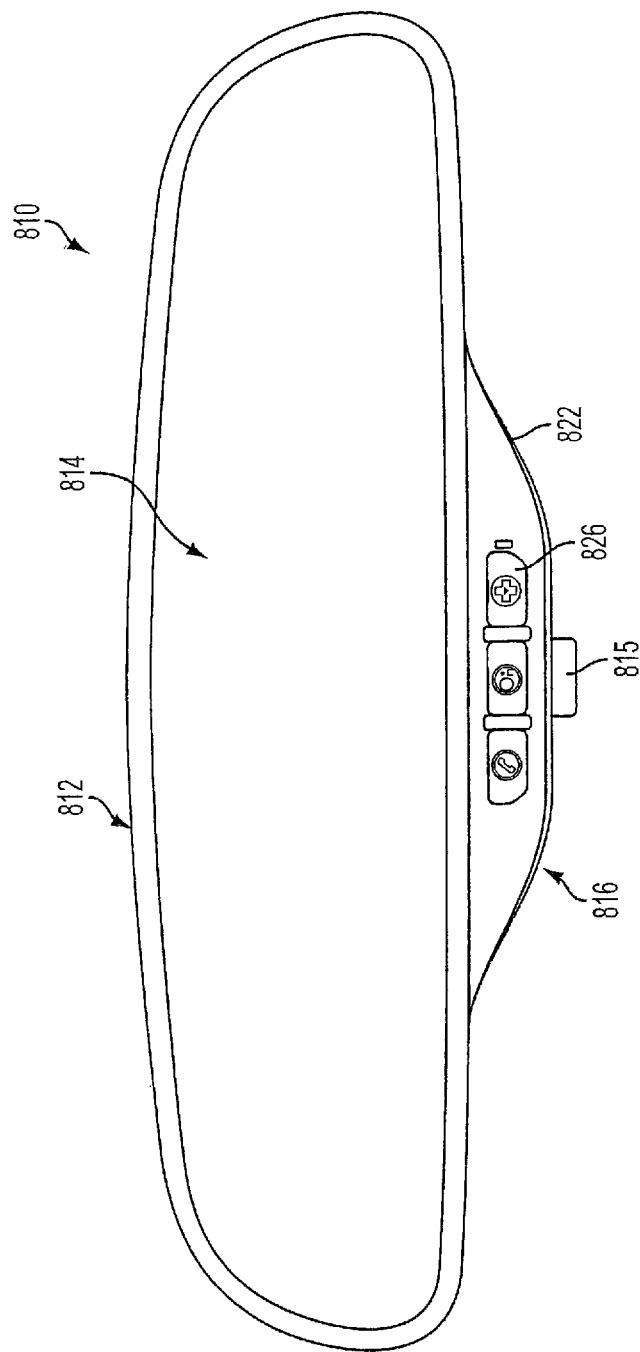
FIG. 49 is a front elevation of the mirror assembly of FIG. 48.
Figure 50:
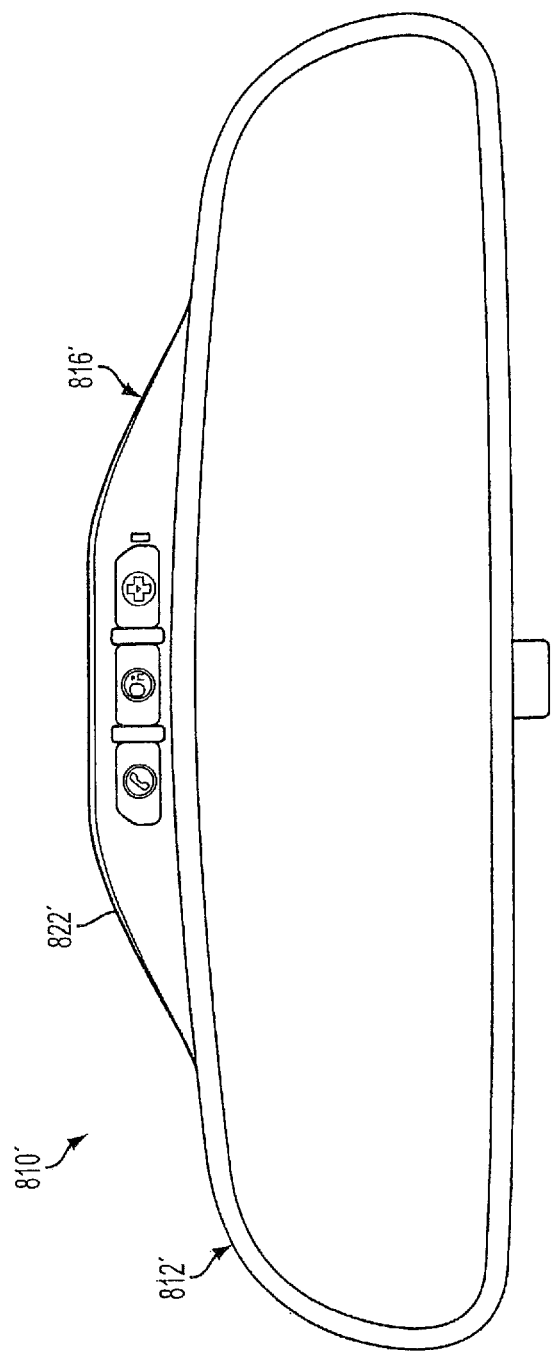
FIG. 50 is a front elevation of another mirror assembly similar to the mirror assembly of FIG. 49, but with the module attached to an upper portion of the mirror casing in accordance with the present invention.

Referring now to FIGS. 47-49, an interior rearview mirror assembly 810 includes a mirror casing 812 and a reflective element 814 (FIGS. 48 and 49), and a mirror accessory module or element or device 816 that is attachable at a mounting portion 818 of mirror casing 812. Mirror accessory element 816 includes a circuit board 820 and associated accessories and circuitry. Mirror accessory element 816 thus comprises an electronic accessory element having electronic content or features that is readily attached to the mounting portion 818 of the mirror casing 812 to provide such electronic content or features to a universal or common mirror casing 816. Thus, during construction of the mirror assembly 810, a mirror module or accessory element or subassembly with the desired or selected electronic content may be selected and attached to a common mirror casing to form a mirror assembly with the desired or selected electronic content therein, as discussed below.

Mirror accessory element 816 thus includes electronic circuitry and content, such as mechanical and/or electrical/electronic elements, such as lighting elements or user interface/button elements or microphone elements or antenna elements or electrical circuitry elements or camera elements or sensor elements or the like, encased or partially encased within a module casing or element 822, which forms a lower or chin portion of the mirror assembly 810 when attached to mounting portion 818 along a lower surface of the mirror casing 812 (such as shown in FIGS. 48 and 49). Optionally, a mirror accessory module or accessory element or subassembly 816' (FIG. 50) may attach to a mounting portion along an upper surface of the mirror casing 812' so that the module casing 822' provides an upper module or eyebrow portion of the mirror assembly 810' when attached thereto. Optionally, the mirror accessory element or module or subassembly may attach elsewhere at the body or casing of the mirror assembly, such as at the driver side or passenger side of the mirror assembly (when the mirror assembly is mounted at the vehicle), without affecting the scope of the present invention. As can be seen with reference to FIGS. 48-50, the module casing 822, 822' may be formed or contoured or sculpted to provide a clean connection to the mirror casing so that the mirror accessory element appears to be formed as part of the mirror casing when the mirror accessory element is attached to the mirror casing.

In the illustrated embodiment, mirror assembly 810 includes a prismatic reflective element 814 and a toggle assembly or toggle 815 that functions to flip the prismatic reflective element to adjust the degree of reflectance of light incident thereon, such as is known in the art. In such a prismatic mirror embodiment, the toggle 815 may comprise an elongated or lengthened toggle so that the toggle may extend down a sufficient amount to extend and protrude through the mirror accessory element 816 (such as through an opening or aperture in the mirror accessory element) when attached at the lower mounting portion 818 of mirror casing 812, and may extend a sufficient amount below the lower surface of the accessory module casing 822 so as to be readily accessible by the driver of the vehicle or user of the mirror assembly.

Circuit board 820 is attached to the module casing 822 so that the circuit board 820 and module casing 822 are provided as a modular unit or self-contained unit for attachment to the mirror casing 812. In the illustrated embodiment, circuit board 820 includes electrical switches 824 positioned along a portion of the circuit board 820 and generally aligned with openings 822a in module casing 822 when the circuit board 820 is attached to the module casing 822. The openings 822a may receive user inputs or buttons 826 (FIGS. 48 and 49) so that the user inputs 826 may be pressed by a user to actuate the electrical switches 824 at circuit board 820, such as to activate/deactivate/control an accessory at or in or associated with the mirror accessory element 816 and/or mirror assembly 810. As shown in FIG. 47, mirror accessory element 816 may include a support rib 827 that may support the circuit board 820 and that may assist in aligning the mirror accessory element with the mounting portion 818 of mirror, casing 812 and guiding the mirror accessory element or unit as the unit is pressed into engagement with and connected or attached to the mirror casing 812, as discussed below.

Optionally, the circuit board 820 may include a photo sensor or glare sensor 828, which may be located generally at an opening 822b in module casing 822 for detecting or sensing light or glare from rearward of the vehicle, such as for use in controlling the automatic dimming function of an electrochromic reflective element or the like. The circuit board 820 may also include electrochromic control circuitry for controlling the dimming of the reflective element 814, and may incorporate aspects of an EC driver-on-a-chip, such as the circuitry and chip described in U.S. patent application Ser. No. 11/201,661, filed Aug. 11, 2005, now U.S. Pat. No. 7,480,149, which is hereby incorporated herein by reference.

Optionally, circuit board 820 may include other accessories or devices, depending on the particular application of the mirror accessory element 816 and mirror assembly 810. For example, and as shown in FIG. 47, mirror accessory element 816 may include a microphone 830 for receiving audible or voice signals from within the cabin of the vehicle. The microphone may incorporate aspects of the microphones and systems described in U.S. Pat. Nos. 6,243,003; 6,278,377; and/or 6,420,975; and/or U.S. patent application Ser. No. 10/529,715, filed Mar. 30, 2005, now U.S. Pat. No. 7,657,052; and/or PCT Application No. PCT/US03/30877, filed Oct. 1, 2003, and published Apr. 15, 2004 as International Publication No. WO 2004/032568, which are hereby incorporated herein by reference.

Figure 51:
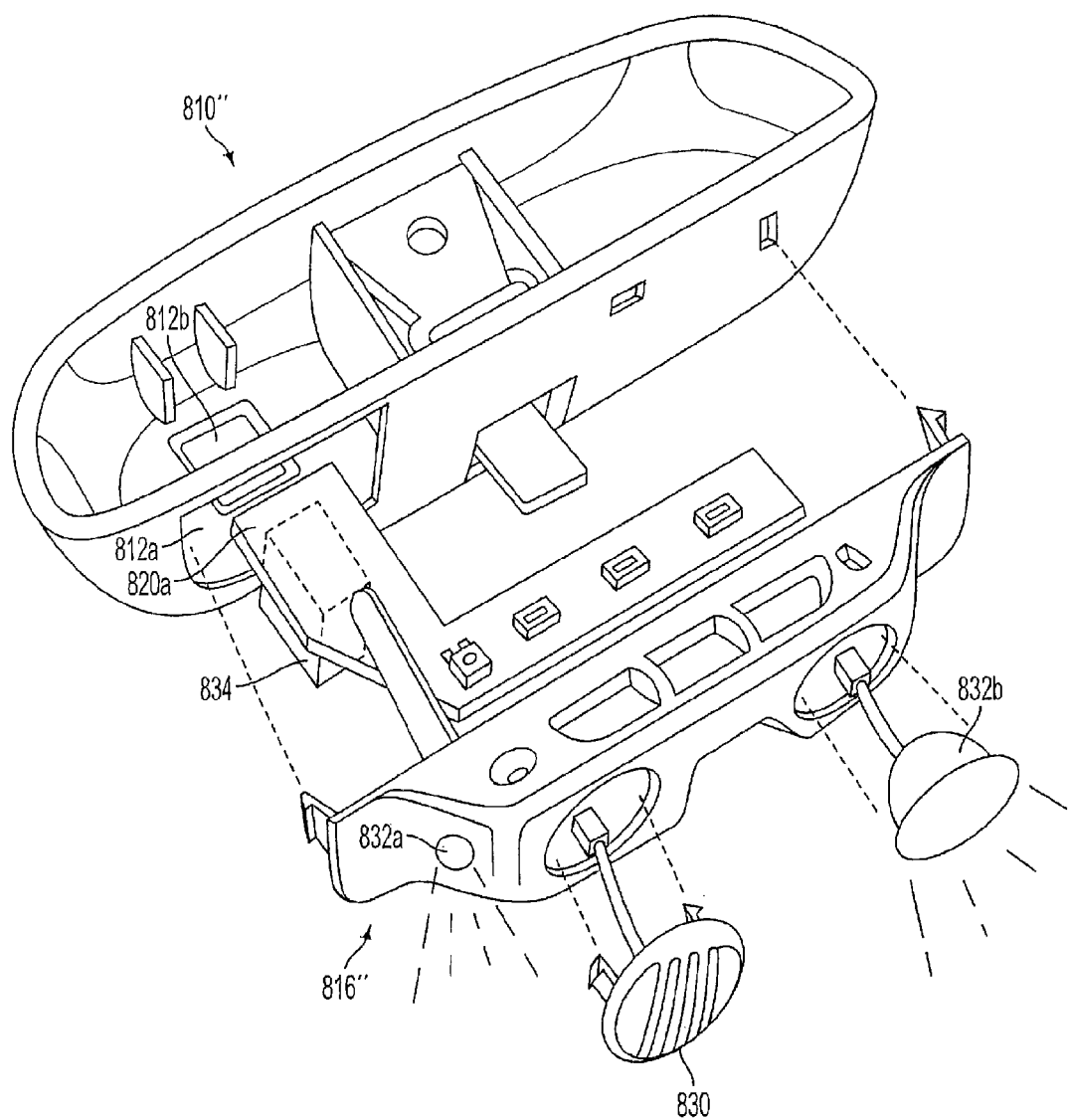
FIG. 51 is an exploded perspective view of another mirror assembly similar to that of FIG. 47, with illumination sources added to the attachable module.
Figure 52:
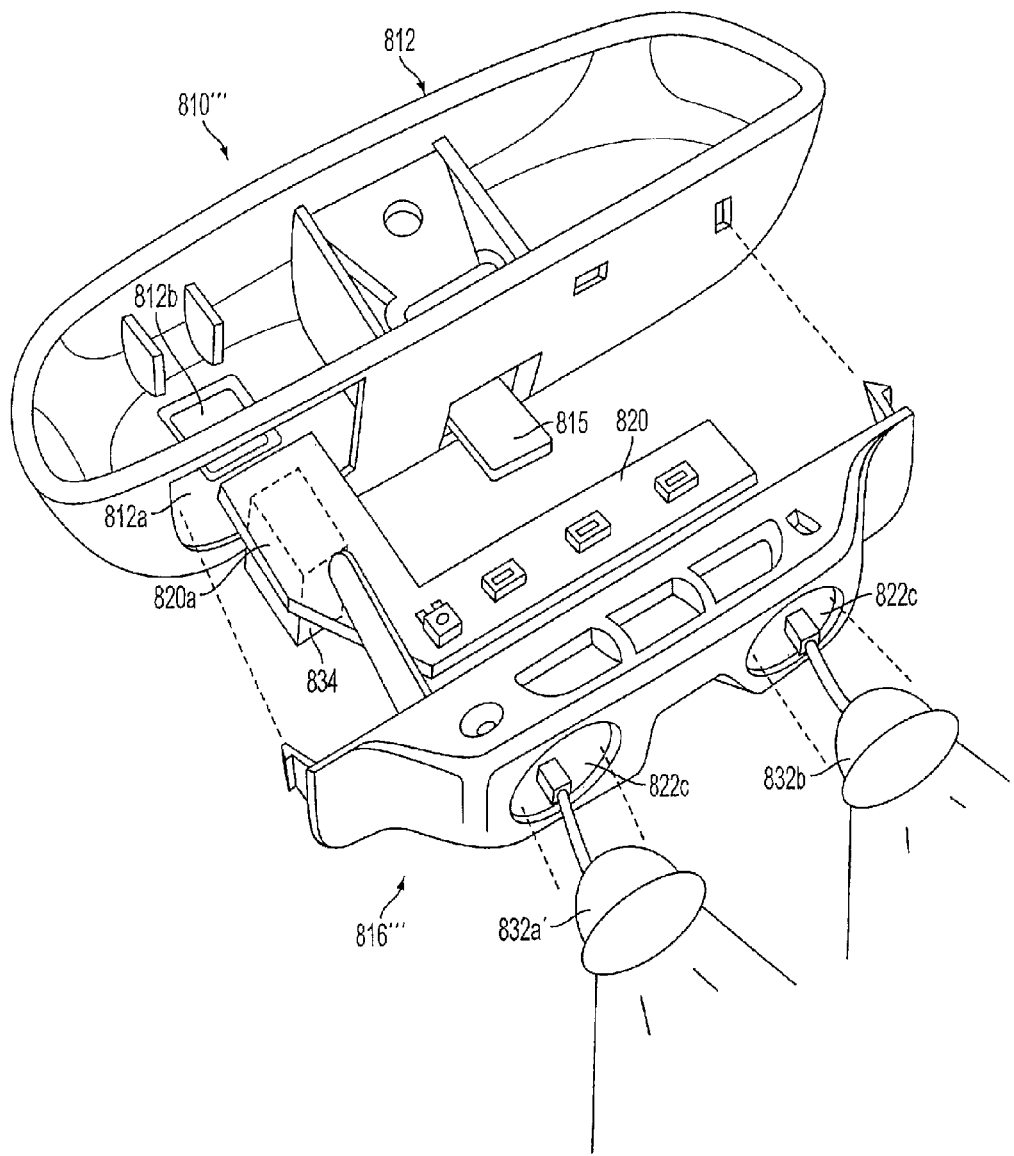
FIG. 52 is an exploded perspective view of another mirror assembly similar to that of FIG. 51, with other illumination sources added to the attachable module.

Optionally, for example, a mirror accessory module or element 816" (FIG. 51) for a mirror assembly 810" may also or otherwise include one or more illumination sources 832a, 832b that may be electrically connected to the circuit board 820 and may be activated/deactivated by one of the user inputs 826 and electrical switches 824 (or other inputs or controls). Optionally, for example, and as shown in FIG. 52, a mirror accessory module or element 816''' of a mirror assembly 810''' may not include a microphone, and may include two lights or illumination sources 832a', 832b, or may include other types of light sources or other accessories, without affecting the scope of the present invention. The illumination sources may direct or emit illumination toward a targeted area, such as for a map reading light application or the like, such as by utilizing aspects of the lights described in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; and/or 5,669,698, and/or U.S. patent application Ser. No. 10/054,633, filed Jan. 22, 2002, now U.S. Pat. No. 7,195,381; Ser. No. 10/745,056, filed Dec. 22, 2003, now U.S. Pat. No. 6,971,775; and/or Ser. No. 10/933,842, filed Sep. 3, 2004, now U.S. Pat. No. 7,249,860, which are hereby incorporated herein by reference. The mirror accessory elements 816'' and 816''' may otherwise be substantially similar to the mirror accessory element 816, such that a detailed description of the mirror accessory elements will not be repeated herein.

Optionally, the selected accessory, such as a microphone or light or the like, may be readily attached or snapped to the module casing 822, 822'' at a corresponding aperture 822c, and may be electrically connected to corresponding circuitry or connectors or terminals at the circuit board to readily provide the desired electronic feature at the mirror accessory element, and without having to re-tool the module casing for different applications. Preferably, the mechanical connection and electrical connection of the accessory to the module casing and circuitry are substantially simultaneously made as the accessory is attached, to the module, thereby providing a plug and play functionality. It is further envisioned that in applications where only one accessory or no accessories are selected for such an attachment, the apertures 822c in the module casing may be plugged or covered with a cover element or blank or punch out element or the like, such that a common module casing may be used for a variety of applications with varying electronic content.

Circuit board 820 includes an electrical connector 834 (such as a multi-pin connector with multiple electrically conducting terminals or pins, such as are known in the art) protruding therefrom for electrical connection to a connector at an end of a vehicle wire harness or the like at the rear of the mirror casing 812. For example, and as shown in FIG. 47, electrical connector 834 may be located at a tab or extension 820a of circuit board 820 so that electrical connector 834 and tab 820a (and support rib 827) are inserted through an opening 812a at mounting portion 818 of mirror casing 812 and into a cavity or interior region of mirror casing 812 when mirror accessory element 816 is attached to mounting portion 818. When so inserted, electrical connector 834 may be generally aligned with a connector opening or aperture 812b at a rear of the mirror casing 812, whereby the connector of the vehicle wiring harness may be readily inserted into or otherwise connected to connector 834 at aperture 812b to electrically connect the circuitry of circuit board 820 to the vehicle power and/or controls. The wire and connector extending to and connecting to the connector 834 of mirror accessory element 816 may comprise a vehicle wire harness or lead or other wire or cable or harness or lead that may extend down from the vehicle headliner and/or console or the like, and that may be routed or managed along the windshield and to the mirror assembly, and such as by utilizing wire managements techniques of the types described in U.S. patent application Ser. No. 11/226,628, filed Sep. 14, 2005, and published on Mar. 23, 2006 as U.S. Patent Publication No. 2006/0061008; and/or PCT Application No. PCT/US2004/015424, filed May 18, 2004 and published on Dec. 2, 2004, as International Publication No. WO 2004/103772; and/or U.S. provisional application Ser. No. 60/729,430, filed Oct. 21, 2005 by Hook for MOUNTING ASSEMBLY FOR VEHICLE INTERIOR MIRROR, which are hereby incorporated by reference herein.

As shown in FIG. 47, the mirror accessory element 816 may include locking tabs 836 that are received in corresponding apertures or slots 838 in mirror casing 812 (and at mounting portion 818) to attach or snap the mirror accessory element 816 to mirror casing 812. As the mirror accessory element 816 is moved into engagement and attached to the mirror casing 812, the electrical connector 834 is moved into position at the connector opening 812b at the rear of mirror casing 812 and toggle or tab 815 is inserted through the mirror accessory element 816 so as to extend below the mirror accessory element when the accessory element is attached or secured or snapped to the mirror casing.

The mirror module or accessory element or subassembly of the present invention thus provides electrical content to a common mirror casing and reflective element (such as a baseline type of mirror casing and reflective element), so that the desired electrical content and features may be readily provided at a mirror assembly without requiring separate mirror casings and particular structures within the mirror casings. A variety of mirror features and assemblies thus may be provided with a common mirror casing and reflective element and toggle assembly, whereby different electronic features may be provided without having to re-tool the mirror casing. For example, a telematics function or system for a vehicle may be incorporated into the mirror accessory element (such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; 6,946,978; and 6,420,975; 6,477,464; and/or 6,678,614; and/or U.S. patent application Ser. No. 10/456,599, filed Jun. 6, 2003, now U.S. Pat. No. 7,004,593; Ser. No. 10/645,762, filed Aug. 20, 2003, now U.S. Pat. No. 7,167,796; Ser. No. 10/964,512, filed Oct. 13, 2004, now U.S. Pat. No. 7,308,341; Ser. No. 10/538,724, filed Jun. 13, 2005, and published Mar. 9, 2006 as U.S. Publication No. 2006/0050018; and/or Ser. No. 10/529,715, filed Mar. 30, 2005, now U.S. Pat. No. 7,657,052, which are all hereby incorporated herein by reference) and may include a microphone and/or speaker and/or associated circuitry, so that such a telematic feature may be readily added to a baseline mirror assembly via the mirror accessory element of the present invention. It is further envisioned that the mirror accessory element of the present invention may facilitate after market electronic content that may be added to a mirror assembly by a customer, if such additional or other features are later desired. Various electronic accessories and/or circuitry may be provided, such as the types of accessories described above, without affecting the scope of the present invention. The electrical elements or devices or circuitry of the accessory module or element may receive data and/or transmit data, depending on the particular circuitry or elements for the particular application of the mirror accessory module or element.

Optionally, the common mirror casing 812 may receive an electro-optic reflective element (such as an electrochromic reflective element) and the circuit board may include the EC control circuitry or other circuitry, whereby the electrical connection of the EC control circuitry to the terminals or connectors of the reflective element assembly or cell may be made as the mirror accessory element is attached to the mirror casing. Other electrical connections may also or otherwise be made upon mechanical attachment of the mirror module to the mirror casing.

Thus, the mirror accessory module or accessory element of the present invention may provide one or more electronic accessories or features at the mirror assembly via attachment of the mirror accessory element to the mirror casing. The electronic circuitry and/or elements that are incorporated in the mirror accessory module or element or subassembly are self-contained within the mirror accessory element, and need only be electrically connected to a power source or control or electrical feed or data feed at the mirror assembly in order to be operational. Optionally, the self-contained elements may include a power source or battery, so that the mirror accessory element is substantially or entirely self-powered and self-operated separate from the mirror assembly.

Therefore, the mirror module or accessory element or subassembly and common mirror casing of the present invention provides electrical content or features (such as a desired or selected feature or accessory or the like) to a mirror assembly, such that the mirror casing, reflective element and mounting arrangement may comprise common components across a vehicle line or the like. The mirror assemblies thus may be readily assembled with different electronic features or content by attaching an appropriate mirror module or accessory element to the mounting portion of the mirror casing. The mirror module or accessory element of the present invention thus may readily provide electronic content to a baseline, prismatic type mirror without having to re-tool the mirror casing and without having to provide a circuit board and the like within the mirror casing, such as at the rear of the reflective element or the like.

Changes and modifications in the specifically described embodiments may be carried out without departing from the principles of the present invention, which is intended to be limited only by the scope of the appended claims as interpreted according to the principles of patent law.

The embodiments of the invention in which an exclusive property or privilege is claimed are defined as follows:

1. A video mirror system suitable for use in a vehicle, said video mirror system comprising:
    an interior rearview mirror assembly mountable at an interior portion of a vehicle, said interior rearview mirror assembly comprising a mirror case and a reflective element, said reflective element having a front portion that faces generally towards a driver of the vehicle when said interior rearview mirror assembly is mounted at the interior portion of the vehicle, and having a rear portion that is generally opposite said front portion;
    wherein said reflective element comprises an electrochromic reflective element;
    a video display device;
    wherein said video display device is one of (i) fixedly disposed in said mirror case and (ii) extendable and retractable relative to said mirror case;
    wherein said video display device is operable to display video images that are viewable by the driver of the vehicle when said interior rearview mirror assembly is mounted at the interior portion of the vehicle;
    wherein said video display device comprises at least one of (i) a multi-pixel light emitting diode (LED) display, (ii) an organic light emitting diode (OLED) display, (iii) a liquid crystal display backlit by a plurality of white light emitting light emitting diodes, (iv) a thin film transistor multi-pixel liquid crystal display backlit by a plurality of white light emitting light emitting diodes, (v) a multi-pixel organic electroluminescent display, (vi) a backlit pixelated display and (vii) an electroluminescent (EL) display; and
    wherein said interior rearview mirror assembly comprises an on-screen display controller and wherein said on-screen display controller is operable to receive a video signal from a camera and wherein, responsive to receipt of said video signal, said on-screen display controller is operable to generate a video feed to said video display device.

2. The video mirror system of claim 1, wherein said video signal comprises an analog video signal.

3. The video mirror system of claim 1, wherein said video feed generated by said on-screen display controller includes a graphic overlay.

4. The video mirror system of claim 1, wherein said video feed generated by said on-screen display controller includes information.

5. The video mirror system of claim 1, wherein said on-screen display controller is operable to overlay, onto a video signal received from said camera, at least one of (i) information, (ii) an icon, (iii) indicia and (iv) a marker.

6. The video mirror system of claim 5, wherein, when said interior rearview mirror assembly is mounted at the interior portion of the vehicle, said on-screen display controller is operable to generate a graphic overlay that provides at least one of (a) an indication of distance to an object exterior of the vehicle, (b) a highlighting of an object exterior of the vehicle and (c) an alert to the driver of the vehicle.

7. The video mirror system of claim 1, wherein said video display device is fixedly disposed in said mirror case and is positioned at least one of (i) rearward of said reflective element and (ii) sideward of said reflective element.

8. The video mirror system of claim 1, wherein said reflective element comprises a transflective mirror reflector.

9. The video mirror system of claim 8, wherein said video display device is fixedly disposed in said mirror case and is disposed to the rear of said rear portion of said reflective element, and wherein the presence of said video display device to the rear of said rear portion of said reflective element is substantially non-discernible when said interior rearview mirror assembly is mounted at the interior portion of the vehicle and is viewed in the vehicle by the driver with the video display device not activated, and wherein said video display device, when activated, displays video images viewable through said transflective mirror reflector by the driver when said interior rearview mirror assembly is mounted at the interior portion of the vehicle and is viewed in the vehicle.

10. The video mirror system of claim 1, wherein said video display device is extendable and retractable relative to said mirror case.

11. The video mirror system of claim 1, wherein said camera comprises a rear camera having a rearward field of view to the rear of the vehicle, and wherein, when said interior rearview mirror assembly is mounted at the interior portion of the vehicle, said video display device is operable to display video images captured by said rear camera when the driver of the vehicle is executing a reversing maneuver.

12. The video mirror system of claim 11, wherein said video display device is fixedly disposed in said mirror case.

13. The video mirror system of claim 11, wherein display by said video display device of video images captured by said rear camera when the driver of the vehicle is executing a reversing maneuver continues until a threshold criterion is met.

14. The video mirror system of claim 13, wherein said threshold criterion comprises at least one of (i) the vehicle traveling forward at or greater than a threshold speed, (ii) the vehicle traveling forward a threshold distance after reverse gear of the vehicle was disengaged, and (iii) a threshold amount of time having elapsed since reverse gear of the vehicle was disengaged.

15. The video mirror system of claim 11, wherein said video display device is operable to display other information during periods when the driver of the vehicle is not executing a reversing maneuver.

16. The video mirror system of claim 15, wherein said other information comprises at least one of (a) video images from another camera of the vehicle, (b) navigational information, and (c) information relating to operation of the vehicle.

17. The video mirror system of claim 11, wherein said on-screen display controller is operable to overlay a graphical overlay onto a video signal received from said rear camera.

18. The video mirror system of claim 1, wherein the display luminance of video images displayed by said video display device, as viewed by the driver viewing said interior rearview mirror assembly when said interior rearview mirror assembly is mounted at the interior portion of the vehicle, is automatically adjusted responsive to an ambient light detection by a light sensor of said interior rearview mirror assembly.

19. The video mirror system of claim 1, wherein at least one of (i) intensity of what is displayed by said video display device is adjustable in response to at least one light sensor, (ii) contrast of what is displayed by said video display device is adjustable in response to at least one light sensor, and (iii) brightness of what is displayed by said video display device is adjustable in response to at least one light sensor.

20. The video mirror system of claim 1, wherein said video display device is operable to display three dimensional information.

21. The video mirror system of claim 1, wherein said video display device comprises a polarizer.

22. The video mirror system of claim 1, wherein said video display device comprises a metallic enclosure and wherein said metallic enclosure is electrically grounded when said interior rearview mirror assembly is mounted at the interior portion of the vehicle.

23. The video mirror system of claim 1, wherein said video display device includes at least one element to reduce EMC effects, and wherein said at least one element comprises at least one of (i) a decoupling capacitor, (ii) a bypass capacitor, (iii) a feed through capacitors, (iv) ferrite beads, (v) inductors and (vi) common mode chokes.

24. The video mirror system of claim 1, wherein, when said interior rearview mirror assembly is mounted at the interior portion of the vehicle, at least one of (i) said video signal is received via a twisted pair wire, (ii) said video signal is received via a shielded twisted pair wire, (iii) said video signal is received via a data bus of the vehicle, (iv) said video signal is received via a data bus of the vehicle and wherein said data bus comprises a MOST data bus protocol, and (v) said video signal is received via a data bus of the vehicle and wherein said data bus comprises a FlexRay data bus protocol.

25. The video mirror system of claim 1, wherein said video display device comprises heating means.

26. The video mirror system of claim 1, wherein said video display device comprises a liquid crystal display backlit by a plurality of white light emitting light emitting diodes.

27. The video mirror system of claim 1, wherein said video display device comprises a monochromatic video display.

28. The video mirror system of claim 1, wherein said interior rearview mirror assembly comprises a user interface input, and wherein said user interface input comprises at least one of a touch sensor and a proximity sensor.

29. The video mirror system of claim 28, wherein said interior rearview mirror assembly includes demarcations to enhance the visibility and discernibility of said user interface input to a user.

30. The video mirror system of claim 28, wherein, responsive to a touch or proximity of a user's finger at said user interface input, an icon or indicia associated with said user interface input is backlit to at least temporarily illuminate said icon or indicia.

31. The video mirror system of claim 30, wherein said icon or indicia is backlit for a period of time following actuation of said user interface input.

32. The video mirror system of claim 1, wherein, when said interior rearview mirror assembly is mounted at the interior portion of the vehicle, said on-screen display controller is in communication with a vehicle fault detection system, and wherein, when the vehicle fault detection system detects a fault condition of an accessory or system of the vehicle, said on-screen display controller is operable to indicate the fault condition at said video display device.

33. The video mirror system of claim 1, wherein, when said interior rearview mirror assembly is mounted at the interior portion of the vehicle and responsive to a determination of a geographical location of the vehicle, said video display device is operable to display information pertaining to the geographic location of the vehicle.

34. The video mirror system of claim 33, wherein said video display device automatically displays said information pertaining to the geographic location of the vehicle and, following a display period of time, automatically stops displaying said information pertaining to the geographical location of the vehicle.

35. The video mirror system of claim 34, wherein said information pertaining to the geographical location of the vehicle comprises an advertisement of a business within a threshold distance from the geographical location of the vehicle.

36. The video mirror system of claim 1, wherein, when said interior rearview mirror assembly is mounted at the interior portion of the vehicle, said video mirror system is operable to generate a prompt to alert the driver of the vehicle that said video display device is displaying information.

* * * * *

UNITED STATES PATENT AND TRADEMARK OFFICE
CERTIFICATE OF CORRECTION

| | |
|---|---|
| PATENT NO. | : 8,908,039 B2 |
| APPLICATION NO. | : 13/487806 |
| DATED | : December 9, 2014 |
| INVENTOR(S) | : Darryl De Wind et al. |

It is certified that error appears in the above-identified patent and that said Letters Patent is hereby corrected as shown below:

In the Specification

Column 5
Line 10, "refracted" should be --retracted--

Column 7
Line 53, insert --U.S. Pat. No.-- after "now"

Column 13
Line 17, "NanoMuseleTM" should be --NanoMuscleTM--

Column 14
Line 5, "minor" should be --mirror--

Column 20
Line 2, "easing" should be --casing--

Column 21
Line 31, insert --thus-- after "and";
Line 33, "fall" should be --full--

Column 23
Line 64, "a'" should be --a--

Column 26
Line 46, "hoard" should be --board--

Column 28
Line 55, "minor" should be --mirror--

Signed and Sealed this
Seventeenth Day of November, 2015

Michelle K. Lee
*Director of the United States Patent and Trademark Office*

In the Specification

Column 29
Line 21, "RUB" should be --RGB--

Column 30
Line 1, insert --in-- after "described"

Column 45
Line 16, "312fwhich" should be --312f which--;
Line 25, "312f'" should be --312f--;
Line 33, "312f'" should be --312f--;
Line 39, "minor" should be --mirror--

Column 46
Line 20, "easing" should be --casing--;
Line 24, "318e" should be --318c--

Column 48
Line 19, "aim" should be --arm--

Column 50
Line 52, "minor" should be --mirror--

Column 53
Line 25, "minor" should be --mirror--

Column 58
Line 28, insert --if a-- after "example"

Column 59
Line 65, "minor" should be --mirror--

Column 64
Line 33, "6,278,3,77" should be --6,278,377--

Column 69
Line 11, "5,576,6.87" should be --5,567,687--

Column 72
Line 28, "site" should be --side--

CERTIFICATE OF CORRECTION (continued)
U.S. Pat. No. 8,908,039 B2

In the Claims

Column 78
Line 6, claim 1, "minor" should be --mirror--